US012763939B2

(12) United States Patent
Miele

(10) Patent No.: US 12,763,939 B2
(45) Date of Patent: Oct. 13, 2026

(54) PERFORMING SCRAMBLING AND/OR DESCRAMBLING ON PARALLEL COMPUTING ARCHITECTURES

(71) Applicant: NVIDIA Corporation, Santa Clara, CA (US)

(72) Inventor: Andrea Miele, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 359 days.

(21) Appl. No.: 18/143,335

(22) Filed: May 4, 2023

(65) Prior Publication Data

US 2023/0308270 A1 Sep. 28, 2023

Related U.S. Application Data

(63) Continuation of application No. 16/559,442, filed on Sep. 3, 2019, now abandoned.

(51) Int. Cl.

| | |
|---|---|
| ***H04L 9/08*** | (2006.01) |
| ***G06F 7/58*** | (2006.01) |
| ***H04N 21/8352*** | (2011.01) |
| *H04W 12/03* | (2021.01) |

(Continued)

(52) U.S. Cl.

CPC ............ *H04L 9/0866* (2013.01); *G06F 7/584* (2013.01); *H04N 21/8352* (2013.01); *H04W 12/03* (2021.01); *H04W 84/042* (2013.01); *H04W 88/08* (2013.01)

(58) Field of Classification Search

CPC ... H04L 9/0866; G06F 7/584; H04N 21/8352; H04W 12/03; H04W 84/042; H04W 88/08; H04W 12/72; H04W 12/73; G06N 3/045; G06N 3/049; G06N 3/088; G06N 3/063; G06N 3/084; H04B 1/0003

See application file for complete search history.

(56) References Cited

U.S. PATENT DOCUMENTS

| | | | | |
|---|---|---|---|---|
| 6,947,468 | B2 * | 9/2005 | Medlock ................. | H04J 13/10 708/250 |
| 7,746,350 | B1 | 6/2010 | Danilak | |
| 2002/0138721 | A1 | 9/2002 | Kwon et al. | |

(Continued)

FOREIGN PATENT DOCUMENTS

| | | | |
|---|---|---|---|
| CN | 107241123 | A | 10/2017 |
| JP | 63221492 | A | 9/1988 |

(Continued)

OTHER PUBLICATIONS

Office Action mailed Jan. 17, 2025 in Chinese Patent Application No. 202080072395.x, Nvidia Corporation, pp. 1-22 including machine translation.

(Continued)

*Primary Examiner* — Dhaval V Patel

(74) *Attorney, Agent, or Firm* — Robert C. Kowert; Kowert, Hood, Munyon, Rankin & Goetzel, P.C.

(57) ABSTRACT

Apparatuses, systems, and techniques to descramble or scramble data use a graphics processing unit (GPU) to perform descrambling. For example, in at least one embodiment, generation of a descrambling sequence is distributed among GPU threads for parallel calculation of the descrambling sequence and/or descrambling is distributed among GPU threads for descrambling.

25 Claims, 50 Drawing Sheets

Initial State, $F1_0(x) = \{k_1(30)=k_1(29)=k_1(28)=...=k_1(4)=k_1(3)=k_1(2)=k_1(1)=0,\ k_1(0)=1\}$ Taps/Feedback Polynomial: $F1(x)=x^{31}+x^3+1$

(51) Int. Cl.
*H04W 84/04* (2009.01)
*H04W 88/08* (2009.01)

(56) References Cited

U.S. PATENT DOCUMENTS

| | | | | |
|---|---|---|---|---|
| 2004/0090907 | A1 | 5/2004 | An | |
| 2004/0223472 | A1 | 11/2004 | Sankaran et al. | |
| 2006/0209973 | A1* | 9/2006 | Gorokhov | H04L 5/0048 375/260 |
| 2007/0283231 | A1* | 12/2007 | Hoyle | G06F 7/584 714/781 |
| 2009/0323784 | A1 | 12/2009 | Depienne et al. | |
| 2010/0299579 | A1 | 11/2010 | Lablans | |
| 2011/0142232 | A1* | 6/2011 | Jeong | H04L 9/0662 380/42 |
| 2011/0293062 | A1 | 12/2011 | Lablans | |
| 2012/0005455 | A1 | 1/2012 | Ueda | |
| 2016/0211971 | A1 | 7/2016 | Lablans | |

FOREIGN PATENT DOCUMENTS

| | | | |
|---|---|---|---|
| WO | 0150239 | A1 | 7/2001 |
| WO | 2019137480 | A1 | 7/2019 |

OTHER PUBLICATIONS

IEEE, "IEEE Standard 754-2008 (Revision of IEEE Standard 754-1985): IEEE Standard for Floating-Point Arithmetic," Aug. 29, 2008, 70 pages.

International Search Report and Written Opinion mailed Dec. 3, 2020, for International Patent Application No. PCT/US2020/048616, filed Aug. 28, 2020.

Ji et al., "Fast Parallel CRC Algorithm and Implementation on a Configurable Processor," IEEE, 2002, 5 pages.

Kirk et al., "Programming Massively Parallel Processors—A Hands-on Approach," retrieved on Jul. 26, 2013, from https://dl.acm.org/doi/pdf/10.5555/2597841, 2010, 279 pages.

Lauradoux "From Hardware to Software Synthesis of Linear Feedback Shift Registers," Fibonacci LFSR and Galois LFSR and use for data scrambling, 2007, http://www.cece.uci.edu/-papers/ipdps07/pdfs/POHLL-07-paper1.pdf, 8 pages.

Li et al., "From WiFi to WiMax: Efficient GPU-based Parameterized Transceiver Across Different OFDM Protocols," KSII Transactions on Internet and Information Systems, vol. 7(8), Aug. 30, 2013, pp. 1911-1932.

Nvidia, "Nvidia Turing GPU Architecture," retrieved on Mar. 25, 2020, from https://www.nvidia.com/content/dam/en-zz/Solutions/design-visualization/technologies/turing-architecture/NVIDIA-Turing-Architecture-Whitepaper.pdf, Jan. 1, 2018, 86 pages.

Office Action for United Kingdom Application No. GB2202263.6, mailed Dec. 5, 2022, 4 pages.

Office Action for United Kingdom Application No. GB2202263.6, mailed May 3, 2023, 4 pages.

Society of Automotive Engineers On-Road Automated Vehicle Standards Committee, "Taxonomy and Definitions for Terms Related to Driving Automation Systems for On-Road Motor Vehicles," Standard No. J3016-201609, issued Jan. 2014, revised Sep. 2016, 30 pages.

Society of Automotive Engineers On-Road Automated Vehicle Standards Committee, "Taxonomy and Definitions for Terms Related to Driving Automation Systems for On-Road Motor Vehicles," Standard No. J3016-201806, issued Jan. 2014, revised Jun. 2018, 35 pages.

Milovanovic et al., "Concurrent Generation of Pseudo Random Numbers with LSFR of Fibonacci and Galois Type," Compputing and Informatics, vol. 34, 2015, 18 pages.

Office Action for United Kingdom Application No. GB2202263.6, mailed Apr. 4, 2024, 5 pages.

Office Action for United Kingdom Application No. GB2202263.6, mailed Apr. 24, 2024, 4 pages.

Office Action mailed Jun. 21, 2025 in Chinese Patent Application No. 202080072395.x, Nvidia Corporation, pp. 1-22 including machine translation.

Decision on Granting of Patent Right mailed Jun. 9, 2026 in Chinese patent application No. 202080072395.x, NVIDIA Corporation, 10 pages including translation.

* cited by examiner

Initial State, $G1'_0(x) = F1'_0(x)P(x)/X^{31}$, where $F1'_0(x)$=bit reversal of $F1_0(x)$ Taps/Feedback Polynomial: $G1(x)=x^{31}+x^3+1$ Initial State, $G2'_0(x) = F2'_0(x)P(x)/X^{31}$, where $F2'_0(x)$=bit reversal of $F2_0(x)$ Taps/Feedback Polynomial: $G2(x)=x^{31}+x^3+x^2+x+1$

PERFORMING SCRAMBLING AND/OR DESCRAMBLING ON PARALLEL COMPUTING ARCHITECTURES

CROSS-REFERENCE TO RELATED APPLICATIONS

This application is a continuation of U.S. patent application Ser. No. 16/559,442, filed Sep. 3, 2019, entitled "PERFORMING SCRAMBLING AND/OR DESCRAMBLING ON PARALLEL COMPUTING ARCHITECTURES," the disclosure of which is incorporated by reference herein in its entirety.

TECHNICAL FIELD

This disclosure relates to at least one embodiment for performing scrambling and/or descrambling of communications data, and more particularly, at least one embodiment relates to performing scrambling and/or descrambling of communications data using parallel computing architectures in wireless communications and processing.

BACKGROUND

In some communications protocols, data is received and processed by a receiver pipeline and a step in a receiver pipeline might be applying a sequence to received data that would descramble data that was scrambled using a corresponding sequence, or would scramble unscrambled data. In many communication applications, descrambling takes a significant amount of time, especially for current and future applications that rely upon improved communications speed.

DETAILED DESCRIPTION

Figure 1:
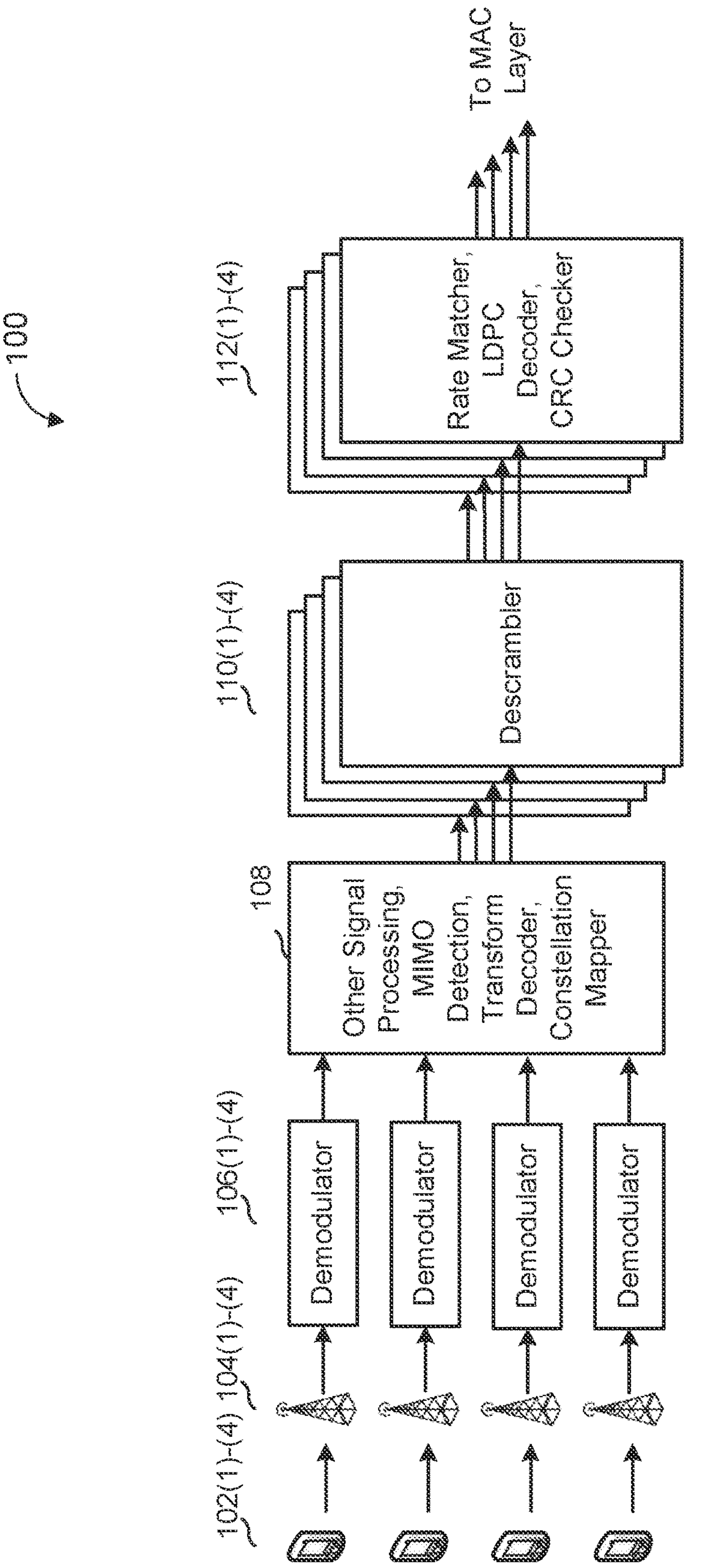
FIG. 1 illustrates data reception at a physical layer (PHY) of a mobile device network, according to one or more embodiments.

For many communications protocols, such as 5G and LTE protocols used with mobile communications, data is processed at a receiver and/or a transmitter according to specifications of those protocols. In at least one embodiment, one such operation is descrambling of received data. In at least one embodiment, if a stream of data is scrambled by changing data in some way prior to being transmitted, it can be descrambled upon reception using an inverse of a scrambling process. In at least one embodiment, where scrambling involves performing an exclusive XOR on bits of an input data sequence with corresponding bits of a scrambling sequence, then descrambling can be done by again performing an exclusive XOR to return to that original input data sequence. In at least one embodiment, examples herein describing descrambling can be used for scrambling as a result.

In at least one embodiment, a descrambling sequence can be a pseudorandom bit sequence that is generated using linear feedback shift registers (LFSRs). In at least one embodiment, a LFSR outputs a bit sequence that is a function of its feedback connections and its initial state as that LFSR is cycled through its states.

In at least one embodiment, feedback connections, or taps, for an LFSR referred to as a many-to-one LFSR, or a Fibonacci LFSR, might have an input to such an LFSR be an XOR of values of several shift register stages of that LFSR. In at least one embodiment, a given future state of a Fibonacci LFSR can be obtained by loading shift register stages of that Fibonacci LFSR with an initial state and then cycling that Fibonacci LFSR, where each cycle involves shifting each stage to a next stage in that Fibonacci LFSR, outputting an LFSR output from a last stage of that Fibonacci LFSR and loading a first stage of that Fibonacci LFSR with an XOR of values in shift register stages corresponding to those taps. In at least one embodiment, a pattern of taps for an LFSR can be represented as a generator polynomial for that LFSR.

Feedback taps for an LFSR referred to as a one-to-many LFSR, or a Galois LFSR, might have an output of such a Galois LFSR being an input to a first stage of that Galois LFSR as well as its output being XOR-ed with values shifted between shift register stages of that Galois LFSR. In at least one embodiment, a given future state of a Galois LFSR can be obtained by loading shift register stages of that Galois LFSR with an initial state and then cycling that Galois LFSR, shifting each stage to a next stage in that Galois LFSR and outputting an LFSR output from a last stage. In at least one embodiment, a pattern of taps for where stage values are XOR-ed with its output can be represented as a generator polynomial for that LFSR.

In at least one embodiment, a descrambling sequence defined by a generator polynomial and a Fibonacci LFSR is generated by a plurality of threads of a graphics processing unit (GPU) by operating each thread to generate a descrambling segment of a larger descrambling sequence. In at least one embodiment, a descrambling sequence is defined by a plurality of LFSRs. In at least one embodiment, a descrambling sequence is defined as an XOR of an output of a first LFSR and an output of a second LFSR, where a first LFSR is tapped according to a first generator polynomial and starts in a first LFSR initial state and where a second LFSR is tapped according to a second generator polynomial and starts in a second LFSR initial state.

In at least one embodiment, for a particular protocol and communications system, a first Fibonacci LFSR might have 31 stages, a first generator polynomial of $F1(x)=x^{31}+x^{3}+1$ and a first LFSR initial state that is a constant value of $F0_0(x)=\{k_1(30)= \ldots =k_1(1)=0, k_1(0)=1\}$, where $k_1(i)$ refers to an initial value of an i-th stage. In at least one embodiment, for that particular protocol and communications system, a second Fibonacci LFSR might also have 31 stages, a second generator polynomial of $F2(x)=x^{31}+x^{3}+x^{2}+x+1$ and a second LFSR initial state that is seed value that is a function of values associated with a particular data stream. In at least one embodiment, a seed value associated with a particular data stream is computed from a user identifier and a base station identifier, in which case that seed value might be specific to a particular connection. In at least one embodiment, a descrambling sequence is a bitwise XOR of a first Fibonacci LFSR output and a second Fibonacci LFSR output after some large number of cycles. In at least one embodiment, descrambling occurs at a base station, such as a cellular network base station, upon receipt of data from a mobile device of a user of a cellular network.

In at least one embodiment, a descrambling sequence derived from one or more Fibonacci LFSRs is generated using Galois LFSRs using a plurality of threads of a GPU with various threads operating on one or more Galois LFSRs that are advanced through a number of cycles, with that number being different for different threads. In at least one embodiment, by parallelizing generation of a descrambling sequence, a descrambling sequence can be generated more quickly and provide low latency for scrambling and descrambling, using threads of a GPU as part of a software-defined radio access network (RAN) interface.

In at least one embodiment, a GPU thread descrambles one bit of an input data sequence, which might be represented as a sequence of soft bits stored as floating point numbers of a scrambling block of a physical layer (PHY) of a networking pipeline. In at least one embodiment, bits of an input data sequence each have a position and bits of a descrambling sequence each have a corresponding position, where a "0" in a particular position of a descrambling sequence might indicate that a soft bit of an input data sequence is to pass unaltered and a "1" in that particular position of that descrambling sequence might indicate that a soft bit of that input data sequence is to pass with an inversion or sign flip. In at least one embodiment, depending on how input data values are stored, input data values might be converted, if desired, from a storage format that is not amenable to a sign bit to a storage format where a sign of a float is represented in a single bit, such as a sign bit, followed by an exponent value, followed by a mantissa value. In at least one embodiment, signs of input data values might be flipped in other ways.

In at least one embodiment, threads of a GPU can be used to generate a descrambling sequence with each thread generating a descrambling segment in parallel such as a highly parallel operation with independent thread operations, and threads of a GPU can be used to scramble/descramble an input data sequence using a descrambling sequence in parallel such as a highly parallel operation with independent thread operations.

In at least one embodiment, by converting from a Fibonacci feedback pattern, or set of taps, to a Galois feedback pattern that is an equivalent, an LFSR can be brought to a "fast-forwarded" state using parallel operations. In at least one embodiment, a "fast-forwarded" state of an LFSR can be reached by initializing that LFSR with an initial LFSR state, cycling that LFSR through some number of cycles, and then taking output from that LFSR while undergoing additional cycles. In at least one embodiment, fast-forwarding of an LFSR is performed by using a Galois LFSR and loading as an initial LFSR state a value that is polynomial multiplication modulo a generator polynomial of an initial state and a monomial with a degree corresponding to a number of cycles being fast-forwarded. In at least one embodiment, where a protocol expects a descrambling sequence that is an output of one or more Fibonacci LFSRs, a conversion to one or more Galois LFSRs can be done, with a conversion back, if needed.

In at least one embodiment, each monomial that might be used might be precomputed modulo a generator polynomial and stored in GPU memory. In at least one embodiment, where a thread operates on a byte at a time, precomputation might be done on powers of eight, modulo a generator polynomial.

FIG. 1 illustrates data reception at a physical layer (PHY) of a mobile device network, according to one or more embodiments. In at least one embodiment, a network system 100 might provide for multiple mobile devices 102(1)-(4) to connect to base stations 104(1)-(4), where signals received are demodulated by demodulators 106(1)-(4) and processed by various other signal processing elements 108, such as channel estimation, multiple-input, multiple-output signal processing, transform decoding, and constellation mapping. In at least one embodiment, outputs of signal processing elements 108 might parse signals into multiple paths. In at least one embodiment, one or more descramblers 110(1)-(4) receive input data sequences and descramble input data sequences according to descrambler sequences. In at least one embodiment, descramblers 110 output descrambled input data sequences to other elements 112(1)-(4), as might contain rate matchers, low-density parity checking (LDPC) decoders, and cyclic redundancy checkers. In at least one embodiment, where network system 100 is providing real-time data transport or otherwise requires quick processing, performing descrambling using a GPU and parallelization available with a GPU can provide for quick descrambling.

In at least one embodiment, while FIG. 1 illustrates descrambling in a context of a base station processing signals received from user mobile devices over a cellular network, other contexts might be present, such as a user mobile device descrambling a signal received from a base station. In at least one embodiment, a base station might be programmed to expect repeated use by a given user mobile device, perhaps over a limited period of time. In at least one embodiment, a user mobile device might remain in range of a base station for a number of hours or days, in which case a base station can cache a descrambling sequence specific to a user and base station once it is computed, if that descrambling sequence is expected to be used and does not change.

Figure 2A:
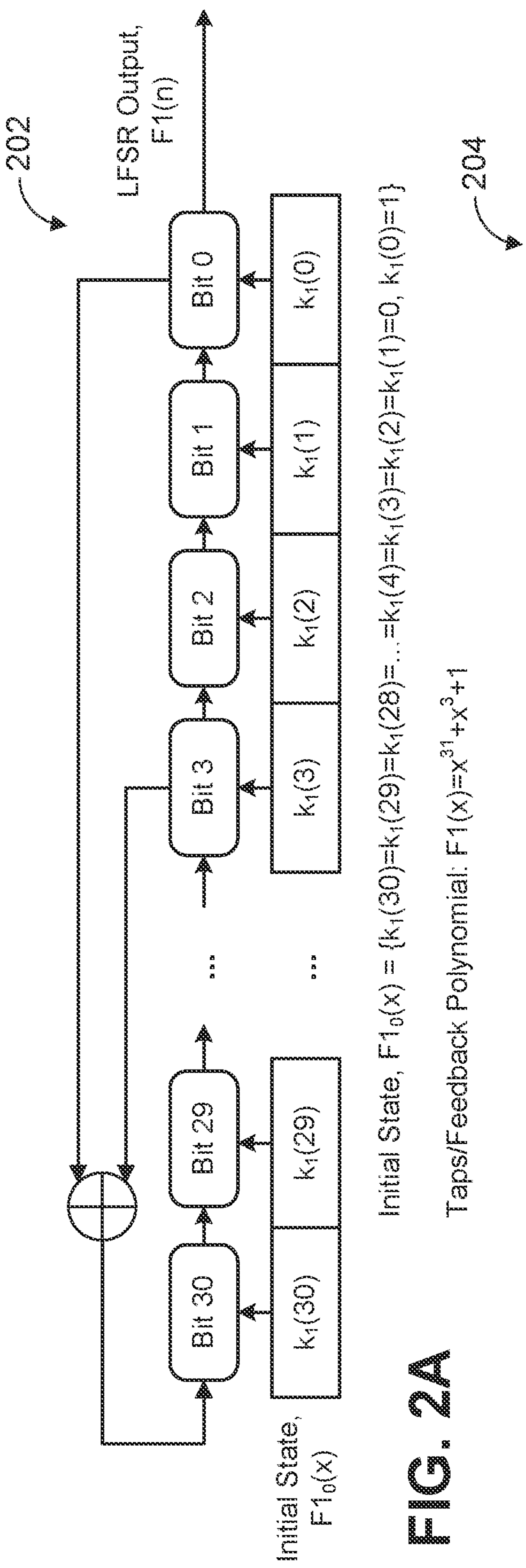
FIG. 2A illustrates an operation of generating a generator segment of a first descrambling sequence using a many-to-one linear feedback shift register (LFSR) according to one or more embodiments.

FIG. 2A illustrates an operation of generating a generator segment of a first descrambling sequence using a many-to-one LFSR 202 according to one or more embodiments. In at least one embodiment, many-to-one LFSR has 31 stages and when loaded with an initial state, it can cycle through states and output a pseudorandom sequence. In at least one embodiment, an initial state has a least significant bit loaded into a last stage of many-to-one LFSR 202 and a most significant bit loaded into a first stage of many-to-one LFSR 202. In at least one embodiment, cycling many-to-one LFSR 202 shifts values from each stage to a next stage, loads that first stage with an XOR of tapped stages, tapped according to a generator polynomial of many-to-one LFSR 202, and outputs a stage value from that last stage of many-to-one LFSR 202. In at least one embodiment, an initial state of many-to-one LFSR 202 is a constant.

Figure 2B:
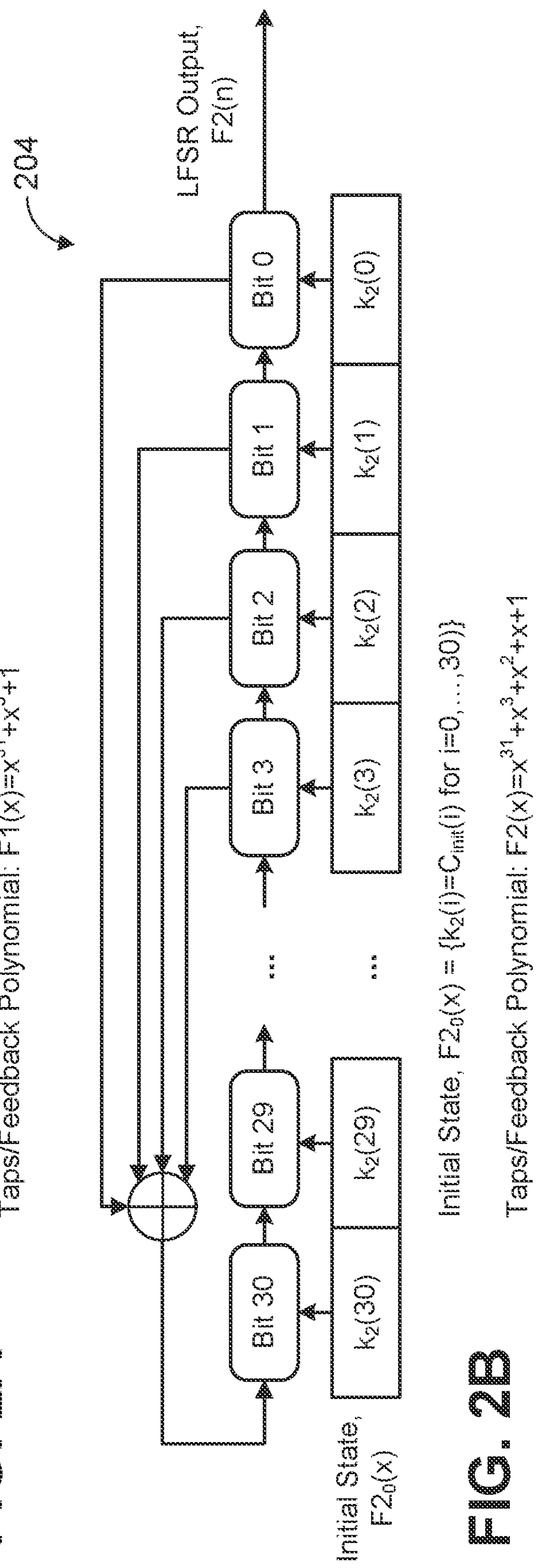
FIG. 2B illustrates an operation of generating a generator segment of a second descrambling sequence using a many-to-one LFSR according to one or more embodiments.

FIG. 2B illustrates an operation of generating a generator segment of a second descrambling sequence using a many-to-one LFSR 204 according to one or more embodiments. In at least one embodiment, many-to-one LFSR has 31 stages and when loaded with an initial state, it can cycle through states and output a pseudorandom sequence. In at least one embodiment, an initial state has a least significant bit loaded into a last stage of many-to-one LFSR 204 and a most significant bit loaded into a first stage of many-to-one LFSR 204. In at least one embodiment, cycling many-to-one LFSR 204 shifts values from each stage to a next stage, loads that first stage with an XOR of tapped stages, tapped according to a generator polynomial of many-to-one LFSR 204, and outputs a stage value from that last stage of many-to-one LFSR 204.

In at least one embodiment, an initial state of many-to-one LFSR 204 is a seed value derived from a user identifier and a base station identifier. In at least one embodiment, outputs of many-to-one LFSR 202 and of many-to-one LFSR 204 might be combined.

Figure 3A:
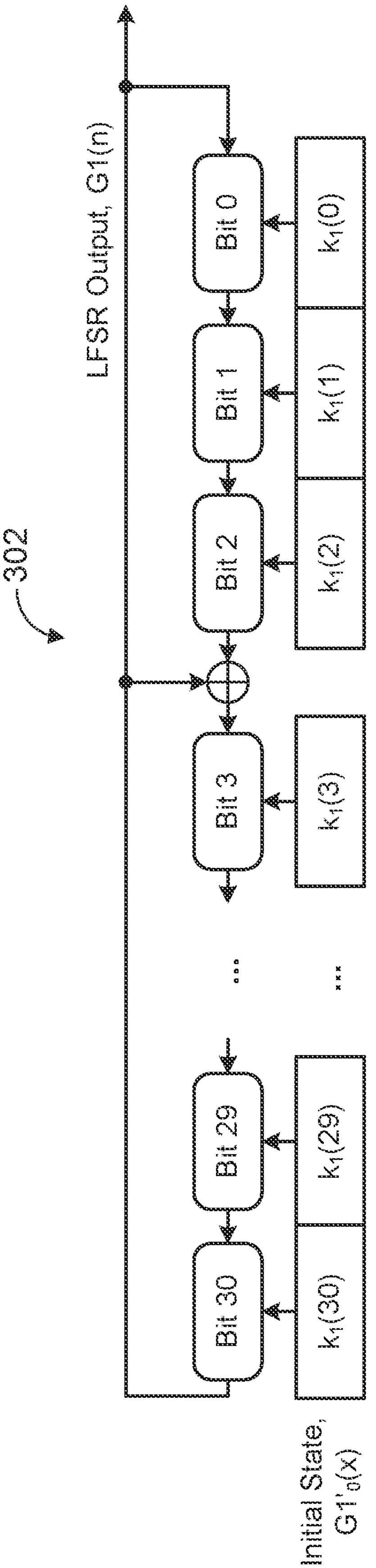
FIG. 3A illustrates an operation of generating a generator segment of a first descrambling sequence as shown in FIG. 2A using a one-to-many LFSR according to one or more embodiments.

FIG. 3A illustrates an operation of generating a generator segment of that first descrambling sequence shown in FIG. 2A using a one-to-many LFSR according to one or more embodiments. In at least one embodiment, as shown, a one-to-many LFSR 302 has 31 stages and can be loaded with an initial state with a most significant bit loaded into a last stage of one-to-many LFSR 302 and a least significant bit loaded into a first stage of many-to-one LFSR 204. In at least one embodiment, cycling one-to-many LFSR 302 shifts values from each stage to a next stage, outputs a stage value from a last stage of one-to-many LFSR 302, and XORs that output with shifted values according to a pattern of taps, tapped according to a generator polynomial of one-to-many LFSR 302.

In at least one embodiment, one-to-many LFSR 302 can output a similar pseudorandom sequence as does many-to-one LFSR 202 shown in FIG. 2A, with an appropriate modification of an initial state of many-to-one LFSR 202, modified by bit reversal and shifting by 31 cycles.

Figure 3B:
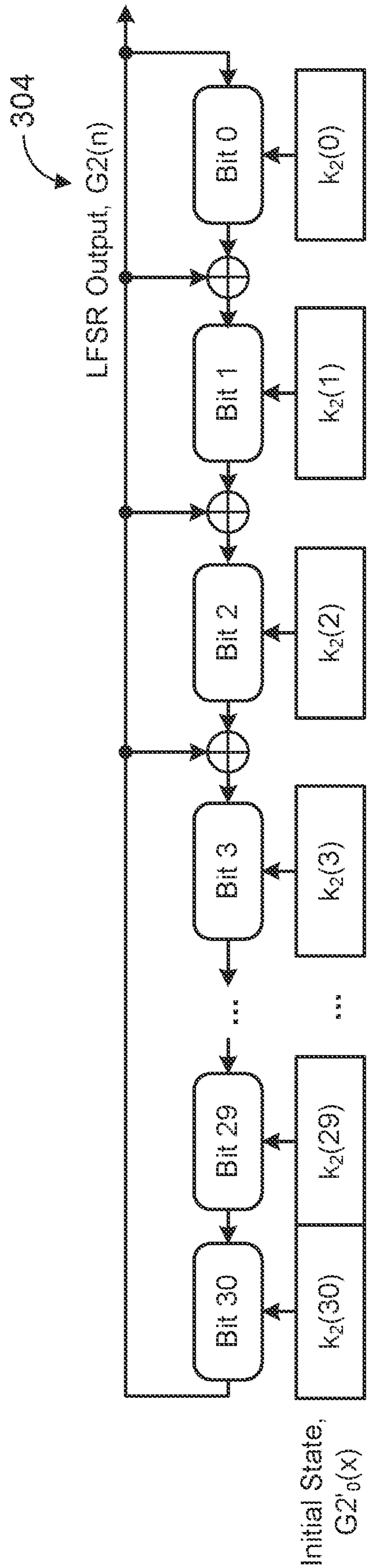
FIG. 3B illustrates an operation of generating a generator segment of a second descrambling sequence as shown in FIG. 2B using a one-to-many LFSR according to one or more embodiments.

FIG. 3B illustrates an operation of generating a generator segment of that first descrambling sequence shown in FIG. 2B using a one-to-many LFSR 304 according to one or more embodiments. In at least one embodiment, as shown, one-to-many LFSR 304 also has 31 stages and can be loaded with an initial state with a most significant bit loaded into a last stage of one-to-many LFSR 304 and a least significant bit loaded into a first stage of many-to-one LFSR 204. In at least one embodiment, cycling one-to-many LFSR 304 shifts values from each stage to a next stage, outputs a stage value from a last stage of one-to-many LFSR 304, and XORs that output with shifted values according to a pattern of taps, tapped according to a generator polynomial of one-to-many LFSR 304.

In at least one embodiment, one-to-many LFSR 304 can output a similar pseudorandom sequence as does many-to-one LFSR 204 shown in FIG. 2B, with an appropriate modification of an initial state of many-to-one LFSR 204, modified by bit reversal and shifting by 31 cycles. In at least one embodiment, one-to-many LFSR 302 and/or one-to-many LFSR 304 can be implemented in a plurality of threads, wherein different threads operate on different segments of a descrambling sequence using a one-to-many LFSR where each thread's LFSR is fast-forwarded to a set of cycles corresponding to a location of that thread's generator segment in that descrambling sequence.

Figure 4:
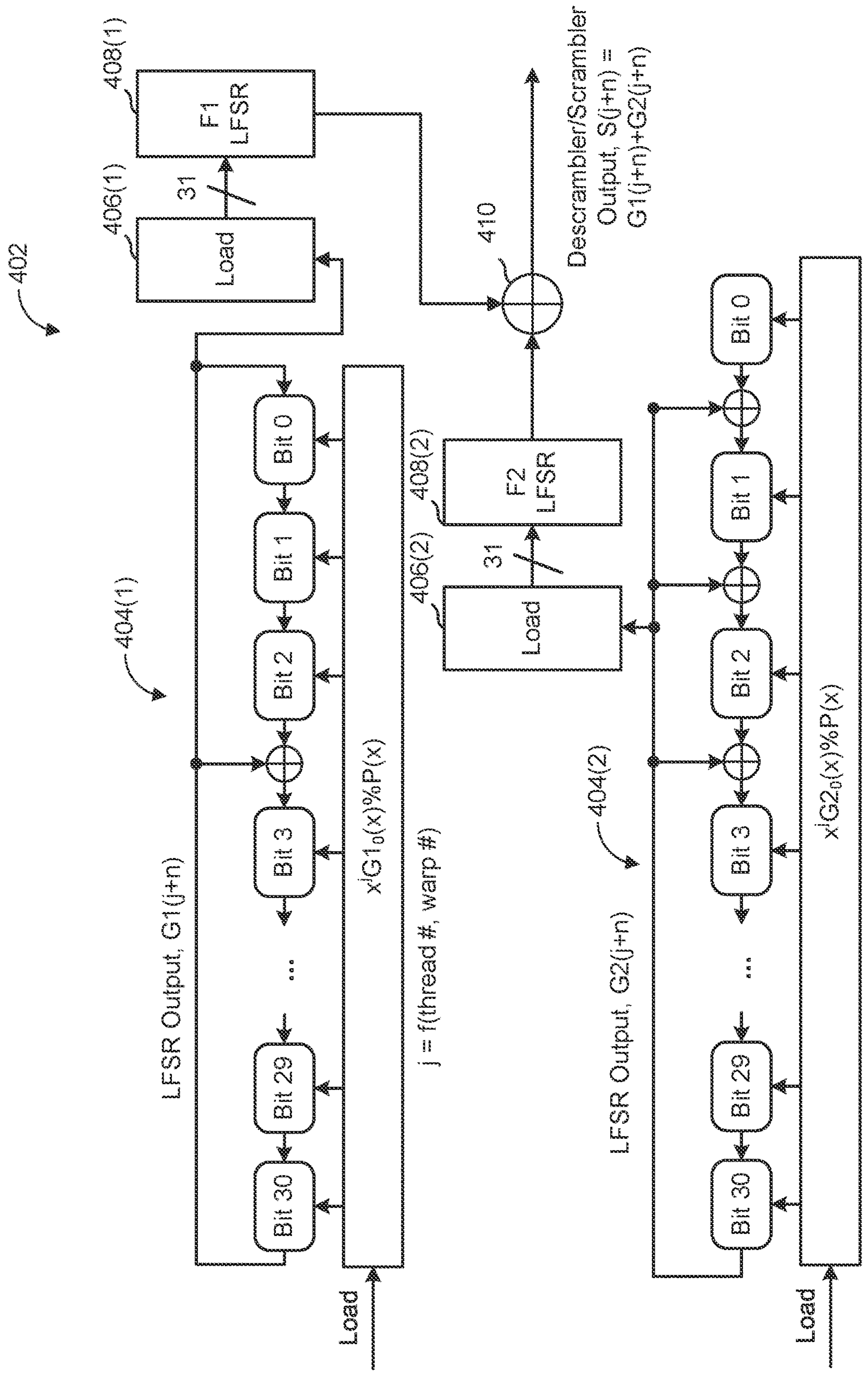
FIG. 4 illustrates an operation of generating a generator segment of a particular descrambling sequence using one-to-many LFSRs that are cycled ahead by a predetermined number of cycles based on a thread index and/or a warp index according to one or more embodiments.

FIG. 4 illustrates an operation of generating a generator segment of a particular descrambling sequence using one-to-many LFSRs that are cycled ahead by a predetermined number of cycles based on a thread index and/or a warp index according to one or more embodiments. In at least one embodiment, a descrambler 402 comprises two one-to-many LFSRs 404(1)-(2) with their outputs applied to corresponding load registers 406(1)-(2) of many-to-one LFSRs 408(1)-(2) that output to an exclusive OR element 410 to form a descrambler output. In at least one embodiment, a descrambler output can be used for scrambling data.

In at least one embodiment, using one-to-many LFSRs, their states can be set to states they would have had if they were loaded with an initial state and then cycled through a predetermined number of cycles, but without requiring a cycling process. In at least one embodiment, one-to-many LFSR 404(1) is loaded with a state of $x^j G1_0(x)$ % P(x) and one-to-many LFSR 404(2) is loaded with a state of $x^j G2_0(x)$ % P(x), where $G1_0(x)$ is a first LFSR initial state, $G2_0(x)$ is a second LFSR initial state, $x^j$ is a monomial of degree j, and P(x) is a generator polynomial. In at least one embodiment, outputs of one-to-many LFSRs, loaded with such states, fed to many-to-one LFSRs, that are in turn cycled as needed to obtain outputs, can be used to an effect similar to cycling many-to-one LFSRs through a large number of cycles.

In at least one embodiment, descrambler 402 is implemented as a thread of a GPU and many descramblers can be run in parallel with operations of a thread implemented by an execution unit of that thread, a local memory of that thread, and/or a load/store unit of that thread for reading and/or writing to shared memory shared by that thread and/or global memory available to a GPU. In at least one embodiment, different descramblers each operate with a same set of LFSRs, but where they are initialized to different portions of a descrambler sequence, so that more of a descrambler sequence can be covered in parallel. In at least one embodiment, Degree j can be a function of a thread and/or warp. In at least one embodiment, for example, a descrambler sequence comprises a 1024-bit pseudorandom sequence and a GPU allocates 32 threads to generate that descrambler sequence, so each thread would operate on a descrambler segment that is 32 bits of that descrambler sequence. In at least one embodiment, where each thread operates on a 32-bit descrambler segment, j can be equal to 32 times a thread position where thread positions are numbered from 0 to 31. In at least one embodiment, for example, LFSR 404(1) of a thread in a thread position 0 would have a first LFSR initial state of $G1_0(x)$ % P(x) and LFSR 404(2) of that thread would have a second LFSR initial state of $G2_0(x)$ % P(x), while LFSR 404(1) of a thread in a thread position 1 would have a first LFSR initial state of $x^{32}G1_0(x)$ % P(x) and LFSR 404(2) of that thread would have a second LF SR initial state of $x^{32}G2_0(x)$ % P(x). In at least one embodiment, values of $x^{32}$% P(x), $x^{64}$% P(x), $x^{96}$% P(x), etc. can be computed in advance and stored in shared memory or global memory, as they might be constant for a given protocol.

In at least one embodiment, $G1_0(x)$ can correspond to $F1'_0(x)P(x)/x^{31}$, where $F1'_0(x)$ is a bit reversal of $F0_0(x)$, where $F0_0(x)$ is an initial state for a corresponding many-to-one LFSR that generates a portion of a descrambler sequence. In at least one embodiment, $F0_0(x)$ can be a constant wherein a least significant bit is 1 and all other bits are zero. In at least one embodiment, where $F0_0(x)$ is a constant, values for $x^{32i}G1_0(x)$ % P(x) can be computed in advance and stored in shared memory or global memory. In at least one embodiment, $G2_0(x)$ can correspond to $F2'_0(x)$ $P(x)/x^{31}$, where $F2'_0(x)$ is a bit reversal of $F2_0(x)$, where $F2_0(x)$ is an initial state for a corresponding many-to-one LFSR that generates a portion of a descrambler sequence. In at least one embodiment, $F2_0(x)$ can be a seed value that is computed based on a user identifier and a base station identifier. In at least one embodiment, values for $x^{32i}G2_0(x)$ % P(x) can be computed once a seed value is known and stored in shared memory or global memory. In at least one embodiment, in a particular implementation, LFSR initial values can start after a predetermined number of cycles, such as 1600 cycles and, using feedback patterns for a corresponding one-to-many LFSR, advancing by 1600 cycles can be done by multiplying an LFSR initial state by $x^{1600}$ modulo P(x). In at least one embodiment, a different protocol might be supported in which a number of cycles of advancing is other than 1600 cycles and/or in which $F1_0(x)$ is not a constant.

In at least one embodiment, in descrambler 402 shown in FIG. 4, LFSR 404(1) has a feedback pattern corresponding to a generator polynomial $G1(x)=x^{31}+x^3+1$ and LFSR 404(2) has a feedback pattern corresponding to a generator polynomial $G2(x)=x^{31}+x^3+x^2+x+1$. In at least one embodiment, another set of feedback patterns could be used. In at least one embodiment, outputs of such one-to-many LFSRs are then fed to load registers that provide an initial state for many-to-one LFSRs that can then be cycled to generate needed outputs.

Figure 5:
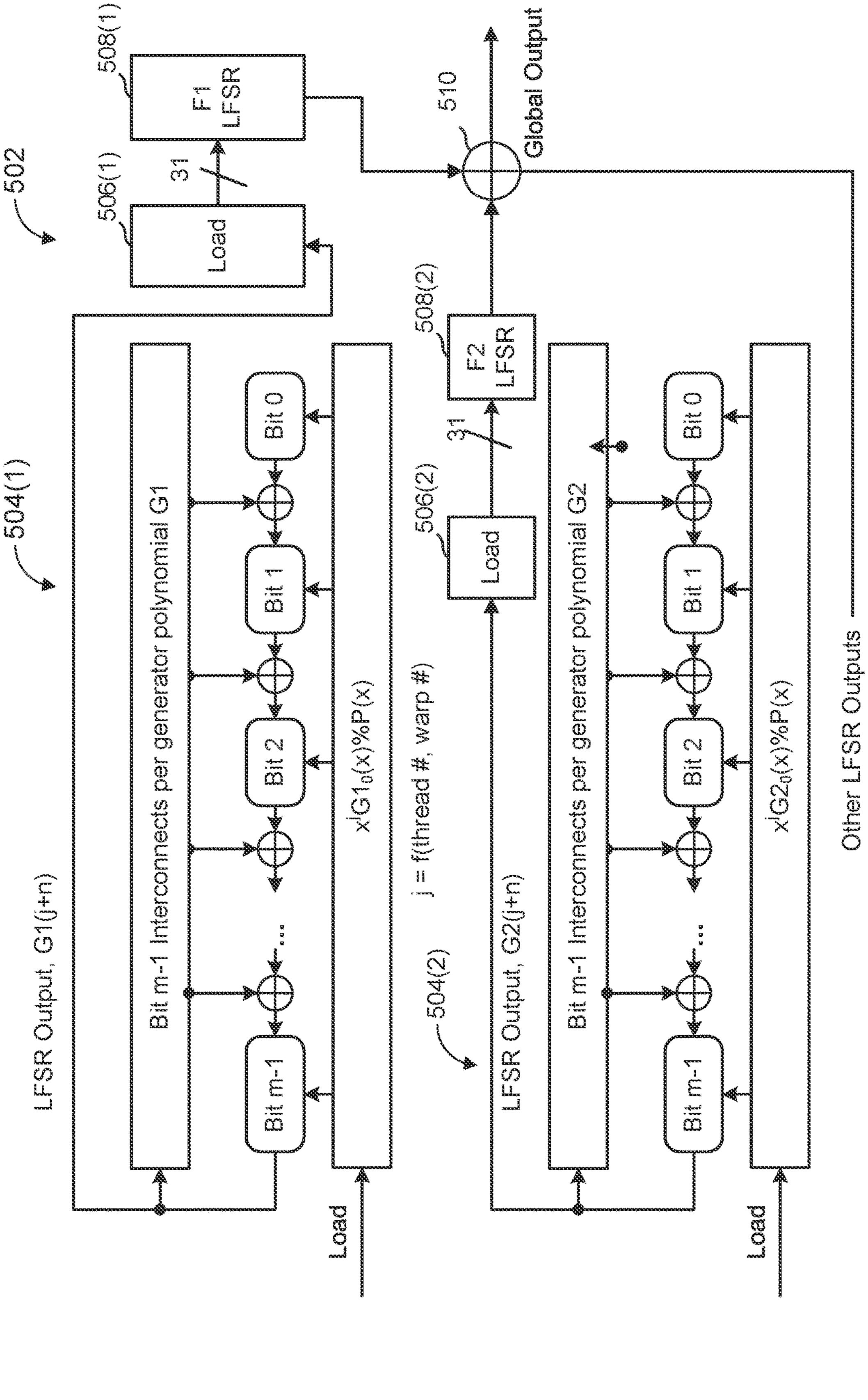
FIG. 5 illustrates an operation of generating a generator segment of a generalized descrambling sequence using a plurality of one-to-many LFSRs that are cycled ahead by a predetermined number of cycles based on a thread index and/or a warp index according to one or more embodiments.

FIG. 5 illustrates an operation of generating a generator segment of a generalized descrambling sequence using a plurality of one-to-many LFSRs that are cycled ahead by a predetermined number of cycles based on a thread index and/or a warp index according to one or more embodiments. In at least one embodiment, a descrambler 502 comprises two one-to-many LFSRs 504(1)-(2) with their outputs applied to corresponding load registers 506(1)-(2) of many-to-one LFSRs 508(1)-(2) that output to an exclusive OR element 510 to form a descrambler output. In at least one embodiment, a descrambler output can be used for scrambling data.

In at least one embodiment, using one-to-many LFSRs, their states can be set to states they would have had if they were loaded with an initial state and then cycled through a predetermined number of cycles according to their respective feedback patterns defined by taps of those LFSRs, but without requiring a cycling process. In at least one embodiment, one-to-many LFSRs are used and loaded with states corresponding to a polynomial multiplication of an LFSR initial state with a monomial of a degree corresponding to a predetermined number of cycles modulo a generator polynomial. In at least one embodiment, initial states and tap patterns can be different for different LFSRs. In at least one embodiment, as an LFSR can be forwarded by polynomial multiplication by a monomial, a plurality of such LFSRs can be deployed over a plurality of threads of a GPU so that LFSR outputs can be generated in parallel rather than serially cycling an LFSR through each of its sequential states. In at least one embodiment, a degree j can be a function of a thread number or position and/or a warp number or position. In at least one embodiment, outputs of one-to-many LFSRs, loaded with such states, fed to many-to-one LFSRs, that are in turn cycled as needed to obtain outputs, can be used to an effect similar to cycling many-to-one LFSRs through a large number of cycles.

In at least one embodiment, descrambler 502 can be implemented as a thread of a GPU and many descramblers can be run in parallel with operations of a thread implemented by an execution unit of that thread, a local memory of that thread, and/or a load/store unit of that thread for reading and/or writing to shared memory shared by that thread and/or global memory available to a GPU. In at least one embodiment, outputs of such one-to-many LFSRs are then fed to load registers that provide an initial state for many-to-one LFSRs that can then be cycled to generate needed outputs.

Figure 6:
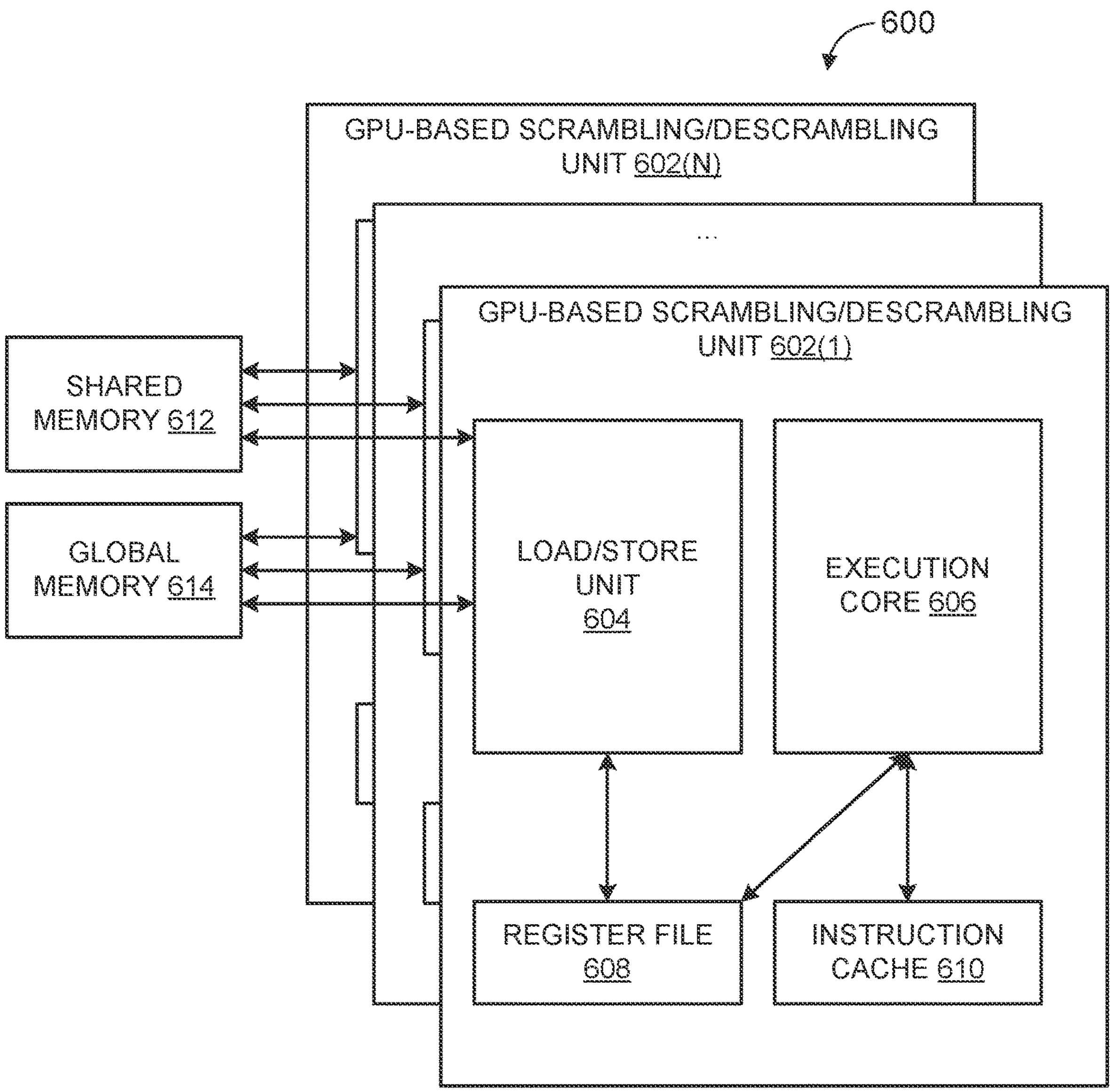
FIG. 6 illustrates elements of GPU-based scrambling/descrambling processing units as might be used for GPU-based scrambling/descrambling according to one or more embodiments.

FIG. 6 illustrates elements of a GPU-based descrambler 600 comprising a plurality of GPU-based scrambling/descrambling processing units 602(1)-(N) as might be used for GPU-based scrambling/descrambling according to one or more embodiments. In at least one embodiment, N is a number of threads used for scrambling/descrambling. In at least one embodiment, a GPU-based scrambling/descrambling processing unit 602(1), similar to other GPU-based scrambling/descrambling processing units shown, comprises a load/store unit 604, an execution core 606, a register file 608, an instruction cache 610, along with access to a shared memory 612, and a global memory 614. In at least one embodiment, in operations described herein, GPU-based scrambling/descrambling processing unit 602(1) can read in a number of input data values, load data to register file 608, access those input data values using execution core 606 and return to register file 608 a thread output. In at least one embodiment, a GPU-based scrambling/descrambling processing unit scrambles or descrambles input data values by flipping their signs based on bits of a descrambling sequence, operating on a plurality of input data values in parallel. In at least one embodiment, a GPU-based scrambling/descrambling processing unit generates a descrambling sequence, operating on a plurality of descrambling segments of that descrambling sequence in parallel.

Figure 7:
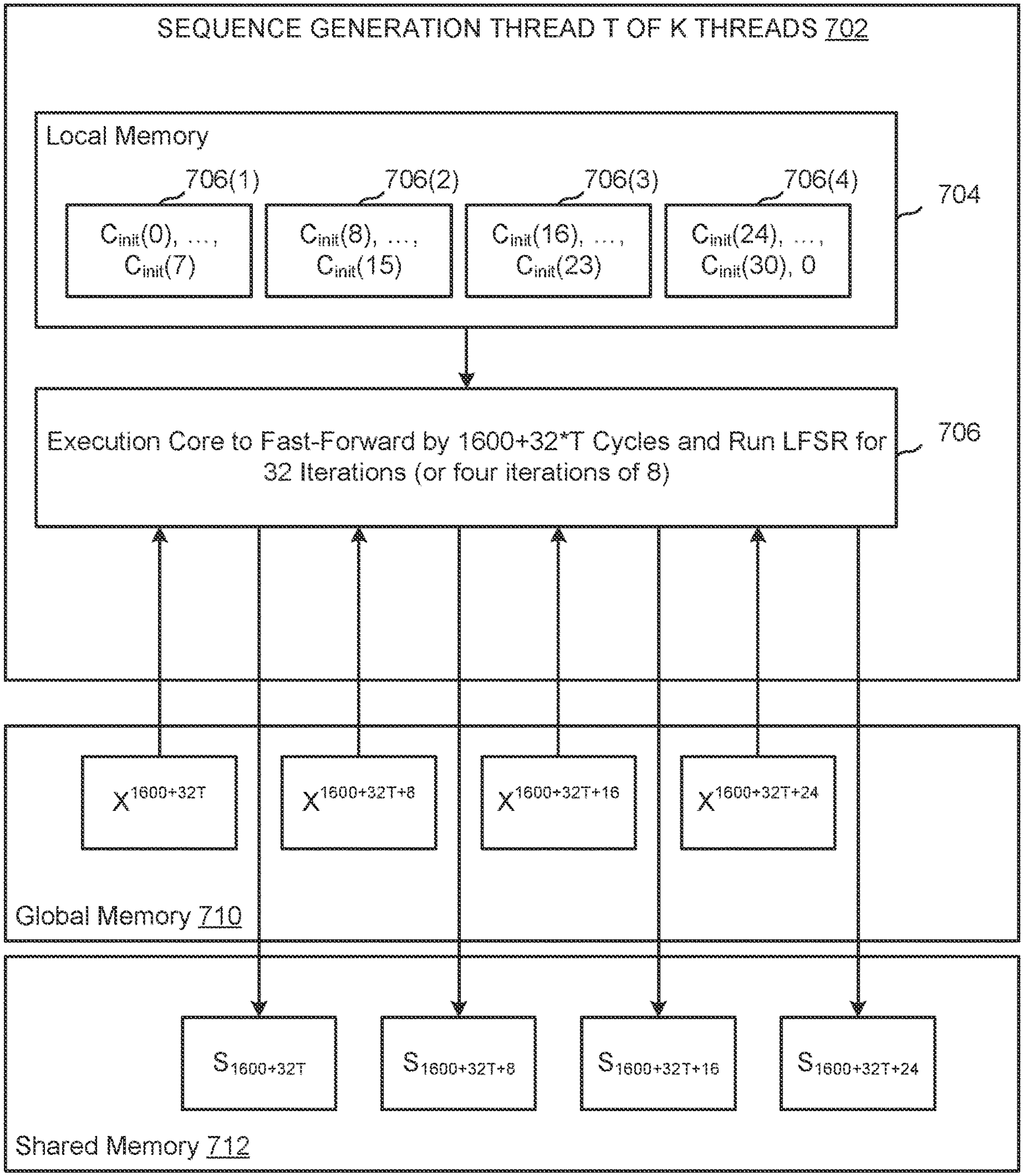
FIG. 7 illustrates an operation of parallelized descrambling sequence generation using a thread of a GPU according to one or more embodiments.

FIG. 7 illustrates an operation of parallelized descrambling sequence generation using a thread of a GPU according to one or more embodiments. In at least one embodiment, sequence generation of a T-th thread of K threads is performed as illustrated by a thread 702 shown in FIG. 7. In at least one embodiment, a seed is provided and stored in a local memory 704 of thread 702 as a plurality of bytes 706(1)-(4), shown there as $C_{init}(0)$ through $C_{init}(30)$ and one bit of byte 706(4) set to zero. In at least one embodiment, other sizes for a seed might be used. In at least one embodiment, seed value that are used correspond to a 5G protocol or LTE protocol values with one seed value being a nonzero constant and one seed value being based on a user identifier and a cellular base station identifier. In at least one embodiment, an execution unit 706 performs an operation similar to that shown in FIG. 4, with a first segment LFSR initialized to $x^{1600+32T}G1_0(x)$ % P(x) and a second segment LFSR initialized to $x^{1600+32T}G2_0(x)$ % P(x) and stores an output in a shared memory 712. In at least one embodiment, values for monomials can be precomputed and stored in a global memory 710. In at least one embodiment, thread 702 does a four-way shift-and-XOR operation to generate 32 outputs in eight cycles of LFSRs, a serial shift through 32 cycles, or some other variation. In at least one embodiment, an effect of operation of execution unit 706 of thread 702 is to generate, from respective seed values, generator polynomials, descrambler segments that form, over a plurality of threads, a descrambler sequence that can be stored in shared memory. In at least one embodiment, if execution unit 706 operates serially, it might be sufficient to have $X^{1600+32T}$ in global memory 710.

Figure 8:
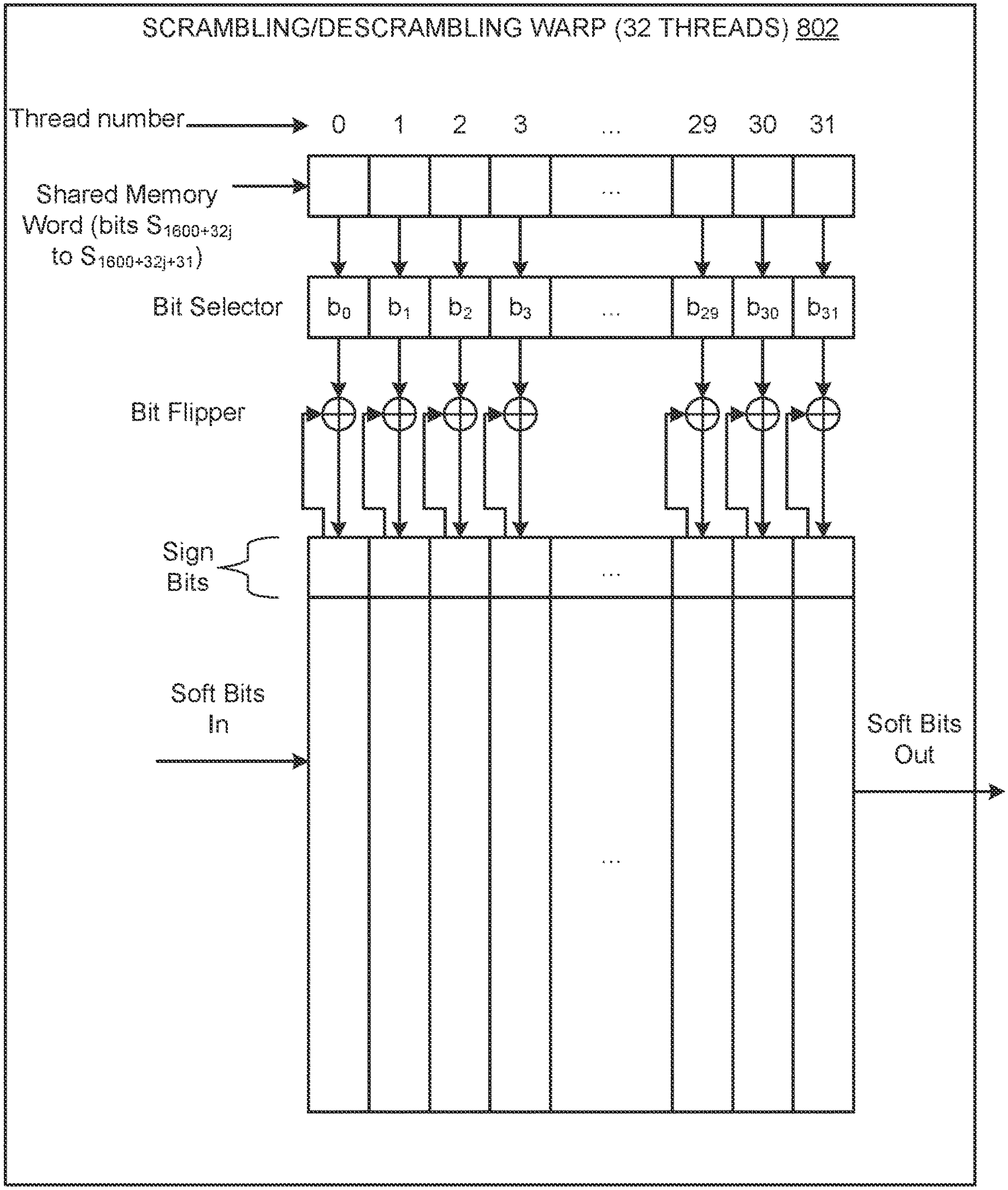
FIG. 8 illustrates an operation of parallelized scrambling/descrambling using a block of threads (a warp) of a GPU according to one or more embodiments.

FIG. 8 illustrates an operation of parallelized scrambling/descrambling using a block of threads (a warp) of a GPU according to one or more embodiments. In at least one embodiment, a descrambling warp 802 comprises 32 threads, each of which receives one input data value in a form of a 32-bit soft bit, reads in a corresponding bit of a descrambler sequence from GPU shared memory to arrive at a bit selector for each thread. In at least one embodiment, each thread implements, perhaps using an execution unit, an XOR of a bit selector and a sign bit of a soft bit value and places a result in as a new sign bit. In at least one embodiment, a process of descrambling is to change a sign of a soft bit if a corresponding bit in a descrambler sequence is one and leave unchanged if that corresponding bit is zero. In at least one embodiment, where a descrambler sequence is used in scrambling and descrambling, having that descrambler sequence causes descrambling to cancel out effects of scrambling.

Figure 9:
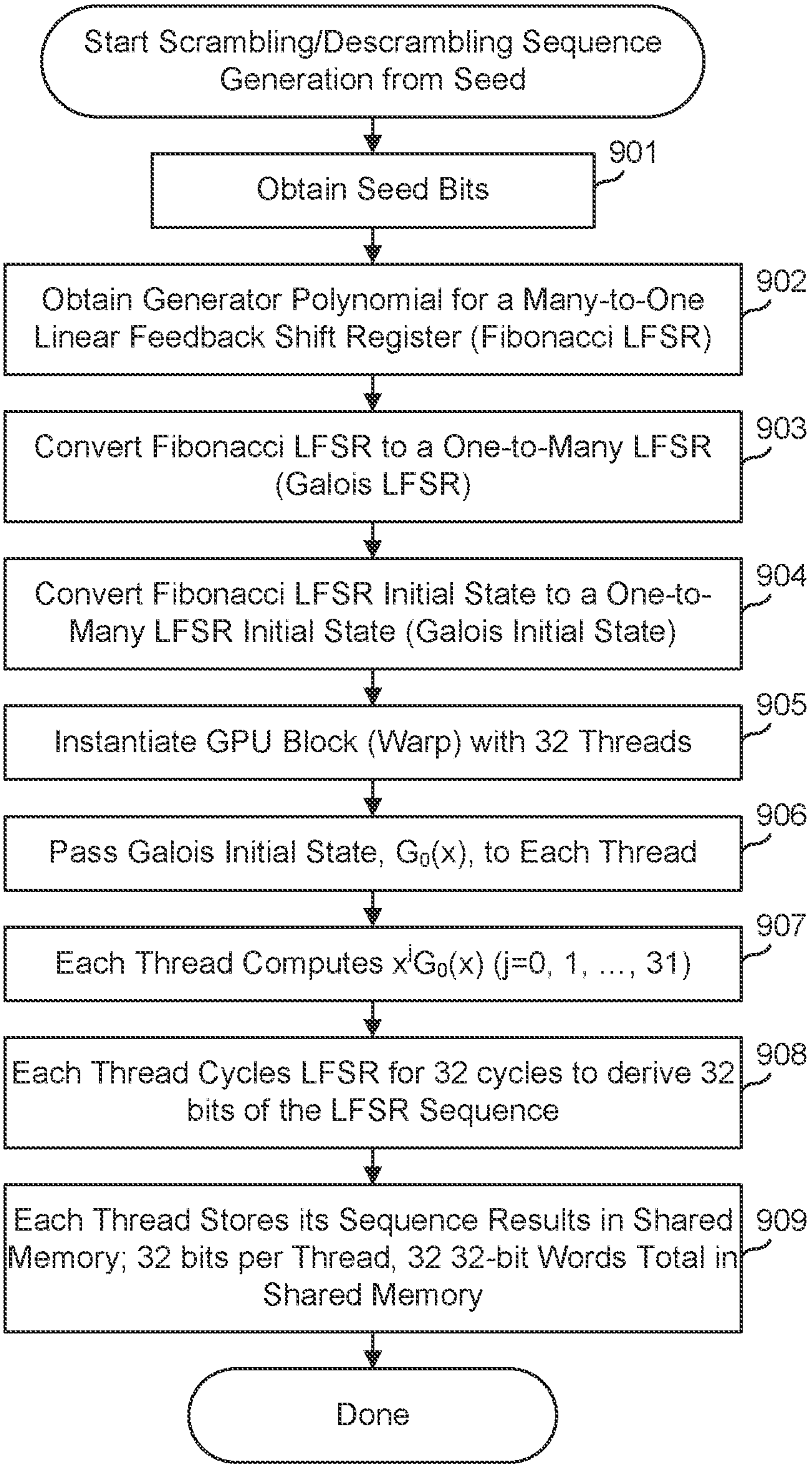
FIG. 9 is a flowchart of steps of a parallelized descrambling sequence generation method according to one or more embodiments.

FIG. 9 is a flowchart of steps of a parallelized descrambling sequence generation method according to one or more embodiments. In at least one embodiment, a scrambling/descrambling sequence generation process beings with obtaining seed bits (step 901) and obtaining a generator polynomial for a many-to-one linear feedback shift register (Fibonacci LFSR) (step 902). In at least one embodiment, a process then converts a Fibonacci LFSR to a one-to-many LFSR (Galois LFSR) (step 903) and converts a Fibonacci LFSR initial state to a one-to-many LFSR initial state (Galois initial state) (step 904). In at least one embodiment, a process instantiates a GPU block (warp) with 32 threads (step 905) and passes a Galois initial state, $G_0(x)$, to each thread (step 906). In at least one embodiment, each thread can computes $x^jG_0(x)$ (j=0, 1, . . . , 31) (step 907) and each thread cycles its LFSR for 32 cycles to derive 32 bits of an LFSR sequence (step 908). In at least one embodiment, each thread stores its sequence results in shared memory, with 32 bits per thread, 32 32-bit words total in shared memory (step 909) to complete a process as shown.

Figure 10:
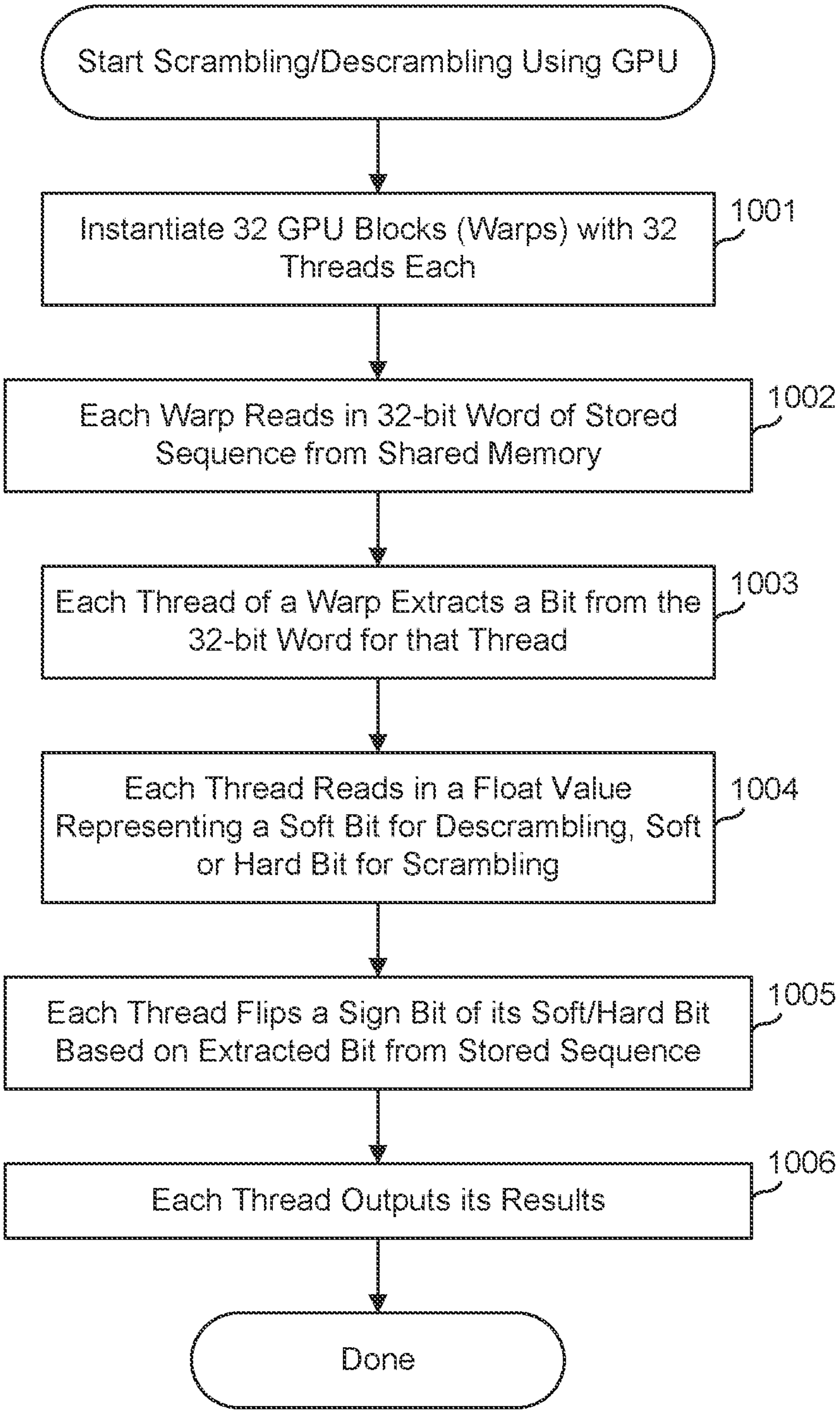
FIG. 10 is a flowchart of steps of a parallelized scrambling/descrambling method according to one or more embodiments.

FIG. 10 is a flowchart of steps of a parallelized scrambling/descrambling method according to one or more embodiments. In at least one embodiment, a scrambling/descrambling process using a GPU starts by instantiating 32 GPU blocks (warps) with 32 threads each (step 1001). In at least one embodiment, each warp reads in a 32-bit word of stored sequence from a shared memory (step 1002) and each thread of a warp extracts a bit from a 32-bit word for that thread (step 1003). In at least one embodiment, each thread reads in a float value representing a soft bit for descrambling, or a soft bit or a hard bit for scrambling (step 1004). In at least one embodiment, each thread flips a sign bit of its soft/hard bit based on an extracted bit from a stored sequence (step 1005) and outputs its results (step 1006).

Figure 11A:
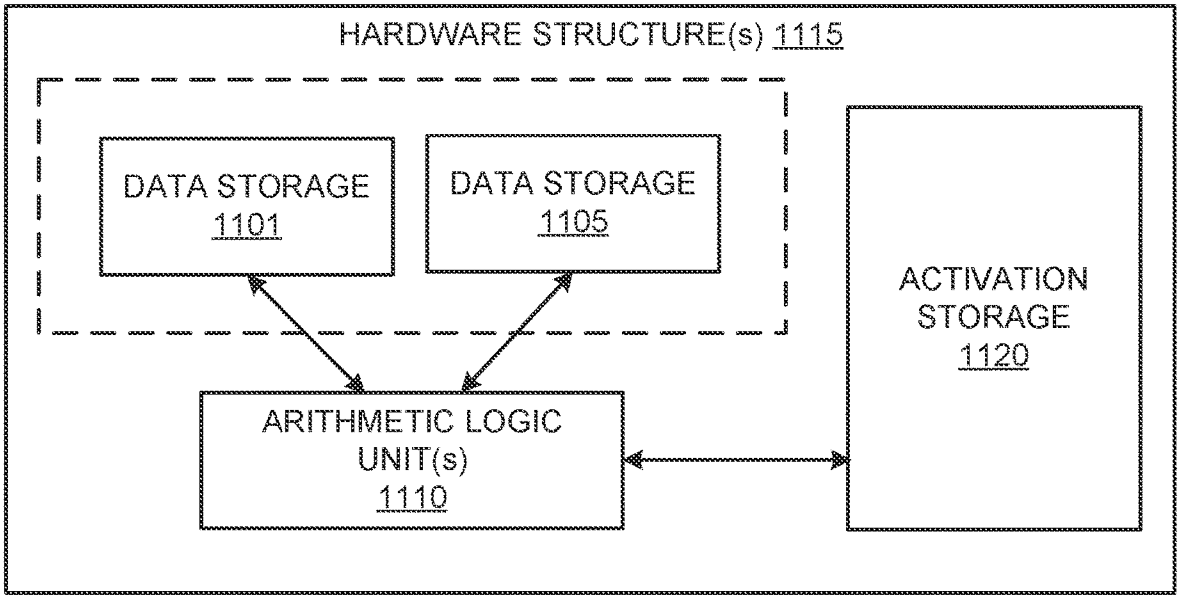
FIG. 11A illustrates inference and/or training logic, according to at least one embodiment.

FIG. 11A illustrates inference and/or training logic 1115 used to perform inferencing and/or training operations associated with one or more embodiments. Details regarding inference and/or training logic 1115 are provided herein in conjunction with FIGS. 11A and/or 11B.

In at least one embodiment, inference and/or training logic 1115 may include, without limitation, code and/or data storage 1101 to store forward and/or output weight and/or input/output data, and/or other parameters to configure neurons or layers of a neural network trained and/or used for inferencing in aspects of one or more embodiments. In at least one embodiment, training logic 1115 may include, or be coupled to code and/or data storage 1101 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which that code corresponds. In at least one embodiment code and/or data storage 1101 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 1101 may be included with other on-chip or off-chip data storage, including a processor's L1, L2, or L3 cache or system memory.

In at least one embodiment, any portion of data storage 1101 may be internal or external to one or more processors or other hardware logic devices or circuits. In at least one embodiment, data storage 1101 may be cache memory, dynamic randomly addressable memory ("DRAM"), static randomly addressable memory ("SRAM"), non-volatile memory (e.g., Flash memory), or other storage. In at least one embodiment, choice of whether data storage 1101 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1115 may include, without limitation, a code and/or data storage 1105 to store backward and/or output weight and/or input/output data corresponding to neurons or layers of a neural network trained and/or used for inferencing in aspects of one or more embodiments. In at least one embodiment, code and/or data storage 1105 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 1115 may include, or be coupled to code and/or data storage 1105 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which that code corresponds. In at least one embodiment, any portion of code and/or data storage 1105 may be included with other on-chip or off-chip data storage, including a processor's L1, L2, or L3 cache or system memory. In at least one embodiment, any portion of code and/or data storage 1105 may be internal or external to on one or more processors or other hardware logic devices or circuits. In at least one embodiment, code and/or data storage 1105 may be cache memory, DRAM, SRAM, non-volatile memory (e.g., Flash memory), or other storage. In at least one embodiment, choice of whether code and/or data storage 1105 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, data storage 1101 and data storage 1105 may be separate storage structures. In at least one embodiment, data storage 1101 and data storage 1105 may be same storage structure. In at least one embodiment, data storage 1101 and data storage 1105 may be partially same storage structure and partially separate storage structures. In at least one embodiment, any portion of data storage 1101 and data storage 1105 may be included with other on-chip or off-chip data storage, including a processor's L1, L2, or L3 cache or system memory.

In at least one embodiment, inference and/or training logic 1115 may include, without limitation, one or more arithmetic logic unit(s) ("ALU(s)") 1110, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1120 that are functions of input/output and/or weight parameter data stored in code and/or data storage 1101 and/or code and/or data storage 1105. In at least one embodiment, activations stored in activation storage 1120 are generated according to linear algebraic and or matrix-based mathematics performed by ALU(s) 1110 in response to performing instructions or other code, wherein weight values stored in code and/or data storage 1105 and/or data 1101 are used as operands along with other values, such as bias values, gradient information, momentum values, or other parameters or hyperparameters, any or all of which may be stored in code and/or data storage 1105 or code and/or data storage 1101 or another storage on or off-chip.

In at least one embodiment, ALU(s) 1110 are included within one or more processors or other hardware logic devices or circuits, or ALU(s) 1110 may be external to a processor or other hardware logic device or circuit that uses them (e.g., a co-processor). In at least one embodiment, ALUs 1110 may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage 1101, data storage 1105, and activation storage 1120 may be on same processor or other hardware logic device or circuit, or they may be in different processors or other hardware logic devices or circuits, or some combination of same and different processors or other hardware logic devices or circuits. In at least one embodiment, any portion of activation storage 1120 may be included with other on-chip or off-chip data storage, including a processor's L1, L2, or L3 cache or system memory. Furthermore, in at least one embodiment, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1120 may be cache memory, DRAM, SRAM, non-volatile memory (e.g., Flash memory), or other storage. In at least one embodiment, activation storage 1120 may be completely or partially within or external to one or more processors or other logical circuits. In at least one embodiment, choice of whether activation storage 1120 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 1115 illustrated in FIG. 11A may be used in conjunction with an application-specific integrated circuit ("ASIC"), such as TensorFlow® Processing Unit from Google, an inference processing unit (IPU) from Graphcore™, or a Nervana® (e.g., "Lake Crest") processor from Intel Corp. In at least one embodiment, inference and/or training logic 1115 illustrated in FIG. 11A may be used in conjunction with central processing unit ("CPU") hardware, graphics processing unit ("GPU") hardware or other hardware, such as field programmable gate arrays ("FPGAs").

Figure 11B:
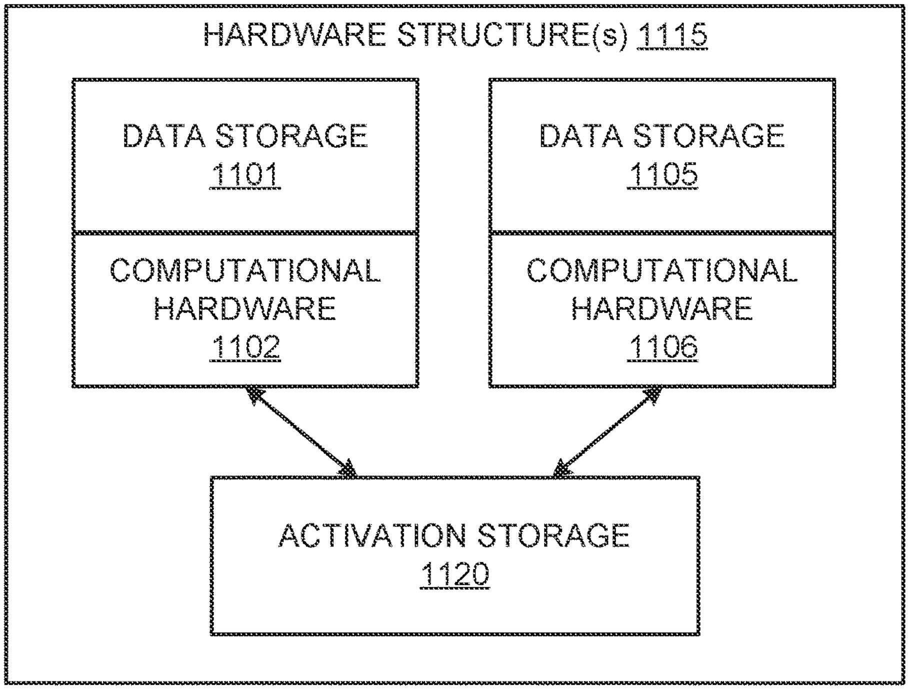
FIG. 11B illustrates inference and/or training logic, according to at least one embodiment.

FIG. 11B illustrates inference and/or training logic 1115, according to at least one embodiment various. In at least one embodiment, inference and/or training logic 1115 may include, without limitation, hardware logic in which computational resources are dedicated or otherwise exclusively used in conjunction with weight values or other information corresponding to one or more layers of neurons within a neural network. In at least one embodiment, inference and/or training logic 1115 illustrated in FIG. 11B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 1115 illustrated in FIG. 11B may be used in conjunction with central processing unit (CPU) hardware, graphics processing unit (GPU) hardware or other hardware, such as field programmable gate arrays (FPGAs). In at least one embodiment, inference and/or training logic 1115 includes, without limitation, code and/or data storage 1101 and code and/or data storage 1105, which may be used to store code (e.g., graph code), weight values and/or other information, including bias values, gradient information, momentum values, and/or other parameter or hyperparameter information. In at least one embodiment illustrated in FIG. 11B, each of code and/or data storage 1101 and code and/or data storage 1105 is associated with a dedicated computational resource, such as computational hardware 1102 and computational hardware 1106, respectively. In at least one embodiment, each of computational hardware 1102 and computational hardware 1106 comprises one or more ALUs that perform mathematical functions, such as linear algebraic functions, only on information stored in code and/or data storage 1101 and code and/or data storage 1105, respectively, result of which is stored in activation storage 1120.

In at least one embodiment, each of data storage 1101 and 1105 and corresponding computational hardware 1102 and 1106, respectively, correspond to different layers of a neural network, such that resulting activation from one "storage/computational pair 1101/1102" of data storage 1101 and computational hardware 1102 is provided as an input to next "storage/computational pair 1105/1106" of data storage 1105 and computational hardware 1106, in order to mirror conceptual organization of a neural network. In at least one embodiment, each of storage/computational pairs 1101/1102 and 1105/1106 may correspond to more than one neural network layer. In at least one embodiment, additional storage/computation pairs (not shown) subsequent to or in parallel with storage computation pairs 1101/1102 and 1105/1106 may be included in inference and/or training logic 1115.

Data Center

Figure 12:
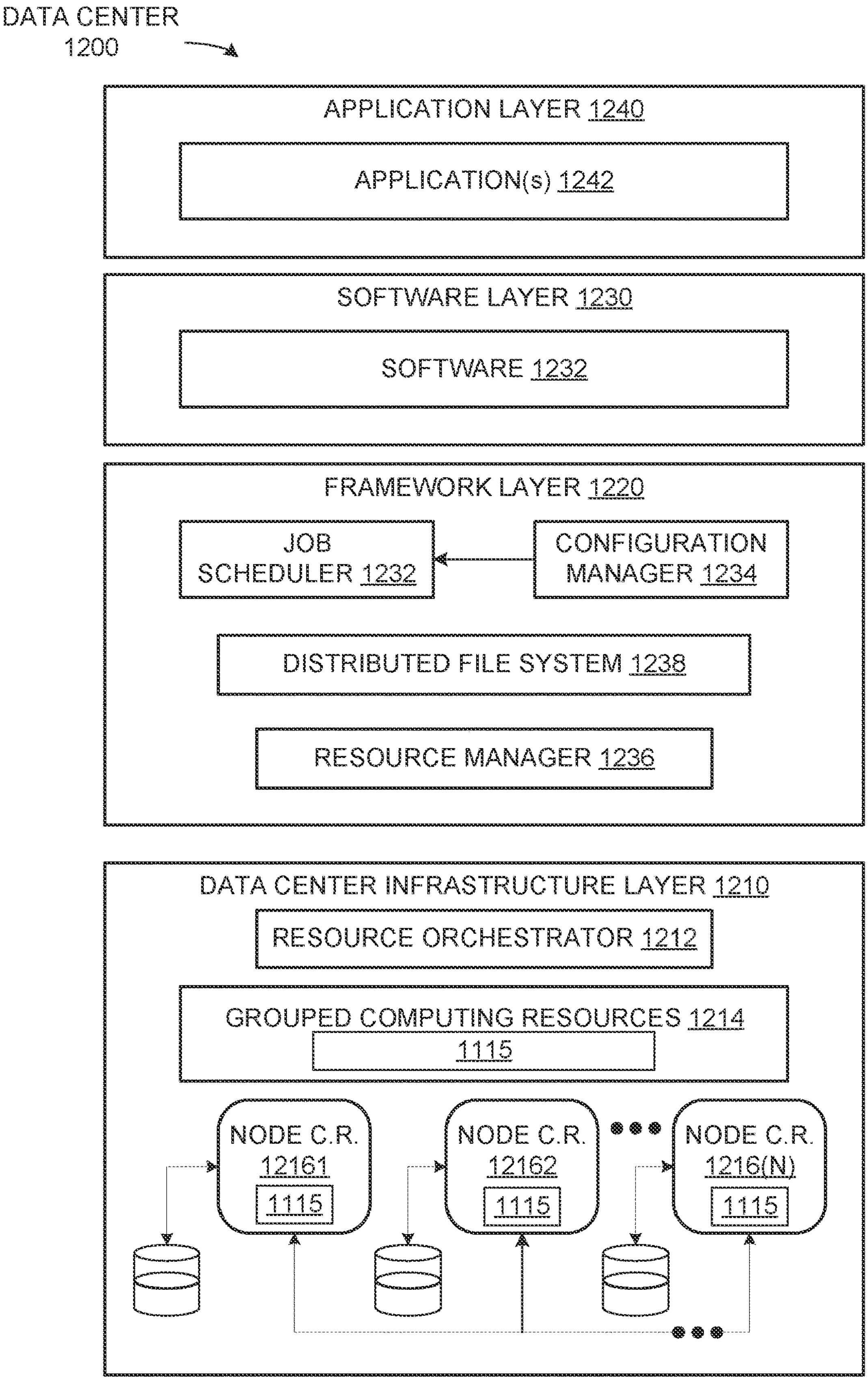
FIG. 12 illustrates an example data center system, according to at least one embodiment.

FIG. 12 illustrates an example data center 1200, in which at least one embodiment may be used. In at least one embodiment, a data center 1200 includes a data center infrastructure layer 1210, a framework layer 1220, a software layer 1230 and an application layer 1240.

In at least one embodiment, as shown in FIG. 12, a data center infrastructure layer 1210 may include a resource orchestrator 1212, grouped computing resources 1214, and node computing resources ("node C.R.s") 1216(1)-1216(N), where "N" represents any whole, positive integer. In at least one embodiment, node C.R.s 1216(1)-1216(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1216(1)-1216(N) may be a server having one or more of above-mentioned computing resources.

In at least one embodiment, grouped computing resources 1214 may include separate groupings of node C.R.s housed within one or more racks (not shown), or many racks housed in data centers at various geographical locations (also not shown). In at least one embodiment, separate groupings of node C.R.s within grouped computing resources 1214 may include grouped compute, network, memory or storage resources that may be configured or allocated to support one or more workloads. In at least one embodiment, several node C.R.s including CPUs or processors may be grouped within one or more racks to provide compute resources to support one or more workloads. In at least one embodiment, one or more racks may also include any number of power modules, cooling modules, and network switches, in any combination.

In at least one embodiment, resource orchestrator 1212 may configure or otherwise control one or more node C.R.s 1216(1)-1216(N) and/or grouped computing resources 1214. In at least one embodiment, resource orchestrator 1212 may include a software design infrastructure ("SDI") management entity for data center 1200. In at least one embodiment, a resource orchestrator may include hardware, software or some combination thereof.

In at least one embodiment, as shown in FIG. 12, framework layer 1220 includes a job scheduler 1232, a configuration manager 1234, a resource manager 1236, and a distributed file system 1238. In at least one embodiment, framework layer 1220 may include a framework to support software 1232 of software layer 1230 and/or one or more application(s) 1242 of application layer 1240. In at least one embodiment, software 1232 or application(s) 1242 may respectively include web-based service software or applications, such as those provided by Amazon Web Services, Google Cloud and Microsoft Azure. In at least one embodiment, framework layer 1220 may be, but is not limited to, a type of free and open-source software web application framework such as Apache Spark™ (hereinafter "Spark") that may utilize distributed file system 1238 for large-scale data processing (e.g., "big data"). In at least one embodiment, job scheduler 1232 may include a Spark driver to facilitate scheduling of workloads supported by various layers of data center 1200. In at least one embodiment, configuration manager 1234 may be capable of configuring different layers such as software layer 1230 and framework layer 1220 including Spark and distributed file system 1238 for supporting large-scale data processing. In at least one embodiment, resource manager 1236 may be capable of managing clustered or grouped computing resources mapped to or allocated for support of distributed file system 1238 and job scheduler 1232. In at least one embodiment, clustered or grouped computing resources may include grouped computing resource 1214 at data center infrastructure layer 1210. In at least one embodiment, resource manager 1236 may coordinate with resource orchestrator 1212 to manage these mapped or allocated computing resources.

In at least one embodiment, software 1232 included in software layer 1230 may include software used by at least portions of node C.R.s 1216(1)-1216(N), grouped computing resources 1214, and/or distributed file system 1238 of framework layer 1220. One or more types of software may include but are not limited to Internet web page search software, e-mail virus scan software, database software, and streaming video content software.

In at least one embodiment, application(s) 1242 included in application layer 1240 may include one or more types of applications used by at least portions of node C.R.s 1216 (1)-1216(N), grouped computing resources 1214, and/or distributed file system 1238 of framework layer 1220. One or more types of applications may include but are not limited to any number of a genomics application, a cognitive compute, and a machine learning application, including training or inferencing software, machine learning framework software (e.g., PyTorch, TensorFlow®, Caffe, etc.) or other machine learning applications used in conjunction with at least one embodiment.

In at least one embodiment, any of configuration manager 1234, resource manager 1236, and resource orchestrator 1212 may implement any number and type of self-modifying actions based on any amount and type of data acquired in any technically feasible fashion. In at least one embodiment, self-modifying actions may relieve a data center operator of data center 1200 from making possibly bad configuration decisions and possibly avoiding underutilized and/or poor performing portions of a data center.

In at least one embodiment, data center 1200, may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1200. In at least one embodiment, trained machine learning models corresponding to one or more neural networks may be used to infer or predict information using resources described above with respect to data center 1200 by using weight parameters calculated through one or more training techniques described herein.

In at least one embodiment, a data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or perform inferencing of information, such as image recognition, speech recognition, or other artificial intelligence services.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in system FIG. 12 for inferencing or predicting operations based, at least in part, on weight parameters calculated using neural network training operations, neural network functions and/or architectures, or neural network use cases described herein.

Autonomous Vehicle

Figure 13A:
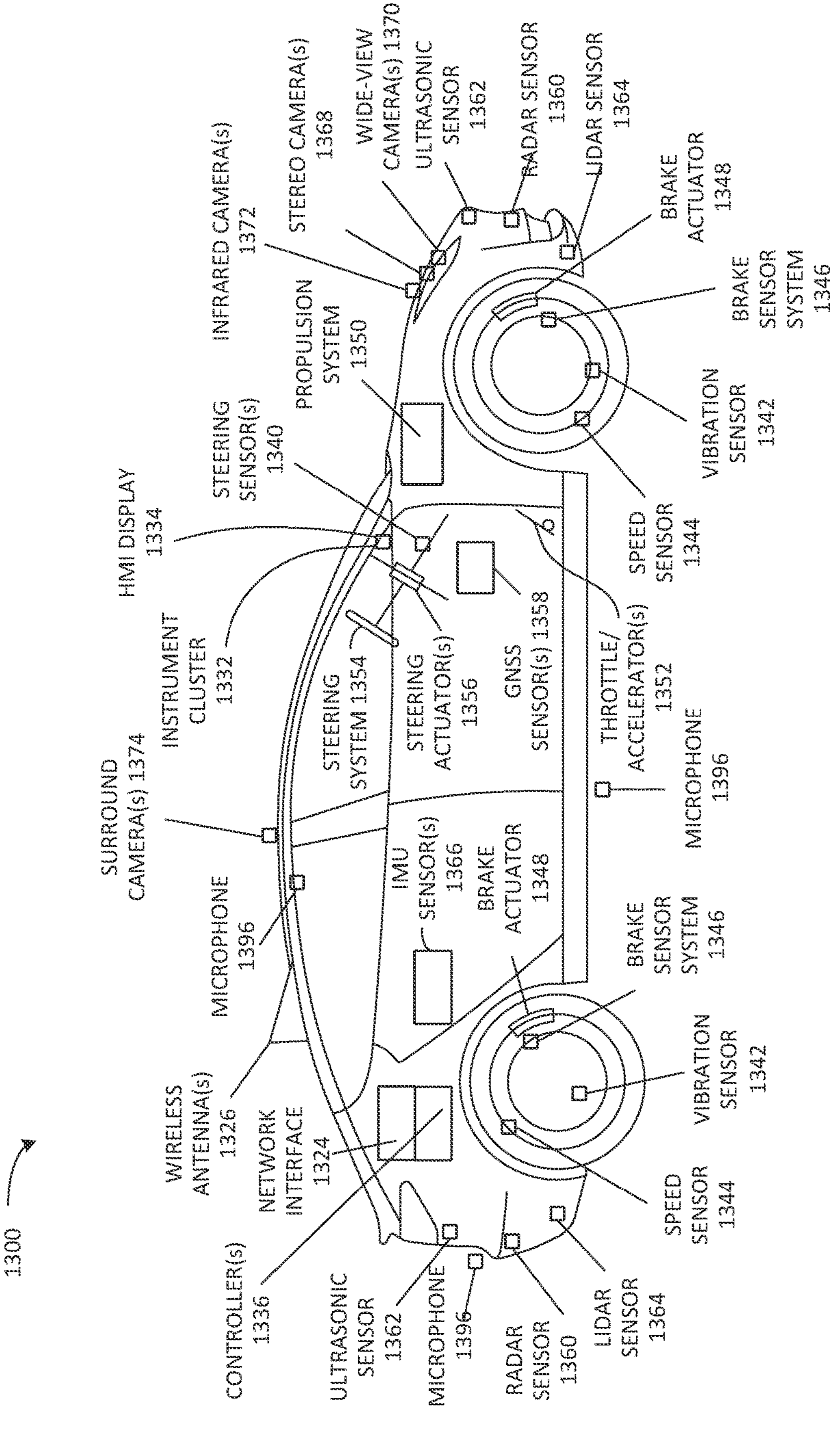
FIG. 13A illustrates an example of an autonomous vehicle, according to at least one embodiment.

FIG. 13A illustrates an example of an autonomous vehicle 1300, according to at least one embodiment. In at least one embodiment, autonomous vehicle 1300 (alternatively referred to herein as "vehicle 1300") may be, without limitation, a passenger vehicle, such as a car, a truck, a bus, and/or another type of vehicle that accommodates one or more passengers. In at least one embodiment, vehicle 1300 may be a semi-tractor-trailer truck used for hauling cargo. In at least one embodiment, vehicle 1300 may be an airplane, robotic vehicle, or other kind of vehicle.

Autonomous vehicles may be described in terms of automation levels, defined by the National Highway Traffic Safety Administration ("NHTSA"), a division of the US Department of Transportation, and the Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In at least one embodiment, a vehicle 1300 may be capable of functionality in accordance with one or more of level 1-level 5 of autonomous driving levels. For example, in at least one embodiment, a vehicle 1300 may be capable of conditional automation (Level 3), high automation (Level 4), and/or full automation (Level 5), depending on an embodiment.

In at least one embodiment, a vehicle 1300 may include, without limitation, components such as a chassis, a vehicle body, wheels (e.g., 2, 4, 6, 8, 18, etc.,) tires, axles, and other components of a vehicle. In at least one embodiment, a vehicle 1300 may include, without limitation, a propulsion system 1350, such as an internal combustion engine, a hybrid electric power plant, an all-electric engine, and/or another propulsion system type. In at least one embodiment, a propulsion system 1350 may be connected to a drive train of a vehicle 1300, which may include, without limitation, a transmission, to enable propulsion of a vehicle 1300. In at least one embodiment, a propulsion system 1350 may be controlled in response to receiving signals from one or more throttle/accelerator(s) 1352.

In at least one embodiment, a steering system 1354, which may include, without limitation, a steering wheel, is used to steer a vehicle 1300 (e.g., along a desired path or route) when a propulsion system 1350 is operating (e.g., when a vehicle is in motion). In at least one embodiment, a steering system 1354 may receive signals from steering actuator(s) 1356. In at least one embodiment, a steering wheel is not needed with full automation (Level 5) functionality. In at least one embodiment, a brake sensor system 1346 may be used to operate vehicle brakes in response to receiving signals from brake actuator(s) 1348 and/or brake sensors.

In at least one embodiment, controller(s) 1336, which may include, without limitation, one or more system on chips ("SoCs") (not shown in FIG. 13A) and/or graphics processing unit(s) ("GPU(s)"), provide signals (e.g., representative of commands) to one or more components and/or systems of vehicle 1300. For instance, in at least one embodiment, controller(s) 1336 may send signals to operate vehicle brakes via brake actuators 1348, to operate a steering system 1354 via steering actuator(s) 1356, to operate a propulsion system 1350 via throttle/accelerator(s) 1352. In at least one embodiment, controller(s) 1336 may include one or more onboard (e.g., integrated) computing devices (e.g., supercomputers) that process sensor signals, and output operation commands (e.g., signals representing commands) to enable autonomous driving and/or to assist a human driver in driving a vehicle 1300. In at least one embodiment, controller(s) 1336 may include a first controller 1336 for autonomous driving functions, a second controller 1336 for functional safety functions, a third controller 1336 for artificial intelligence functionality (e.g., computer vision), a fourth controller 1336 for infotainment functionality, a fifth controller 1336 for redundancy in emergency conditions, and/or other controllers. In at least one embodiment, a single controller 1336 may handle two or more functionalities described above, two or more controllers 1336 may handle a single functionality, and/or any combination thereof.

In at least one embodiment, controller(s) 1336 provide signals for controlling one or more components and/or systems of a vehicle 1300 in response to sensor data received from one or more sensors (e.g., sensor inputs). In at least one embodiment, sensor data may be received from, for example and without limitation, global navigation satellite systems ("GNSS") sensor(s) 1358 (e.g., Global Positioning System sensor(s)), RADAR sensor(s) 1360, ultrasonic sensor(s) 1362, LIDAR sensor(s) 1364, inertial measurement unit ("IMU") sensor(s) 1366 (e.g., accelerometer(s), gyroscope(s), magnetic compass(es), magnetometer(s), etc.), microphone(s) 1396, stereo camera(s) 1368, wide-view camera(s) 1370 (e.g., fisheye cameras), infrared camera(s) 1372, surround camera(s) 1374 (e.g., 360-degree cameras), long-range cameras (not shown in FIG. 13A), mid-range camera(s) (not shown in FIG. 13A), speed sensor(s) 1344 (e.g., for measuring speed of vehicle 1300), vibration sensor(s) 1342, steering sensor(s) 1340, brake sensor(s) (e.g., as part of a brake sensor system 1346), and/or other sensor types.

In at least one embodiment, one or more controller(s) 1336 may receive inputs (e.g., represented by input data) from an instrument cluster 1332 of a vehicle 1300 and provide outputs (e.g., represented by output data, display data, etc.) via a human-machine interface ("HMI") display 1334, an audible annunciator, a loudspeaker, and/or via other components of a vehicle 1300. In at least one embodiment, outputs may include information such as vehicle velocity, speed, time, map data (e.g., a High Definition map (not shown in FIG. 13A), location data (e.g., vehicle's 1300 location, such as on a map), direction, location of other vehicles (e.g., an occupancy grid), information about objects and status of objects as perceived by controller(s) 1336, etc. For example, in at least one embodiment, HMI display 1334 may display information about presence of one or more objects (e.g., a street sign, caution sign, traffic light changing, etc.), and/or information about driving maneuvers a vehicle has made, is making, or will make (e.g., changing lanes now, taking exit 34B in two miles, etc.).

In at least one embodiment, a vehicle 1300 further includes a network interface 1324 which may use wireless antenna(s) 1326 and/or modem(s) to communicate over one or more networks. For example, in at least one embodiment, network interface 1324 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. In at least one embodiment, wireless antenna(s) 1326 may also enable communication between objects in an environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in a system FIG. 13A for inferencing or predicting operations based, at least in part, on weight parameters calculated using neural network training operations, neural network functions and/or architectures, or neural network use cases described herein.

In at least one embodiment, a GPU-based scrambling/descrambling unit might be used to perform scrambling and/or descrambling as part of a communications process or system used with a system of FIG. 13A.

Figure 13B:
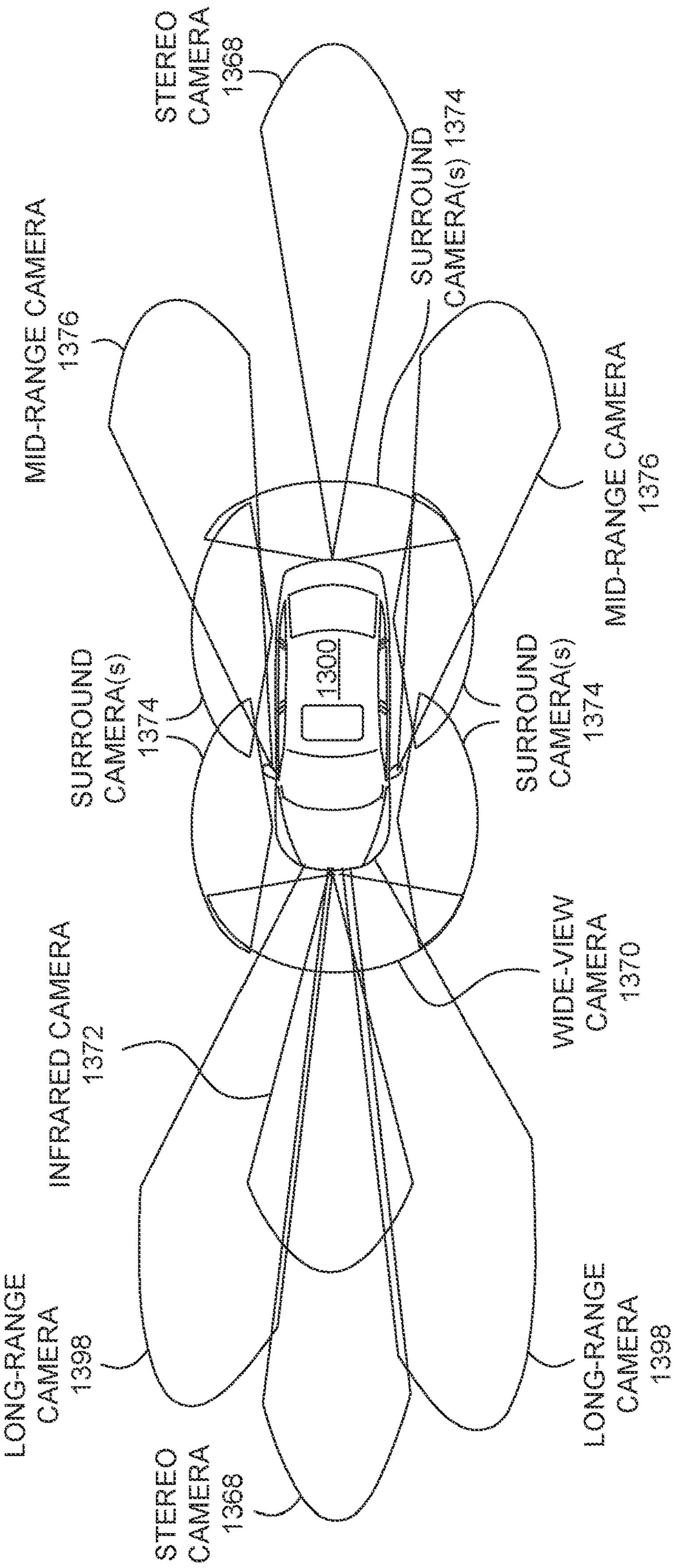
FIG. 13B illustrates an example of camera locations and fields of view for an autonomous vehicle of FIG. 13A, according to at least one embodiment.

FIG. 13B illustrates an example of camera locations and fields of view for an autonomous vehicle 1300 of FIG. 13A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on a vehicle 1300.

In at least one embodiment, camera types for cameras may include, but are not limited to, digital cameras that may be adapted for use with components and/or systems of a vehicle 1300. Camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on embodiment. In at least one embodiment, cameras may be capable of using rolling shutters, global shutters, another type of shutter, or a combination thereof. In at least one embodiment, a color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more camera(s) (e.g., all cameras) may record and provide image data (e.g., video) simultaneously.

In at least one embodiment, one or more cameras may be mounted in a mounting assembly, such as a custom designed (three-dimensional ("3D") printed) assembly, in order to cut out stray light and reflections from within a car (e.g., reflections from a dashboard reflected in windshield mirrors) which may interfere with a camera's image data capture abilities. With reference to wing-mirror mounting assemblies, in at least one embodiment, wing-mirror assemblies may be custom 3D printed so that a camera mounting plate matches shape of a wing-mirror. In at least one embodiment, camera(s) may be integrated into a wing-mirror. For side-view cameras, camera(s) may also be integrated within four pillars at each corner of a cab in at least one embodiment.

In at least one embodiment, cameras with a field of view that includes portions of an environment in front of a vehicle 1300 (e.g., front-facing cameras) may be used for surround view, to help identify forward facing paths and obstacles, as well as aid in, with help of one or more of controllers 1336 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, a wide-view camera 1370 may be used to perceive objects coming into view from a periphery (e.g., pedestrians, crossing traffic or bicycles). Although only one wide-view camera 1370 is illustrated in FIG. 13B, in at least one embodiment, there may be any number (including zero) of wide-view camera(s) 1370 on a vehicle 1300. In at least one embodiment, any number of long-range camera(s) 1398 (e.g., a long-view stereo camera pair) may be used for depth-based object detection, especially for objects for which a neural network has not yet been trained. In at least one embodiment, long-range camera(s) 1398 may also be used for object detection and classification, as well as basic object tracking.

In at least one embodiment, any number of stereo camera(s) 1368 may also be included in a front-facing configuration. In at least one embodiment, one or more stereo camera(s) 1368 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of an environment of a vehicle 1300, including a distance estimate for all points in an image. In at least one embodiment, one or more of stereo camera(s) 1368 may include, without limitation, compact stereo vision sensor(s) that may include, without limitation, two camera lenses (one each on left and right) and an image processing chip that may measure distance from a vehicle 1300 to a target object and use generated information (e.g., metadata) to activate autonomous emergency braking and lane departure warning functions. In at least one embodiment, other types of stereo camera(s) 1368 may be used in addition to, or alternatively from, those described herein.

In at least one embodiment, cameras with a field of view that includes portions of an environment to a side of a vehicle 1300 (e.g., side-view cameras) may be used for a surround view, providing information used to create and update an occupancy grid, as well as to generate side impact collision warnings. For example, in at least one embodiment, surround camera(s) 1374 (e.g., four surround cameras 1374 as illustrated in FIG. 13B) could be positioned on vehicle 1300. In at least one embodiment, surround camera(s) 1374 may include, without limitation, any number and combination of wide-view camera(s) 1370, fisheye camera(s), 360-degree camera(s), and/or like. For instance, in at least one embodiment, four fisheye cameras may be positioned on front, rear, and sides of a vehicle 1300. In at least one embodiment, a vehicle 1300 may use three surround camera(s) 1374 (e.g., left, right, and rear), and may leverage one or more other camera(s) (e.g., a forward-facing camera) as a fourth surround-view camera.

In at least one embodiment, cameras with a field of view that includes portions of an environment to rear of a vehicle 1300 (e.g., rear-view cameras) may be used for park assistance, surround view, rear collision warnings, and creating and updating an occupancy grid. In at least one embodiment, a wide variety of cameras may be used including, but not limited to, cameras that are also suitable as front-facing camera(s) (e.g., long-range cameras 1398 and/or mid-range camera(s) 1376, stereo camera(s) 1368), infrared camera(s) 1372, etc.), as described herein.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in a system FIG. 13B for inferencing or predicting operations based, at least in part, on weight parameters calculated using neural network training operations, neural network functions and/or architectures, or neural network use cases described herein.

In at least one embodiment, a GPU-based scrambling/descrambling unit might be used to perform scrambling and/or descrambling as part of a communications process or system used with a system of FIG. 13B.

Figure 13C:
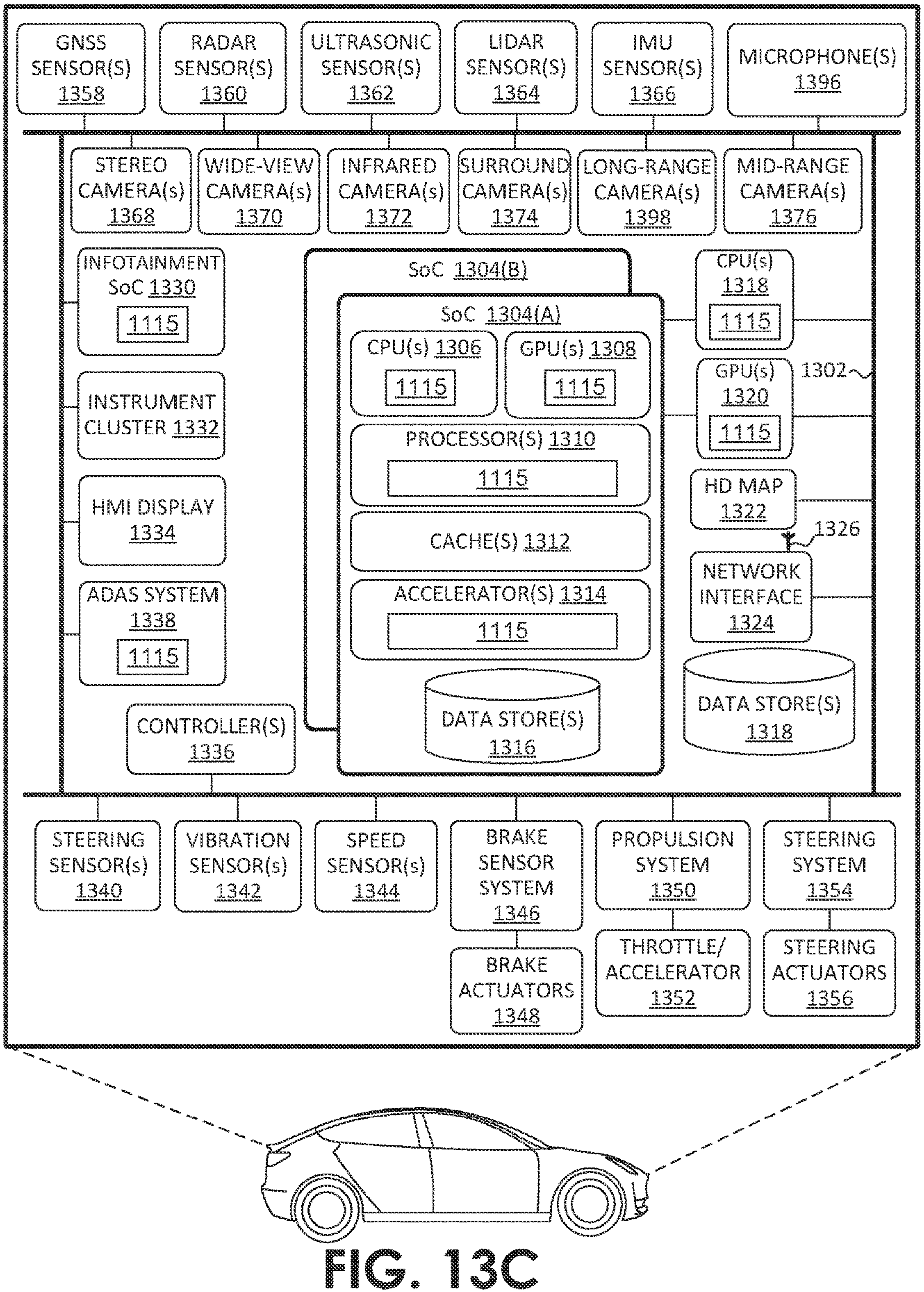
FIG. 13C is a block diagram illustrating an example system architecture for an autonomous vehicle of FIG. 13A, according to at least one embodiment.

FIG. 13C is a block diagram illustrating an example system architecture for an autonomous vehicle 1300 of FIG. 13A, according to at least one embodiment. In at least one embodiment, each of components, features, and systems of a vehicle 1300 in FIG. 13C are illustrated as being connected via a bus 1302. In at least one embodiment, a bus 1302 may include, without limitation, a CAN data interface (alternatively referred to herein as a "CAN bus"). In at least one embodiment, a CAN may be a network inside vehicle 1300 used to aid in control of various features and functionality of a vehicle 1300, such as actuation of brakes, acceleration, braking, steering, windshield wipers, etc. In at least one embodiment, a bus 1302 may be configured to have dozens or even hundreds of nodes, each with its own unique identifier (e.g., a CAN ID). In at least one embodiment, a bus 1302 may be read to find steering wheel angle, ground speed, engine revolutions per minute ("RPMs"), button positions, and/or other vehicle status indicators. In at least one embodiment, a bus 1302 may be a CAN bus that is ASIL B compliant.

In at least one embodiment, in addition to, or alternatively from CAN, FlexRay and/or Ethernet may be used. In at least one embodiment, there may be any number of busses 1302, which may include, without limitation, zero or more CAN busses, zero or more FlexRay busses, zero or more Ethernet busses, and/or zero or more other types of busses using a different protocol. In at least one embodiment, two or more busses 1302 may be used to perform different functions, and/or may be used for redundancy. For example, a first bus 1302 may be used for collision avoidance functionality and a second bus 1302 may be used for actuation control. In at least one embodiment, each bus 1302 may communicate with any of components of vehicle 1300, and two or more busses 1302 may communicate with same components. In at least one embodiment, each of any number of system(s) on chip(s) ("SoC(s)") 1304, each of controller(s) 1336, and/or each computer within a vehicle may have access to same input data (e.g., inputs from sensors of a vehicle 1300), and may be connected to a common bus, such as a CAN bus.

In at least one embodiment, a vehicle 1300 may include one or more controller(s) 1336, such as those described herein with respect to FIG. 13A. In at least one embodiment, controller(s) 1336 may be used for a variety of functions. In at least one embodiment, controller(s) 1336 may be coupled to any of various other components and systems of a vehicle 1300, and may be used for control of a vehicle 1300, artificial intelligence of a vehicle 1300, infotainment for a vehicle 1300, and/or like.

In at least one embodiment, a vehicle 1300 may include any number of SoCs 1304, which may each include, without limitation, central processing units ("CPU(s)") 1306, graphics processing units ("GPU(s)") 1308, processor(s) 1310, cache(s) 1312, accelerator(s) 1314, data store(s) 1316, and/or other components and features not illustrated. In at least one embodiment, SoC(s) 1304 may be used to control a vehicle 1300 in a variety of platforms and systems. For example, in at least one embodiment, SoC(s) 1304 may be combined in a system (e.g., system of vehicle 1300) with a High Definition ("HD") map 1322 which may obtain map refreshes and/or updates via a network interface 1324 from one or more servers (not shown in FIG. 13C).

In at least one embodiment, CPU(s) 1306 may include a CPU cluster or CPU complex (alternatively referred to herein as a "CCPLEX"). In at least one embodiment, CPU(s) 1306 may include multiple cores and/or level two ("L2") caches. For instance, in at least one embodiment, CPU(s) 1306 may include eight cores in a coherent multi-processor configuration. In at least one embodiment, CPU(s) 1306 may include four dual-core clusters where each cluster has a dedicated L2 cache (e.g., a 2 MB L2 cache). In at least one embodiment, CPU(s) 1306 (e.g., CCPLEX) may be configured to support simultaneous cluster operation enabling any combination of clusters of CPU(s) 1306 to be active at any given time.

In at least one embodiment, one or more of CPU(s) 1306 may implement power management capabilities that include, without limitation, one or more of following features: individual hardware blocks may be clock-gated automatically when idle to save dynamic power; each core clock may be gated when a core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 1306 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode.

In at least one embodiment, GPU(s) 1308 may include an integrated GPU (alternatively referred to herein as an "iGPU"). In at least one embodiment, GPU(s) 1308 may be programmable and may be efficient for parallel workloads. In at least one embodiment, GPU(s) 1308 may use an enhanced tensor instruction set. In at least one embodiment, GPU(s) 1308 may include one or more streaming microprocessors, where each streaming microprocessor may include a level one ("Li") cache (e.g., an L1 cache with at least 96 KB storage capacity), and two or more of streaming microprocessors may share an L2 cache (e.g., an L2 cache with a 512 KB storage capacity). In at least one embodiment, GPU(s) 1308 may include at least eight streaming microprocessors. In at least one embodiment, GPU(s) 1308 may use compute application programming interface(s) (API(s)). In at least one embodiment, GPU(s) 1308 may use one or more parallel computing platforms and/or programming models (e.g., NVIDIA's CUDA).

In at least one embodiment, one or more of GPU(s) 1308 may be power-optimized for best performance in automotive and embedded use cases. In at least one embodiment, for example, GPU(s) 1308 could be fabricated on a Fin field-effect transistor ("FinFET"). In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA TENSOR COREs for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 1308 may include a high bandwidth memory ("HBM") and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 1308 may include unified memory technology. In at least one embodiment, address translation services ("ATS") support may be used to allow GPU(s) 1308 to access CPU(s) 1306 page tables directly. In at least one embodiment, when GPU(s) 1308 memory management unit ("MMU") experiences a miss, an address translation request may be transmitted to CPU(s) 1306. In response, CPU(s) 1306 may look in its page tables for virtual-to-physical mapping for address and transmit translation back to GPU(s) 1308, in at least one embodiment. In at least one embodiment, unified memory technology may allow a single unified virtual address space for memory of both CPU(s) 1306 and GPU(s) 1308, thereby simplifying GPU(s) 1308 programming and porting of applications to GPU(s) 1308.

In at least one embodiment, GPU(s) 1308 may include any number of access counters that may keep track of frequency of access of GPU(s) 1308 to memory of other processors. In at least one embodiment, access counter(s) may help ensure that memory pages are moved to physical memory of a processor that is accessing pages most frequently, thereby improving efficiency for memory ranges shared between processors.

In at least one embodiment, one or more of SoC(s) 1304 may include any number of cache(s) 1312, including those described herein. For example, in at least one embodiment, cache(s) 1312 could include a level three ("L3") cache that is available to both CPU(s) 1306 and GPU(s) 1308 (e.g., that is connected to both CPU(s) 1306 and GPU(s) 1308). In at least one embodiment, cache(s) 1312 may include a write-back cache that may keep track of states of lines, such as by using a cache coherence protocol (e.g., MEI, MESI, MSI, etc.). In at least one embodiment, an L3 cache may include 4 MB or more, depending on an embodiment, although smaller cache sizes may be used.

In at least one embodiment, one or more of SoC(s) 1304 may include one or more accelerator(s) 1314 (e.g., hardware accelerators, software accelerators, or a combination thereof). In at least one embodiment, SoC(s) 1304 may include a hardware acceleration cluster that may include optimized hardware accelerators and/or large on-chip memory. In at least one embodiment, large on-chip memory (e.g., 4 MB of SRAM), may enable hardware acceleration cluster to accelerate neural networks and other calculations. In at least one embodiment, a hardware acceleration cluster may be used to complement GPU(s) 1308 and to off-load some tasks of GPU(s) 1308 (e.g., to free up more cycles of GPU(s) 1308 for performing other tasks). In at least one embodiment, accelerator(s) 1314 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 1314 (e.g., hardware acceleration cluster) may include deep learning accelerator(s) ("DLA"). In at least one embodiment, DLA(s) may include, without limitation, one or more Tensor processing units ("TPUs") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). In at least one embodiment, DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 1396; a CNN for facial recognition and vehicle owner identification using data from camera sensors; and/or a CNN for security and/or safety related events.

In at least one embodiment, DLA(s) may perform any function of GPU(s) 1308, and by using an inference accelerator, for example, a designer may target either DLA(s) or GPU(s) 1308 for any function. For example, in at least one embodiment, a designer may focus processing of CNNs and floating point operations on DLA(s) and leave other functions to GPU(s) 1308 and/or other accelerator(s) 1314.

In at least one embodiment, accelerator(s) 1314 (e.g., hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for an advanced driver assistance system ("ADAS") 1338, autonomous driving, augmented reality ("AR") applications, and/or virtual reality ("VR") applications. In at least one embodiment, PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (e.g., image sensors of any of cameras described herein), image signal processor(s), and/or like. In at least one embodiment, each RISC core may include any amount of memory. In at least one embodiment, RISC cores may use any of a number of protocols, depending on an embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 1306. In at least one embodiment, DMA may support any number of features used to provide optimization to a PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, a PVA may include a PVA core and two vector processing subsystem partitions. In at least one embodiment, a PVA core may include a processor subsystem, DMA engine(s) (e.g., two DMA engines), and/or other peripherals. In at least one embodiment, a vector processing subsystem may operate as a primary processing engine of a PVA, and may include a vector processing unit ("VPU"), an instruction cache, and/or vector memory (e.g., "VMEM"). In at least one embodiment, a VPU core may include a digital signal processor such as, for example, a single instruction, multiple data ("SIMD"), and/or a very long instruction word ("VLIW") digital signal processor. In at least one embodiment, a combination of SIMD and VLIW may enhance throughput and speed.

In at least one embodiment, each vector processor may include an instruction cache and may be coupled to a dedicated memory. As a result, in at least one embodiment, each vector processor may be configured to execute independently of other vector processors. In at least one embodiment, vector processors that are included in a particular PVA may be configured to employ data parallelism. For instance, in at least one embodiment, a plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in a hardware acceleration cluster and any number of vector processors may be included in each PVA. In at least one embodiment, PVA(s) may include additional error correcting code ("ECC") memory, to enhance overall system safety.

In at least one embodiment, accelerator(s) 1314 (e.g., hardware acceleration cluster) may include a computer vision network on-chip and static random-access memory ("SRAM"), for providing high-bandwidth, low latency SRAM for accelerator(s) 1314. In at least one embodiment, on-chip memory may include at least 4 MB SRAM, consisting of, for example and without limitation, eight field-configurable memory blocks, that may be accessible by both a PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, a PVA and DLA may access memory via a backbone that provides a PVA and DLA with high-speed access to memory. In at least one embodiment, a backbone may include a computer vision network on-chip that interconnects a PVA and DLA to memory (e.g., using APB).

In at least one embodiment, a computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 1304 may include a real-time ray-tracing hardware accelerator. In at least one embodiment, a real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 1314 (e.g., hardware accelerator cluster(s)) have a wide array of uses for autonomous driving. In at least one embodiment, a PVA may be a programmable vision accelerator that may be used for key processing stages in ADAS and autonomous vehicles. In at least one embodiment, a PVA's capabilities are a good match for algorithmic domains needing predictable processing, at low power and low latency. In other words, a PVA performs well on semi-dense or dense regular computation, even on small data sets, which need predictable run-times with low latency and low power. In at least one embodiment, autonomous vehicles, such as a vehicle 1300, PVAs are designed to run classic computer vision algorithms, as they are efficient at object detection and operating on integer math.

For example, according to at least one embodiment of technology, a PVA is used to perform computer stereo vision. In at least one embodiment, a semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, a PVA may perform computer stereo vision function on inputs from two monocular cameras.

In at least one embodiment, a PVA may be used to perform dense optical flow. For example, in at least one embodiment, a PVA could process raw RADAR data (e.g., using a 4D Fast Fourier Transform) to provide processed RADAR data. In at least one embodiment, a PVA is used for time of flight depth processing, by processing raw time of flight data to provide processed time of flight data, for example.

In at least one embodiment, a DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. For example, in at least one embodiment, a system may set a threshold value for confidence and consider only detections exceeding a threshold value as true positive detections. In at least one embodiment in which an automatic emergency braking ("AEB") system is used, false positive detections would cause a vehicle to automatically perform emergency braking, which is obviously undesirable. In at least one embodiment, highly confident detections may be considered as triggers for AEB. In at least one embodiment, a DLA may run a neural network for regressing confidence value. In at least one embodiment, a neural network may take as its input at least some subset of parameters, such as bounding box dimensions, a ground plane estimate obtained (e.g., from another subsystem), output from IMU sensor(s) 1366 that correlates with vehicle 1300 orientation, distance, 3D location estimates of object obtained from a neural network and/or other sensors (e.g., LIDAR sensor(s) 1364 or RADAR sensor(s) 1360), among others.

In at least one embodiment, one or more of SoC(s) 1304 may include data store(s) 1316 (e.g., memory). In at least one embodiment, data store(s) 1316 may be on-chip memory of SoC(s) 1304, which may store neural networks to be executed on GPU(s) 1308 and/or DLA. In at least one embodiment, data store(s) 1316 may be large enough in capacity to store multiple instances of neural networks for redundancy and safety. In at least one embodiment, data store(s) 1312 may comprise L2 or L3 cache(s).

In at least one embodiment, one or more of SoC(s) 1304 may include any number of processor(s) 1310 (e.g., embedded processors). In at least one embodiment, processor(s) 1310 may include a boot and power management processor that may be a dedicated processor and subsystem to handle boot power and management functions and related security enforcement. In at least one embodiment, boot and a power management processor may be a part of SoC(s) 1304 boot sequence and may provide runtime power management services. In at least one embodiment, a boot power and management processor may provide clock and voltage programming, assistance in system low power state transitions, management of SoC(s) 1304 thermals and temperature sensors, and/or management of SoC(s) 1304 power states. In at least one embodiment, each temperature sensor may be implemented as a ring-oscillator whose output frequency is proportional to temperature, and SoC(s) 1304 may use ring-oscillators to detect temperatures of CPU(s) 1306, GPU(s) 1308, and/or accelerator(s) 1314. In at least one embodiment, if temperatures are determined to exceed a threshold, then a boot and power management processor may enter a temperature fault routine and put SoC(s) 1304 into a lower power state and/or put vehicle 1300 into a chauffeur to safe stop mode (e.g., bring a vehicle 1300 to a safe stop).

In at least one embodiment, processor(s) 1310 may further include a set of embedded processors that may serve as an audio processing engine. In at least one embodiment, an audio processing engine may be an audio subsystem that enables full hardware support for multi-channel audio over multiple interfaces, and a broad and flexible range of audio I/O interfaces. In at least one embodiment, an audio processing engine is a dedicated processor core with a digital signal processor with dedicated RAM.

In at least one embodiment, processor(s) 1310 may further include an always-on processor engine that may provide necessary hardware features to support low power sensor management and wake use cases. In at least one embodiment, an always-on processor engine may include, without limitation, a processor core, a tightly coupled RAM, supporting peripherals (e.g., timers and interrupt controllers), various I/O controller peripherals, and routing logic.

In at least one embodiment, processor(s) 1310 may further include a safety cluster engine that includes, without limitation, a dedicated processor subsystem to handle safety management for automotive applications. In at least one embodiment, a safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 1310 may further include a real-time camera engine that may include, without limitation, a dedicated processor subsystem for handling real-time camera management. In at least one embodiment, processor(s) 1310 may further include a high-dynamic range signal processor that may include, without limitation, an image signal processor that is a hardware engine that is part of a camera processing pipeline.

In at least one embodiment, processor(s) 1310 may include a video image compositor that may be a processing block (e.g., implemented on a microprocessor) that implements video post-processing functions needed by a video playback application to produce final image for a player window. In at least one embodiment, a video image compositor may perform lens distortion correction on wide-view camera(s) 1370, surround camera(s) 1374, and/or on in-cabin monitoring camera sensor(s). In at least one embodiment, in-cabin monitoring camera sensor(s) are preferably monitored by a neural network running on another instance of SoC 1304, configured to identify in-cabin events and respond accordingly. In at least one embodiment, an in-cabin system may perform, without limitation, lip reading to activate cellular service and place a phone call, dictate emails, change a vehicle's destination, activate or change a vehicle's infotainment system and settings, or provide voice-activated web surfing. In at least one embodiment, certain functions are available to a driver when a vehicle is operating in an autonomous mode and are disabled otherwise.

In at least one embodiment, a video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, a video image compositor may also be configured to perform stereo rectification on input stereo lens frames. In at least one embodiment, a video image compositor may further be used for user interface composition when an operating system desktop is in use, and GPU(s) 1308 are not required to continuously render new surfaces. In at least one embodiment, when GPU(s) 1308 are powered on and active doing 3D rendering, a video image compositor may be used to offload GPU(s) 1308 to improve performance and responsiveness.

In at least one embodiment, one or more of SoC(s) 1304 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 1304 may further include input/output controller(s) that may be controlled by software and may be used for receiving I/O signals that are uncommitted to a specific role.

In at least one embodiment, one or more of SoC(s) 1304 may further include a broad range of peripheral interfaces to enable communication with peripherals, audio encoders/decoders ("codecs"), power management, and/or other devices. In at least one embodiment, SoC(s) 1304 may be used to process data from cameras (e.g., connected over Gigabit Multimedia Serial Link and Ethernet), sensors (e.g., LIDAR sensor(s) 1364, RADAR sensor(s) 1360, etc. that may be connected over Ethernet), data from a bus 1302 (e.g., speed of vehicle 1300, steering wheel position, etc.), data from GNSS sensor(s) 1358 (e.g., connected over Ethernet or CAN bus), etc. In at least one embodiment, one or more of SoC(s) 1304 may further include dedicated high-performance mass storage controllers that may include their own DMA engines, and that may be used to free CPU(s) 1306 from routine data management tasks.

In at least one embodiment, SoC(s) 1304 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 1304 may be faster, more reliable, and even more energy-efficient and space-efficient than other systems. For example, in at least one embodiment, accelerator(s) 1314, when combined with CPU(s) 1306, GPU(s) 1308, and data store(s) 1316, may provide for a fast, efficient platform for level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Levels 3-5 autonomous vehicles.

In at least one embodiment, multiple neural networks can be performed simultaneously and/or sequentially, and results combined together to enable Level 3-5 autonomous driving functionality. For example, in at least one embodiment, a CNN executing on DLA or discrete GPU (e.g., GPU(s) 1320) may include text and word recognition, allowing a supercomputer to read and understand traffic signs, including signs for which a neural network has not been specifically trained. In at least one embodiment, a DLA may further include a neural network that is able to identify, interpret, and provide semantic understanding of a sign, and to pass that semantic understanding to path planning modules running on a CPU Complex.

In at least one embodiment, multiple neural networks may be run simultaneously, as for Levels 3, 4, or 5 driving. For example, in at least one embodiment, a warning sign consisting of "Caution: flashing lights indicate icy conditions," along with an electric light, may be independently or collectively interpreted by several neural networks. In at least one embodiment, a sign itself may be identified as a traffic sign by a first deployed neural network (e.g., a neural network that has been trained), text "flashing lights indicate icy conditions" may be interpreted by a second deployed neural network, which informs a vehicle's path planning software (preferably executing on CPU Complex) that when flashing lights are detected, icy conditions exist. In at least one embodiment, flashing light may be identified by operating a third deployed neural network over multiple frames, informing a vehicle's path-planning software of presence (or absence) of flashing lights. In at least one embodiment, all three neural networks may run simultaneously, such as within DLA and/or on GPU(s) 1308.

In at least one embodiment, a CNN for facial recognition and vehicle owner identification may use data from camera sensors to identify presence of an authorized driver and/or owner of vehicle 1300. In at least one embodiment, an always-on sensor processing engine may be used to unlock a vehicle when an owner approaches a driver door and turns on lights, and, in security mode, to disable a vehicle when an owner leaves a vehicle. In this way, SoC(s) 1304 provide for security against theft and/or carjacking.

In at least one embodiment, a CNN for emergency vehicle detection and identification may use data from microphones 1396 to detect and identify emergency vehicle sirens. In at least one embodiment, SoC(s) 1304 use a CNN for classifying environmental and urban sounds, as well as classifying visual data. In at least one embodiment, a CNN running on a DLA is trained to identify relative closing speed of emergency vehicle (e.g., by using Doppler effect). In at least one embodiment, a CNN may also be trained to identify emergency vehicles specific to local area in which a vehicle is operating, as identified by GNSS sensor(s) 1358. In at least one embodiment, when operating in Europe, a CNN will seek to detect European sirens, and when in United States CNN will seek to identify only North American sirens. In at least one embodiment, once an emergency vehicle is detected, a control program may be used to execute an emergency vehicle safety routine, a slowing vehicle, pulling over to side of a road, parking a vehicle, and/or idling a vehicle, with assistance of ultrasonic sensor(s) 1362, until an emergency vehicle(s) pass.

In at least one embodiment, vehicle 1300 may include CPU(s) 1318 (e.g., discrete CPU(s), or dCPU(s)), that may be coupled to SoC(s) 1304 via a high-speed interconnect (e.g., PCIe). In at least one embodiment, CPU(s) 1318 may include an X86 processor, for example. In at least one embodiment, CPU(s) 1318 may be used to perform any of a variety of functions, including arbitrating potentially inconsistent results between ADAS sensors and SoC(s) 1304, and/or monitoring status and health of controller(s) 1336 and/or an infotainment system on a chip ("infotainment SoC") 1330, for example.

In at least one embodiment, vehicle 1300 may include GPU(s) 1320 (e.g., discrete GPU(s), or dGPU(s)), that may be coupled to SoC(s) 1304 via a high-speed interconnect (e.g., NVIDIA's NVLINK). In at least one embodiment, GPU(s) 1320 may provide additional artificial intelligence functionality, such as by executing redundant and/or different neural networks, and may be used to train and/or update neural networks based at least in part on input (e.g., sensor data) from sensors of vehicle 1300.

In at least one embodiment, vehicle 1300 may further include network interface 1324 which may include, without limitation, wireless antenna(s) 1326 (e.g., one or more wireless antennas 1326 for different communication protocols, such as a cellular antenna, a Bluetooth antenna, etc.). In at least one embodiment, network interface 1324 may be used to enable wireless connectivity over Internet with cloud (e.g., with server(s) and/or other network devices), with other vehicles, and/or with computing devices (e.g., client devices of passengers). In at least one embodiment, to communicate with other vehicles, a direct link may be established between vehicle 130 and another vehicle and/or an indirect link may be established (e.g., across networks and over Internet). In at least one embodiment, direct links may be provided using a vehicle-to-vehicle communication link. In at least one embodiment, a vehicle-to-vehicle communication link provides vehicle 1300 information about vehicles in proximity to vehicle 1300 (e.g., vehicles in front of, on side of, and/or behind vehicle 1300). In at least one embodiment, aforementioned functionality may be part of a cooperative adaptive cruise control functionality of vehicle 1300.

In at least one embodiment, network interface 1324 may include an SoC that provides modulation and demodulation functionality and enables controller(s) 1336 to communicate over wireless networks. In at least one embodiment, network interface 1324 may include a radio frequency front-end for up-conversion from baseband to radio frequency, and down-conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, a network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 1300 may further include data store(s) 1328 which may include, without limitation, off-chip (e.g., off SoC(s) 1304) storage. In at least one embodiment, data store(s) 1328 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 1300 may further include GNSS sensor(s) 1358 (e.g., GPS and/or assisted GPS sensors), to assist in mapping, perception, occupancy grid generation, and/or path planning functions. In at least one embodiment, any number of GNSS sensor(s) 1358 may be used, including, for example and without limitation, a GPS using a USB connector with an Ethernet to Serial (e.g., RS-232) bridge.

In at least one embodiment, vehicle 1300 may further include RADAR sensor(s) 1360. RADAR sensor(s) 1360 may be used by vehicle 1300 for long-range vehicle detection, even in darkness and/or severe weather conditions. In at least one embodiment, RADAR functional safety levels may be ASIL B. RADAR sensor(s) 1360 may use a CAN and/or a bus 1302 (e.g., to transmit data generated by RADAR sensor(s) 1360) for control and to access object tracking data, with access to Ethernet to access raw data in some examples. In at least one embodiment, wide variety of RADAR sensor types may be used. For example, and without limitation, RADAR sensor(s) 1360 may be suitable for front, rear, and side RADAR use. In at least one embodiment, one or more of RADAR sensors(s) 1360 are Pulse Doppler RADAR sensor(s).

In at least one embodiment, RADAR sensor(s) 1360 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250m range. In at least one embodiment, RADAR sensor(s) 1360 may help in distinguishing between static and moving objects, and may be used by an ADAS system 1338 for emergency brake assist and forward collision warning. In at least one embodiment, sensors 1360(*s*) included in a long-range RADAR system may include, without limitation, monostatic multimodal RADAR with multiple (e.g., six or more) fixed RADAR antennae and a high-speed CAN and FlexRay interface. In at least one embodiment, with six antennae, central four antennae may create a focused beam pattern, designed to record a vehicle's 1300 surroundings at higher speeds with minimal interference from traffic in adjacent lanes. In at least one embodiment, other two antennae may expand a field of view, making it possible to quickly detect vehicles entering or leaving vehicle's 1300 lane.

In at least one embodiment, mid-range RADAR systems may include, as an example, a range of up to 160m (front) or 80m (rear), and a field of view of up to 42 degrees (front) or 150 degrees (rear). In at least one embodiment, short-range RADAR systems may include, without limitation, any number of RADAR sensor(s) 1360 designed to be installed at both ends of a rear bumper. When installed at both ends of a rear bumper, in at least one embodiment, a RADAR sensor system may create two beams that constantly monitor blind spot in rear and next to vehicle. In at least one embodiment, short-range RADAR systems may be used in ADAS system 1338 for blind spot detection and/or lane change assist.

In at least one embodiment, vehicle 1300 may further include ultrasonic sensor(s) 1362. Ultrasonic sensor(s) 1362, which may be positioned at front, back, and/or sides of vehicle 1300, may be used for park assist and/or to create and update an occupancy grid. In at least one embodiment, a wide variety of ultrasonic sensor(s) 1362 may be used, and different ultrasonic sensor(s) 1362 may be used for different ranges of detection (e.g., 2.5m, 4m). In at least one embodiment, ultrasonic sensor(s) 1362 may operate at functional safety levels of ASIL B.

In at least one embodiment, vehicle 1300 may include LIDAR sensor(s) 1364. In at least one embodiment, LIDAR sensor(s) 1364 may be used for object and pedestrian detection, emergency braking, collision avoidance, and/or other functions. In at least one embodiment, LIDAR sensor(s) 1364 may be functional safety level ASIL B. In at least one embodiment, vehicle 1300 may include multiple LIDAR sensors 1364 (e.g., two, four, six, etc.) that may use Ethernet (e.g., to provide data to a Gigabit Ethernet switch).

In at least one embodiment, LIDAR sensor(s) 1364 may be capable of providing a list of objects and their distances for a 360-degree field of view. In at least one embodiment, commercially available LIDAR sensor(s) 1364 may have an advertised range of approximately 100m, with an accuracy of 2 cm-3 cm, and with support for a 100 Mbps Ethernet connection, for example. In at least one embodiment, one or more non-protruding LIDAR sensor(s) 1364 may be used and implemented as a small device that may be embedded into front, rear, sides, and/or corners of vehicle 1300. In at least one embodiment, LIDAR sensor(s) 1364, in such an embodiment, may provide up to a 120-degree horizontal and 35-degree vertical field-of-view, with a 200m range even for low-reflectivity objects. In at least one embodiment, front-mounted LIDAR sensor(s) 1364 may be configured for a horizontal field of view between 45 degrees and 135 degrees.

In at least one embodiment, LIDAR technologies, such as 3D flash LIDAR, may also be used. 3D Flash LIDAR uses a flash of a laser as a transmission source, to illuminate surroundings of vehicle 1300 up to approximately 200m. In at least one embodiment, a flash LIDAR unit includes, without limitation, a receptor, which records laser pulse transit time and reflected light on each pixel, which in turn corresponds to a range from vehicle 1300 to objects. In at least one embodiment, flash LIDAR may allow for highly accurate and distortion-free images of surroundings to be generated with every laser flash. In at least one embodiment, four flash LIDAR sensors may be deployed, one at each side of vehicle 1300. In at least one embodiment, 3D flash LIDAR systems include, without limitation, a solid-state 3D staring array LIDAR camera with no moving parts other than a fan (e.g., a non-scanning LIDAR device). In at least one embodiment, a flash LIDAR device may use a 5 nanosecond class I (eye-safe) laser pulse per frame and may capture reflected laser light in form of 3D range point clouds and co-registered intensity data.

In at least one embodiment, a vehicle may further include IMU sensor(s) 1366. In at least one embodiment, IMU sensor(s) 1366 may be located at a center of a rear axle of a vehicle 1300, in at least one embodiment. In at least one embodiment, IMU sensor(s) 1366 may include, for example and without limitation, accelerometer(s), magnetometer(s), gyroscope(s), magnetic compass(es), and/or other sensor types. In at least one embodiment, such as in six-axis applications, IMU sensor(s) 1366 may include, without limitation, accelerometers and gyroscopes. In at least one embodiment, such as in nine-axis applications, IMU sensor(s) 1366 may include, without limitation, accelerometers, gyroscopes, and magnetometers.

In at least one embodiment, IMU sensor(s) 1366 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 1366 may enable vehicle 1300 to estimate heading without requiring input from a magnetic sensor by directly observing and correlating changes in velocity from GPS to IMU sensor(s) 1366. In at least one embodiment, IMU sensor(s) 1366 and GNSS sensor(s) 1358 may be combined in a single integrated unit.

In at least one embodiment, vehicle 1300 may include microphone(s) 1396 placed in and/or around vehicle 1300. In at least one embodiment, microphone(s) 1396 may be used for emergency vehicle detection and identification, among other things.

In at least one embodiment, vehicle 1300 may further include any number of camera types, including stereo camera(s) 1368, wide-view camera(s) 1370, infrared camera(s) 1372, surround camera(s) 1374, long-range camera(s) 1398, mid-range camera(s) 1376, and/or other camera types. In at least one embodiment, cameras may be used to capture image data around an entire periphery of vehicle 1300. In at least one embodiment, types of cameras used depends vehicle 1300. In at least one embodiment, any combination of camera types may be used to provide necessary coverage around vehicle 1300. In at least one embodiment, number of cameras may differ depending on embodiment. For example, in at least one embodiment, vehicle 1300 could include six cameras, seven cameras, ten cameras, twelve cameras, or another number of cameras. Cameras may support, as an example and without limitation, Gigabit Multimedia Serial Link ("GMSL") and/or Gigabit Ethernet. In at least one embodiment, each of camera(s) is described with more detail previously herein with respect to FIG. 13A and FIG. 13B.

In at least one embodiment, vehicle 1300 may further include vibration sensor(s) 1342. Vibration sensor(s) 1342 may measure vibrations of components of vehicle 1300, such as axle(s). For example, in at least one embodiment, changes in vibrations may indicate a change in road surfaces. In at least one embodiment, when two or more vibration sensors 1342 are used, differences between vibrations may be used to determine friction or slippage of road surface (e.g., when difference in vibration is between a power-driven axle and a freely rotating axle).

In at least one embodiment, vehicle 1300 may include ADAS system 1338. In at least one embodiment, ADAS system 1338 may include, without limitation, an SoC, in some examples. In at least one embodiment, ADAS system 1338 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 1360, LIDAR sensor(s) 1364, and/or any number of camera(s). In at least one embodiment, an ACC system may include a longitudinal ACC system and/or a lateral ACC system. In at least one embodiment, a longitudinal ACC system monitors and controls distance to vehicle immediately ahead of vehicle 1300 and automatically adjusts speed of vehicle 1300 to maintain a safe distance from vehicles ahead. In at least one embodiment, lateral ACC system performs distance keeping, and advises vehicle 1300 to change lanes when necessary. In at least one embodiment, a lateral ACC is related to other ADAS applications such as LC and CW.

In at least one embodiment, a CACC system uses information from other vehicles that may be received via network interface 1324 and/or wireless antenna(s) 1326 from other vehicles via a wireless link, or indirectly, over a network connection (e.g., over Internet). In at least one embodiment, direct links may be provided by a vehicle-to-vehicle ("V2V") communication link, while indirect links may be provided by an infrastructure-to-vehicle ("I2V") communication link. In at least one embodiment, a V2V communication concept provides information about immediately preceding vehicles (e.g., vehicles immediately ahead of and in same lane as vehicle 1300), while I2V communication concept provides information about traffic further ahead. In at least one embodiment, a CACC system may include either or both I2V and V2V information sources. In at least one embodiment, given information of vehicles ahead of vehicle 1300, a CACC system may be more reliable and it has potential to improve traffic flow smoothness and reduce congestion on a road.

In at least one embodiment, FCW system is designed to alert a driver to a hazard, so that a driver may take corrective action. In at least one embodiment, a FCW system uses a front-facing camera and/or RADAR sensor(s) 1360, coupled to a dedicated processor, DSP, FPGA, and/or ASIC, that is electrically coupled to driver feedback, such as a display, speaker, and/or vibrating component. In at least one embodiment, an FCW system may provide a warning, such as in form of a sound, visual warning, vibration and/or a quick brake pulse.

In at least one embodiment, an AEB system detects an impending forward collision with another vehicle or other object, and may automatically apply brakes if a driver does not take corrective action within a specified time or distance parameter. In at least one embodiment, an AEB system may use front-facing camera(s) and/or RADAR sensor(s) 1360, coupled to a dedicated processor, DSP, FPGA, and/or ASIC. In at least one embodiment, when an AEB system detects a hazard, an AEB system typically first alerts a driver to take corrective action to avoid collision and, if a driver does not take corrective action, an AEB system may automatically apply brakes in an effort to prevent, or at least mitigate, impact of a predicted collision. In at least one embodiment, an AEB system, may include techniques such as dynamic brake support and/or crash imminent braking.

In at least one embodiment, an LDW system provides visual, audible, and/or tactile warnings, such as steering wheel or seat vibrations, to alert a driver when vehicle 1300 crosses lane markings. In at least one embodiment, an LDW system does not activate when a driver indicates an intentional lane departure, by activating a turn signal. In at least one embodiment, an LDW system may use front-side facing cameras, coupled to a dedicated processor, DSP, FPGA, and/or ASIC, that is electrically coupled to driver feedback, such as a display, speaker, and/or vibrating component. In at least one embodiment, an LKA system is a variation of an LDW system. In at least one embodiment, an LKA system provides steering input or braking to correct a vehicle 1300 if vehicle 1300 starts to exit a lane.

In at least one embodiment, a BSW system detects and warns a driver of vehicles in an automobile's blind spot. In at least one embodiment, a BSW system may provide a visual, audible, and/or tactile alert to indicate that merging or changing lanes is unsafe. In at least one embodiment, a BSW system may provide an additional warning when a driver uses a turn signal. In at least one embodiment, a BSW system may use rear-side facing camera(s) and/or RADAR sensor(s) 1360, coupled to a dedicated processor, DSP, FPGA, and/or ASIC, that is electrically coupled to driver feedback, such as a display, speaker, and/or vibrating component.

In at least one embodiment, an RCTW system may provide visual, audible, and/or tactile notification when an object is detected outside rear-camera range when vehicle 1300 is backing up. In at least one embodiment, an RCTW system includes an AEB system to ensure that vehicle brakes are applied to avoid a crash. In at least one embodiment, an RCTW system may use one or more rear-facing RADAR sensor(s) 1360, coupled to a dedicated processor, DSP, FPGA, and/or ASIC, that is electrically coupled to driver feedback, such as a display, speaker, and/or vibrating component.

In at least one embodiment, an ADAS systems may be prone to false positive results which may be annoying and distracting to a driver, but typically are not catastrophic, because ADAS systems alert a driver and allow a driver to decide whether a safety condition truly exists and act accordingly. In at least one embodiment, vehicle 1300 itself decides, in case of conflicting results, whether to heed a result from a primary computer or a secondary computer (e.g., first controller 1336 or second controller 1336). For example, in at least one embodiment, ADAS system 1338 may be a backup and/or secondary computer for providing perception information to a backup computer rationality module. In at least one embodiment, a backup computer rationality monitor may run a redundant diverse software on hardware components to detect faults in perception and dynamic driving tasks. In at least one embodiment, outputs from ADAS system 1338 may be provided to a supervisory MCU. In at least one embodiment, if outputs from a primary computer and secondary computer conflict, supervisory MCU determines how to reconcile a conflict to ensure safe operation.

In at least one embodiment, a primary computer may be configured to provide supervisory MCU with a confidence score, indicating a primary computer's confidence in a chosen result. In at least one embodiment, if a confidence score exceeds a threshold, a supervisory MCU may follow a primary computer's direction, regardless of whether a secondary computer provides a conflicting or inconsistent result. In at least one embodiment, where a confidence score does not meet a threshold, and where primary and secondary computers indicate different results (e.g., a conflict), a supervisory MCU may arbitrate between computers to determine appropriate outcome.

In at least one embodiment, a supervisory MCU may be configured to run neural network(s) that are trained and configured to determine, based at least in part on outputs from a primary computer and secondary computer, conditions under which a secondary computer provides false alarms. In at least one embodiment, neural network(s) in a supervisory MCU may learn when a secondary computer's output may be trusted, and when it cannot. For example, in at least one embodiment, when a secondary computer is a RADAR-based FCW system, a neural network(s) in a supervisory MCU may learn when an FCW system is identifying metallic objects that are not, in fact, hazards, such as a drainage grate or manhole cover that triggers an alarm. In at least one embodiment, when a secondary computer is a camera-based LDW system, a neural network in supervisory MCU may learn to override LDW when bicyclists or pedestrians are present and a lane departure is, in fact, safest maneuver. In at least one embodiment, a supervisory MCU may include at least one of a DLA or GPU suitable for running neural network(s) with associated memory. In at least one embodiment, a supervisory MCU may comprise and/or be included as a component of SoC(s) 1304.

In at least one embodiment, an ADAS system 1338 may include a secondary computer that performs ADAS functionality using traditional rules of computer vision. In at least one embodiment, a secondary computer may use classic computer vision rules (if-then), and presence of a neural network(s) in a supervisory MCU may improve reliability, safety and performance. For example, in at least one embodiment, diverse implementation and intentional non-identity makes overall system more fault-tolerant, especially to faults caused by software (or software-hardware interface) functionality. For example, in at least one embodiment, if there is a software bug or error in software running on a primary computer, and non-identical software code running on a secondary computer provides same overall result, then a supervisory MCU may have greater confidence that overall result is correct, and a bug in software or hardware on a primary computer is not causing a material error.

In at least one embodiment, an output of ADAS system 1338 may be fed into a primary computer's perception block and/or a primary computer's dynamic driving task block. For example, in at least one embodiment, if ADAS system 1338 indicates a forward crash warning due to an object immediately ahead, a perception block may use this information when identifying objects. In at least one embodiment, a secondary computer may have its own neural network which is trained and thus reduces risk of false positives, as described herein.

In at least one embodiment, vehicle 1300 may further include infotainment SoC 1330 (e.g., an in-vehicle infotainment system (IVI)). Although illustrated and described as an SoC, infotainment system 1330, in at least one embodiment, may not be an SoC, and may include, without limitation, two or more discrete components. In at least one embodiment, infotainment SoC 1330 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 1300. For example, an infotainment SoC 1330 could include radios, disk players, navigation systems, video players, USB and Bluetooth connectivity, carputers, in-car entertainment, WiFi, steering wheel audio controls, hands free voice control, a heads-up display ("HUD"), HMI display 1334, a telematics device, a control panel (e.g., for controlling and/or interacting with various components, features, and/or systems), and/or other components. In at least one embodiment, an infotainment SoC 1330 may further be used to provide information (e.g., visual and/or audible) to user(s) of a vehicle, such as information from an ADAS system 1338, autonomous driving information such as planned vehicle maneuvers, trajectories, surrounding environment information (e.g., intersection information, vehicle information, road information, etc.), and/or other information.

In at least one embodiment, an infotainment SoC 1330 may include any amount and type of GPU functionality. In at least one embodiment, an infotainment SoC 1330 may communicate over a bus 1302 (e.g., a CAN bus, Ethernet, etc.) with other devices, systems, and/or components of a vehicle 1300. In at least one embodiment, an infotainment SoC 1330 may be coupled to a supervisory MCU such that a GPU of infotainment system may perform some self-driving functions in event that primary controller(s) 1336 (e.g., primary and/or backup computers of vehicle 1300) fail. In at least one embodiment, an infotainment SoC 1330 may put a vehicle 1300 into a chauffeur to safe stop mode, as described herein.

In at least one embodiment, a vehicle 1300 may further include an instrument cluster 1332 (e.g., a digital dash, an electronic instrument cluster, a digital instrument panel, etc.). In at least one embodiment, an instrument cluster 1332 may include, without limitation, a controller and/or supercomputer (e.g., a discrete controller or supercomputer). In at least one embodiment, an instrument cluster 1332 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among an infotainment SoC 1330 and instrument cluster 1332. In at least one embodiment, an instrument cluster 1332 may be included as part of an infotainment SoC 1330, or vice versa.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in system FIG. 13C for inferencing or predicting operations based, at least in part, on weight parameters calculated using neural network training operations, neural network functions and/or architectures, or neural network use cases described herein.

In at least one embodiment, a GPU-based scrambling/descrambling unit might be used to perform scrambling and/or descrambling as part of a communications process or system used with a system of FIG. 13C.

Figure 13D:
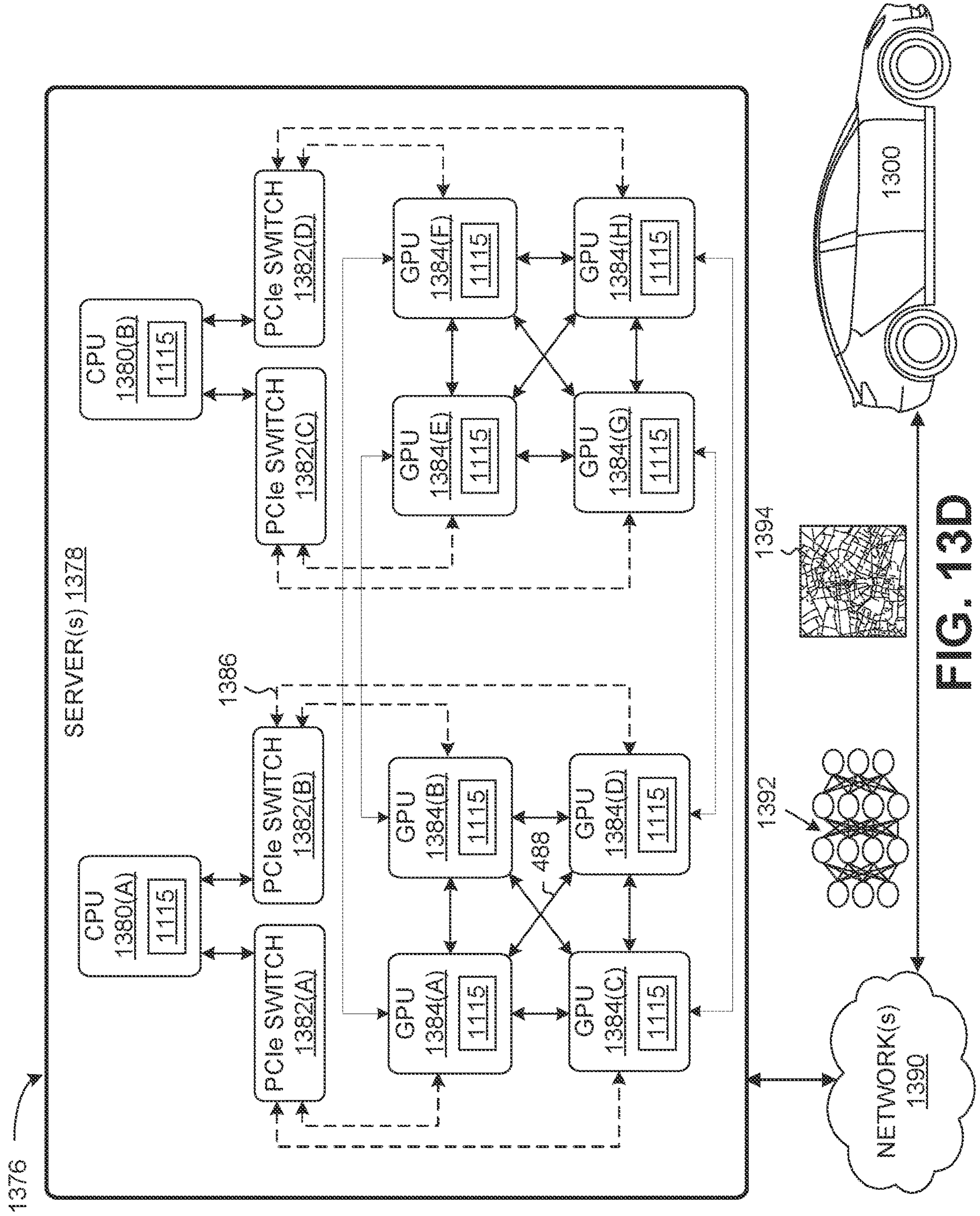
FIG. 13D is a diagram illustrating a system for communication between cloud-based server(s) and an autonomous vehicle of FIG. 13A, according to at least one embodiment.

FIG. 13D is a diagram of a system 1376 for communication between cloud-based server(s) and an autonomous vehicle 1300 of FIG. 13A, according to at least one embodiment. In at least one embodiment, a system 1376 may include, without limitation, server(s) 1378, network(s) 1390, and any number and type of vehicles, including a vehicle 1300. In at least one embodiment, server(s) 1378 may include, without limitation, a plurality of GPUs 1384(A)-1384(H) (collectively referred to herein as GPUs 1384), PCIe switches 1382(A)-1382(H) (collectively referred to herein as PCIe switches 1382), and/or CPUs 1380(A)-1380(B) (collectively referred to herein as CPUs 1380). In at least one embodiment, GPUs 1384, CPUs 1380, and PCIe switches 1382 may be interconnected with high-speed interconnects such as, for example and without limitation, NVLink interfaces 1388 developed by NVIDIA and/or PCIe connections 1386. In at least one embodiment, GPUs 1384 are connected via an NVLink and/or NVSwitch SoC and GPUs 1384 and PCIe switches 1382 are connected via PCIe interconnects. In at least one embodiment, although eight GPUs 1384, two CPUs 1380, and four PCIe switches 1382 are illustrated, this is not intended to be limiting. In at least one embodiment, each of server(s) 1378 may include, without limitation, any number of GPUs 1384, CPUs 1380, and/or PCIe switches 1382, in any combination. For example, in at least one embodiment, server(s) 1378 could each include eight, sixteen, thirty-two, and/or more GPUs 1384.

In at least one embodiment, server(s) 1378 may receive, over network(s) 1390 and from vehicles, image data representative of images showing unexpected or changed road conditions, such as recently commenced road-work. In at least one embodiment, server(s) 1378 may transmit, over network(s) 1390 and to vehicles, neural networks 1392, updated neural networks 1392, and/or map information 1394, including, without limitation, information regarding traffic and road conditions. In at least one embodiment, updates to map information 1394 may include, without limitation, updates for HD map 1322, such as information regarding construction sites, potholes, detours, flooding, and/or other obstructions. In at least one embodiment, neural networks 1392, updated neural networks 1392, and/or map information 1394 may have resulted from new training and/or experiences represented in data received from any number of vehicles in an environment, and/or based at least in part on training performed at a data center (e.g., using server(s) 1378 and/or other servers).

In at least one embodiment, server(s) 1378 may be used to train machine learning models (e.g., neural networks) based at least in part on training data. In at least one embodiment, training data may be generated by vehicles, and/or may be generated in a simulation (e.g., using a game engine). In at least one embodiment, any amount of training data is tagged (e.g., where an associated neural network benefits from supervised learning) and/or undergoes other pre-processing. In at least one embodiment, any amount of training data is not tagged and/or pre-processed (e.g., where an associated neural network does not require supervised learning). In at least one embodiment, once machine learning models are trained, machine learning models may be used by vehicles (e.g., transmitted to vehicles over network(s) 1390), and/or machine learning models may be used by server(s) 1378 to remotely monitor vehicles.

In at least one embodiment, server(s) 1378 may receive data from vehicles and apply data to up-to-date real-time neural networks for real-time intelligent inferencing. In at least one embodiment, server(s) 1378 may include deep-learning supercomputers and/or dedicated AI computers powered by GPU(s) 1384, such as a DGX and DGX Station machines developed by NVIDIA. However, in at least one embodiment, server(s) 1378 may include deep learning infrastructure that use CPU-powered data centers.

In at least one embodiment, a deep-learning infrastructure of server(s) 1378 may be capable of fast, real-time inferencing, and may use that capability to evaluate and verify health of processors, software, and/or associated hardware in a vehicle 1300. For example, in at least one embodiment, deep-learning infrastructure may receive periodic updates from a vehicle 1300, such as a sequence of images and/or objects that a vehicle 1300 has located in that sequence of images (e.g., via computer vision and/or other machine learning object classification techniques). In at least one embodiment, deep-learning infrastructure may run its own neural network to identify objects and compare them with objects identified by a vehicle 1300 and, if results do not match and deep-learning infrastructure concludes that AI in a vehicle 1300 is malfunctioning, then server(s) 1378 may transmit a signal to a vehicle 1300 instructing a fail-safe computer of a vehicle 1300 to assume control, notify passengers, and complete a safe parking maneuver.

In at least one embodiment, server(s) 1378 may include GPU(s) 1384 and one or more programmable inference accelerators (e.g., NVIDIA's TensorRT 3). In at least one embodiment, a combination of GPU-powered servers and inference acceleration may make real-time responsiveness possible. In at least one embodiment, such as where performance is less critical, servers powered by CPUs, FPGAs, and other processors may be used for inferencing. In at least one embodiment, hardware structure(s) 1115 are used to perform one or more embodiments. Details regarding hardware structure(s) 1115 are provided herein in conjunction with FIGS. 11A and/or 11B.

Computer Systems

Figure 14:
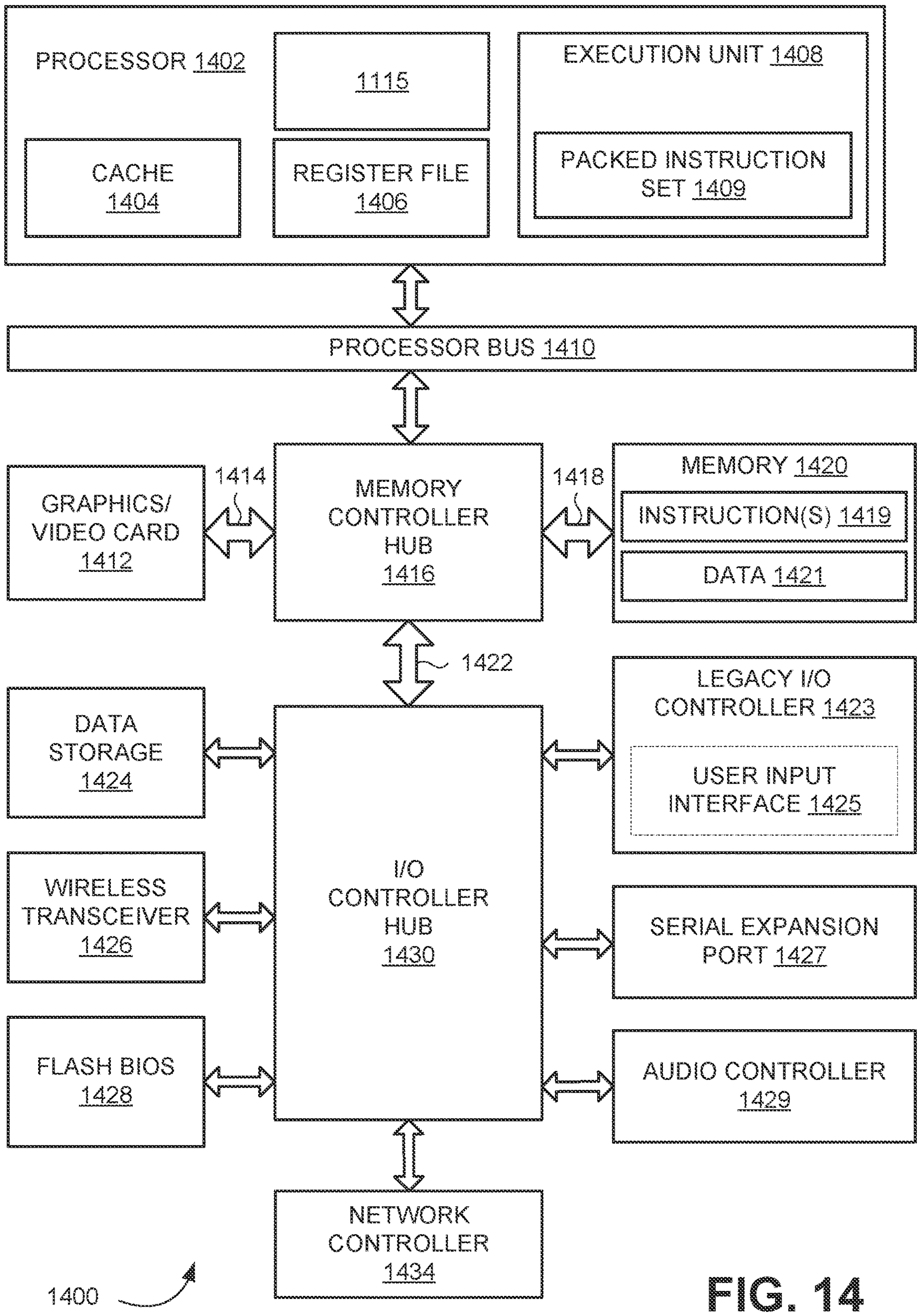
FIG. 14 is a block diagram illustrating a computer system, according to at least one embodiment.

FIG. 14 is a block diagram illustrating an exemplary computer system, which may be a system with interconnected devices and components, a system-on-a-chip (SOC) or some combination thereof 1400 formed with a processor that may include execution units to execute an instruction, according to at least one embodiment. In at least one embodiment, a computer system 1400 may include, without limitation, a component, such as a processor 1402 to employ execution units including logic to perform algorithms for process data, in accordance with present disclosure, such as in embodiment described herein. In at least one embodiment, computer system 1400 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, a computer system 1400 may execute a version of WINDOWS' operating system available from Microsoft Corporation of Redmond, Wash., although other operating systems (UNIX and Linux for example), embedded software, and/or graphical user interfaces, may also be used.

In at least one embodiment, functionality is implemented in devices such as handheld devices and embedded applications, such as, for example, cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, a computer system 1400 may include, without limitation, a processor 1402 that may include, without limitation, one or more execution units 1408 to perform machine learning model training and/or inferencing according to techniques described herein. In at least one embodiment, a system 14 is a single processor desktop or server system or system 14 may be a multiprocessor system. In at least one embodiment, a processor 1402 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, a processor 1402 may be coupled to a processor bus 1410 that may transmit data signals between a processor 1402 and other components in a computer system 1400.

In at least one embodiment, a processor 1402 may include, without limitation, a Level 1 ("L1") internal cache memory ("cache") 1404. In at least one embodiment, a processor 1402 may have a single internal cache or multiple levels of internal cache. In at least one embodiment, a cache memory may reside external to a processor 1402. Other embodiments may also include a combination of both internal and external caches depending on particular implementation and needs. In at least one embodiment, a register file 1406 may store different types of data in various registers including, without limitation, integer registers, floating point registers, status registers, and an instruction pointer register.

In at least one embodiment, an execution unit 1408, including, without limitation, logic to perform integer and floating point operations, also resides in processor 1402. In at least one embodiment, a processor 1402 may also include a microcode ("ucode") read only memory ("ROM") that stores microcode for certain macro instructions. In at least one embodiment, an execution unit 1408 may include logic to handle a packed instruction set 1409. In at least one embodiment, by including a packed instruction set 1409 in an instruction set of a general-purpose processor 1402, along with associated circuitry to execute instructions, operations used by many multimedia applications may be performed using packed data in a general-purpose processor 1402. In at least one embodiment, many multimedia applications may be accelerated and executed more efficiently by using full width of a processor's data bus for performing operations on packed data, which may eliminate need to transfer smaller units of data across a processor's data bus to perform one or more operations one data element at a time.

In at least one embodiment, an execution unit 1408 may also be used in microcontrollers, embedded processors, graphics devices, DSPs, and other types of logic circuits. In at least one embodiment, a computer system 1400 may include, without limitation, a memory 1420. In at least one embodiment, a memory 1420 may be implemented as a Dynamic Random Access Memory ("DRAM") device, a Static Random Access Memory ("SRAM") device, a flash memory device, or other memory device. In at least one embodiment, a memory 1420 may store instruction(s) 1419 and/or data 1421 represented by data signals that may be executed by processor 1402.

In at least one embodiment, a system logic chip may be coupled to a processor bus 1410 and a memory 1420. In at least one embodiment, a system logic chip may include, without limitation, a memory controller hub ("MCH") 1416, and a processor 1402 may communicate with a MCH 1416 via processor bus 1410. In at least one embodiment, a MCH 1416 may provide a high bandwidth memory path 1418 to a memory 1420 for instruction and data storage and for storage of graphics commands, data and textures. In at least one embodiment, a MCH 1416 may direct data signals between a processor 1402, a memory 1420, and other components in a computer system 1400 and to bridge data signals between a processor bus 1410, a memory 1420, and a system I/O 1422. In at least one embodiment, a system logic chip may provide a graphics port for coupling to a graphics controller. In at least one embodiment, an MCH 1416 may be coupled to memory 1420 through a high bandwidth memory path 1418 and a graphics/video card 1412 may be coupled to an MCH 1416 through an Accelerated Graphics Port ("AGP") interconnect 1414.

In at least one embodiment, a computer system 1400 may use a system I/O 1422 that is a proprietary hub interface bus to couple an MCH 1416 to I/O controller hub ("ICH") 1430. In at least one embodiment, an ICH 1430 may provide direct connections to some I/O devices via a local I/O bus. In at least one embodiment, a local I/O bus may include, without limitation, a high-speed I/O bus for connecting peripherals to memory 1420, a chipset, and a processor 1402. Examples may include, without limitation, an audio controller 1429, a firmware hub ("flash BIOS") 1428, a wireless transceiver 1426, a data storage 1424, a legacy I/O controller 1423 containing user input and keyboard interfaces, a serial expansion port 1427, such as a Universal Serial Bus ("USB"), and a network controller 1434. In at least one embodiment, data storage 1424 may comprise a hard disk drive, a floppy disk drive, a CD-ROM device, a flash memory device, or other mass storage device.

In at least one embodiment, FIG. 14 illustrates a system, which includes interconnected hardware devices or "chips," and/or FIG. 14 may illustrate an exemplary System on a Chip ("SoC"). In at least one embodiment, devices illustrated in FIG. 14 may be interconnected with proprietary interconnects, standardized interconnects (e.g., PCIe) or some combination thereof. In at least one embodiment, one or more components of system 1400 are interconnected using compute express link (CXL) interconnects.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in system FIG. 14 for inferencing or predicting operations based, at least in part, on weight parameters calculated using neural network training operations, neural network functions and/or architectures, or neural network use cases described herein.

In at least one embodiment, a GPU-based scrambling/descrambling unit might be used to perform scrambling and/or descrambling as part of a communications process or system used with a system of FIG. 14.

Figure 15:
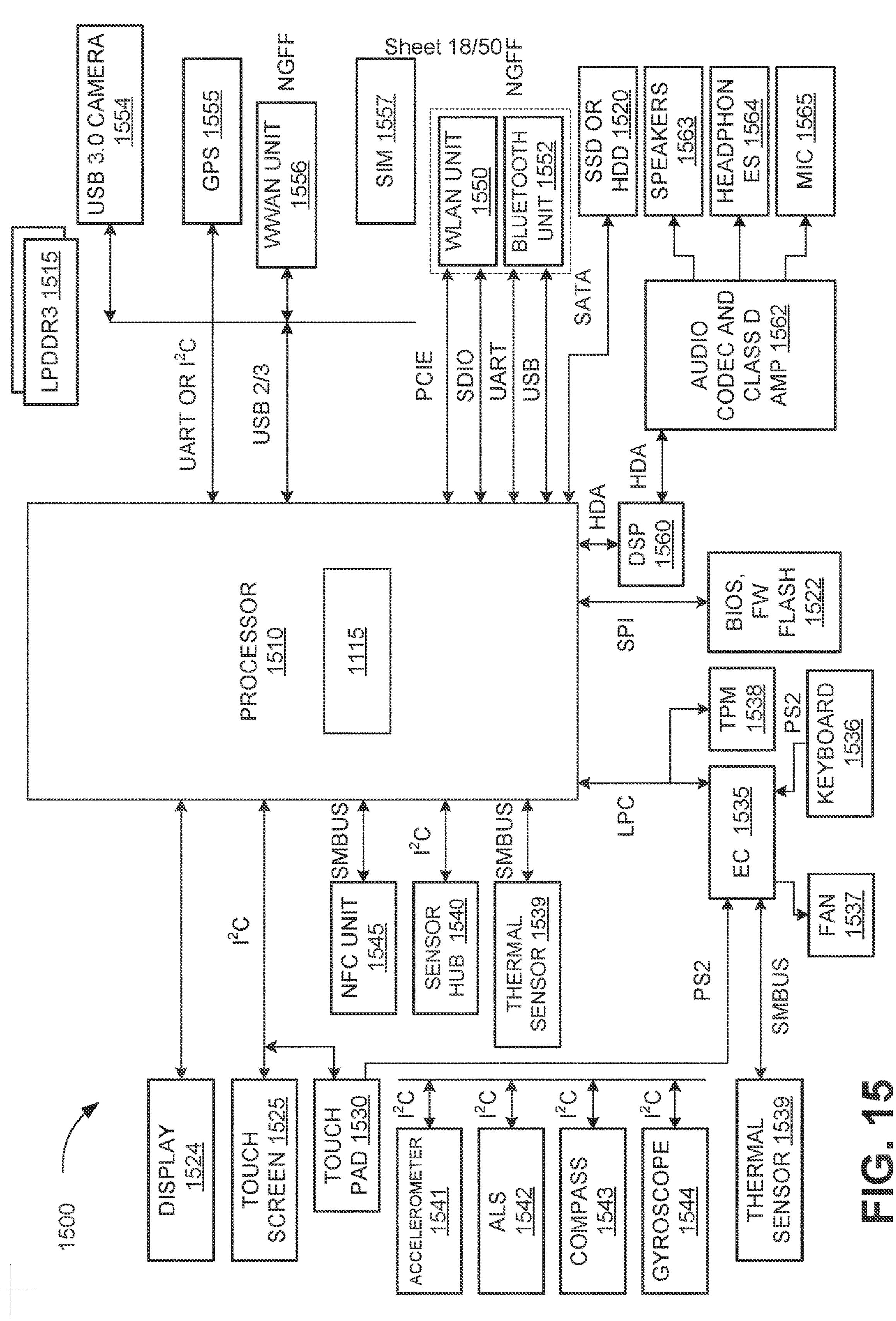
FIG. 15 is a block diagram illustrating computer system, according to at least one embodiment.

FIG. 15 is a block diagram illustrating an electronic device 1500 for utilizing a processor 1510, according to at least one embodiment. In at least one embodiment, an electronic device 1500 may be, for example and without limitation, a notebook, a tower server, a rack server, a blade server, a laptop, a desktop, a tablet, a mobile device, a phone, an embedded computer, or any other suitable electronic device.

In at least one embodiment, a system 1500 may include, without limitation, a processor 1510 communicatively coupled to any suitable number or kind of components, peripherals, modules, or devices. In at least one embodiment, a processor 1510 coupled using a bus or interface, such as a $I^2C$ bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 15 illustrates a system, which includes interconnected hardware devices or "chips", and/or FIG. 15 may illustrate an exemplary System on a Chip ("SoC"). In at least one embodiment, devices illustrated in FIG. 15 may be interconnected with proprietary interconnects, standardized interconnects (e.g., PCIe) or some combination thereof. In at least one embodiment, one or more components of FIG. 15 are interconnected using compute express link (CXL) interconnects.

In at least one embodiment, FIG. 15 may include a display 1524, a touch screen 1525, a touch pad 1530, a Near Field Communications unit ("NFC") 1545, a sensor hub 1540, a thermal sensor 1546, an Express Chipset ("EC") 1535, a Trusted Platform Module ("TPM") 1538, BIOS/firmware/flash memory ("BIOS, FW Flash") 1522, a DSP 1560, a drive "SSD or HDD") 1520 such as a Solid State Disk ("SSD") or a Hard Disk Drive ("HDD"), a wireless local area network unit ("WLAN") 1550, a Bluetooth unit 1552, a Wireless Wide Area Network unit ("WWAN") 1556, a Global Positioning System (GPS) 1555, a camera ("USB 3.0 camera") 1554 such as a USB 3.0 camera, or a Low Power Double Data Rate ("LPDDR") memory unit ("LPDDR3") 1515 implemented in, for example, a LPDDR3 standard. These components may each be implemented in any suitable manner.

In at least one embodiment, other components may be communicatively coupled to a processor 1510 through components discussed above. In at least one embodiment, an accelerometer 1541, Ambient Light Sensor ("ALS") 1542, compass 1543, and a gyroscope 1544 may be communicatively coupled to a sensor hub 1540. In at least one embodiment, a thermal sensor 1539, a fan 1537, a keyboard 1546, and a touch pad 1530 may be communicatively coupled to an EC 1535. In at least one embodiment, a speaker 1563, headphones 1564, and a microphone ("mic") 1565 may be communicatively coupled to an audio unit ("audio codec and class d amp") 1564, which may in turn be communicatively coupled to a DSP 1560. In at least one embodiment, audio unit 1564 may include, for example and without limitation, an audio coder/decoder ("codec") and a class D amplifier. In at least one embodiment, a SIM card ("SIM") 1557 may be communicatively coupled to a WWAN unit 1556. In at least one embodiment, components such as a WLAN unit 1550 and a Bluetooth unit 1552, as well as a WWAN unit 1556 may be implemented in a Next Generation Form Factor ("NGFF").

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in a system FIG. 15 for inferencing or predicting operations based, at least in part, on weight parameters calculated using neural network training operations, neural network functions and/or architectures, or neural network use cases described herein.

In at least one embodiment, a GPU-based scrambling/descrambling unit might be used to perform scrambling and/or descrambling as part of a communications process or system used with a system of FIG. 15.

Figure 16:
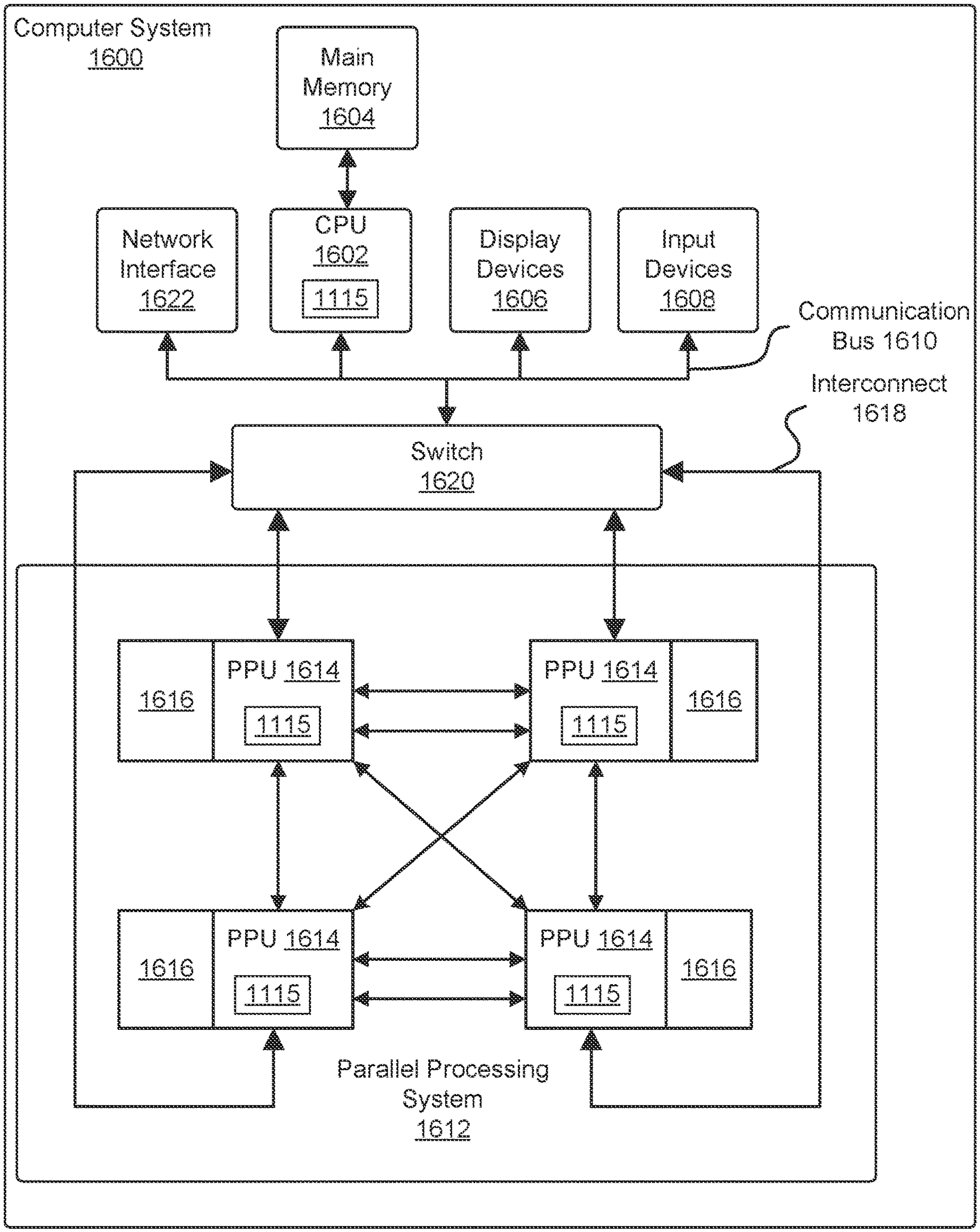
FIG. 16 illustrates a computer system, according to at least one embodiment.

FIG. 16 illustrates a computer system 1600, according to at least one embodiment. In at least one embodiment, a computer system 1600 is configured to implement various processes and methods described throughout this disclosure.

In at least one embodiment, a computer system 1600 comprises, without limitation, at least one central processing unit ("CPU") 1602 that is connected to a communication bus 1610 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, a computer system 1600 includes, without limitation, a main memory 1604 and control logic (e.g., implemented as hardware, software, or a combination thereof) and data are stored in a main memory 1604 which may take form of random access memory ("RAM"). In at least one embodiment, a network interface subsystem ("network interface") 1622 provides an interface to other computing devices and networks for receiving data from and transmitting data to other systems from a computer system 1600.

In at least one embodiment, a computer system 1600 includes, without limitation, input devices 1608, a parallel processing system 1612, and display devices 1606 which can be implemented using a cathode ray tube ("CRT"), liquid crystal display ("LCD"), light emitting diode ("LED"), plasma display, or other suitable display technologies. In at least one embodiment, user input is received from input devices 1608 such as a keyboard, mouse, touchpad, microphone, and more. In at least one embodiment, each of foregoing modules can be situated on a single semiconductor platform to form a processing system.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in a system FIG. 16 for inferencing or predicting operations based, at least in part, on weight parameters calculated using neural network training operations, neural network functions and/or architectures, or neural network use cases described herein.

In at least one embodiment, a GPU-based scrambling/descrambling unit might be used to perform scrambling and/or descrambling as part of a communications process or system used with a system of FIG. 16.

Figure 17:
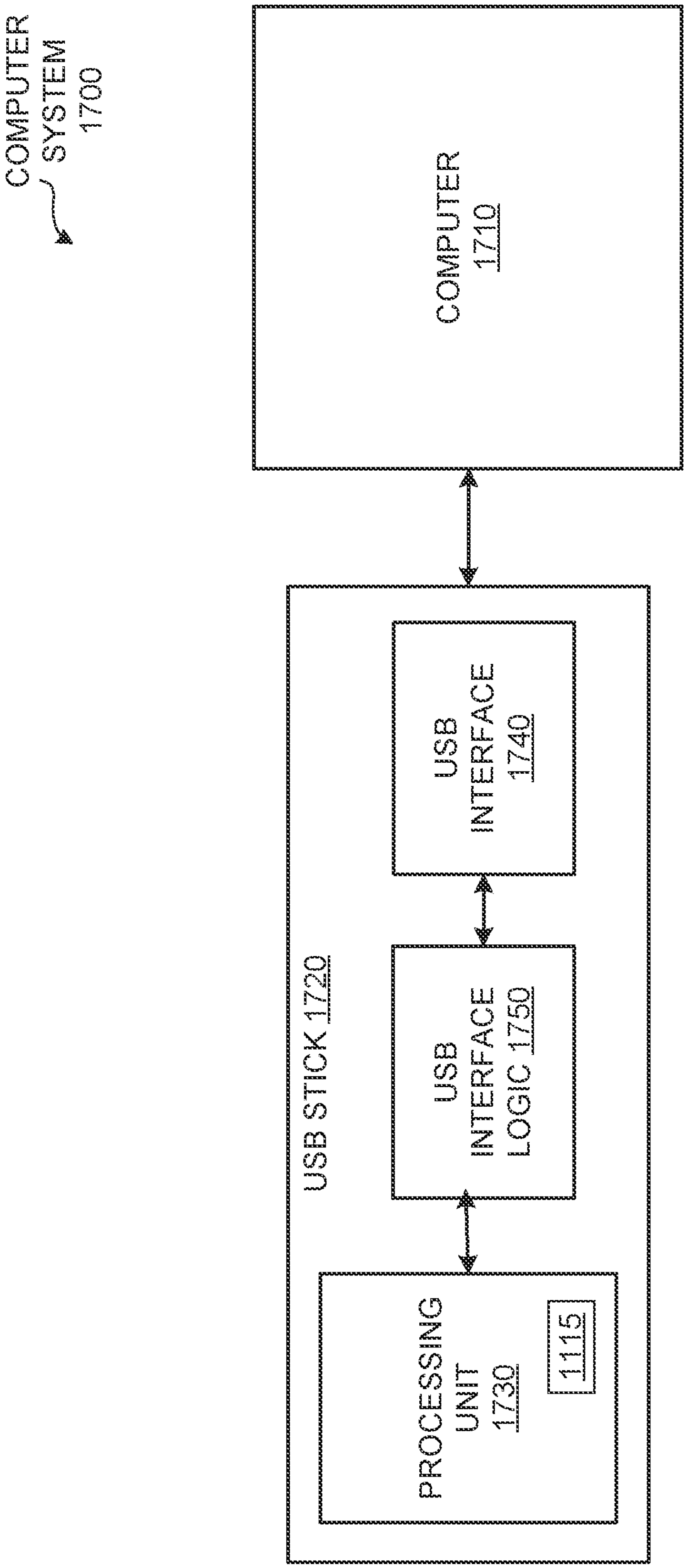
FIG. 17 illustrates a computer system, according to at least one embodiment.

FIG. 17 illustrates a computer system 1700, according to at least one embodiment. In at least one embodiment, a computer system 1700 includes, without limitation, a computer 1710 and a USB stick 1720. In at least one embodiment, a computer 1710 may include, without limitation, any number and type of processor(s) (not shown) and a memory (not shown). In at least one embodiment, a computer 1710 includes, without limitation, a server, a cloud instance, a laptop, and a desktop computer.

In at least one embodiment, a USB stick 1720 includes, without limitation, a processing unit 1730, a USB interface 1740, and USB interface logic 1750. In at least one embodiment, a processing unit 1730 may be any instruction execution system, apparatus, or device capable of executing instructions. In at least one embodiment, a processing unit 1730 may include, without limitation, any number and type of processing cores (not shown). In at least one embodiment, a processing core 1730 comprises an application specific integrated circuit ("ASIC") that is optimized to perform any amount and type of operations associated with machine learning. For instance, in at least one embodiment, a processing core 1730 is a tensor processing unit ("TPC") that is optimized to perform machine learning inference operations. In at least one embodiment, a processing core 1730 is a vision processing unit ("VPU") that is optimized to perform machine vision and machine learning inference operations.

In at least one embodiment, a USB interface 1740 may be any type of USB connector or USB socket. For instance, in at least one embodiment, a USB interface 1740 is a USB 3.0 Type-C socket for data and power. In at least one embodiment, a USB interface 1740 is a USB 3.0 Type-A connector. In at least one embodiment, a USB interface logic 1750 may include any amount and type of logic that enables a processing unit 1730 to interface with or devices (e.g., computer 1710) via USB connector 1740.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in system FIG. 17 for inferencing or predicting operations based, at least in part, on weight parameters calculated using neural network training operations, neural network functions and/or architectures, or neural network use cases described herein.

In at least one embodiment, a GPU-based scrambling/descrambling unit might be used to perform scrambling and/or descrambling as part of a communications process or system used with a system of FIG. 17.

Figure 18:
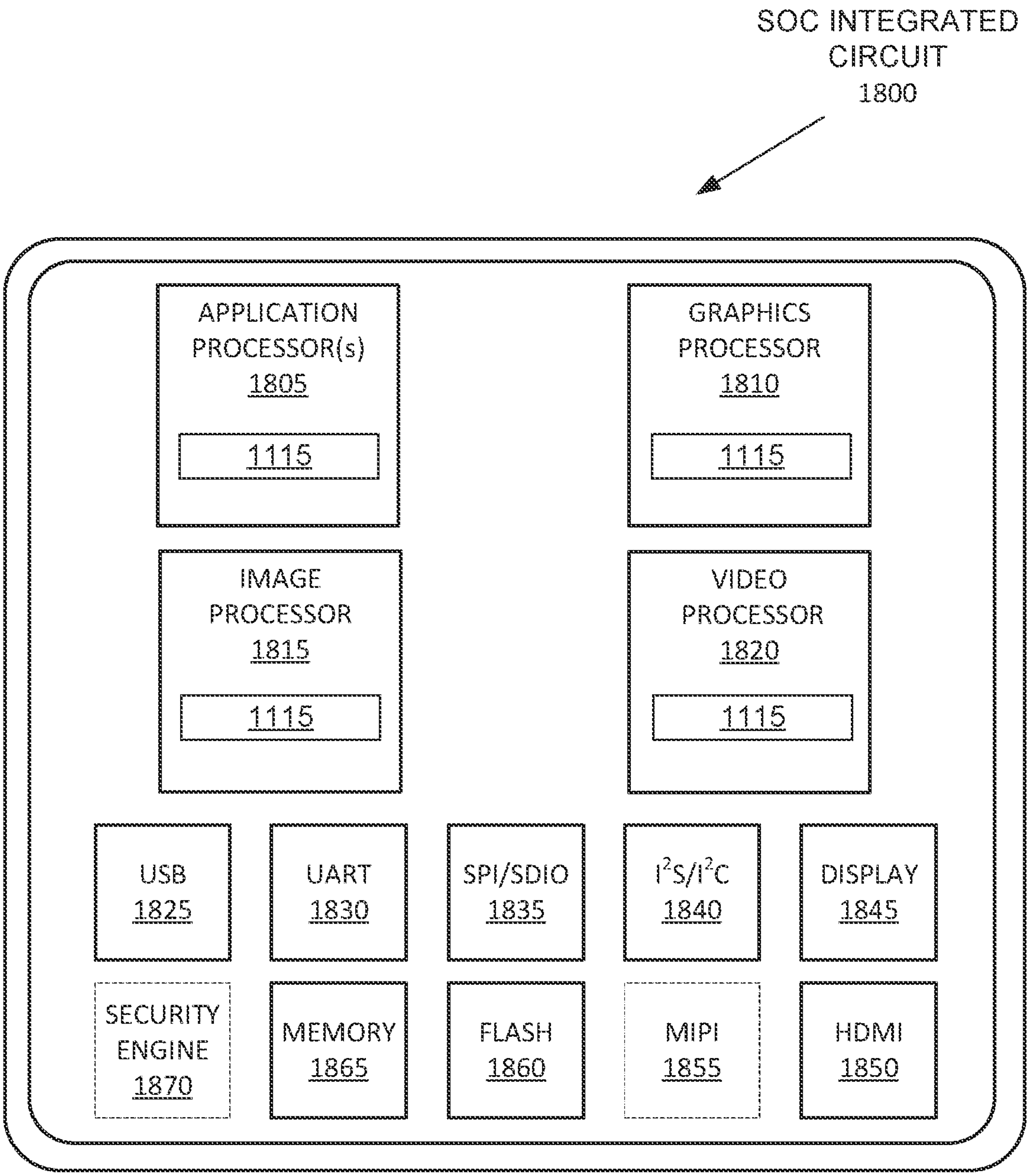
FIG. 18 illustrates exemplary integrated circuits and associated graphics processors that may be fabricated using one or more IP cores, according to at least one embodiment.

FIG. 18 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 18 is a block diagram illustrating an exemplary system on a chip (SOC) integrated circuit 1800 that may be fabricated using one or more IP cores, according to at least one embodiment. In at least one embodiment, an integrated circuit 1800 includes one or more application processor(s) 1805 (e.g., CPUs), at least one graphics processor 1810, and may additionally include an image processor 1815 and/or a video processor 1820, any of which may be a modular IP core. In at least one embodiment, an integrated circuit 1800 includes peripheral or bus logic including a USB controller 1825, an UART controller 1830, an SPI/SDIO controller 1835, and an $I^2S/I^2C$ controller 1840. In at least one embodiment, an integrated circuit 1800 can include a display device

1845 coupled to one or more of a high-definition multimedia interface (HDMI) controller 1850 and a mobile industry processor interface (MIPI) display interface 1855. In at least one embodiment, storage may be provided by a flash memory subsystem 1860 including flash memory and a flash memory controller. In at least one embodiment, a memory interface may be provided via a memory controller 1865 for access to SDRAM or SRAM memory devices. In at least one embodiment, some integrated circuits additionally include an embedded security engine 1870.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in an integrated circuit 1800 for inferencing or predicting operations based, at least in part, on weight parameters calculated using neural network training operations, neural network functions and/or architectures, or neural network use cases described herein.

In at least one embodiment, a GPU-based scrambling/descrambling unit might be used to perform scrambling and/or descrambling as part of a communications process or system used with a system of FIG. 18.

Figure 19A:
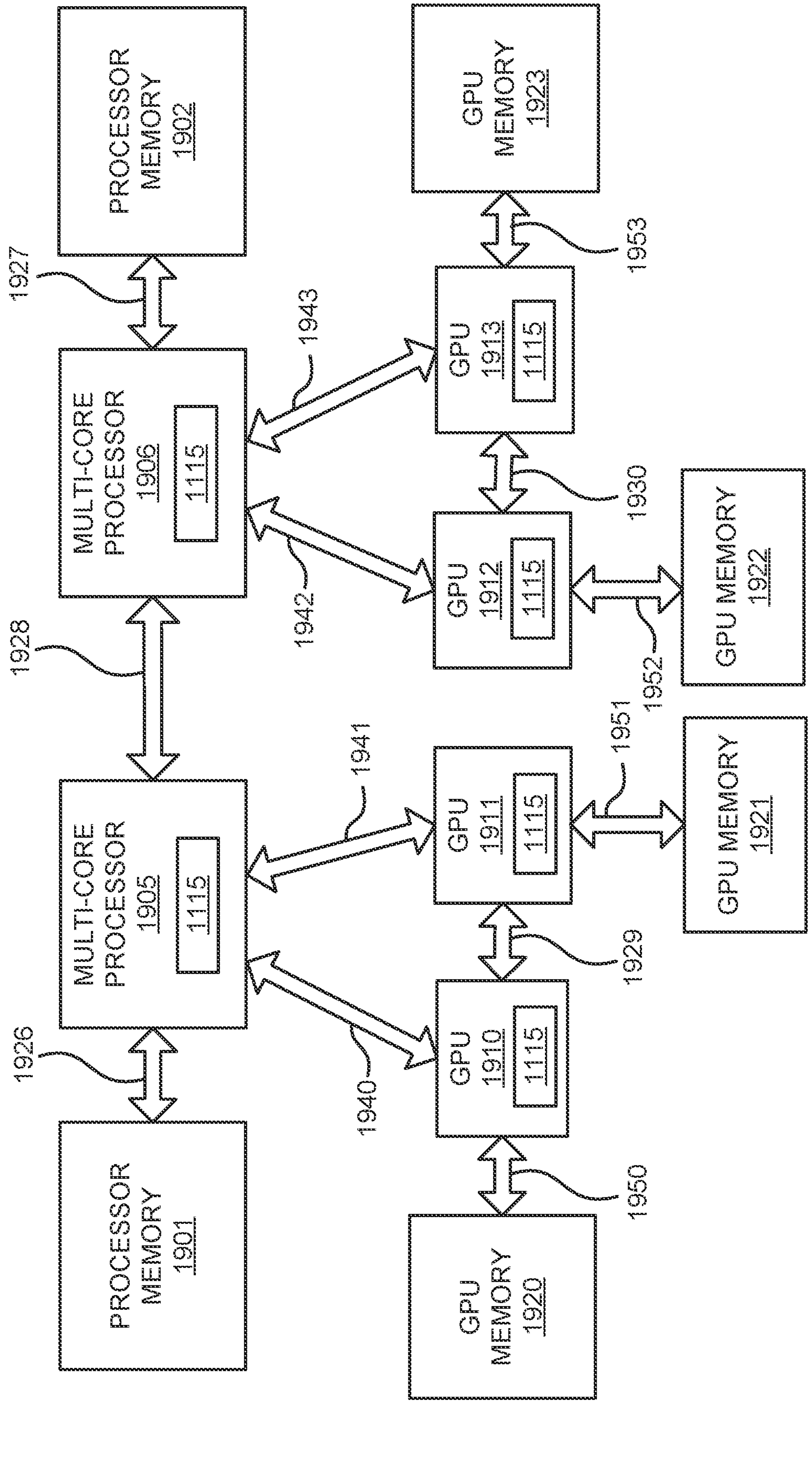
FIG. 19A illustrates a computer system, according to at least one embodiment.

FIG. 19A illustrates an exemplary architecture in which a plurality of GPUs 1910-1913 is communicatively coupled to a plurality of multi-core processors 1905-1906 over high-speed links 1940-1943 (e.g., buses, point-to-point interconnects, etc.). In at least one embodiment, high-speed links 1940-1943 support a communication throughput of 4 GB/s, 30 GB/s, 80 GB/s or higher. In at least one embodiment, various interconnect protocols may be used including, but not limited to, PCIe 4.0 or 5.0 and NVLink 2.0.

In addition, and in at least one embodiment, two or more of GPUs 1910-1913 are interconnected over high-speed links 1929-1930, which may be implemented using same or different protocols/links than those used for high-speed links 1940-1943. In at least one embodiment, similarly, two or more of multi-core processors 1905-1906 may be connected over high speed link 1928 which may be symmetric multi-processor (SMP) buses operating at 20 GB/s, 30 GB/s, 120 GB/s or higher. In at least one embodiment, alternatively, all communication between various system components shown in FIG. 19A may be accomplished using same protocols/links (e.g., over a common interconnection fabric).

In at least one embodiment, each multi-core processor 1905-1906 is communicatively coupled to a processor memory 1901-1902, via memory interconnects 1926-1927, respectively, and each GPU 1910-1913 is communicatively coupled to GPU memory 1920-1923 over GPU memory interconnects 1950-1953, respectively. In at least one embodiment, memory interconnects 1926-1927 and 1950-1953 may utilize same or different memory access technologies. In at least one embodiment, by way of example, and not limitation, processor memories 1901-1902 and GPU memories 1920-1923 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In at least one embodiment, some portion of processor memories 1901-1902 may be volatile memory and another portion may be non-volatile memory (e.g., using a two-level memory (2LM) hierarchy).

In at least one embodiment, as described herein, although various processors 1905-1906 and GPUs 1910-1913 may be physically coupled to a particular memory 1901-1902, 1920-1923, respectively, a unified memory architecture may be implemented in which a same virtual system address space (also referred to as "effective address" space) is distributed among various physical memories. In at least one embodiment, for example, processor memories 1901-1902 may each comprise 64 GB of system memory address space and GPU memories 1920-1923 may each comprise 32 GB of system memory address space (resulting in a total of 256 GB addressable memory in this example).

Figure 19B:
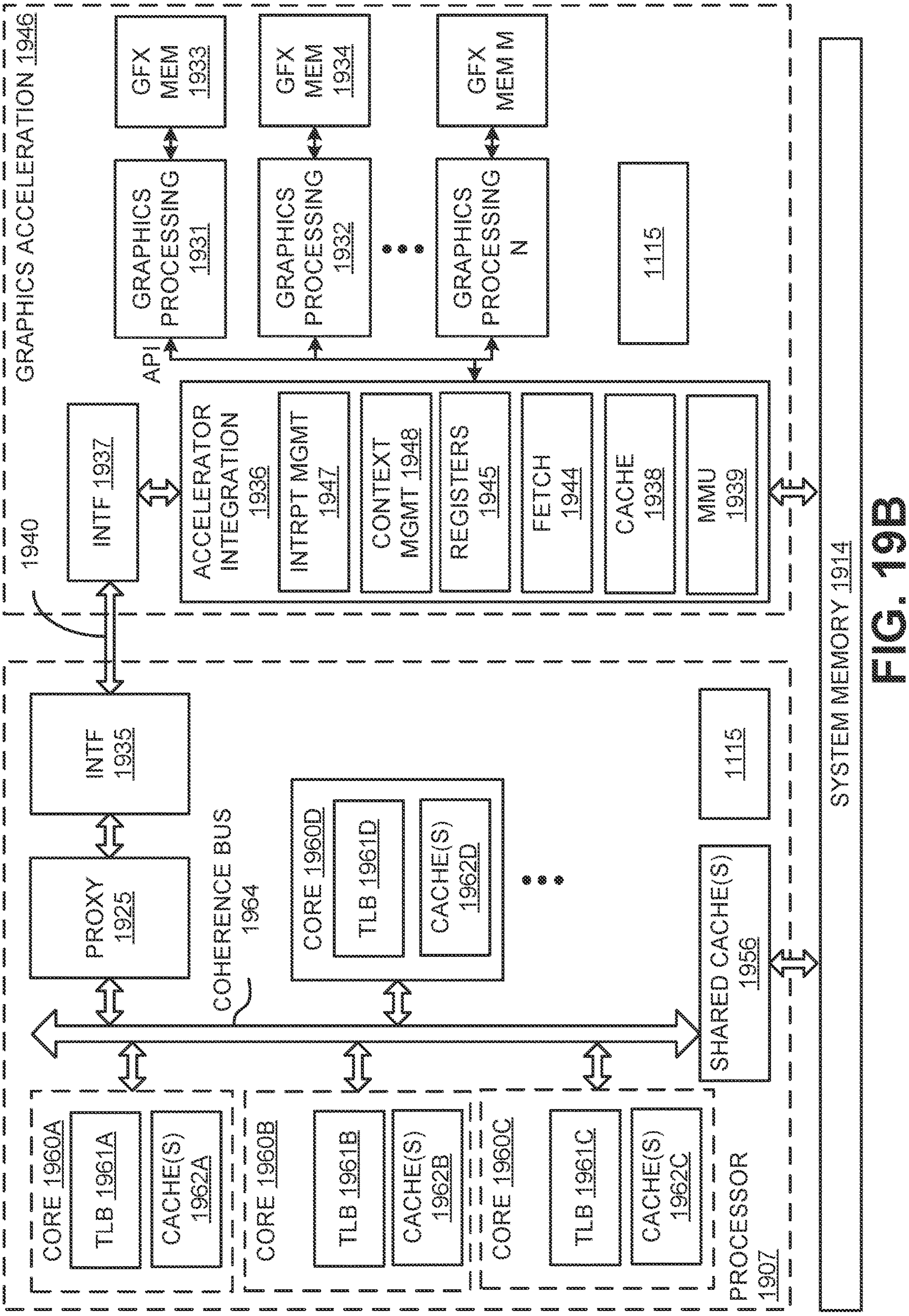
FIG. 19B illustrates a computer system, according to at least one embodiment.

FIG. 19B illustrates additional details for an interconnection between a multi-core processor 1907 and a graphics acceleration module 1946 in accordance with one exemplary embodiment. In at least one embodiment, graphics acceleration module 1946 may include one or more GPU chips integrated on a line card which is coupled to processor 1907 via high-speed link 1940. In at least one embodiment, alternatively, graphics acceleration module 1946 may be integrated on a same package or chip as processor 1907.

In at least one embodiment, illustrated processor 1907 includes a plurality of cores 1960A-1960D, each with a translation lookaside buffer 1961A-1961D and one or more caches 1962A-1962D. In at least one embodiment, cores 1960A-1960D may include various other components for executing instructions and processing data which are not illustrated. In at least one embodiment, caches 1962A-1962D may comprise level 1 (L1) and level 2 (L2) caches and one or more shared caches 1956 may be included in caches 1962A-1962D and shared by sets of cores 1960A-1960D. In at least one embodiment, for example, processor 1907 includes 24 cores, each with its own L1 cache, twelve shared L2 caches, and twelve shared L3 caches and one or more L2 and L3 caches are shared by two adjacent cores. In at least one embodiment, processor 1907 and graphics acceleration module 1946 connect with system memory 1914, which may include processor memories 1901-1902 of FIG. 19A.

In at least one embodiment, coherency is maintained for data and instructions stored in various caches 1962A-1962D, 1956 and system memory 1914 via inter-core communication over a coherence bus 1964. For example, in at least one embodiment, each cache may have cache coherency logic/circuitry associated therewith to communicate to over coherence bus 1964 in response to detected reads or writes to particular cache lines. In at least one embodiment, a cache snooping protocol is implemented over coherence bus 1964 to snoop cache accesses.

In at least one embodiment, a proxy circuit 1925 communicatively couples graphics acceleration module 1946 to coherence bus 1964, allowing graphics acceleration module 1946 to participate in a cache coherence protocol as a peer of cores 1960A-1960D. In at least one embodiment, an interface 1935 provides connectivity to proxy circuit 1925 over high-speed link 1940 (e.g., a PCIe bus, NVLink, etc.) and an interface 1937 connects graphics acceleration module 1946 to link 1940.

In at least one embodiment, an accelerator integration circuit 1936 provides cache management, memory access, context management, and interrupt management services on behalf of a plurality of graphics processing engines 1931, 1932, N of graphics acceleration module 1946. In at least one embodiment, graphics processing engines 1931, 1932, N may each comprise a separate graphics processing unit (GPU). In at least one embodiment, alternatively, graphics processing engines 1931, 1932, N may comprise different types of graphics processing engines within a GPU such as graphics execution units, media processing engines (e.g., video encoders/decoders), samplers, and blit engines. In at least one embodiment, graphics acceleration module 1946 may be a GPU with a plurality of graphics processing engines 1931-1932, N or graphics processing engines 1931-1932, N may be individual GPUs integrated on a common package, line card, or chip.

In at least one embodiment, accelerator integration circuit 1936 includes a memory management unit (MMU) 1939 for performing various memory management functions such as virtual-to-physical memory translations (also referred to as effective-to-real memory translations) and memory access protocols for accessing system memory 1914. In at least one embodiment, MMU 1939 may also include a translation lookaside buffer (TLB) (not shown) for caching virtual/effective to physical/real address translations. In at least one embodiment, a cache 1938 stores commands and data for efficient access by graphics processing engines 1931-1932, N. In at least one embodiment, data stored in cache 1938 and graphics memories 1933-1934, M is kept coherent with core caches 1962A-1962D, 1956 and system memory 1914. In at least one embodiment, as mentioned, this may be accomplished via proxy circuit 1925 on behalf of cache 1938 and memories 1933-1934, M (e.g., sending updates to cache 1938 related to modifications/accesses of cache lines on processor caches 1962A-1962D, 1956 and receiving updates from cache 1938).

In at least one embodiment, a set of registers 1945 store context data for threads executed by graphics processing engines 1931-1932, N and a context management circuit 1948 manages thread contexts. For example, in at least one embodiment, context management circuit 1948 may perform save and restore operations to save and restore contexts of various threads during contexts switches (e.g., where a first thread is saved and a second thread is stored so that a second thread can be execute by a graphics processing engine). In at least one embodiment, for example, on a context switch, context management circuit 1948 may store current register values to a designated region in memory (e.g., identified by a context pointer). In at least one embodiment, it may then restore register values when returning to a context. In at least one embodiment, an interrupt management circuit 1947 receives and processes interrupts received from system devices.

In at least one embodiment, virtual/effective addresses from a graphics processing engine 1931 are translated to real/physical addresses in system memory 1914 by MMU 1939. In at least one embodiment, accelerator integration circuit 1936 supports multiple (e.g., 4, 8, 16) graphics accelerator modules 1946 and/or other accelerator devices. In at least one embodiment, graphics accelerator module 1946 may be dedicated to a single application executed on processor 1907 or may be shared between multiple applications. In at least one embodiment, a virtualized graphics execution environment is presented in which resources of graphics processing engines 1931-1932, N are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 1936 performs as a bridge to a system for graphics acceleration module 1946 and provides address translation and system memory cache services. In addition, in at least one embodiment, accelerator integration circuit 1936 may provide virtualization facilities for a host processor to manage virtualization of graphics processing engines 1931-1932, interrupts, and memory management.

In at least one embodiment, because hardware resources of graphics processing engines 1931-1932, N are mapped explicitly to a real address space seen by host processor 1907, any host processor can address these resources directly using an effective address value. In at least one embodiment, one function of accelerator integration circuit 1936 is physical separation of graphics processing engines 1931-1932, N so that they appear to a system as independent units.

In at least one embodiment, one or more graphics memories 1933-1934, M are coupled to each of graphics processing engines 1931-1932, N, respectively. In at least one embodiment, graphics memories 1933-1934, M store instructions and data being processed by each of graphics processing engines 1931-1932, N. In at least one embodiment, graphics memories 1933-1934, M may be volatile memories such as DRAMs (including stacked DRAMs), GDDR memory (e.g., GDDR5, GDDR6), or HBM, and/or may be non-volatile memories such as 3D XPoint or Nano-Ram.

In at least one embodiment, to reduce data traffic over link 1940, biasing techniques are used to ensure that data stored in graphics memories 1933-1934, M is data which will be used most frequently by graphics processing engines 1931-1932, N and preferably not used by cores 1960A-1960D (at least not frequently). In at least one embodiment, similarly, a biasing mechanism attempts to keep data needed by cores (and preferably not graphics processing engines 1931-1932, N) within caches 1962A-1962D, 1956 of cores and system memory 1914.

Figure 19C:
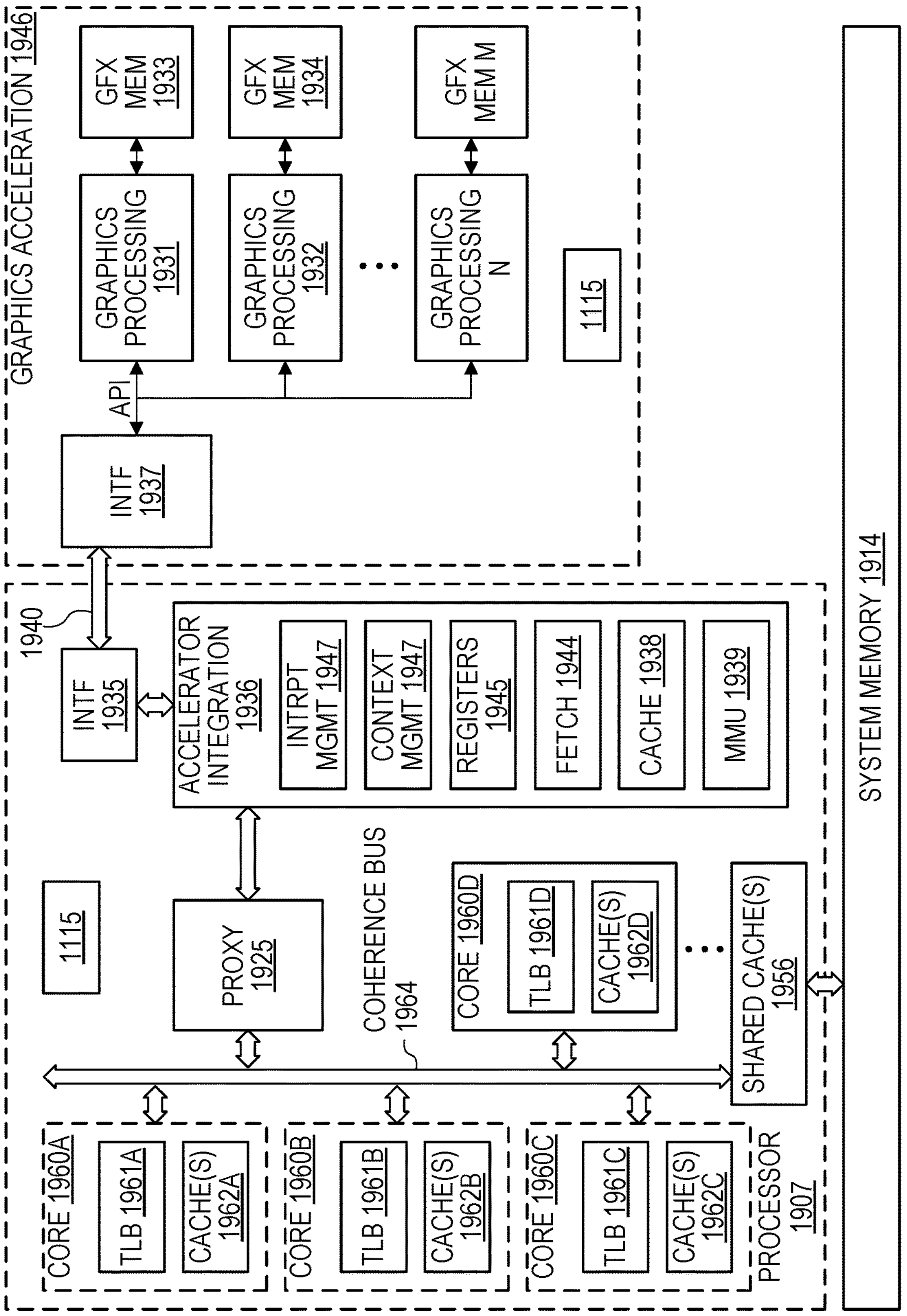
FIG. 19C illustrates a computer system, according to at least one embodiment.

FIG. 19C illustrates another exemplary embodiment in which accelerator integration circuit 1936 is integrated within processor 1907, wherein graphics processing engines 1931-1932, N communicate directly over high-speed link 1940 to accelerator integration circuit 1936 via interface 1937 and interface 1935 (which, again, may be utilize any form of bus or interface protocol). In at least one embodiment, accelerator integration circuit 1936 may perform same operations as those described with respect to FIG. 19B, but potentially at a higher throughput given its close proximity to coherence bus 1964 and caches 1962A-1962D, 1956. In at least one embodiment, different programming models are supported, including a dedicated-process programming model (no graphics acceleration module virtualization) and shared programming models (with virtualization), which may include programming models which are controlled by accelerator integration circuit 1936 and programming models which are controlled by graphics acceleration module 1946.

In at least one embodiment, graphics processing engines 1931-1932, N are dedicated to a single application or process under a single operating system. In at least one embodiment, a single application can funnel other application requests to graphics processing engines 1931-1932, N, providing virtualization within a VM/partition.

In at least one embodiment, graphics processing engines 1931-1932, N, may be shared by multiple VM/application partitions. In at least one embodiment, shared models may use a system hypervisor to virtualize graphics processing engines 1931-1932, N to allow access by each operating system. In at least one embodiment, for single-partition systems without a hypervisor, graphics processing engines 1931-1932, N are owned by an operating system. In at least one embodiment, an operating system can virtualize graphics processing engines 1931-1932, N to provide access to each process or application.

In at least one embodiment, graphics acceleration module 1946 or an individual graphics processing engine 1931-1932, N selects a process element using a process handle. In at least one embodiment, process elements are stored in system memory 1914 and are addressable using an effective address to real address translation techniques described herein. In at least one embodiment, a process handle may be an implementation-specific value provided to a host process when registering its context with graphics processing engine 1931-1932, N (that is, calling system software to add a process element to a process element linked list). In at least one embodiment, a lower 16-bits of a process handle may be an offset of that process element within a process element linked list.

Figure 19D:
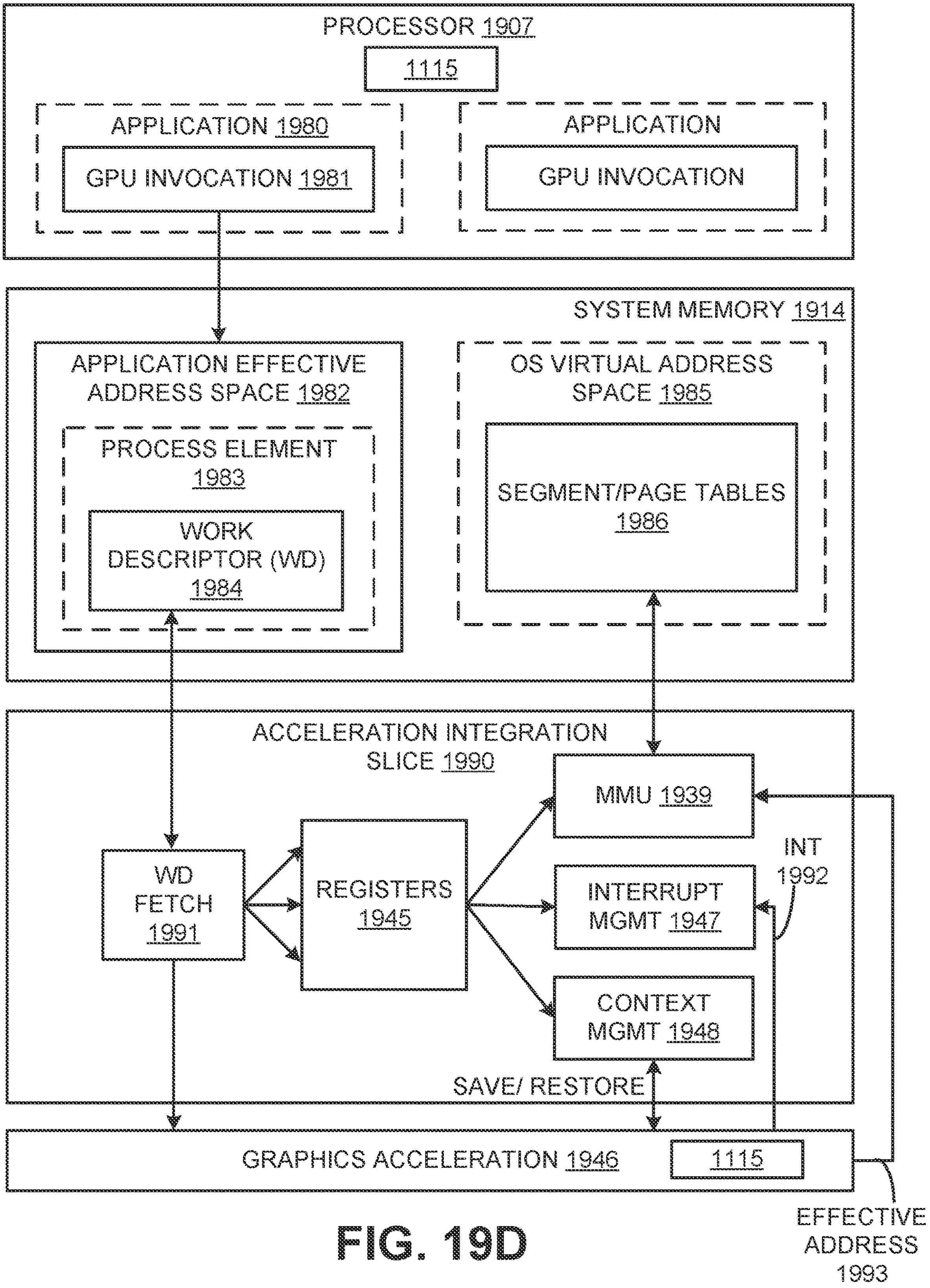
FIG. 19D illustrates a computer system, according to at least one embodiment.

FIG. 19D illustrates an exemplary accelerator integration slice 1990. As used herein, a "slice" comprises a specified portion of processing resources of accelerator integration circuit 1936. In at least one embodiment, application effective address space 1982 within system memory 1914 stores process elements 1983. In at least one embodiment, process elements 1983 are stored in response to GPU invocations 1981 from applications 1980 executed on processor 1907. In at least one embodiment, a process element 1983 contains process state for corresponding application 1980. In at least one embodiment, a work descriptor (WD) 1984 contained in process element 1983 can be a single job requested by an application or may contain a pointer to a queue of jobs. In at least one embodiment, WD 1984 is a pointer to a job request queue in an application's address space 1982.

Graphics acceleration module 1946 and/or individual graphics processing engines 1931-1932, N can be shared by all or a subset of processes in a system. In at least one embodiment, an infrastructure for setting up process state and sending a WD 1984 to a graphics acceleration module 1946 to start a job in a virtualized environment may be included.

In at least one embodiment, a dedicated-process programming model is implementation-specific, in which a single process owns graphics acceleration module 1946 or an individual graphics processing engine 1931. In at least one embodiment, because graphics acceleration module 1946 is owned by a single process, a hypervisor initializes accelerator integration circuit 1936 for an owning partition and an operating system initializes accelerator integration circuit 1936 for an owning process when graphics acceleration module 1946 is assigned.

In at least one embodiment, in operation, a WD fetch unit 1991 in accelerator integration slice 1990 fetches next WD 1984 which includes an indication of work to be done by one or more graphics processing engines of graphics acceleration module 1946. In at least one embodiment, data from WD 1984 may be stored in registers 1945 and used by MMU 1939, interrupt management circuit 1947 and/or context management circuit 1948 as illustrated. In at least one embodiment, for example, MMU 1939 includes segment/page walk circuitry for accessing segment/page tables 1986 within OS virtual address space 1985. In at least one embodiment, interrupt management circuit 1947 may process interrupt events 1992 received from graphics acceleration module 1946. In at least one embodiment, when performing graphics operations, an effective address 1993 generated by a graphics processing engine 1931-1932, N is translated to a real address by MMU 1939.

In at least one embodiment, a same set of registers 1945 are duplicated for each graphics processing engine 1931-1932, N and/or graphics acceleration module 1946 and may be initialized by a hypervisor or operating system. In at least one embodiment, each of these duplicated registers may be included in an accelerator integration slice 1990. In at least one embodiment, exemplary registers that may be initialized by a hypervisor are shown in Table 1.

TABLE 1

| | Hypervisor Initialized Registers |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

In at least one embodiment, exemplary registers that may be initialized by an operating system are shown in Table 2.

TABLE 2

| | Operating System Initialized Registers |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In at least one embodiment, each WD 1984 is specific to a particular graphics acceleration module 1946 and/or graphics processing engines 1931-1932, N, and each WD 1984 contains information required by a graphics processing engine 1931-1932, N to do work or it can be a pointer to a memory location where an application has set up a command queue of work to be completed.

Figure 19E:
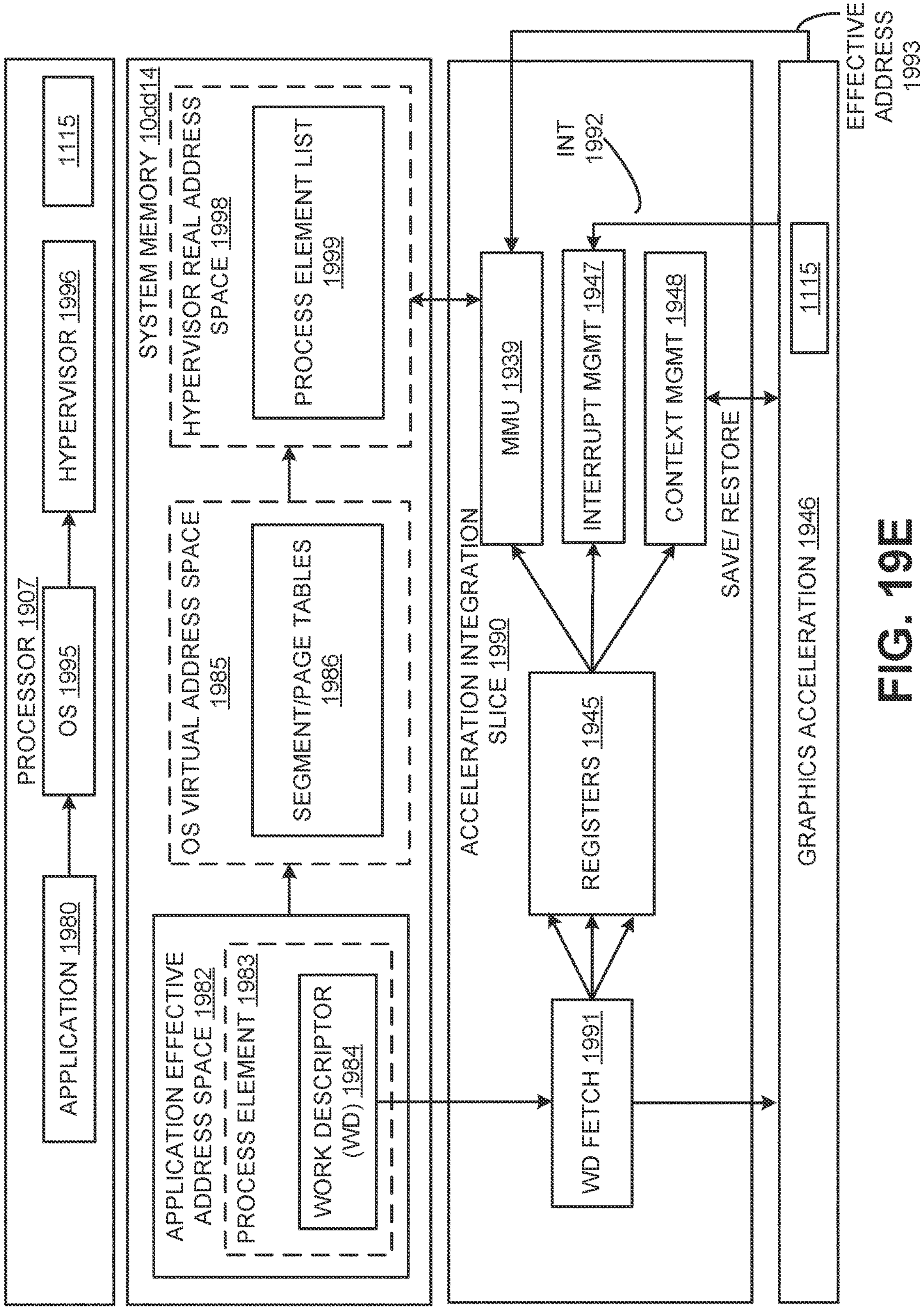
FIG. 19E illustrates a computer system, according to at least one embodiment.

FIG. 19E illustrates additional details for one exemplary embodiment of a shared model. In at least one embodiment, a hypervisor real address space 1998 is included, in which a process element list 1999 is stored. In at least one embodiment, hypervisor real address space 1998 is accessible via a hypervisor 1996 which virtualizes graphics acceleration module engines for operating system 1995.

In at least one embodiment, shared programming models allow for all or a subset of processes from all or a subset of partitions in a system to use a graphics acceleration module 1946. In at least one embodiment, there are two programming models where graphics acceleration module 1946 is shared by multiple processes and partitions: time-sliced shared and graphics directed shared, in which system hypervisor 1996 owns graphics acceleration module 1946 and makes its function available to all operating systems 1995. In at least one embodiment, for a graphics acceleration module 1946 to support virtualization by system hypervisor 1996, graphics acceleration module 1946 may adhere to the following: 1) An application's job request must be autonomous (that is, state does not need to be maintained between jobs), or graphics acceleration module 1946 must provide a context save and restore mechanism. 2) An application's job request is guaranteed by graphics acceleration module 1946 to complete in a specified amount of time, including any translation faults, or graphics acceleration module 1946 provides an ability to preempt processing of a job. 3) Graphics acceleration module 1946 must be guaranteed fairness between processes when operating in a directed shared programming model.

In at least one embodiment, application 1980 is required to make an operating system 1995 system call with a graphics acceleration module 1946 type, a work descriptor (WD), an authority mask register (AMR) value, and a context save/restore area pointer (CSRP). In at least one embodiment, graphics acceleration module 1946 type describes a targeted acceleration function for a system call. In at least one embodiment, graphics acceleration module 1946 type may be a system-specific value. In at least one embodiment, WD is formatted specifically for graphics acceleration module 1946 and can be in a form of a graphics acceleration module 1946 command, an effective address pointer to a user-defined structure, an effective address pointer to a queue of commands, or any other data structure to describe work to be done by graphics acceleration module 1946. In at least one embodiment, an AMR value is an AMR state to use for a current process. In at least one embodiment, a value passed to an operating system is similar to an application setting an AMR. In at least one embodiment, if accelerator integration circuit 1936 and graphics acceleration module 1946 implementations do not support a User Authority Mask Override Register (UAMOR), an operating system may apply a current UAMOR value to an AMR value before passing an AMR in a hypervisor call. In at least one embodiment, hypervisor 1996 may apply a current Authority Mask Override Register (AMOR) value before placing an AMR into process element 1983. In at least one embodiment, CSRP is one of registers 1945 containing an effective address of an area in an application's address space 1982 for graphics acceleration module 1946 to save and restore context state. In at least one embodiment, this pointer is not required if no state is required to be saved between jobs or when a job is preempted. In at least one embodiment, context save/restore area may be pinned system memory.

In at least one embodiment, upon receiving a system call, operating system 1995 may verify that application 1980 has registered and been given authority to use graphics acceleration module 1946. In at least one embodiment, operating system 1995 then calls hypervisor 1996 with information shown in Table 3.

TABLE 3

| | OS to Hypervisor Call Parameters |
|---|---|
| 1 | A work descriptor (WD) |
| 2 | An Authority Mask Register (AMR) value (potentially masked) |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |

In at least one embodiment, upon receiving a hypervisor call, hypervisor 1996 verifies that operating system 1995 has registered and been given authority to use graphics acceleration module 1946. In at least one embodiment, hypervisor 1996 then puts process element 1983 into a process element linked list for a corresponding graphics acceleration module 1946 type. In at least one embodiment, a process element may include information shown in Table 4.

TABLE 4

| | Process Element Information |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |
| 8 | Interrupt vector table, derived from hypervisor call parameters |
| 9 | A state register (SR) value |
| 10 | A logical partition ID (LPID) |
| 11 | A real address (RA) hypervisor accelerator utilization record pointer |
| 12 | Storage Descriptor Register (SDR) |

In at least one embodiment, hypervisor initializes a plurality of accelerator integration slice 1990 registers 1945.

Figure 19F:
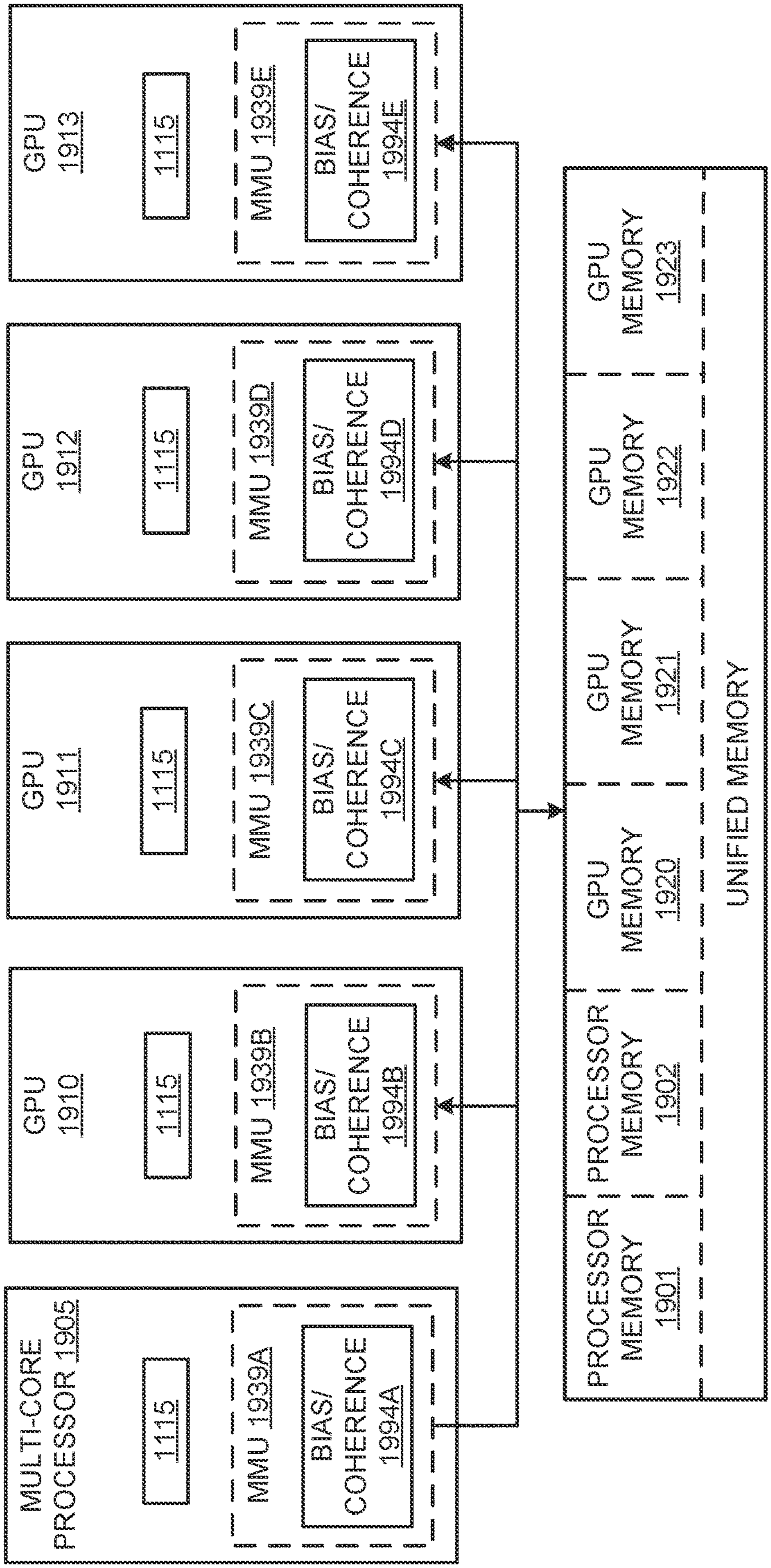
FIG. 19F illustrates a computer system, according to at least one embodiment.

As illustrated in FIG. 19F, in at least one embodiment, a unified memory is used, addressable via a common virtual memory address space used to access physical processor memories 1901-1902 and GPU memories 1920-1923, in which operations executed on GPUs 1910-1913 utilize a same virtual/effective memory address space to access processor memories 1901-1902 and vice versa, thereby simplifying programmability. In at least one embodiment, a first portion of a virtual/effective address space is allocated to processor memory 1901, a second portion to second processor memory 1902, a third portion to GPU memory 1920, and so on. In at least one embodiment, an entire virtual/effective memory space (sometimes referred to as an effective address space) is thereby distributed across each of processor memories 1901-1902 and GPU memories 1920-1923, allowing any processor or GPU to access any physical memory with a virtual address mapped to that memory.

In at least one embodiment, bias/coherence management circuitry 1994A-1994E within one or more of MMUs 1939A-1939E ensures cache coherence between caches of one or more host processors (e.g., 1905) and GPUs 1910-1913 and implements biasing techniques indicating physical memories in which certain types of data should be stored. In at least one embodiment, while multiple instances of bias/coherence management circuitry 1994A-1994E are illustrated in FIG. 19F, bias/coherence circuitry may be implemented within an MMU of one or more host processors 1905 and/or within accelerator integration circuit 1936.

In at least one embodiment, GPU-attached memory 1920-1923 is to be mapped as part of system memory, and accessed using shared virtual memory (SVM) technology, but without suffering performance drawbacks associated with full system cache coherence. In at least one embodiment, an ability for GPU-attached memory 1920-1923 to be accessed as system memory without onerous cache coherence overhead provides a beneficial operating environment for GPU offload. In at least one embodiment, this arrangement allows host processor 1905 software to setup operands and access computation results, without overhead of tradition I/O DMA data copies. In at least one embodiment, such traditional copies involve driver calls, interrupts and memory mapped I/O (MMIO) accesses that are all inefficient relative to simple memory accesses. In at least one embodiment, an ability to access GPU attached memory 1920-1923 without cache coherence overheads can be critical to execution time of an offloaded computation. In at least one embodiment, in cases with substantial streaming write memory traffic, for example, cache coherence overhead can significantly reduce an effective write bandwidth seen by a GPU 1910-1913. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. In at least one embodiment, a bias table may be used, for example, which may be a page-granular structure controlled at a granularity of a memory page that includes 1 or 2 bits per GPU-attached memory page. In at least one embodiment, a bias table may be implemented in a stolen memory range of one or more GPU-attached memories 1920-1923, with or without a bias cache in GPU 1910-1913 (e.g., to cache frequently/recently used entries of a bias table). In at least one embodiment, alternatively, an entire bias table may be maintained within a GPU.

In at least one embodiment, a bias table entry associated with each access to GPU-attached memory 1920-1923 is accessed prior to actual access to a GPU memory, causing the following operations. First, local requests from GPU 1910-1913 that find their page in GPU bias are forwarded directly to a corresponding GPU memory 1920-1923. In at least one embodiment, local requests from a GPU that find their page in host bias are forwarded to processor 1905 (e.g., over a high-speed link as discussed above). In at least one embodiment, requests from processor 1905 that find a requested page in host processor bias complete a request like a normal memory read. In at least one embodiment, alternatively, requests directed to a GPU-biased page may be forwarded to GPU 1910-1913. In at least one embodiment, a GPU may then transition a page to a host processor bias if it is not currently using a page. In at least one embodiment, bias state of a page can be changed either by a software-based mechanism, a hardware-assisted software-based mechanism, or, for a limited set of cases, a purely hardware-based mechanism.

In at least one embodiment, one mechanism for changing bias state employs an API call (e.g., OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, cache flushing operation is used for a transition from host processor 1905 bias to GPU bias, but is not for an opposite transition.

In at least one embodiment, cache coherency is maintained by temporarily rendering GPU-biased pages uncacheable by host processor 1905. In at least one embodiment, to access these pages, processor 1905 may request access from GPU 1910 which may or may not grant access right away. In at least one embodiment, to reduce communication between processor 1905 and GPU 1910 it can be beneficial to ensure that GPU-biased pages are those which are required by a GPU but not host processor 1905 and vice versa.

In at least one embodiment, hardware structure(s) 1115 are used to perform one or more embodiments. Details regarding hardware structure(x) 1115 are provided herein in conjunction with FIGS. 11A and/or 11B.

In at least one embodiment, a GPU-based scrambling/descrambling unit might be used to perform scrambling and/or descrambling as part of a communications process or system used with a system of FIG. 19.

Figure 20A:
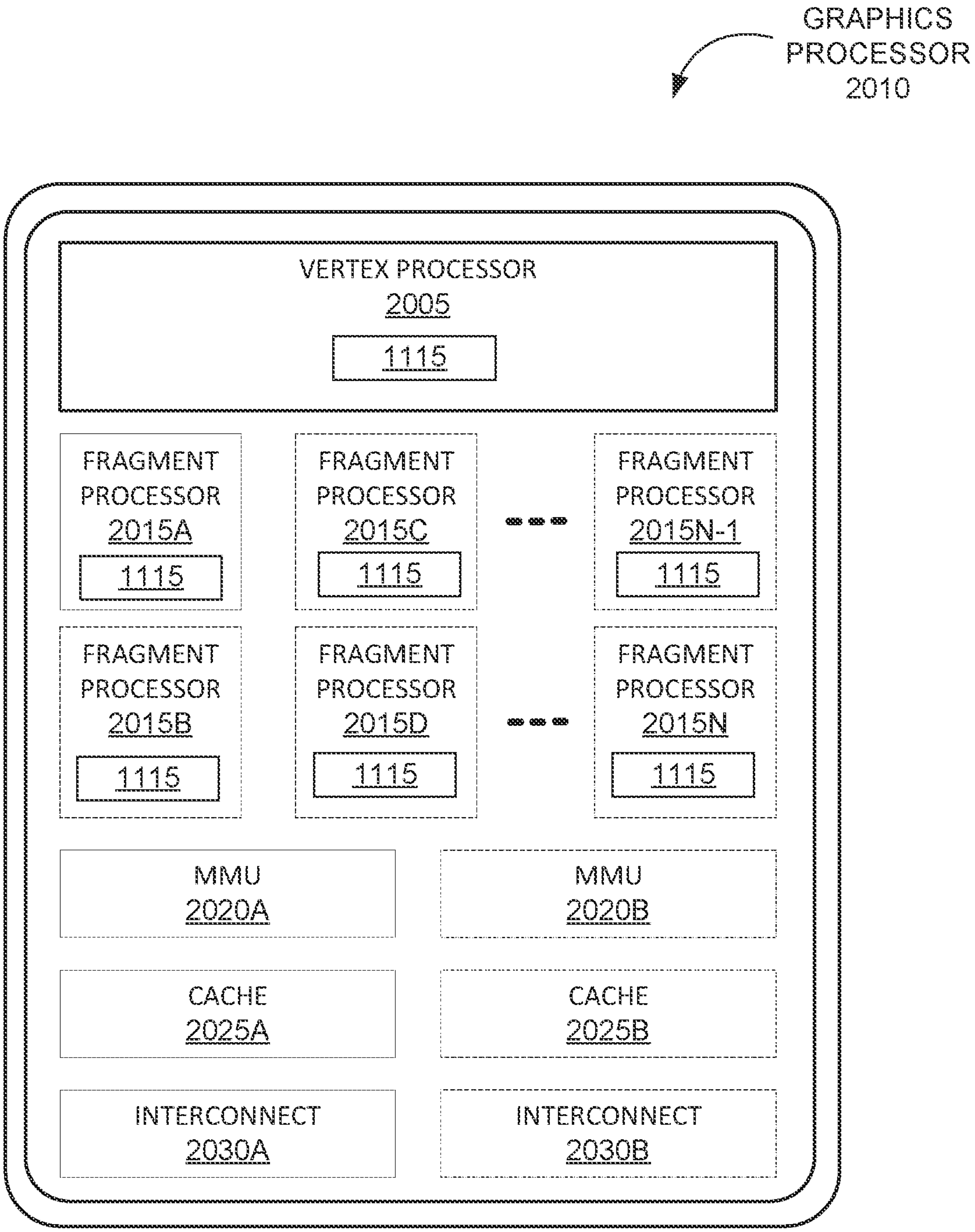
FIGS. 20A and 20B illustrate exemplary integrated circuits and associated graphics processors that may be fabricated using one or more IP cores, according to at least one embodiment.
Figure 20B:
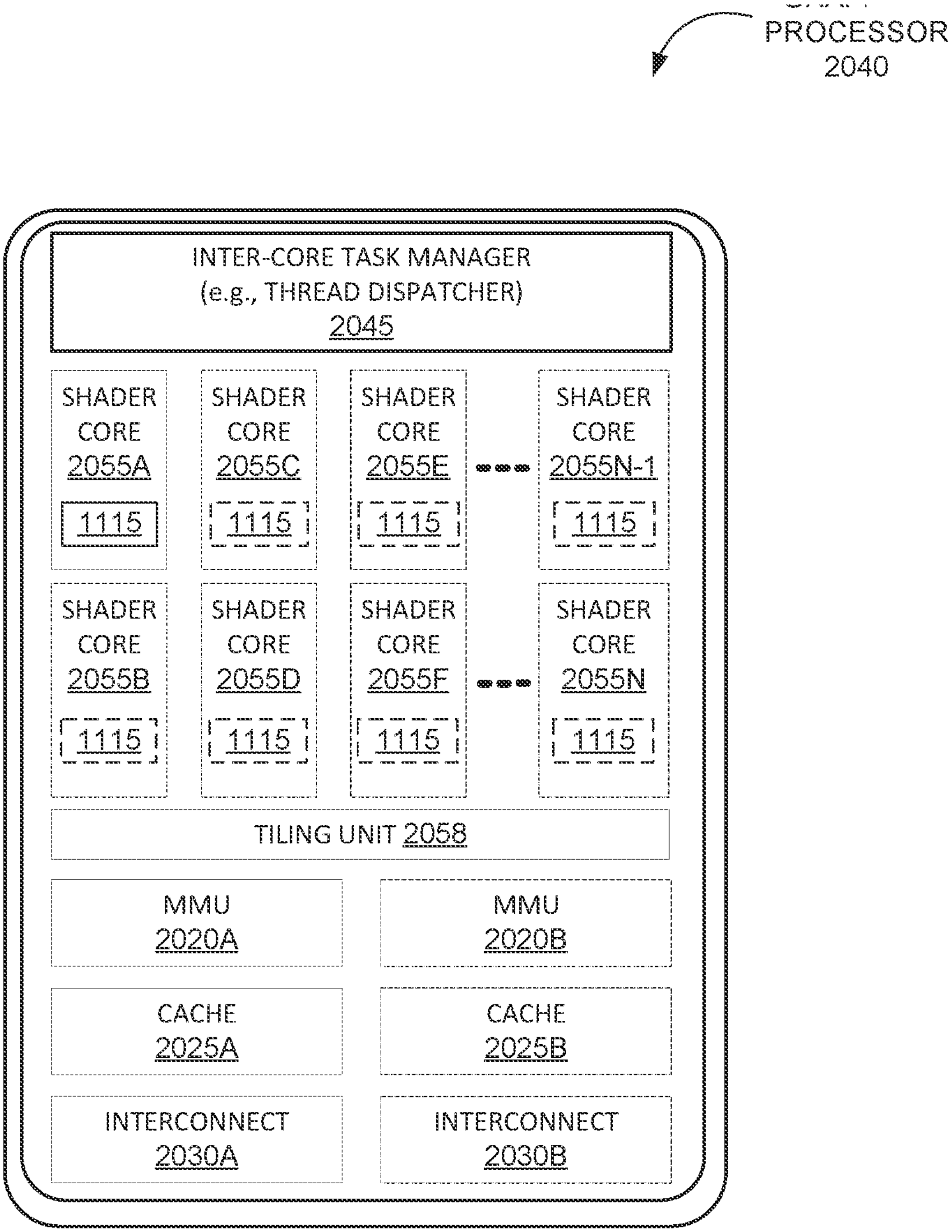

FIGS. 20A-20B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 20A and 20B are block diagrams illustrating exemplary graphics processors for use within an SoC, according to embodiments described herein. FIG. 20A illustrates an exemplary graphics processor 2010 of a system on a chip integrated circuit that may be fabricated using one or more IP cores, according to at least one embodiment. FIG. 20B illustrates an additional exemplary graphics processor 2040 of a system on a chip integrated circuit that may be fabricated using one or more IP cores, according to at least one embodiment. In at least one embodiment, graphics processor 2010 of FIG. 20A is a low power graphics processor core. In at least one embodiment, graphics processor 2040 of FIG. 20B is a higher performance graphics processor core. In at least one embodiment, each of graphics processors 2010, 2040 can be variants of graphics processor 1810 of FIG. 18.

In at least one embodiment, a graphics processor 2010 includes a vertex processor 2005 and one or more fragment processor(s) 2015A-2015N (e.g., 2015A, 2015B, 2015C, 2015D, through 2015N-1, and 2015N). In at least one embodiment, a graphics processor 2010 can execute different shader programs via separate logic, such that a vertex processor 2005 is optimized to execute operations for vertex shader programs, while one or more fragment processor(s) 2015A-2015N execute fragment (e.g., pixel) shading operations for fragment or pixel shader programs. In at least one embodiment, a vertex processor 2005 performs a vertex processing stage of a 3D graphics pipeline and generates primitives and vertex data. In at least one embodiment, fragment processor(s) 2015A-2015N use primitive and vertex data generated by vertex processor 2005 to produce a framebuffer that is displayed on a display device. In at least one embodiment, fragment processor(s) 2015A-2015N are optimized to execute fragment shader programs as provided for in an OpenGL API, which may be used to perform similar operations as a pixel shader program as provided for in a Direct 3D API.

In at least one embodiment, a graphics processor 2010 additionally includes one or more memory management units (MMUs) 2020A-2020B, cache(s) 2025A-2025B, and circuit interconnect(s) 2030A-2030B. In at least one embodiment, one or more MMU(s) 2020A-2020B provide for virtual to physical address mapping for a graphics processor 2010, including for a vertex processor 2005 and/or fragment processor(s) 2015A-2015N, which may reference vertex or image/texture data stored in memory, in addition to vertex or image/texture data stored in one or more cache(s) 2025A-2025B. In at least one embodiment, one or more MMU(s) 2020A-2020B may be synchronized with other MMUs within a system, including one or more MMUs associated with one or more application processor(s) 1805, image processors 1815, and/or video processors 1820 of FIG. 18, such that each processor 1805-1820 can participate in a shared or unified virtual memory system. In at least one embodiment, one or more circuit interconnect(s) 2030A-2030B enable a graphics processor 2010 to interface with other IP cores within SoC, either via an internal bus of an SoC or via a direct connection.

In at least one embodiment, a graphics processor 2040 includes one or more MMU(s) 2020A-2020B, caches 2025A-2025B, and circuit interconnects 2030A-2030B of graphics processor 2010 of FIG. 20A. In at least one embodiment, a graphics processor 2040 includes one or more shader core(s) 2055A-2055N (e.g., 2055A, 2055B,

2055C, 2055D, 2055E, 2055F, through 2055N-1, and 2055N), which provides for a unified shader core architecture in which a single core or type of core can execute all types of programmable shader code, including shader program code to implement vertex shaders, fragment shaders, and/or compute shaders. In at least one embodiment, a number of shader cores can vary. In at least one embodiment, a graphics processor 2040 includes an inter-core task manager 2045, which acts as a thread dispatcher to dispatch execution threads to one or more shader cores 2055A-2055N and a tiling unit 2058 to accelerate tiling operations for tile-based rendering, in which rendering operations for a scene are subdivided in image space, for example to exploit local spatial coherence within a scene or to optimize use of internal caches.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in integrated circuit 20A and/or 20B for inferencing or predicting operations based, at least in part, on weight parameters calculated using neural network training operations, neural network functions and/or architectures, or neural network use cases described herein.

In at least one embodiment, a GPU-based scrambling/descrambling unit might be used to perform scrambling and/or descrambling as part of a communications process or system used with a system of FIG. 20A or 20B.

Figure 21A:
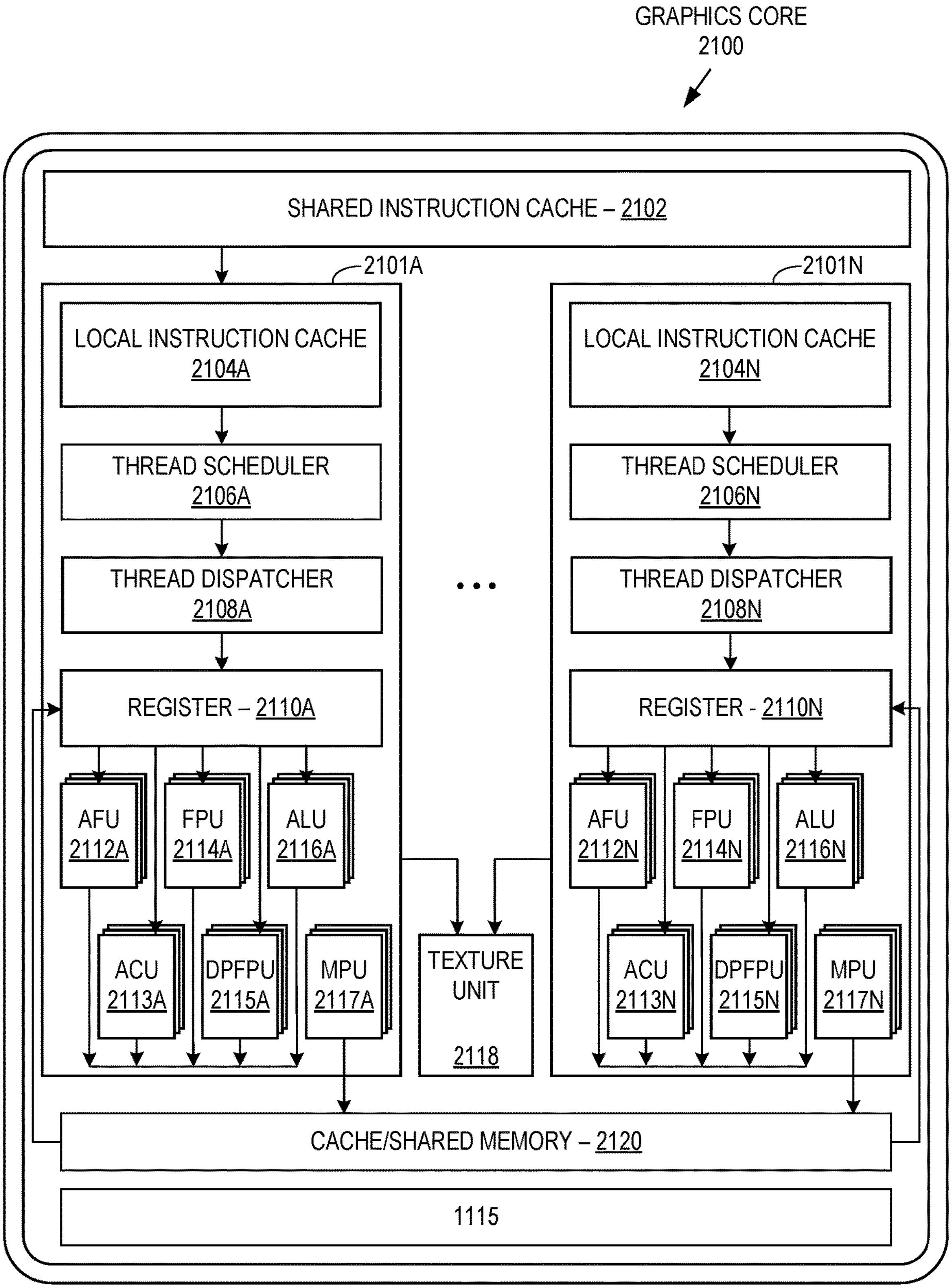
FIGS. 21A and 21B illustrate additional exemplary graphics processor logic, according to at least one embodiment.
Figure 21B:
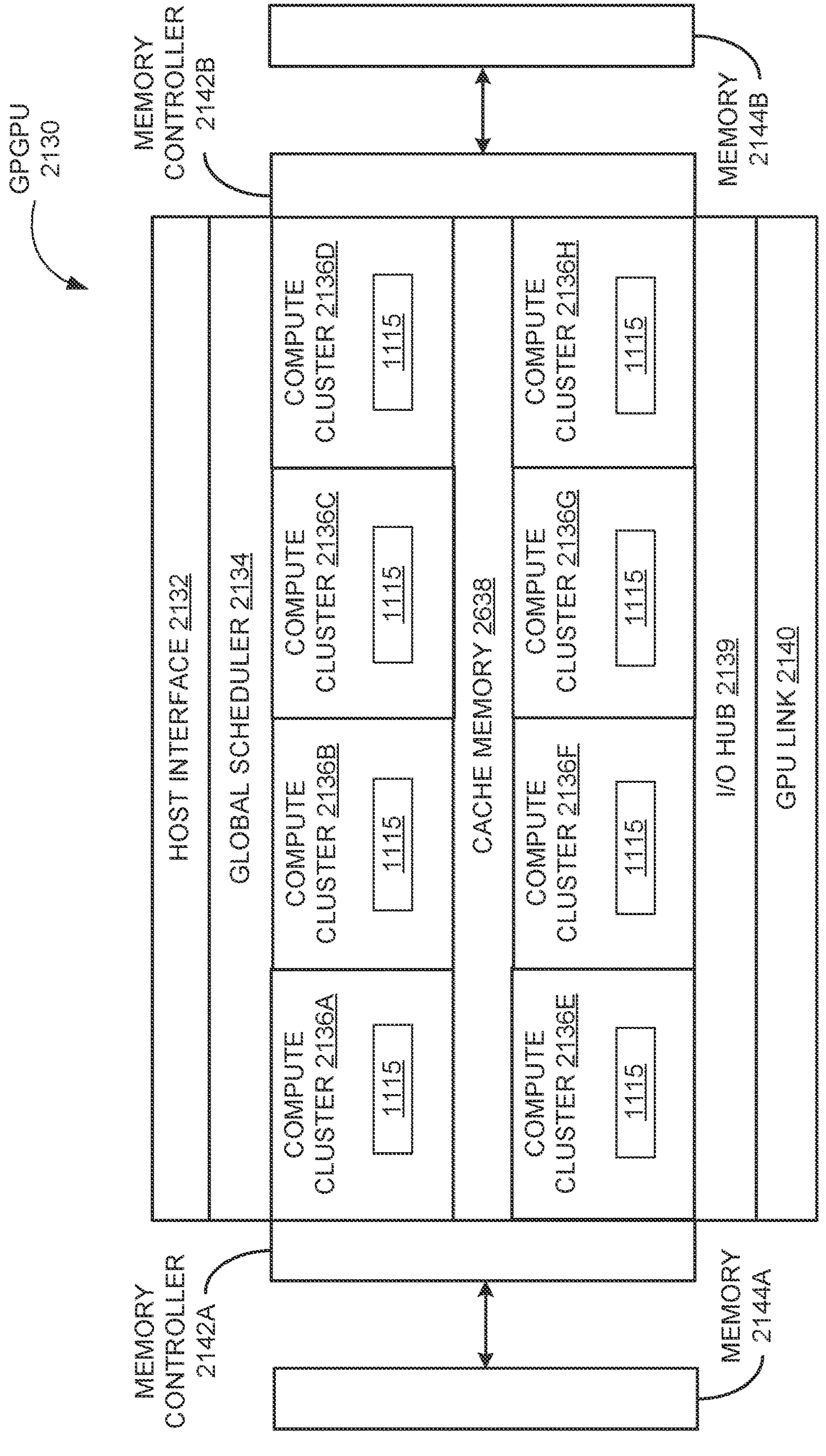

FIGS. 21A-21B illustrate additional exemplary graphics processor logic according to embodiments described herein. FIG. 21A illustrates a graphics core 2100 that may be included within a graphics processor 1810 of FIG. 18, in at least one embodiment, and may be a unified shader core 2055A-2055N as in FIG. 20B in at least one embodiment. FIG. 21B illustrates a highly parallel general-purpose graphics processing unit 2130 suitable for deployment on a multi-chip module in at least one embodiment.

In at least one embodiment, a graphics core 2100 includes a shared instruction cache 2102, a texture unit 2118, and a cache/shared memory 2120 that are common to execution resources within a graphics core 2100. In at least one embodiment, a graphics core 2100 can include multiple slices 2101A-2101N or partitions for each core, and a graphics processor can include multiple instances of a graphics core 2100. In at least one embodiment, slices 2101A-2101N can include support logic including a local instruction cache 2104A-2104N, a thread scheduler 2106A-2106N, a thread dispatcher 2108A-2108N, and a set of registers 2110A-2110N. In at least one embodiment, slices 2101A-2101N can include a set of additional function units (AFUs 2112A-2112N), floating-point units (FPU 2114A-2114N), integer arithmetic logic units (ALUs 2116-2116N), address computational units (ACU 2113A-2113N), double-precision floating-point units (DPFPU 2115A-2115N), and matrix processing units (MPU 2117A-2117N).

In at least one embodiment, FPUs 2114A-2114N can perform single-precision (32-bit) and half-precision (16-bit) floating point operations, while DPFPUs 2115A-2115N perform double precision (64-bit) floating point operations. In at least one embodiment, ALUs 2116A-2116N can perform variable precision integer operations at 8-bit, 16-bit, and 32-bit precision, and can be configured for mixed precision operations. In at least one embodiment, MPUs 2117A-2117N can also be configured for mixed precision matrix operations, including half-precision floating point and 8-bit integer operations. In at least one embodiment, MPUs 2117-2117N can perform a variety of matrix operations to accelerate machine learning application frameworks, including enabling support for accelerated general matrix to matrix multiplication (GEMM). In at least one embodiment, AFUs 2112A-2112N can perform additional logic operations not supported by floating-point or integer units, including trigonometric operations (e.g., sine, cosine, etc.).

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in graphics core 2100 for inferencing or predicting operations based, at least in part, on weight parameters calculated using neural network training operations, neural network functions and/or architectures, or neural network use cases described herein.

FIG. 21B illustrates a general-purpose processing unit (GPGPU) 2130 that can be configured to enable highly parallel compute operations to be performed by an array of graphics processing units, in at least one embodiment. In at least one embodiment, a GPGPU 2130 can be linked directly to other instances of a GPGPU 2130 to create a multi-GPU cluster to improve training speed for deep neural networks. In at least one embodiment, a GPGPU 2130 includes a host interface 2132 to enable a connection with a host processor. In at least one embodiment, a host interface 2132 is a PCI Express interface. In at least one embodiment, host interface 2132 can be a vendor specific communications interface or communications fabric. In at least one embodiment, a GPGPU 2130 receives commands from a host processor and uses a global scheduler 2134 to distribute execution threads associated with those commands to a set of compute clusters 2136A-2136H. In at least one embodiment, compute clusters 2136A-2136H share a cache memory 2138. In at least one embodiment, cache memory 2138 can serve as a higher-level cache for cache memories within compute clusters 2136A-2136H.

In at least one embodiment, GPGPU 2130 includes memory 2144A-2144B coupled with compute clusters 2136A-2136H via a set of memory controllers 2142A-2142B. In at least one embodiment, memory 2144A-2144B can include various types of memory devices including dynamic random access memory (DRAM) or graphics random access memory, such as synchronous graphics random access memory (SGRAM), including graphics double data rate (GDDR) memory.

In at least one embodiment, compute clusters 2136A-2136H each include a set of graphics cores, such as a graphics core 2100 of FIG. 21A, which can include multiple types of integer and floating point logic units that can perform computational operations at a range of precisions including suited for machine learning computations. For example, in at least one embodiment, at least a subset of floating point units in each of compute clusters 2136A-2136H can be configured to perform 16-bit or 32-bit floating point operations, while a different subset of those floating point units can be configured to perform 64-bit floating point operations.

In at least one embodiment, multiple instances of a GPGPU 2130 can be configured to operate as a compute cluster. In at least one embodiment, communication used by compute clusters 2136A-2136H for synchronization and data exchange varies across embodiments. In at least one embodiment, multiple instances of a GPGPU 2130 communicate over a host interface 2132. In at least one embodiment, a GPGPU 2130 includes an I/O hub 2139 that couples a GPGPU 2130 with a GPU link 2140 that enables a direct connection to other instances of a GPGPU 2130. In at least one embodiment, a GPU link 2140 is coupled to a dedicated GPU-to-GPU bridge that enables communication and synchronization between multiple instances of a GPGPU 2130. In at least one embodiment a GPU link 2140 couples with a high speed interconnect to transmit and receive data to other GPGPUs or parallel processors. In at least one embodiment, multiple instances of a GPGPU 2130 are located in separate data processing systems and communicate via a network device that is accessible via host interface 2132. In at least one embodiment a GPU link 2140 can be configured to enable a connection to a host processor in addition to or as an alternative to host interface 2132.

In at least one embodiment, a GPGPU 2130 can be configured to train neural networks. In at least one embodiment, a GPGPU 2130 can be used within an inferencing platform. In at least one embodiment, in which a GPGPU 2130 is used for inferencing, a GPGPU may include fewer compute clusters 2136A-2136H relative to when a GPGPU is used for training a neural network. In at least one embodiment, memory technology associated with memory 2144A-2144B may differ between inferencing and training configurations, with higher bandwidth memory technologies devoted to training configurations. In at least one embodiment, inferencing configuration of a GPGPU 2130 can support inferencing specific instructions. For example, in at least one embodiment, an inferencing configuration can provide support for one or more 8-bit integer dot product instructions, which may be used during inferencing operations for deployed neural networks.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in a GPGPU 2130 for inferencing or predicting operations based, at least in part, on weight parameters calculated using neural network training operations, neural network functions and/or architectures, or neural network use cases described herein.

In at least one embodiment, a GPU-based scrambling/descrambling unit might be used to perform scrambling and/or descrambling as part of a communications process or system used with a system of FIG. 21A or FIG. 21B.

Figure 22:
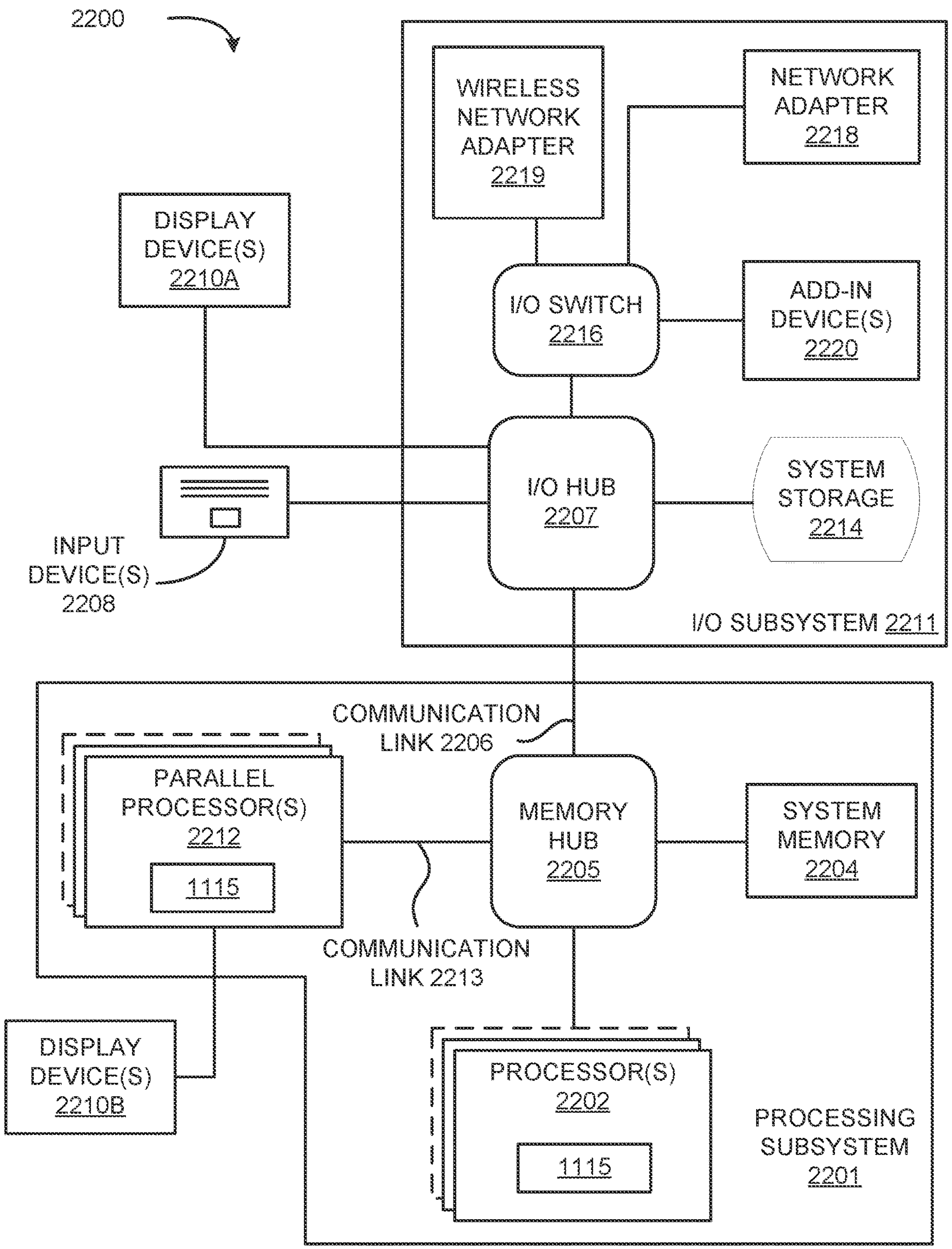
FIG. 22 illustrates a computer system, according to at least one embodiment.

FIG. 22 is a block diagram illustrating a computing system 2200 according to at least one embodiment. In at least one embodiment, a computing system 2200 includes a processing subsystem 2201 having one or more processor(s) 2202 and a system memory 2204 communicating via an interconnection path that may include a memory hub 2205. In at least one embodiment, a memory hub 2205 may be a separate component within a chipset component or may be integrated within one or more processor(s) 2202. In at least one embodiment, a memory hub 2205 couples with an I/O subsystem 2211 via a communication link 2206. In at least one embodiment, an I/O subsystem 2211 includes an I/O hub 2207 that can enable a computing system 2200 to receive input from one or more input device(s) 2208. In at least one embodiment, an I/O hub 2207 can enable a display controller, which may be included in one or more processor(s) 2202, to provide outputs to one or more display device(s) 2210A. In at least one embodiment, one or more display device(s) 2210A coupled with I/O hub 2207 can include a local, internal, or embedded display device.

In at least one embodiment, a processing subsystem 2201 includes one or more parallel processor(s) 2212 coupled to a memory hub 2205 via a bus or other communication link 2213. In at least one embodiment, a communication link 2213 may be one of any number of standards based communication link technologies or protocols, such as, but not limited to PCI Express, or may be a vendor specific communications interface or communications fabric. In at least one embodiment, one or more parallel processor(s) 2212 form a computationally focused parallel or vector processing system that can include a large number of processing cores and/or processing clusters, such as a many integrated core (MIC) processor. In at least one embodiment, one or more parallel processor(s) 2212 form a graphics processing subsystem that can output pixels to one of one or more display device(s) 2210A coupled via I/O Hub 2207. In at least one embodiment, one or more parallel processor(s) 2212 can also include a display controller and display interface (not shown) to enable a direct connection to one or more display device(s) 2210B.

In at least one embodiment, a system storage unit 2214 can connect to an I/O hub 2207 to provide a storage mechanism for computing system 2200. In at least one embodiment, an I/O switch 2216 can be used to provide an interface mechanism to enable connections between an I/O hub 2207 and other components, such as a network adapter 2218 and/or wireless network adapter 2219 that may be integrated into a platform, and various other devices that can be added via one or more add-in device(s) 2220. In at least one embodiment, a network adapter 2218 can be an Ethernet adapter or another wired network adapter. In at least one embodiment, a wireless network adapter 2219 can include one or more of a Wi-Fi, Bluetooth, near field communication (NFC), or other network device that includes one or more wireless radios.

In at least one embodiment, a computing system 2200 can include other components not explicitly shown, including USB or other port connections, optical storage drives, video capture devices, and the like, may also be connected to an I/O hub 2207. In at least one embodiment, communication paths interconnecting various components in FIG. 22 may be implemented using any suitable protocols, such as PCI (Peripheral Component Interconnect) based protocols (e.g., PCI-Express), or other bus or point-to-point communication interfaces and/or protocol(s), such as an NVLink high-speed interconnect, or interconnect protocols.

In at least one embodiment, one or more parallel processor(s) 2212 incorporate circuitry optimized for graphics and video processing, including, for example, video output circuitry, and constitute a graphics processing unit (GPU). In at least one embodiment, one or more parallel processor(s) 2212 incorporate circuitry optimized for general-purpose processing. In at least one embodiment, components of a computing system 2200 may be integrated with one or more other system elements on a single integrated circuit. For example, in at least one embodiment, one or more parallel processor(s) 2212, a memory hub 2205, processor(s) 2202, and an I/O hub 2207 can be integrated into a system on chip (SoC) integrated circuit. In at least one embodiment, components of a computing system 2200 can be integrated into a single package to form a system in package (SIP) configuration. In at least one embodiment, at least a portion of components of computing system 2200 can be integrated into a multi-chip module (MCM), which can be interconnected with other multi-chip modules into a modular computing system.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in system 2200 for inferencing or predicting operations based, at least in part, on weight parameters calculated using neural network training operations, neural network functions and/or architectures, or neural network use cases described herein.

In at least one embodiment, a GPU-based scrambling/descrambling unit might be used to perform scrambling and/or descrambling as part of a communications process or system used with a system of FIG. 22.

Processors

Figure 23A:
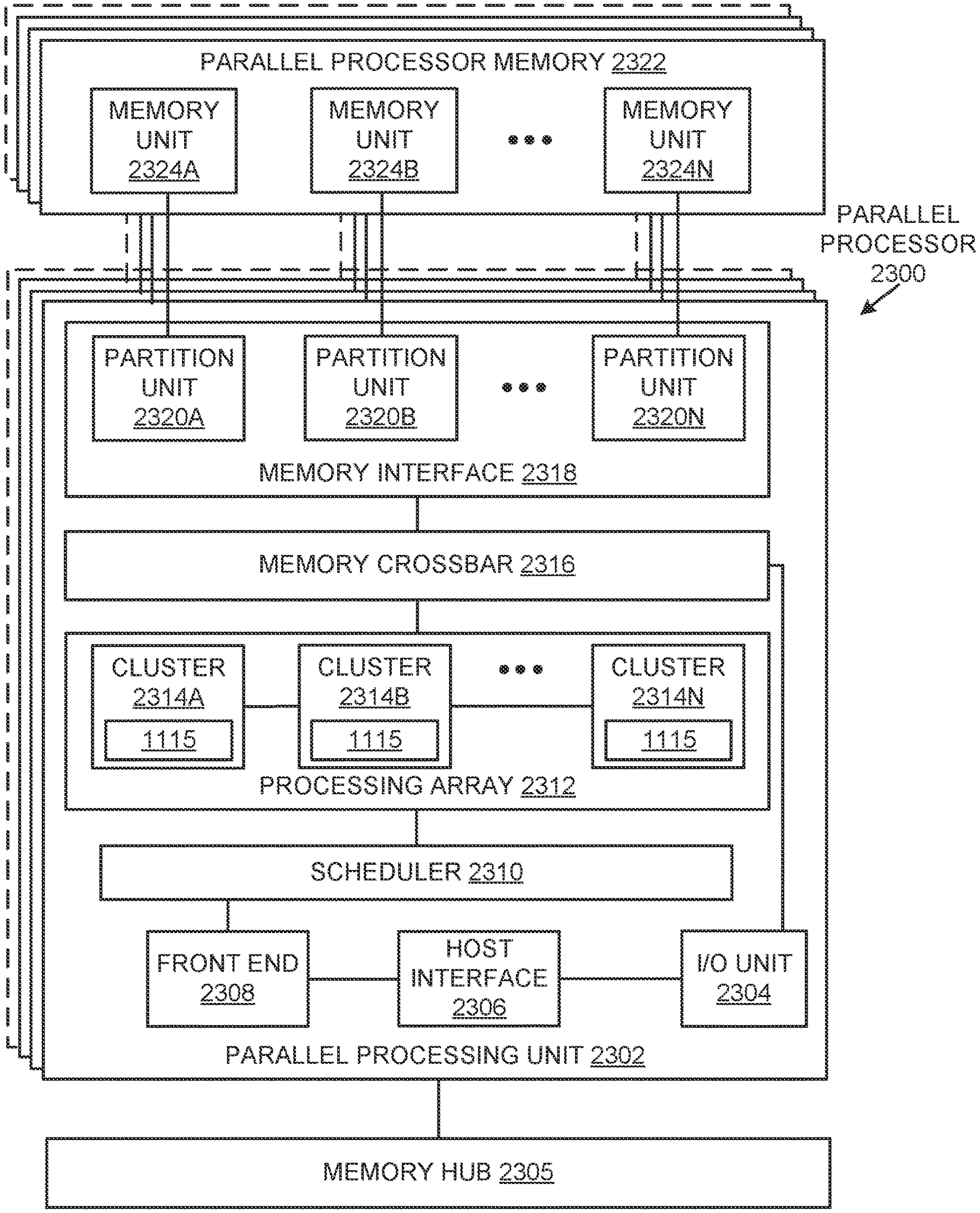
FIG. 23A illustrates a parallel processor, according to at least one embodiment.

FIG. 23A illustrates a parallel processor 2300 according to at least one embodiment. In at least one embodiment, various components of a parallel processor 2300 may be implemented using one or more integrated circuit devices, such as programmable processors, application specific integrated circuits (ASICs), or field programmable gate arrays (FPGA). In at least one embodiment, an illustrated parallel processor 2300 is a variant of one or more parallel processor(s) 2212 shown in FIG. 22 according to an exemplary embodiment.

In at least one embodiment, a parallel processor 2300 includes a parallel processing unit 2302. In at least one embodiment, a parallel processing unit 2302 includes an I/O unit 2304 that enables communication with other devices, including other instances of a parallel processing unit 2302. In at least one embodiment, I/O unit 2304 may be directly connected to other devices. In at least one embodiment, I/O unit 2304 connects with other devices via use of a hub or switch interface, such as memory hub 2205. In at least one embodiment, connections between a memory hub 2205 and an I/O unit 2304 form a communication link 2213. In at least one embodiment, an I/O unit 2304 connects with a host interface 2306 and a memory crossbar 2316, where host interface 2306 receives commands directed to performing processing operations and a memory crossbar 2316 receives commands directed to performing memory operations.

In at least one embodiment, when a host interface 2306 receives a command buffer via an I/O unit 2304, a host interface 2306 can direct work operations to perform those commands to a front end 2308. In at least one embodiment, a front end 2308 couples with a scheduler 2310, which is configured to distribute commands or other work items to a processing cluster array 2312. In at least one embodiment, a scheduler 2310 ensures that processing cluster array 2312 is properly configured and in a valid state before tasks are distributed to a processing cluster array 2312. In at least one embodiment, a scheduler 2310 is implemented via firmware logic executing on a microcontroller. In at least one embodiment, a microcontroller implemented scheduler 2310 is configurable to perform complex scheduling and work distribution operations at coarse and fine granularity, enabling rapid preemption and context switching of threads executing on a processing array 2312. In at least one embodiment, host software can prove workloads for scheduling on a processing array 2312 via one of multiple graphics processing doorbells. In at least one embodiment, workloads can then be automatically distributed across a processing array 2312 by a scheduler 2310 logic within a microcontroller including a scheduler 2310.

In at least one embodiment, a processing cluster array 2312 can include up to "N" processing clusters (e.g., cluster 2314A, cluster 2314B, through cluster 2314N). In at least one embodiment, each cluster 2314A-2314N of a processing cluster array 2312 can execute a large number of concurrent threads. In at least one embodiment, a scheduler 2310 can allocate work to clusters 2314A-2314N of a processing cluster array 2312 using various scheduling and/or work distribution algorithms, which may vary depending on workload arising for each type of program or computation. In at least one embodiment, scheduling can be handled dynamically by a scheduler 2310, or can be assisted in part by compiler logic during compilation of program logic configured for execution by processing cluster array 2312. In at least one embodiment, different clusters 2314A-2314N of processing cluster array 2312 can be allocated for processing different types of programs or for performing different types of computations.

In at least one embodiment, a processing cluster array 2312 can be configured to perform various types of parallel processing operations. In at least one embodiment, a processing cluster array 2312 is configured to perform general-purpose parallel compute operations. For example, in at least one embodiment, a processing cluster array 2312 can include logic to execute processing tasks including filtering of video and/or audio data, performing modeling operations, including physics operations, and performing data transformations.

In at least one embodiment, a processing cluster array 2312 is configured to perform parallel graphics processing operations. In at least one embodiment, a processing cluster array 2312 can include additional logic to support execution of such graphics processing operations, including, but not limited to texture sampling logic to perform texture operations, as well as tessellation logic and other vertex processing logic. In at least one embodiment, a processing cluster array 2312 can be configured to execute graphics processing related shader programs such as, but not limited to vertex shaders, tessellation shaders, geometry shaders, and pixel shaders. In at least one embodiment, a parallel processing unit 2302 can transfer data from a system memory via an I/O unit 2304 for processing. In at least one embodiment, during processing, transferred data can be stored to on-chip memory (e.g., parallel processor memory 2322) during processing, then written back to system memory.

In at least one embodiment, when a parallel processing unit 2302 is used to perform graphics processing, a scheduler 2310 can be configured to divide a processing workload into approximately equal sized tasks, to better enable distribution of graphics processing operations to multiple clusters 2314A-2314N of a processing cluster array 2312. In at least one embodiment, portions of a processing cluster array 2312 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2314A-2314N may be stored in buffers to allow intermediate data to be transmitted between clusters 2314A-2314N for further processing.

In at least one embodiment, a processing cluster array 2312 can receive processing tasks to be executed via a scheduler 2310, which receives commands defining processing tasks from a front end 2308. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, a scheduler 2310 may be configured to fetch indices corresponding to tasks or may receive indices from a front end 2308. In at least one embodiment, a front end 2308 can be configured to ensure a processing cluster array 2312 is configured to a valid state before a workload specified by incoming command buffers (e.g., batch-buffers, push buffers, etc.) is initiated.

In at least one embodiment, each of one or more instances of a parallel processing unit 2302 can couple with parallel processor memory 2322. In at least one embodiment, parallel processor memory 2322 can be accessed via a memory crossbar 2316, which can receive memory requests from a processing cluster array 2312 as well as an I/O unit 2304. In at least one embodiment, a memory crossbar 2316 can access parallel processor memory 2322 via a memory interface 2318. In at least one embodiment, memory interface 2318 can include multiple partition units (e.g., partition unit 2320A, partition unit 2320B, through partition unit 2320N) that can each couple to a portion (e.g., memory unit) of parallel processor memory 2322. In at least one embodiment, a number of partition units 2320A-2320N is configured to be equal to a number of memory units, such that a first partition unit 2320A has a corresponding first memory unit 2324A, a second partition unit 2320B has a corresponding memory unit 2324B, and an Nth partition unit 2320N has a corresponding Nth memory unit 2324N. In at least one embodiment, a number of partition units 2320A-2320N may not be equal to a number of memory devices.

In at least one embodiment, memory units 2324A-2324N can include various types of memory devices, including dynamic random access memory (DRAM) or graphics random access memory, such as synchronous graphics random access memory (SGRAM), including graphics double data rate (GDDR) memory. In at least one embodiment, memory units 2324A-2324N may also include 3D stacked memory, including but not limited to high bandwidth memory (HBM). In at least one embodiment, render targets, such as frame buffers or texture maps may be stored across memory units 2324A-2324N, allowing partition units 2320A-2320N to write portions of each render target in parallel to efficiently use available bandwidth of parallel processor memory 2322. In at least one embodiment, a local instance of parallel processor memory 2322 may be excluded in favor of a unified memory design that utilizes system memory in conjunction with local cache memory.

In at least one embodiment, any one of clusters 2314A-2314N of a processing cluster array 2312 can process data that will be written to any of memory units 2324A-2324N within a parallel processor memory 2322. In at least one embodiment, a memory crossbar 2316 can be configured to transfer an output of each cluster 2314A-2314N to any partition unit 2320A-2320N or to another cluster 2314A-2314N, which can perform additional processing operations on an output. In at least one embodiment, each cluster 2314A-2314N can communicate with a memory interface 2318 through a memory crossbar 2316 to read from or write to various external memory devices. In at least one embodiment, a memory crossbar 2316 has a connection to a memory interface 2318 to communicate with an I/O unit 2304, as well as a connection to a local instance of a parallel processor memory 2322, enabling processing units within different processing clusters 2314A-2314N to communicate with system memory or other memory that is not local to a parallel processing unit 2302. In at least one embodiment, a memory crossbar 2316 can use virtual channels to separate traffic streams between clusters 2314A-2314N and partition units 2320A-2320N.

In at least one embodiment, multiple instances of a parallel processing unit 2302 can be provided on a single add-in card, or multiple add-in cards can be interconnected. In at least one embodiment, different instances of a parallel processing unit 2302 can be configured to inter-operate even if different instances have different numbers of processing cores, different amounts of local parallel processor memory, and/or other configuration differences. For example, in at least one embodiment, some instances of a parallel processing unit 2302 can include higher precision floating point units relative to other instances. In at least one embodiment, systems incorporating one or more instances of a parallel processing unit 2302 or parallel processor 2300 can be implemented in a variety of configurations and form factors, including but not limited to desktop, laptop, or handheld personal computers, servers, workstations, game consoles, and/or embedded systems.

Figure 23B:
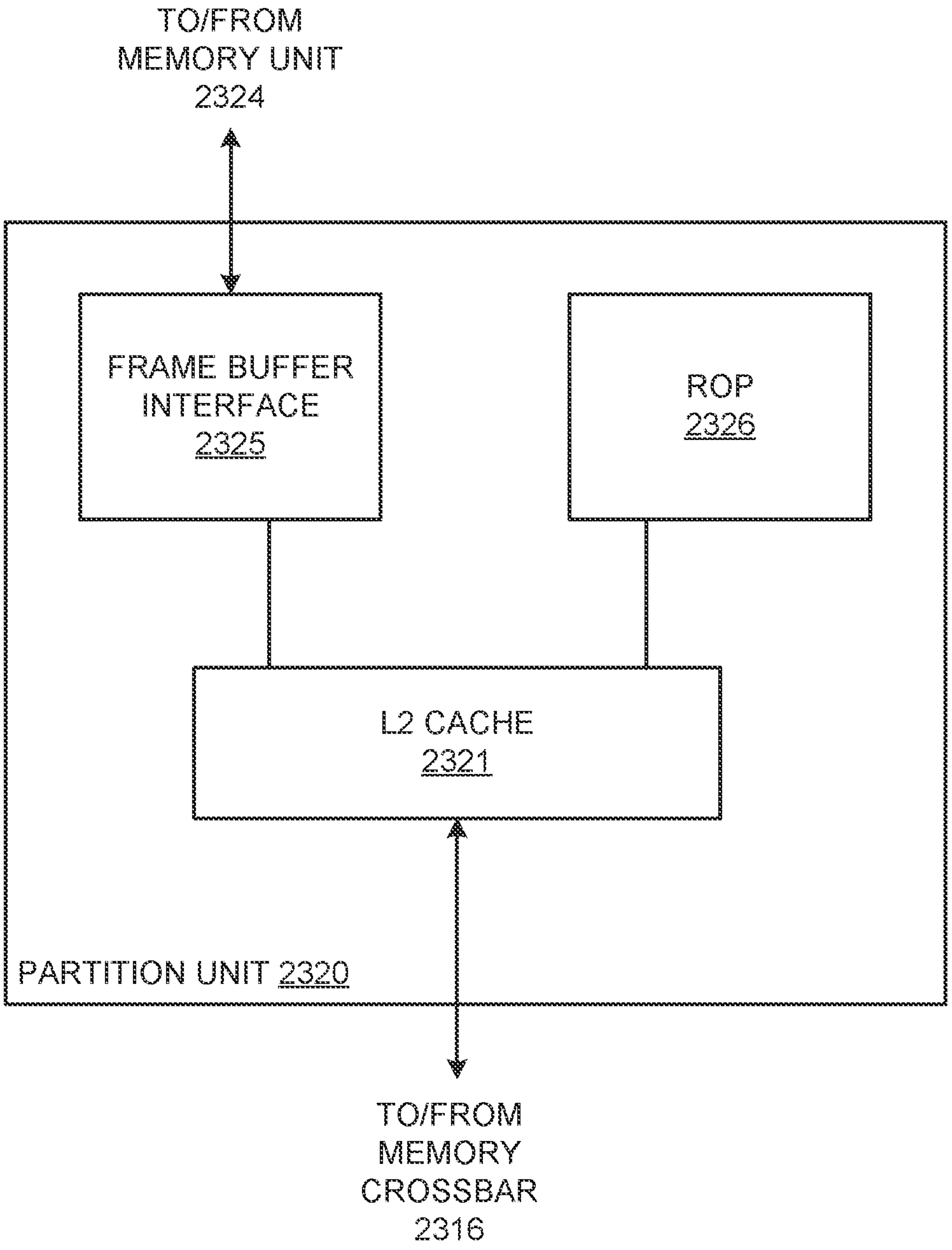
FIG. 23B illustrates a partition unit, according to at least one embodiment.

FIG. 23B is a block diagram of a partition unit 2320 according to at least one embodiment. In at least one embodiment, a partition unit 2320 is an instance of one of partition units 2320A-2320N of FIG. 23A. In at least one embodiment, partition unit 2320 includes an L2 cache 2321, a frame buffer interface 2325, and an ROP 2326 (raster operations unit). In at least one embodiment, an L2 cache 2321 is a read/write cache that is configured to perform load and store operations received from a memory crossbar 2316 and ROP 2326. In at least one embodiment, read misses and urgent write-back requests are output by an L2 cache 2321 to frame buffer interface 2325 for processing. In at least one embodiment, updates can also be sent to a frame buffer via a frame buffer interface 2325 for processing. In at least one embodiment, a frame buffer interface 2325 interfaces with one of memory units in parallel processor memory, such as memory units 2324A-2324N of FIG. 23 (e.g., within parallel processor memory 2322).

In at least one embodiment, an ROP 2326 is a processing unit that performs raster operations such as stencil, z test, blending, and a like. In at least one embodiment, an ROP 2326 then outputs processed graphics data that is stored in graphics memory. In at least one embodiment, an ROP 2326 includes compression logic to compress depth or color data that is written to memory and decompress depth or color data that is read from memory. In at least one embodiment, compression logic can be lossless compression logic that makes use of one or more of multiple compression algorithms. In at least one embodiment, types of compression that are performed by ROP 2326 can vary based on statistical characteristics of data to be compressed. For example, in at least one embodiment, delta color compression is performed on depth and color data on a per-tile basis.

In at least one embodiment, ROP 2326 is included within each processing cluster (e.g., cluster 2314A-2314N of FIG. 23) instead of within a partition unit 2320. In at least one embodiment, read and write requests for pixel data are transmitted over a memory crossbar 2316 instead of pixel fragment data. In at least one embodiment, processed graphics data may be displayed on a display device, such as one of one or more display device(s) 2210 of FIG. 22, routed for further processing by processor(s) 2202, or routed for further processing by one of those processing entities within a parallel processor 2300 of FIG. 23A.

Figure 23C:
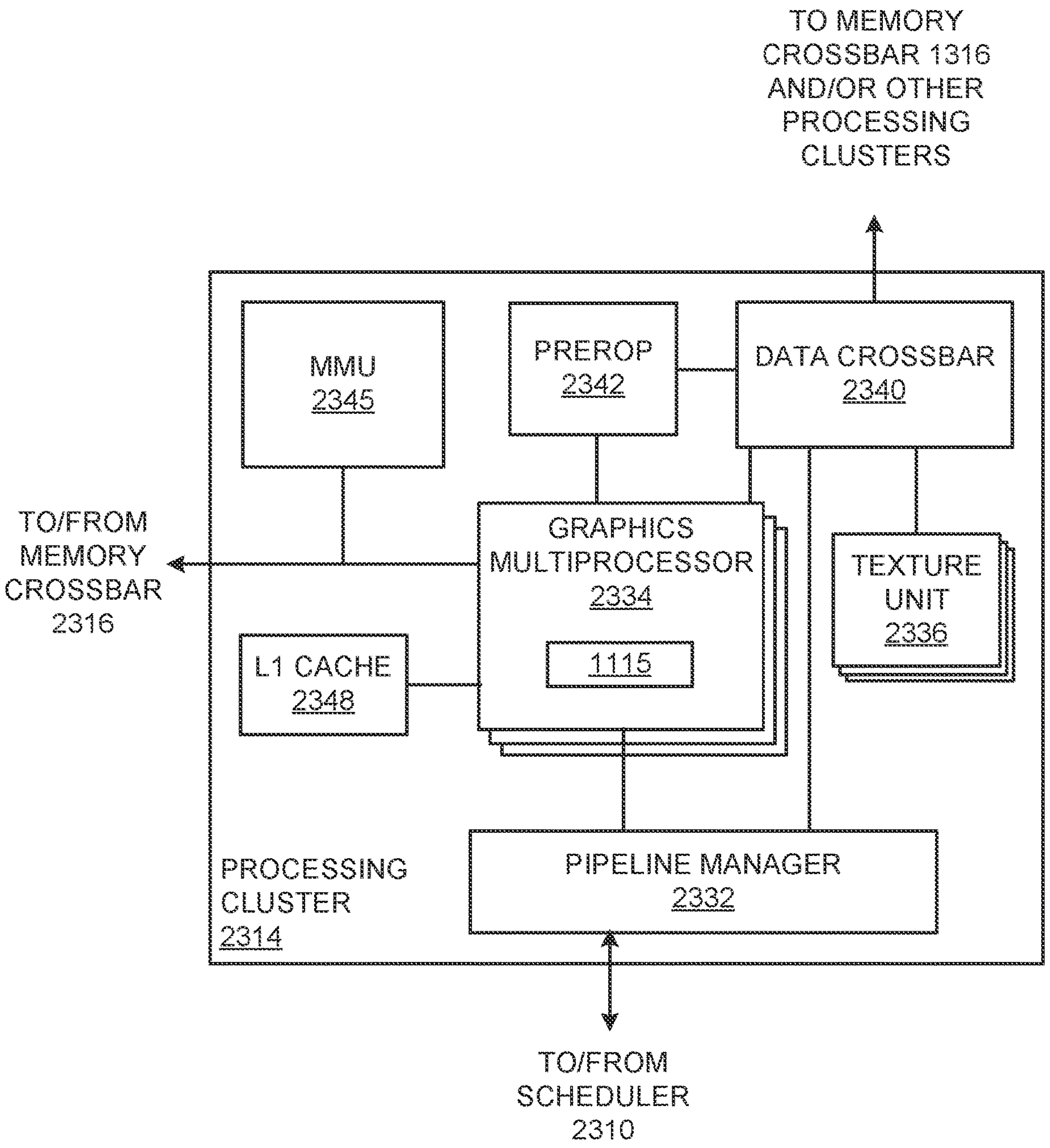
FIG. 23C illustrates a processing cluster, according to at least one embodiment.

FIG. 23C is a block diagram of a processing cluster 2314 within a parallel processing unit according to at least one embodiment. In at least one embodiment, a processing cluster is an instance of one of processing clusters 2314A-2314N of FIG. 23. In at least one embodiment, a processing cluster 2314 can be configured to execute many threads in parallel, where term "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each processing cluster.

In at least one embodiment, operation of a processing cluster 2314 can be controlled via a pipeline manager 2332 that distributes processing tasks to SIMT parallel processors. In at least one embodiment, a pipeline manager 2332 receives instructions from a scheduler 2310 of FIG. 23 and manages execution of those instructions via a graphics multiprocessor 2334 and/or a texture unit 2336. In at least one embodiment, a graphics multiprocessor 2334 is an exemplary instance of an SIMT parallel processor. However, in at least one embodiment, various types of SIMT parallel processors of differing architectures may be included within a processing cluster 2314. In at least one embodiment, one or more instances of a graphics multiprocessor 2334 can be included within a processing cluster 2314. In at least one embodiment, a graphics multiprocessor 2334 can process data and a data crossbar 2340 can be used to distribute processed data to one of multiple possible destinations, including other shader units. In at least one embodiment, a pipeline manager 2332 can facilitate distribution of processed data by specifying destinations for processed data to be distributed via a data crossbar 2340.

In at least one embodiment, each graphics multiprocessor 2334 within processing cluster 2314 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, that same functional-unit hardware can be leveraged to perform different operations and any combination of functional units may be present.

In at least one embodiment, instructions transmitted to a processing cluster 2314 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within a graphics multiprocessor 2334. In at least one embodiment, a thread group may include fewer threads than a number of processing engines within a graphics multiprocessor 2334. In at least one embodiment, when a thread group includes fewer threads than a number of processing engines, one or more of said processing engines may be idle during cycles in which that thread group is being processed. In at least one embodiment, a thread group may also include more threads than a number of processing engines within a graphics multiprocessor 2334. In at least one embodiment, when a thread group includes more threads than number of processing engines within a graphics multiprocessor 2334, processing can be performed over consecutive clock cycles. In at least one embodiment, multiple thread groups can be executed concurrently on a graphics multiprocessor 2334.

In at least one embodiment, a graphics multiprocessor 2334 includes an internal cache memory to perform load and store operations. In at least one embodiment, a graphics multiprocessor 2334 can forego an internal cache and use a cache memory (e.g., an L1 cache 2348) within a processing cluster 2314. In at least one embodiment, each graphics multiprocessor 2334 also has access to L2 caches within partition units (e.g., partition units 2320A-2320N of FIG. 23) that are shared among all processing clusters 2314 and may be used to transfer data between threads. In at least one embodiment, a graphics multiprocessor 2334 may also access off-chip global memory, which can include one or more of local parallel processor memory and/or system memory. In at least one embodiment, any memory external to a parallel processing unit 2302 may be used as global memory. In at least one embodiment, a processing cluster 2314 includes multiple instances of graphics multiprocessor 2334 that can share common instructions and data, which may be stored in L1 cache 2348.

In at least one embodiment, each processing cluster 2314 may include an MMU 2345 (memory management unit) that is configured to map virtual addresses into physical addresses. In at least one embodiment, one or more instances of an MMU 2345 may reside within a memory interface 2318 of FIG. 23. In at least one embodiment, an MMU 2345 includes a set of page table entries (PTEs) used to map a virtual address to a physical address of a tile (talk more about tiling) and a cache line index, if needed. In at least one embodiment, an MMU 2345 may include address translation lookaside buffers (TLB) or caches that may reside within graphics multiprocessor 2334 or an L1 cache or processing cluster 2314. In at least one embodiment, a physical address is processed to distribute a surface data access locality to allow efficient request interleaving among partition units. In at least one embodiment, a cache line index may be used to determine whether a request for a cache line is a hit or miss.

In at least one embodiment, a processing cluster 2314 may be configured such that each graphics multiprocessor 2334 is coupled to a texture unit 2336 for performing texture mapping operations, e.g., determining texture sample positions, reading texture data, and filtering texture data. In at least one embodiment, texture data is read from an internal texture L1 cache (not shown) or from an L1 cache within a graphics multiprocessor 2334 and is fetched from an L2 cache, a local parallel processor memory, or system memory, as needed. In at least one embodiment, each graphics multiprocessor 2334 outputs processed tasks to a data crossbar 2340 to provide a processed task to another processing cluster 2314 for further processing or to store a processed task in an L2 cache, local parallel processor memory, or system memory via a memory crossbar 2316. In at least one embodiment, a preROP 2342 (pre-raster operations unit) is configured to receive data from a graphics multiprocessor 2334, direct data to ROP units, which may be located with partition units as described herein (e.g., partition units 2320A-2320N of FIG. 23). In at least one embodiment, a PreROP 2342 unit can perform optimizations for color blending, organize pixel color data, and perform address translations.

Inference and/or training logic 1115 are used to perform inferencing and/or training operations associated with one or more embodiments. Details regarding inference and/or training logic 1115 are provided herein in conjunction with FIGS.

11A and/or 11B. In at least one embodiment, inference and/or training logic 1115 may be used in a graphics processing cluster 2314 for inferencing or predicting operations based, at least in part, on weight parameters calculated using neural network training operations, neural network functions and/or architectures, or neural network use cases described herein.

Figure 23D:
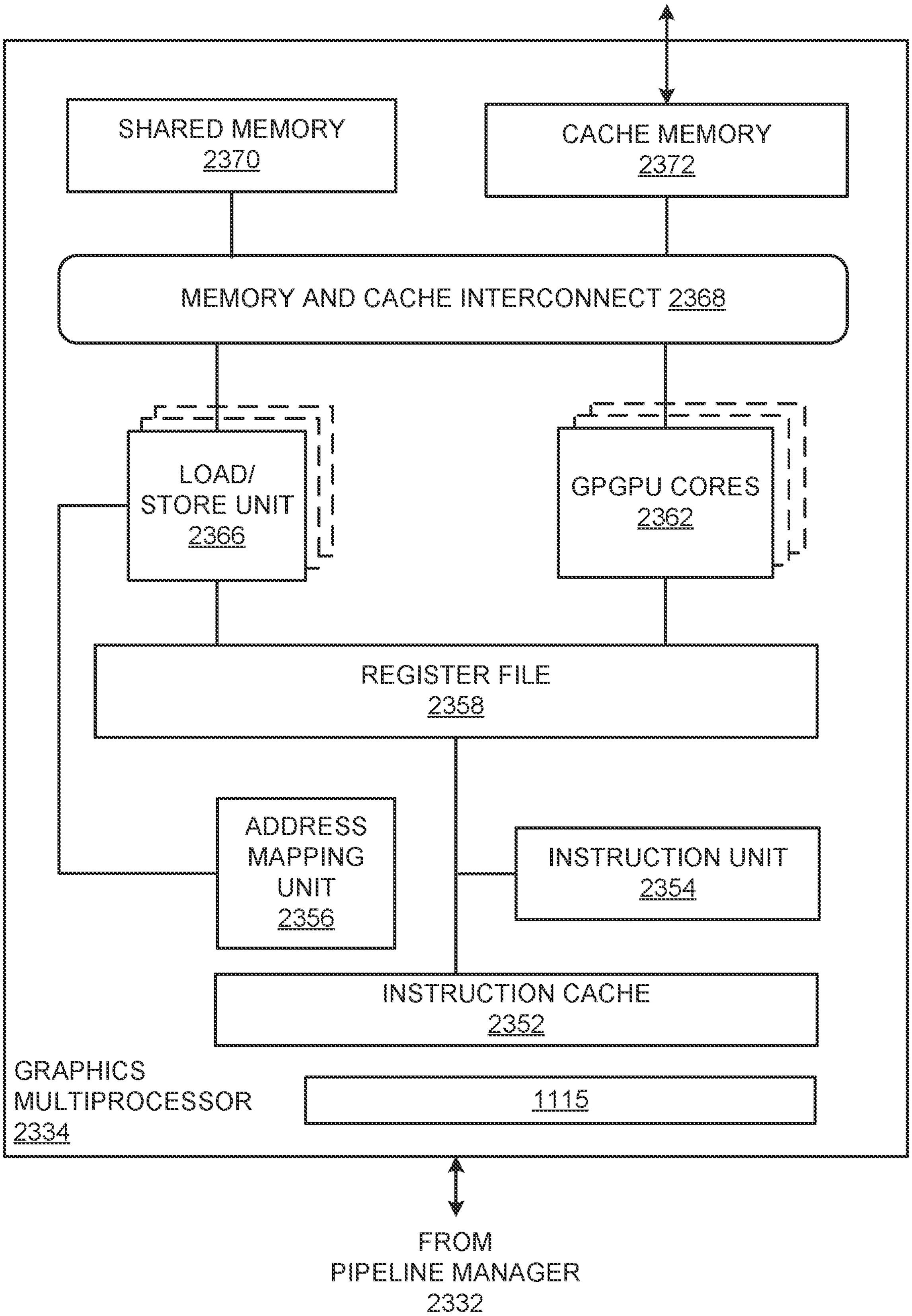
FIG. 23D illustrates a graphics multiprocessor, according to at least one embodiment.

FIG. 23D shows a graphics multiprocessor 2334 according to at least one embodiment. In at least one embodiment, a graphics multiprocessor 2334 couples with a pipeline manager 2332 of a processing cluster 2314. In at least one embodiment, a graphics multiprocessor 2334 has an execution pipeline including but not limited to an instruction cache 2352, an instruction unit 2354, an address mapping unit 2356, a register file 2358, one or more general-purpose graphics processing unit (GPGPU) cores 2362, and one or more load/store units 2366. In at least one embodiment, GPGPU cores 2362 and load/store units 2366 are coupled with a cache memory 2372 and a shared memory 2370 via a memory and a cache interconnect 2368.

In at least one embodiment, an instruction cache 2352 receives a stream of instructions to execute from a pipeline manager 2332. In at least one embodiment, instructions are cached in an instruction cache 2352 and dispatched for execution by an instruction unit 2354. In at least one embodiment, an instruction unit 2354 can dispatch instructions as thread groups (e.g., warps), with each thread of a thread group assigned to a different execution unit within a GPGPU core 2362. In at least one embodiment, an instruction can access any of a local, shared, or global address space by specifying an address within a unified address space. In at least one embodiment, an address mapping unit 2356 can be used to translate addresses in a unified address space into a distinct memory address that can be accessed by load/store units 2366.

In at least one embodiment, a register file 2358 provides a set of registers for functional units of a graphics multiprocessor 2334. In at least one embodiment, a register file 2358 provides temporary storage for operands connected to data paths of functional units (e.g., GPGPU cores 2362, load/store units 2366) of a graphics multiprocessor 2334. In at least one embodiment, a register file 2358 is divided between each of those functional units such that each functional unit is allocated a dedicated portion of a register file 2358. In at least one embodiment, a register file 2358 is divided between different warps being executed by a graphics multiprocessor 2334.

In at least one embodiment, GPGPU cores 2362 can each include floating point units (FPUs) and/or integer arithmetic logic units (ALUs) that are used to execute instructions of a graphics multiprocessor 2334. GPGPU cores 2362 can be similar in architecture or can differ in architecture. In at least one embodiment, a first portion of GPGPU cores 2362 includes a single precision FPU and an integer ALU while a second portion of GPGPU cores includes a double precision FPU. In at least one embodiment, FPUs can implement the IEEE 754-2008 standard for floating point arithmetic or enable variable precision floating point arithmetic. In at least one embodiment, a graphics multiprocessor 2334 can additionally include one or more fixed function or special function units to perform specific functions such as copy rectangle or pixel blending operations. In at least one embodiment one or more of GPGPU cores can also include fixed or special function logic.

In at least one embodiment, GPGPU cores 2362 include SIMD logic capable of performing a single instruction on multiple sets of data. In one embodiment GPGPU cores 2362 can physically execute SIMD4, SIMD8, and SIMD16 instructions and logically execute SIMD1, SIN4D2, and SIMND32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, a memory and cache interconnect 2368 is an interconnect network that connects each functional unit of a graphics multiprocessor 2334 to register file 2358 and to a shared memory 2370. In at least one embodiment, a memory and cache interconnect 2368 is a crossbar interconnect that allows a load/store unit 2366 to implement load and store operations between a shared memory 2370 and a register file 2358. In at least one embodiment, a register file 2358 can operate at a same frequency as GPGPU cores 2362, thus data transfer between GPGPU cores 2362 and a register file 2358 is very low latency. In at least one embodiment, a shared memory 2370 can be used to enable communication between threads that execute on functional units within a graphics multiprocessor 2334. In at least one embodiment, a cache memory 2372 can be used as a data cache for example, to cache texture data communicated between functional units and a texture unit 2336. In at least one embodiment, a shared memory 2370 can also be used as a program managed cache. In at least one embodiment, threads executing on GPGPU cores 2362 can programmatically store data within a shared memory in addition to automatically cached data that is stored within a cache memory 2372.

In at least one embodiment, a parallel processor or GPGPU as described herein is communicatively coupled to host/processor cores to accelerate graphics operations, machine-learning operations, pattern analysis operations, and various general-purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on same package or chip as cores and communicatively coupled to cores over an internal processor bus/interconnect (e.g., internal to a package or chip). In at least one embodiment, regardless of manner in which a GPU is connected, processor cores may allocate work to a GPU in form of sequences of commands/instructions contained in a work descriptor. In at least one embodiment, a GPU then uses dedicated circuitry/logic for efficiently processing these commands/instructions.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in a graphics multiprocessor 2334 for inferencing or predicting operations based, at least in part, on weight parameters calculated using neural network training operations, neural network functions and/or architectures, or neural network use cases described herein.

In at least one embodiment, a GPU-based scrambling/descrambling unit might be used to perform scrambling and/or descrambling as part of a communications process or system used with a system of FIG. 23A through 23D.

Figure 24:
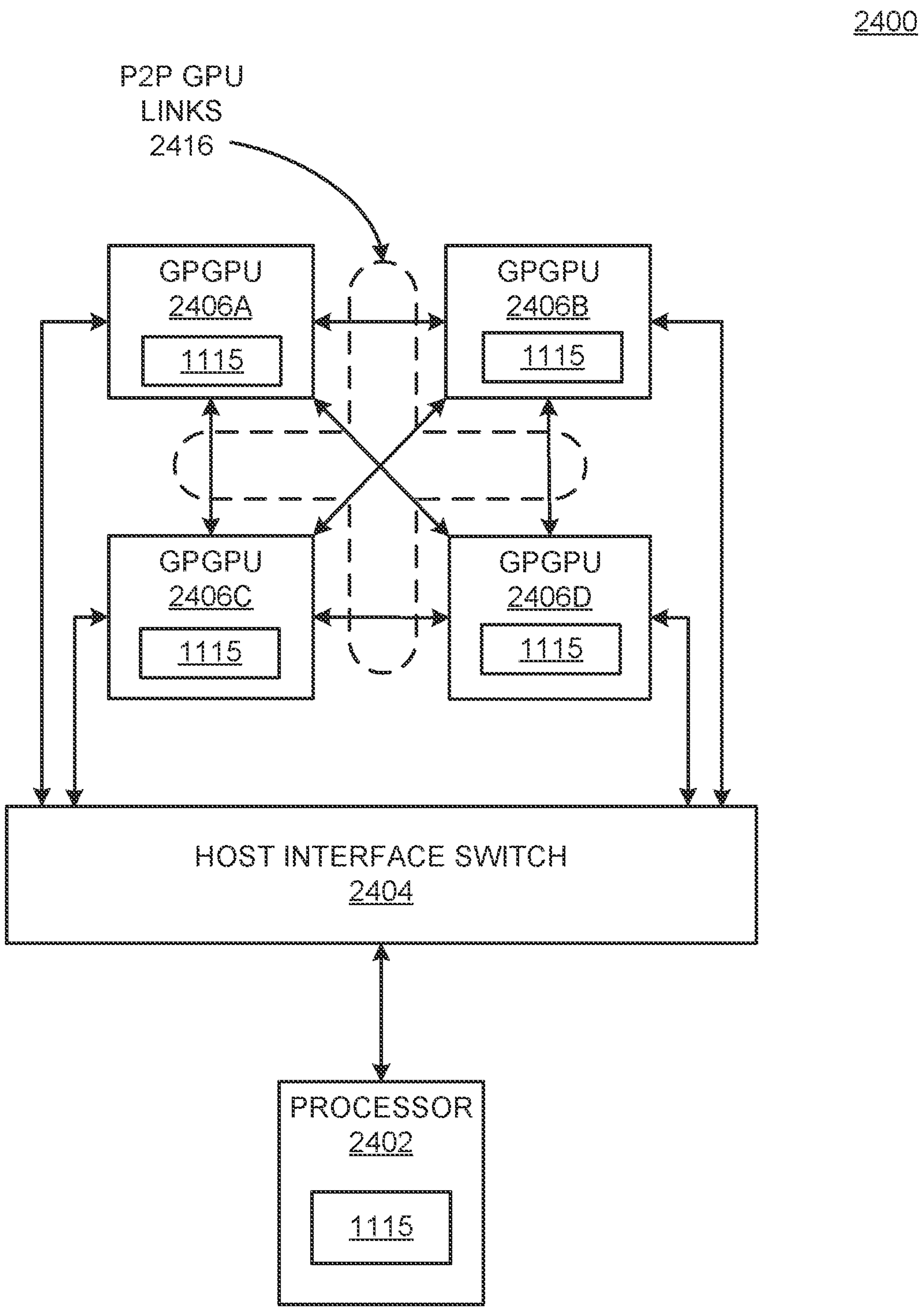
FIG. 24 illustrates a multi-graphics processing unit (GPU) system, according to at least one embodiment.

FIG. 24 illustrates a multi-GPU computing system 2400, according to at least one embodiment. In at least one embodiment, multi-GPU computing system 2400 can include a processor 2402 coupled to multiple general-purpose graphics processing units (GPGPUs) 2406A-D via a host interface switch 2404. In at least one embodiment, host interface switch 2404 is a PCI express switch device that couples processor 2402 to a PCI express bus over which processor 2402 can communicate with GPGPUs 2406A-D. In at least one embodiment, GPGPUs 2406A-D can interconnect via a set of high-speed point to point GPU to GPU links 2416. In at least one embodiment, GPU to GPU links 2416 connect to each of GPGPUs 2406A-D via a dedicated GPU link. In at least one embodiment, P2P GPU links 2416 enable direct communication between each of GPGPUs 2406A-D without requiring communication over host interface bus 2404 to which processor 2402 is connected. In at least one embodiment, with GPU-to-GPU traffic directed to P2P GPU links 2416, host interface bus 2404 remains available for system memory access or to communicate with other instances of multi-GPU computing system 2400, for example, via one or more network devices. In at least one embodiment, while in at least one embodiment GPGPUs 2406A-D connect to processor 2402 via host interface switch 2404, in at least one embodiment processor 2402 includes direct support for P2P GPU links 2416 and can connect directly to GPGPUs 2406A-D.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in multi-GPU computing system 2400 for inferencing or predicting operations based, at least in part, on weight parameters calculated using neural network training operations, neural network functions and/or architectures, or neural network use cases described herein.

In at least one embodiment, a GPU-based scrambling/descrambling unit might be used to perform scrambling and/or descrambling as part of a communications process or system used with a system of FIG. 24.

Figure 25:
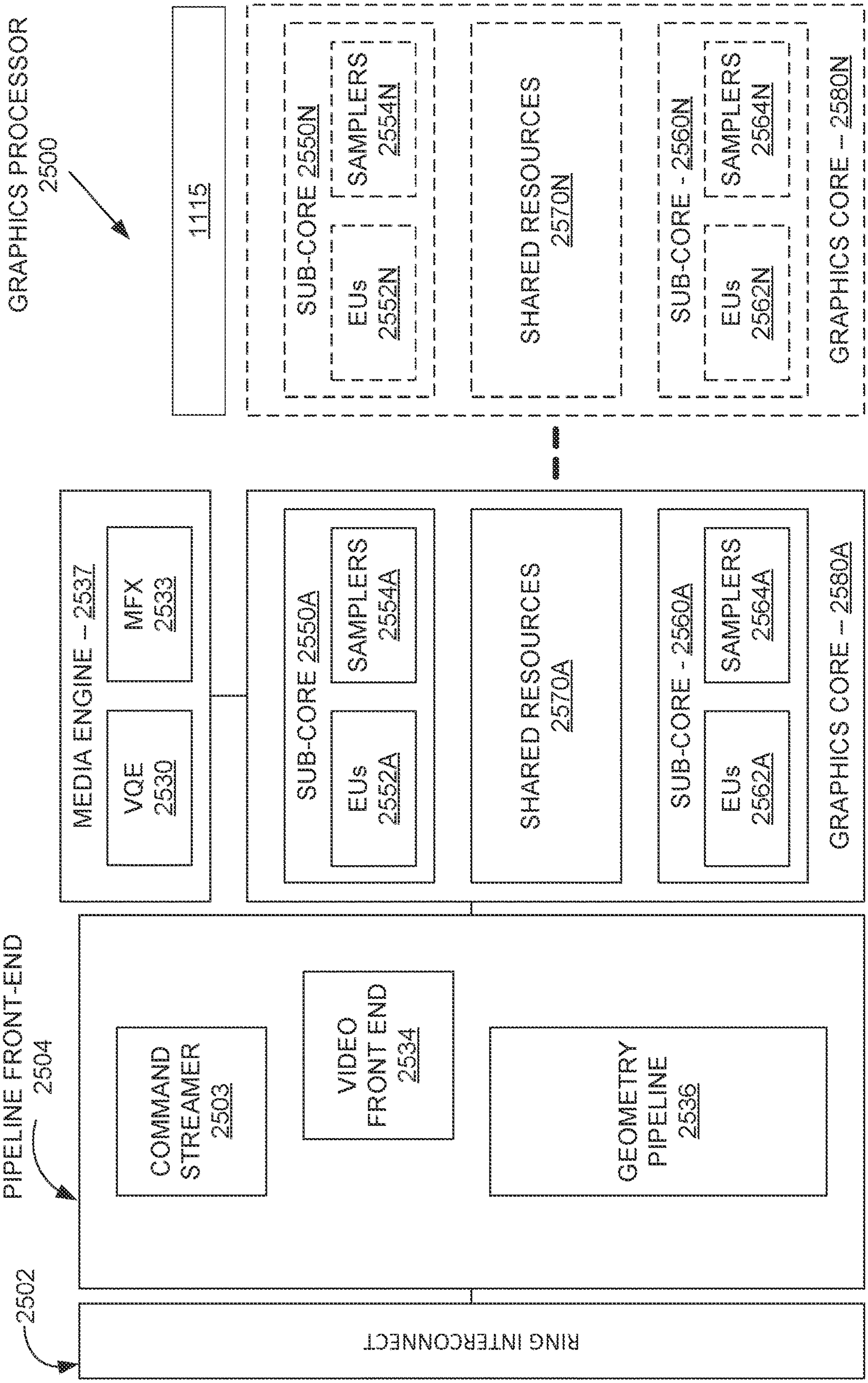
FIG. 25 illustrates a graphics processor, according to at least one embodiment.

FIG. 25 is a block diagram of a graphics processor 2500, according to at least one embodiment. In at least one embodiment, graphics processor 2500 includes a ring interconnect 2502, a pipeline front-end 2504, a media engine 2537, and graphics cores 2580A-2580N. In at least one embodiment, ring interconnect 2502 couples graphics processor 2500 to other processing units, including other graphics processors or one or more general-purpose processor cores. In at least one embodiment, graphics processor 2500 is one of many processors integrated within a multi-core processing system.

In at least one embodiment, graphics processor 2500 receives batches of commands via ring interconnect 2502. In at least one embodiment, incoming commands are interpreted by a command streamer 2503 in pipeline front-end 2504. In at least one embodiment, graphics processor 2500 includes scalable execution logic to perform 3D geometry processing and media processing via graphics core(s) 2580A-2580N. In at least one embodiment, for 3D geometry processing commands, command streamer 2503 supplies commands to geometry pipeline 2536. In at least one embodiment, for at least some media processing commands, command streamer 2503 supplies commands to a video front end 2534, which couples with a media engine 2537. In at least one embodiment, media engine 2537 includes a Video Quality Engine (VQE) 2530 for video and image post-processing and a multi-format encode/decode (MFX) 2533 engine to provide hardware-accelerated media data encode and decode. In at least one embodiment, geometry pipeline 2536 and media engine 2537 each generate execution threads for thread execution resources provided by at least one graphics core 2580A.

In at least one embodiment, graphics processor 2500 includes scalable thread execution resources featuring modular cores 2580A-2580N (sometimes referred to as core slices), each having multiple sub-cores 2550A-550N, 2560A-2560N (sometimes referred to as core sub-slices). In at least one embodiment, graphics processor 2500 can have any number of graphics cores 2580A through 2580N. In at least one embodiment, graphics processor 2500 includes a graphics core 2580A having at least a first sub-core 2550A and a second sub-core 2560A. In at least one embodiment, graphics processor 2500 is a low power processor with a single sub-core (e.g., 2550A). In at least one embodiment, graphics processor 2500 includes multiple graphics cores 2580A-2580N, each including a set of first sub-cores 2550A-2550N and a set of second sub-cores 2560A-2560N. In at least one embodiment, each sub-core in first sub-cores 2550A-2550N includes at least a first set of execution units 2552A-2552N and media/texture samplers 2554A-2554N. In at least one embodiment, each sub-core in second sub-cores 2560A-2560N includes at least a second set of execution units 2562A-2562N and samplers 2564A-2564N. In at least one embodiment, each sub-core 2550A-2550N, 2560A-2560N shares a set of shared resources 2570A-2570N. In at least one embodiment, shared resources include shared cache memory and pixel operation logic.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in graphics processor 2500 for inferencing or predicting operations based, at least in part, on weight parameters calculated using neural network training operations, neural network functions and/or architectures, or neural network use cases described herein.

In at least one embodiment, a GPU-based scrambling/descrambling unit might be used to perform scrambling and/or descrambling as part of a communications process or system used with a system of FIG. 25.

Figure 26:
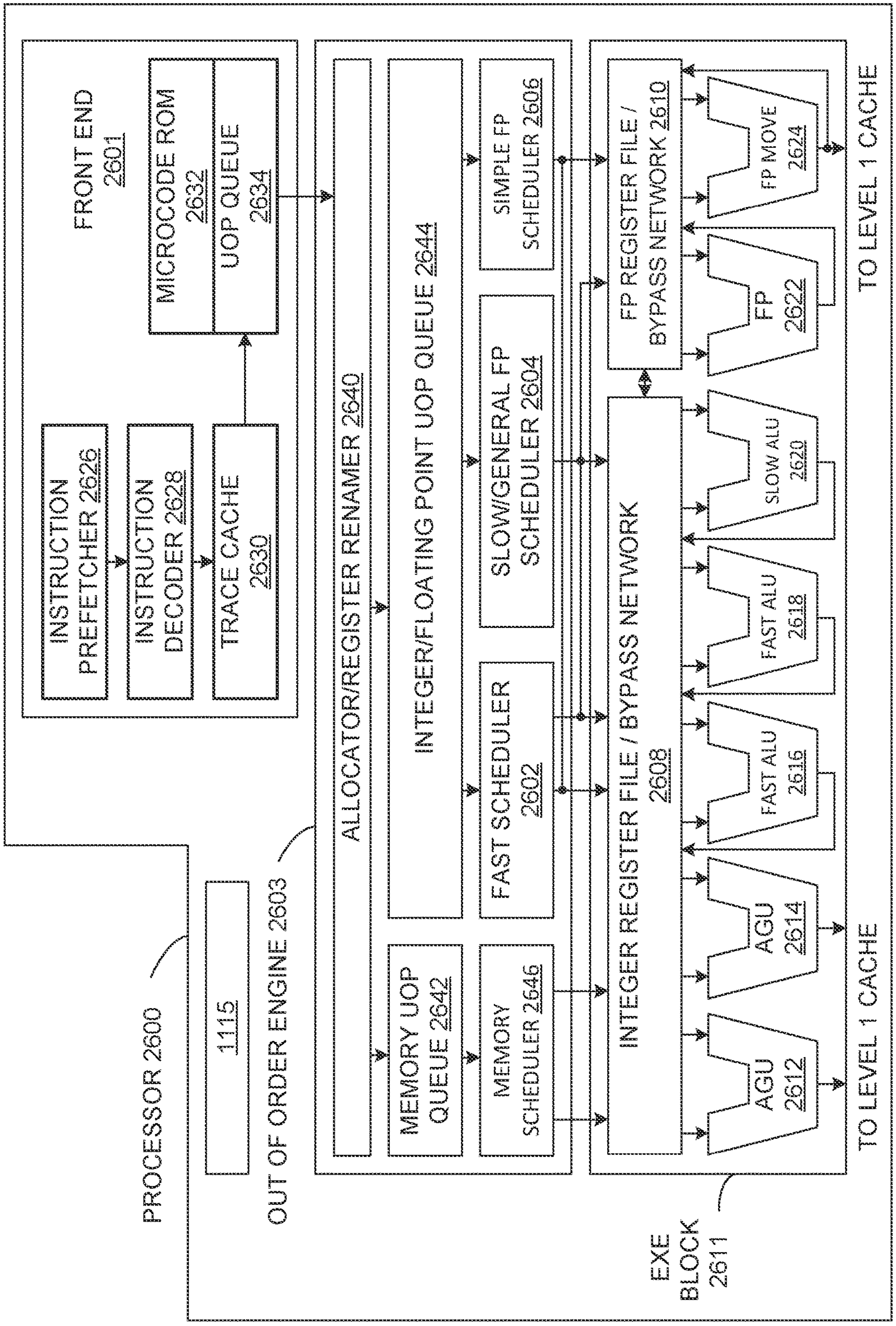
FIG. 26 is a block diagram illustrating a processor micro-architecture for a processor, according to at least one embodiment.

FIG. 26 is a block diagram illustrating micro-architecture for a processor 2600 that may include logic circuits to perform instructions, according to at least one embodiment. In at least one embodiment, a processor 2600 may perform instructions, including x86 instructions, ARM instructions, specialized instructions for application-specific integrated circuits (ASICs), etc. In at least one embodiment, a processor 2610 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 2610 may perform instructions to accelerate machine learning or deep learning algorithms, training, or inferencing.

In at least one embodiment, a processor 2600 includes an in-order front end ("front end") 2601 to fetch instructions to be executed and prepare instructions to be used later in a processor pipeline. In at least one embodiment, a front end 2601 may include several units. In at least one embodiment, an instruction prefetcher 2626 fetches instructions from memory and feeds instructions to an instruction decoder 2628 which in turn decodes or interprets instructions. For example, in at least one embodiment, an instruction decoder 2628 decodes a received instruction into one or more operations called "micro-instructions" or "micro-operations" (also called "micro ops" or "uops") that a machine may execute. In at least one embodiment, an instruction decoder 2628 parses instruction into an opcode and corresponding data and control fields that may be used by micro-architecture to perform operations in accordance with at least one embodiment. In at least one embodiment, a trace cache 2630 may assemble decoded uops into program ordered sequences or traces in a uop queue 2634 for execution. In at least one embodiment, when a trace cache 2630 encounters a complex instruction, a microcode ROM 2632 provides uops needed to complete operation.

In at least one embodiment, some instructions may be converted into a single micro-op, whereas others need several micro-ops to complete full operation. In at least one embodiment, if more than four micro-ops are needed to complete an instruction, an instruction decoder 2628 may access microcode ROM 2632 to perform an instruction. In at least one embodiment, an instruction may be decoded into a small number of micro-ops for processing an instruction decoder 2628. In at least one embodiment, an instruction may be stored within microcode ROM 2632 should a number of micro-ops be needed to accomplish an operation. In at least one embodiment, a trace cache 2630 refers to an entry point programmable logic array ("PLA") to determine a correct micro-instruction pointer for reading microcode sequences to complete one or more instructions from microcode ROM 2632 in accordance with at least one embodiment. In at least one embodiment, after a microcode ROM 2632 finishes sequencing micro-ops for an instruction, a front end 2601 of a machine may resume fetching micro-ops from a trace cache 2630.

In at least one embodiment, an out-of-order execution engine ("out of order engine") 2603 may prepare instructions for an execution. In at least one embodiment, an out-of-order execution logic has a number of buffers to smooth out and re-order flow of instructions to optimize performance as they go down pipeline and get scheduled for execution. In at least one embodiment, an out-of-order execution engine 2603 includes, without limitation, an allocator/register renamer 2640, a memory uop queue 2642, an integer/floating point uop queue 2644, a memory scheduler 2646, a fast scheduler 2602, a slow/general floating point scheduler ("slow/general FP scheduler") 2604, and a simple floating point scheduler ("simple FP scheduler") 2606. In at least one embodiment, a fast schedule 2602, a slow/general floating point scheduler 2604, and a simple floating point scheduler 2606 are also collectively referred to herein as "uop schedulers 2602, 2604, 2606." In at least one embodiment, an allocator/register renamer 2640 allocates machine buffers and resources that each uop needs in order to execute. In at least one embodiment, an allocator/register renamer 2640 renames logic registers onto entries in a register file. In at least one embodiment, an allocator/register renamer 2640 also allocates an entry for each uop in one of two uop queues, a memory uop queue 2642 for memory operations and an integer/floating point uop queue 2644 for non-memory operations, in front of a memory scheduler 2646 and uop schedulers 2602, 2604, 2606. In at least one embodiment, uop schedulers 2602, 2604, 2606, determine when a uop is ready to execute based on readiness of their dependent input register operand sources and availability of execution resources uops need to complete their operation. In at least one embodiment, a fast scheduler 2602 of at least one embodiment may schedule on each half of main clock cycle while a slow/general floating point scheduler 2604 and a simple floating point scheduler 2606 may schedule once per main processor clock cycle. In at least one embodiment, uop schedulers 2602, 2604, 2606 arbitrate for dispatch ports to schedule uops for execution.

In at least one embodiment, an execution block b11 includes, without limitation, an integer register file/bypass network 2608, a floating point register file/bypass network ("FP register file/bypass network") 2610, address generation units ("AGUs") 2612 and 2614, fast Arithmetic Logic Units (ALUs) ("fast ALUs") 2616 and 2618, a slow Arithmetic Logic Unit ("slow ALU") 2620, a floating point ALU ("FP") 2622, and a floating point move unit ("FP move") 2624. In at least one embodiment, an integer register file/bypass network 2608 and a floating point register file/bypass network 2610 are also referred to herein as "register files 2608, 2610." In at least one embodiment, AGUSs 2612 and 2614, fast ALUs 2616 and 2618, a slow ALU 2620, a floating point ALU 2622, and a floating point move unit 2624 are also referred to herein as "execution units 2612, 2614, 2616, 2618, 2620, 2622, and 2624." In at least one embodiment, an execution block b11 may include, without limitation, any number (including zero) and type of register files, bypass networks, address generation units, and execution units, in any combination.

In at least one embodiment, register files 2608, 2610 may be arranged between uop schedulers 2602, 2604, 2606, and execution units 2612, 2614, 2616, 2618, 2620, 2622, and 2624. In at least one embodiment, an integer register file/bypass network 2608 performs integer operations. In at least one embodiment, a floating point register file/bypass network 2610 performs floating point operations. In at least one embodiment, each of register files 2608, 2610 may include, without limitation, a bypass network that may bypass or forward just completed results that have not yet been written into register file to new dependent uops. In at least one embodiment, register files 2608, 2610 may communicate data with each other. In at least one embodiment, integer register file/bypass network 2608 may include, without limitation, two separate register files, one register file for low-order thirty-two bits of data and a second register file for high order thirty-two bits of data. In at least one embodiment, a floating point register file/bypass network 2610 may include, without limitation, 128-bit wide entries because floating point instructions typically have operands from 64 to 128 bits in width.

In at least one embodiment, execution units 2612, 2614, 2616, 2618, 2620, 2622, 2624 may execute instructions. In at least one embodiment, register files 2608, 2610 store integer and floating point data operand values that micro-instructions need to execute. In at least one embodiment, a processor 2600 may include, without limitation, any number and combination of execution units 2612, 2614, 2616, 2618, 2620, 2622, 2624. In at least one embodiment, a floating point ALU 2622 and a floating point move unit 2624, may execute a floating point, MMX, SIMD, AVX and SSE, or other operations, including specialized machine learning instructions. In at least one embodiment, a floating point ALU 2622 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 2616, 2618. In at least one embodiment, fast ALUS 2616, 2618 may execute fast operations with an effective latency of half a clock cycle. In at least one embodiment, most complex integer operations go to a slow ALU 2620 as a slow ALU 2620 may include, without limitation, integer execution hardware for a long-latency type of operations, such as a multiplier, shifts, flag logic, and branch processing. In at least one embodiment, memory load/store operations may be executed by AGUS 2612, 2614. In at least one embodiment, a fast ALU 2616, a fast ALU 2618, and a slow ALU 2620 may perform integer operations on 64-bit data operands. In at least one embodiment, a fast ALU 2616, a fast ALU 2618, and a slow ALU 2620 may be implemented to support a variety of data bit sizes including sixteen, thirty-two, 128, 256, etc. In at least one embodiment, a floating point ALU 2622 and a floating point move unit 2624 may be implemented to support a range of operands having bits of various widths. In at least one embodiment, a floating point ALU 2622 and a floating point move unit 2624 may operate on 128-bit wide packed data operands in conjunction with SIMD and multimedia instructions.

In at least one embodiment, uop schedulers 2602, 2604, 2606, dispatch dependent operations before a parent load has finished executing. In at least one embodiment, as uops may be speculatively scheduled and executed in a processor 2600, a processor 2600 may also include logic to handle memory misses. In at least one embodiment, if a data load misses in data cache, there may be dependent operations in flight in pipeline that have left scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and a replay mechanism of at least one embodiment of a processor may also be designed to catch instruction sequences for text string comparison operations.

In at least one embodiment, "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment portions or all of inference and/or training logic 1115 may be incorporated into an EXE Block 2611 and other memory or registers shown or not shown. For example, in at least one embodiment, training and/or inferencing techniques described herein may use one or more of ALUs illustrated in EXE Block 2611. Moreover, weight parameters may be stored in an on-chip or off-chip memory and/or registers (shown or not shown) that configure ALUs of an EXE Block 2611 to perform one or more machine learning algorithms, neural network architectures, use cases, or training techniques described herein.

In at least one embodiment, a GPU-based scrambling/descrambling unit might be used to perform scrambling and/or descrambling as part of a communications process or system used with a system of FIG. 26.

Figure 27:
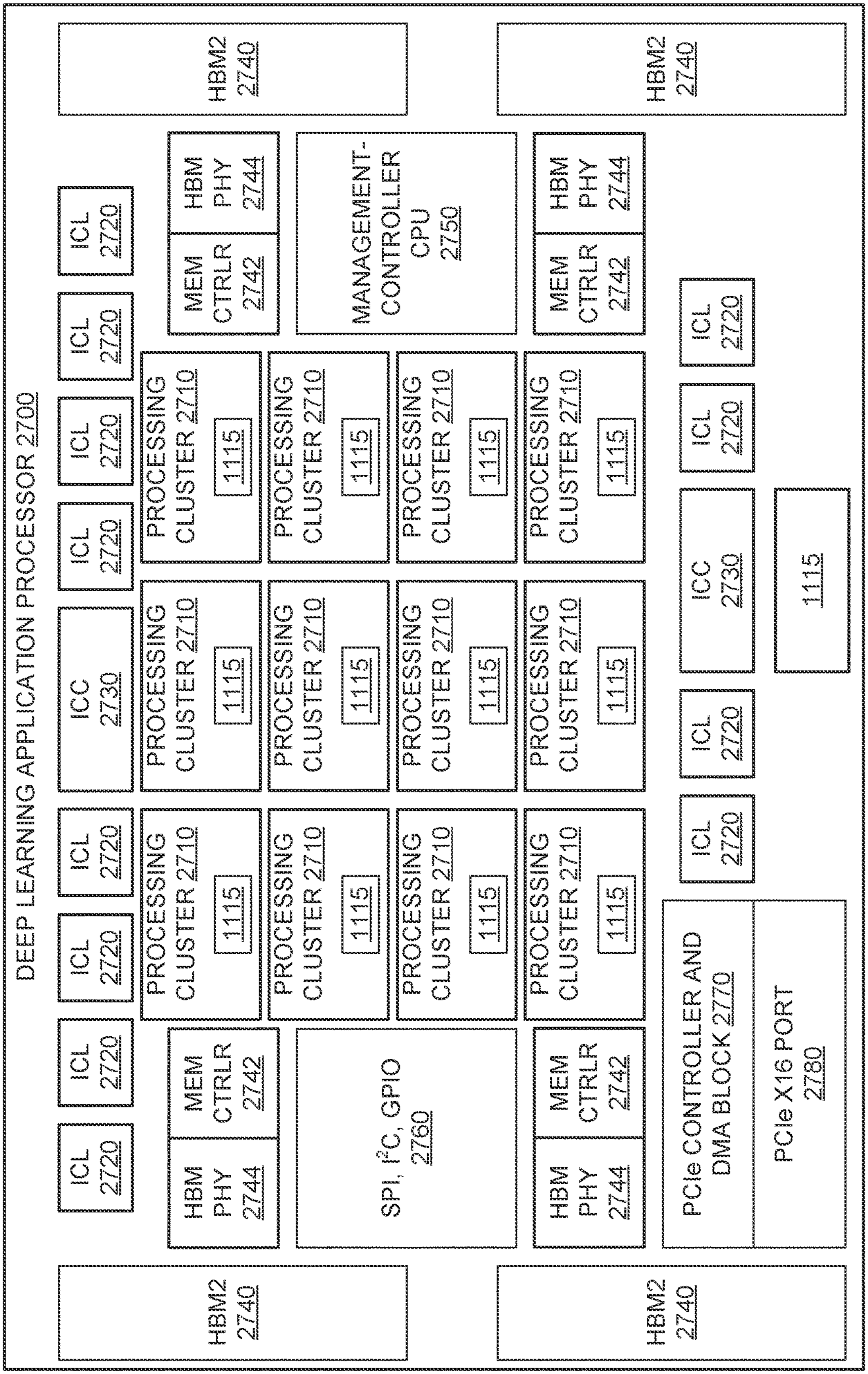
FIG. 27 illustrates a deep learning application processor, according to at least one embodiment.

FIG. 27 illustrates a deep learning application processor 2700, according to at least one embodiment. In at least one embodiment, a deep learning application processor 2700 uses instructions that, if executed by a deep learning application processor 2700, cause a deep learning application processor 2700 to perform some or all of processes and techniques described throughout this disclosure. In at least one embodiment, a deep learning application processor 2700 is an application-specific integrated circuit (ASIC). In at least one embodiment, an application processor 2700 performs matrix multiply operations either "hard-wired" into hardware as a result of performing one or more instructions or both. In at least one embodiment, a deep learning application processor 2700 includes, without limitation, processing clusters 2710(1)-2710(12), Inter-Chip Links ("ICLs") 2720(1)-2720(12), Inter-Chip Controllers ("ICCs") 2730(1)-2730(2), high bandwidth memory second generation ("HBM2") 2740(1)-2740(4), memory controllers ("Mem Ctrlrs") 2742(1)-2742(4), a high bandwidth memory physical layer ("HBM PHY") 2744(1)-2744(4), a management-controller central processing unit ("management-controller CPU") 2750, a Serial Peripheral Interface, Inter-Integrated Circuit, and General Purpose Input/Output block ("SPI, I2C, GPIO") 2760, a peripheral component interconnect express controller and direct memory access block ("PCIe Controller and DMA") 2770, and a sixteen-lane peripheral component interconnect express port ("PCI Express×16") 2780.

In at least one embodiment, processing clusters 2710 may perform deep learning operations, including inference or prediction operations based on weight parameters calculated based at least in part on one or more training techniques, including those described herein. In at least one embodiment, each processing cluster 2710 may include, without limitation, any number and type of processors. In at least one embodiment, a deep learning application processor 2700 may include any number and type of processing clusters 2700. In at least one embodiment, Inter-Chip Links 2720 are bi-directional. In at least one embodiment, Inter-Chip Links 2720 and Inter-Chip Controllers 2730 enable multiple deep learning application processors 2700 to exchange information, including activation information resulting from performing one or more machine learning algorithms embodied in one or more neural networks. In at least one embodiment, a deep learning application processor 2700 may include any number (including zero) and type of ICLs 2720 and ICCs 2730.

In at least one embodiment, HBM2s 2740 provide a total of 32 Gigabytes (GB) of memory. In at least one embodiment, an HBM2 2740(*i*) is associated with both a memory controller 2742(*i*) and an HBM PHY 2744(*i*). In at least one embodiment, any number of HBM2s 2740 may provide any type and total amount of high bandwidth memory and may be associated with any number (including zero) and type of memory controllers 2742 and HBM PHYs 2744. In at least one embodiment, an SPI, I2C, GPIO 2760, PCIe Controller and DMA 2770, and/or a PCIe 2780 may be replaced with any number and type of blocks that enable any number and type of communication standards in any technically feasible fashion.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, a deep learning application processor is used to train a machine learning model, such as a neural network, to predict or infer information provided to a deep learning application processor 2700. In at least one embodiment, a deep learning application processor 2700 is used to infer or predict information based on a trained machine learning model (e.g., neural network) that has been trained by another processor or system or by a deep learning application processor 2700. In at least one embodiment, a processor 2700 may be used to perform one or more neural network use cases described herein.

Figure 28:
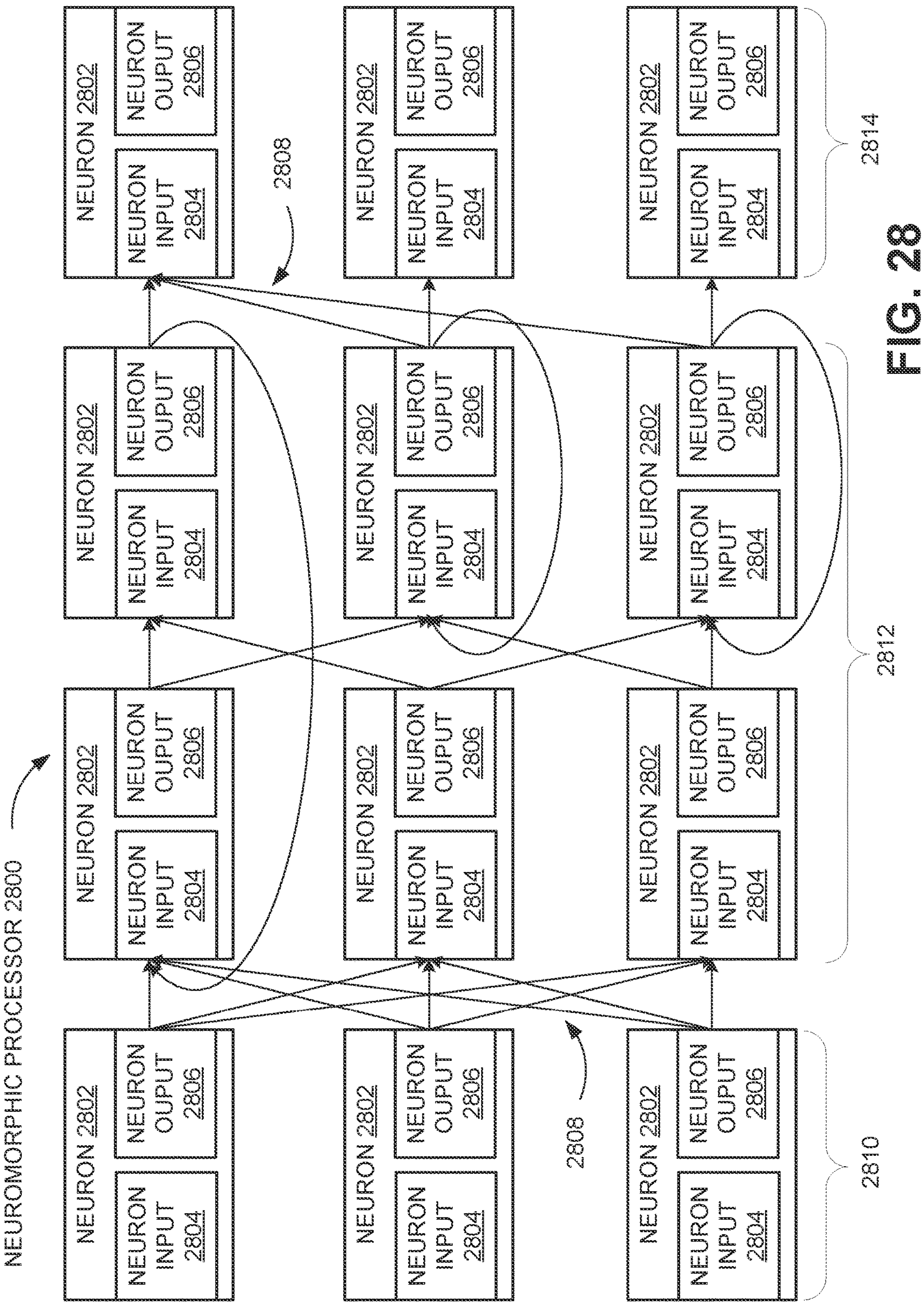
FIG. 28 is a block diagram illustrating an example neuromorphic processor, according to at least one embodiment.

FIG. 28 is a block diagram of a neuromorphic processor 2800, according to at least one embodiment. In at least one embodiment, a neuromorphic processor 2800 may receive one or more inputs from sources external to a neuromorphic processor 2800. In at least one embodiment, these inputs may be transmitted to one or more neurons 2802 within a neuromorphic processor 2800. In at least one embodiment, neurons 2802 and components thereof may be implemented using circuitry or logic, including one or more arithmetic logic units (ALUs). In at least one embodiment, a neuromorphic processor 2800 may include, without limitation, thousands or millions of instances of neurons 2802, but any suitable number of neurons 2802 may be used. In at least one embodiment, each instance of a neuron 2802 may include a neuron input 2804 and a neuron output 2806. In at least one embodiment, neurons 2802 may generate outputs that may be transmitted to inputs of other instances of neurons 2802. For example, in at least one embodiment, neuron inputs 2804 and neuron outputs 2806 may be interconnected via synapses 2808.

In at least one embodiment, neurons 2802 and synapses 2808 may be interconnected such that a neuromorphic processor 2800 operates to process or analyze information received by a neuromorphic processor 2800. In at least one embodiment, neurons 2802 may transmit an output pulse (or "fire" or "spike") when inputs received through a neuron input 2804 exceed a threshold. In at least one embodiment, neurons 2802 may sum or integrate signals received at neuron inputs 2804. For example, in at least one embodiment, neurons 2802 may be implemented as leaky integrate-and-fire neurons, wherein if a sum (referred to as a "membrane potential") exceeds a threshold value, a neuron 2802 may generate an output (or "fire") using a transfer function such as a sigmoid or threshold function. In at least one embodiment, a leaky integrate-and-fire neuron may sum signals received at neuron inputs 2804 into a membrane potential and may also apply a decay factor (or leak) to reduce a membrane potential. In at least one embodiment, a leaky integrate-and-fire neuron may fire if multiple input signals are received at neuron inputs 2804 rapidly enough to exceed a threshold value (e.g., before a membrane potential decays too low to fire). In at least one embodiment, neurons 2802 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 2802 may include, without limitation, comparator circuits or logic that generate an output spike at neuron output 2806 when result of applying a transfer function to neuron input 2804 exceeds a threshold. In at least one embodiment, once a neuron 2802 fires, it may disregard previously received input information by, for example, resetting a membrane potential to 0 or another suitable default value. In at least one embodiment, once a membrane potential is reset to 0, a neuron 2802 may resume normal operation after a suitable period of time (or a refractory period).

In at least one embodiment, neurons 2802 may be interconnected through synapses 2808. In at least one embodiment, synapses 2808 may operate to transmit signals from an output of a first neuron 2802 to an input of a second neuron 2802. In at least one embodiment, neurons 2802 may transmit information over more than one instance of a synapse 2808. In at least one embodiment, one or more instances of neuron output 2806 may be connected, via an instance of a synapse 2808, to an instance of neuron input 2804 in same neuron 2802. In at least one embodiment, an instance of neuron 2802 generating an output to be transmitted over an instance of a synapse 2808 may be referred to as a "pre-synaptic neuron" with respect to that instance of a synapse 2808. In at least one embodiment, an instance of a neuron 2802 receiving an input transmitted over an instance of a synapse 2808 may be referred to as a "post-synaptic neuron" with respect to that instance of a synapse 2808. Because an instance of a neuron 2802 may receive inputs from one or more instances of a synapse 2808, and may also transmit outputs over one or more instances of a synapse 2808, a single instance of a neuron 2802 may therefore be both a "pre-synaptic neuron" and "post-synaptic neuron," with respect to various instances of synapses 2808, in at least one embodiment.

In at least one embodiment, neurons 2802 may be organized into one or more layers. In at least one embodiment, each instance of a neuron 2802 may have one neuron output 2806 that may fan out through one or more synapses 2808 to one or more neuron inputs 2804. In at least one embodiment, neuron outputs 2806 of neurons 2802 in a first layer 2810 may be connected to neuron inputs 2804 of neurons 2802 in a second layer 2812. In at least one embodiment, a layer 2810 may be referred to as a "feed-forward layer." In at least one embodiment, each instance of a neuron 2802 in an instance of a first layer 2810 may fan out to each instance of a neuron 2802 in a second layer 2812. In at least one embodiment, a first layer 2810 may be referred to as a "fully connected feed-forward layer." In at least one embodiment, each instance of a neuron 2802 in an instance of a second layer 2812 may fan out to fewer than all instances of neuron 2802 in a third layer 2814. In at least one embodiment, a second layer 2812 may be referred to as a "sparsely connected feed-forward layer." In at least one embodiment, neurons 2802 in a second layer 2812 may fan out to neurons 2802 in multiple other layers, including to neurons 2802 in (same) second layer 2812. In at least one embodiment, a second layer 2812 may be referred to as a "recurrent layer." In at least one embodiment, a neuromorphic processor 2800 may include, without limitation, any suitable combination of recurrent layers and feed-forward layers, including, without limitation, both sparsely connected feed-forward layers and fully connected feed-forward layers.

In at least one embodiment, a neuromorphic processor 2800 may include, without limitation, a reconfigurable interconnect architecture or dedicated hard wired interconnects to connect synapse 2808 to neurons 2802. In at least one embodiment, a neuromorphic processor 2800 may include, without limitation, circuitry or logic that allows synapses to be allocated to different neurons 2802 as needed based on neural network topology and neuron fan-in/out. For example, in at least one embodiment, synapses 2808 may be connected to neurons 2802 using an interconnect fabric, such as network-on-chip, or with dedicated connections. In at least one embodiment, synapse interconnections and components thereof may be implemented using circuitry or logic.

Figure 29:
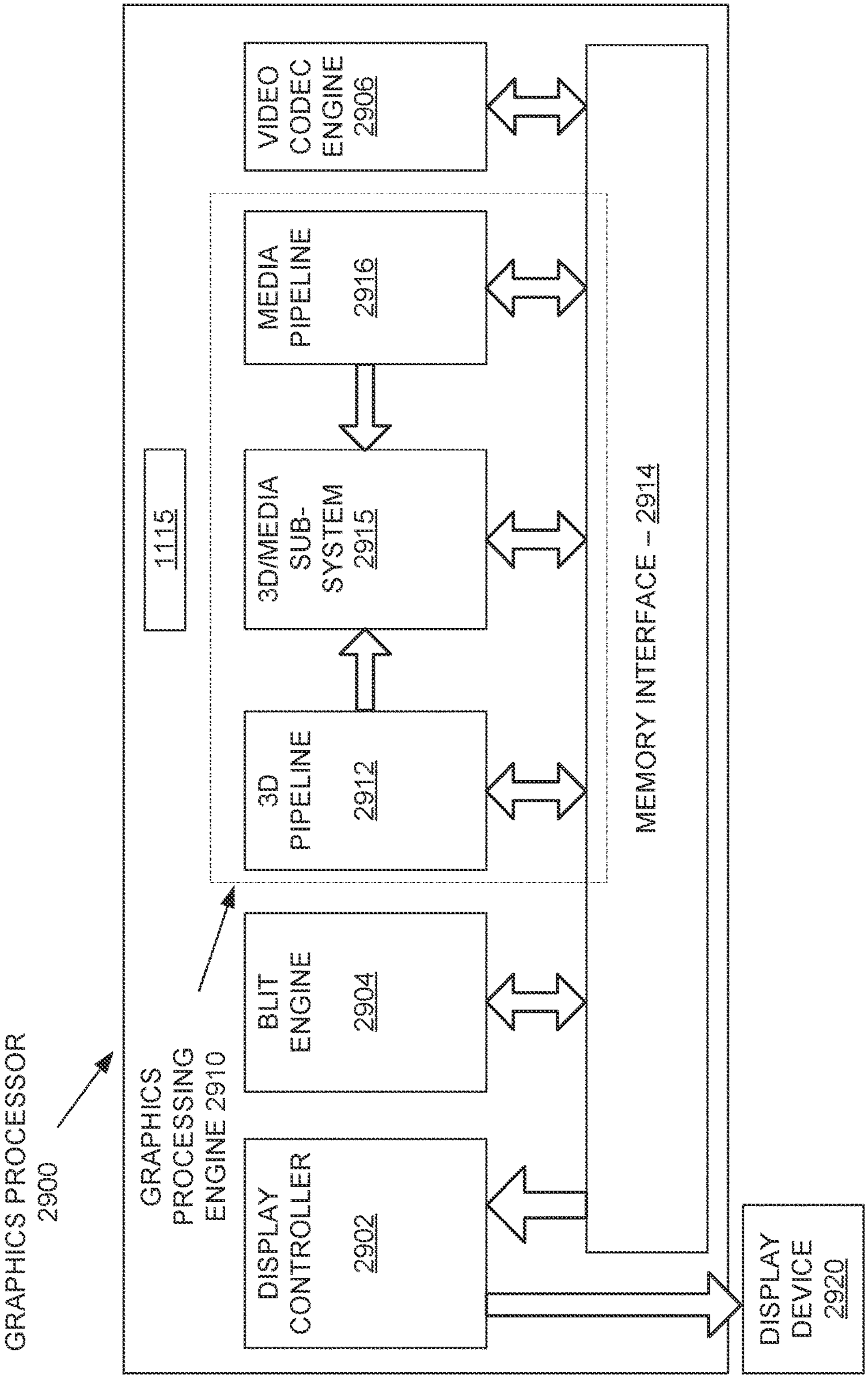
FIGS. 29 and 30 illustrate at least portions of a graphics processor, according to at least one embodiment.

FIG. 29 is a block diagram of a graphics processor 2900, which may be a discrete graphics processing unit, or may be a graphics processor integrated with a plurality of processing cores. In at least one embodiment, a graphics processor 2900 communicates via a memory mapped I/O interface to registers on a graphics processor 2900 and with commands placed into memory. In at least one embodiment, a graphics processor 2900 includes a memory interface 2914 to access memory. In at least one embodiment, a memory interface 2914 is an interface to local memory, one or more internal caches, one or more shared external caches, and/or to system memory.

In at least one embodiment, a graphics processor 2900 also includes a display controller 2902 to drive display output data to a display device 2920. In at least one embodiment, a display controller 2902 includes hardware for one or more overlay planes for a display device 2920 and a composition of multiple layers of video or user interface elements. In at least one embodiment, a display device 2920 can be an internal or external display device. In at least one embodiment, a display device 2920 is a head mounted display device, such as a virtual reality (VR) display device or an augmented reality (AR) display device. In at least one embodiment, a graphics processor 2900 includes a video codec engine 2906 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In at least one embodiment, a graphics processor 2900 includes a block image transfer (BLIT) engine 2904 to perform two-dimensional (2D) rasterizer operations including, for example, bit-boundary block transfers. However, in at least one embodiment, 2D graphics operations are performed using one or more components of a graphics processing engine (GPE) 2910. In at least one embodiment, GPE 2910 is a compute engine for performing graphics operations, including three-dimensional (3D) graphics operations and media operations.

In at least one embodiment, a GPE 2910 includes a 3D pipeline 2912 for performing 3D operations, such as rendering three-dimensional images and scenes using processing functions that act upon 3D primitive shapes (e.g., rectangle, triangle, etc.). In at least one embodiment, a 3D pipeline 2912 includes programmable and fixed function elements that perform various tasks and/or spawn execution threads to a 3D/Media sub-system 2915. While a 3D pipeline 2912 can be used to perform media operations, in at least one embodiment, a GPE 2910 also includes a media pipeline 2916 that is used to perform media operations, such as video post-processing and image enhancement.

In at least one embodiment, a media pipeline 2916 includes fixed function or programmable logic units to perform one or more specialized media operations, such as video decode acceleration, video de-interlacing, and video encode acceleration in place of, or on behalf of a video codec engine 2906. In at least one embodiment, a media pipeline 2916 additionally includes a thread spawning unit to spawn threads for execution on 3D/Media sub-system 2915. In at least one embodiment, spawned threads perform computations for media operations on one or more graphics execution units included in 3D/Media sub-system 2915.

In at least one embodiment, a 3D/Media subsystem 2915 includes logic for executing threads spawned by a 3D pipeline 2912 and a media pipeline 2916. In at least one embodiment, a 3D pipeline 2912 and a media pipeline 2916 send thread execution requests to a 3D/Media subsystem 2915, which includes thread dispatch logic for arbitrating and dispatching various requests to available thread execution resources. In at least one embodiment, execution resources include an array of graphics execution units to process 3D and media threads. In at least one embodiment, a 3D/Media subsystem 2915 includes one or more internal caches for thread instructions and data. In at least one embodiment, a subsystem 2915 also includes a shared memory, including registers and addressable memory, to share data between threads and to store output data.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment portions or all of inference and/or training logic 1115 may be incorporated into graphics processor 2900. For example, in at least one embodiment, training and/or inferencing techniques described herein may use one or more of ALUs embodied in 3D pipeline 2912. Moreover, in at least one embodiment, inferencing and/or training operations described herein may be done using logic other than logic illustrated in FIG. 11A or 11B. In at least one embodiment, weight parameters may be stored in on-chip or off-chip memory and/or registers (shown or not shown) that configure ALUs of a graphics processor 2900 to perform one or more machine learning algorithms, neural network architectures, use cases, or training techniques described herein.

Figure 30:
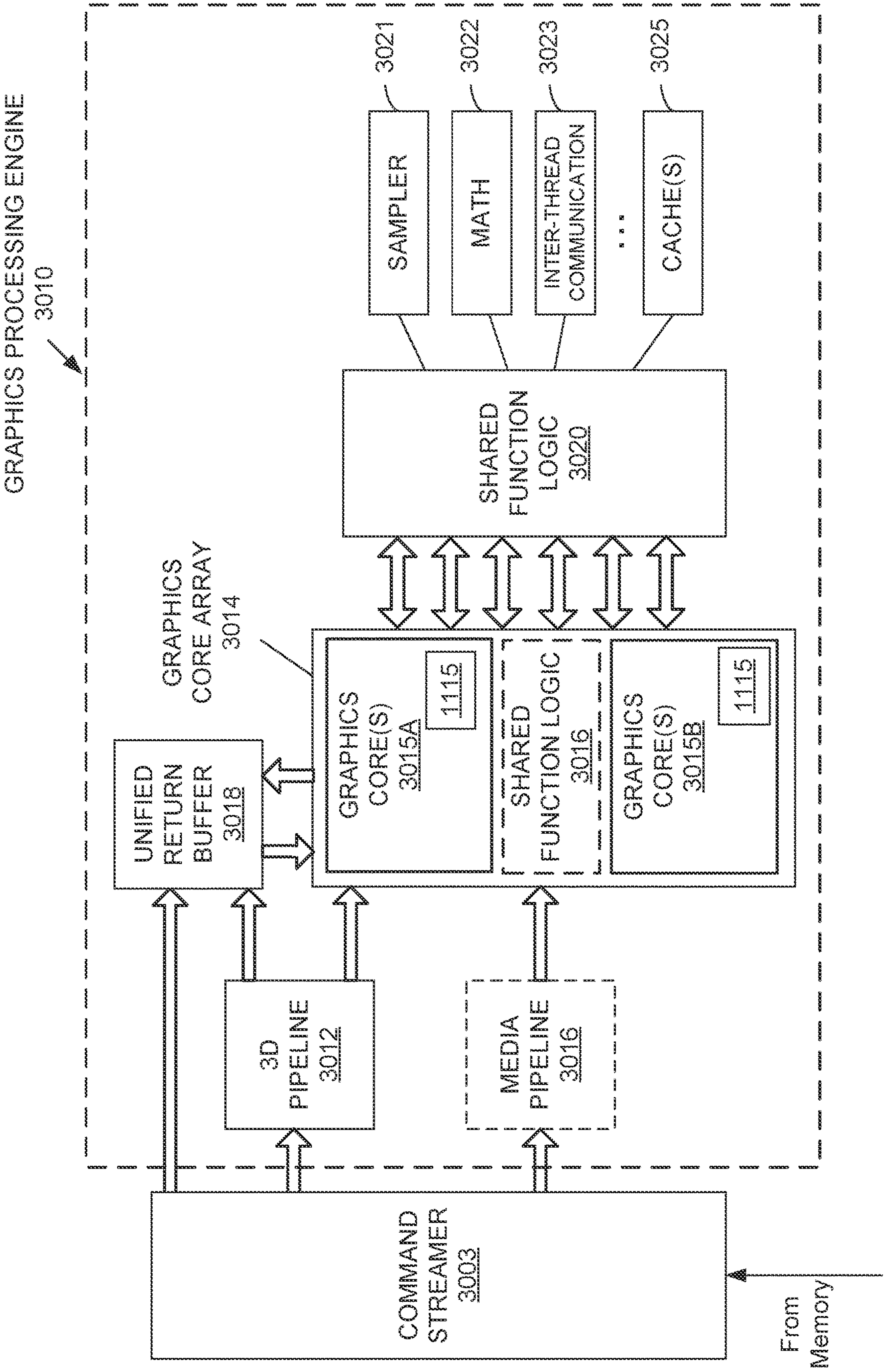

FIG. 30 is a block diagram of a graphics processing engine 3010 of a graphics processor in accordance with at least one embodiment. In at least one embodiment, a graphics processing engine (GPE) 3010 is a version of GPE 2910 shown in FIG. 29. In at least one embodiment, a media pipeline 2916 might not be explicitly included within GPE 3010. In at least one embodiment, a separate media and/or image processor is coupled to a GPE 3010.

In at least one embodiment, a GPE 3010 is coupled to or includes a command streamer 3003, which provides a command stream to a 3D pipeline 2912 and/or media pipelines 2916. In at least one embodiment, a command streamer 3003 is coupled to memory, which can be system memory, or one or more of internal cache memory and shared cache memory. In at least one embodiment, a command streamer 3003 receives commands from memory and sends commands to a 3D pipeline 2912 and/or media pipeline 2916. In at least one embodiment, commands are instructions, primitives, or micro-operations fetched from a ring buffer, which stores commands for a 3D pipeline 2912 and media pipeline 2916. In at least one embodiment, a ring buffer can additionally include batch command buffers storing batches of multiple commands. In at least one embodiment, commands for a 3D pipeline 2912 can also include references to data stored in memory, such as but not limited to vertex and geometry data for 3D pipeline 2912 and/or image data and memory objects for media pipeline 2916. In at least one embodiment, a 3D pipeline 2912 and media pipeline 2916 process commands and data by performing operations or by dispatching one or more execution threads to a graphics core array 3014. In at least one embodiment a graphics core array 3014 includes one or more blocks of graphics cores (e.g., graphics core(s) 3015A, graphics core(s) 3015B), each block including one or more graphics cores. In at least one embodiment, each graphics core includes a set of graphics execution resources that includes general-purpose and graphics specific execution logic to perform graphics and compute operations, as well as fixed function texture processing and/or machine learning and artificial intelligence acceleration logic, including inference and/or training logic 1115 in FIG. 11A and FIG. 11B.

In at least one embodiment, a 3D pipeline 2912 includes fixed function and programmable logic to process one or more shader programs, such as vertex shaders, geometry shaders, pixel shaders, fragment shaders, compute shaders, or other shader programs, by processing instructions and dispatching execution threads to a graphics core array 3014. In at least one embodiment, a graphics core array 3014 provides a unified block of execution resources for use in processing shader programs. In at least one embodiment, multi-purpose execution logic (e.g., execution units) within graphics core(s) 3015A-3015B of a graphic core array 3014 includes support for various 3D API shader languages and can execute multiple simultaneous execution threads associated with multiple shaders.

In at least one embodiment, a graphics core array 3014 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on a graphics core array 3014 can output data to a memory in a unified return buffer (URB) 3018. In at least one embodiment, a URB 3018 can store data for multiple threads. In at least one embodiment, a URB 3018 may be used to send data between different threads executing on a graphics core array 3014. In at least one embodiment, a URB 3018 may additionally be used for synchronization between threads on graphics core array 3014 and fixed function logic within shared function logic 3020.

In at least one embodiment, a graphics core array 3014 is scalable, such that a graphics core array 3014 includes a variable number of graphics cores, each having a variable number of execution units based on a target power and performance level of a GPE 3010. In at least one embodiment, execution resources are dynamically scalable, such that execution resources may be enabled or disabled as needed.

In at least one embodiment, a graphics core array 3014 is coupled to shared function logic 3020 that includes multiple resources that are shared between graphics cores in a graphics core array 3014. In at least one embodiment, shared functions performed by shared function logic 3020 are embodied in hardware logic units that provide specialized supplemental functionality to a graphics core array 3014. In at least one embodiment, shared function logic 3020 includes but is not limited to sampler 3021, math 3022, and inter-thread communication (ITC) 3023 logic. In at least one embodiment, one or more cache(s) 3025 are in included in, or couple to, shared function logic 3020.

In at least one embodiment, a shared function is used if demand for a specialized function is insufficient for inclusion within a graphics core array 3014. In at least one embodiment, a single instantiation of a specialized function is used in shared function logic 3020 and shared among other execution resources within graphics core array 3014. In at least one embodiment, specific shared functions within shared function logic 3020 that are used extensively by a graphics core array 3014 may be included within shared function logic 3016 within a graphics core array 3014. In at least one embodiment, shared function logic 3016 within a graphics core array 3014 can include some or all logic within shared function logic 3020. In at least one embodiment, all logic elements within shared function logic 3020 may be duplicated within shared function logic 3016 of a graphics core array 3014. In at least one embodiment, shared function logic 3020 is excluded in favor of shared function logic 3016 within a graphics core array 3014.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment portions or all of inference and/or training logic 1115 may be incorporated into graphics processor 3010. For example, in at least one embodiment, training and/or inferencing techniques described herein may use one or more of ALUs embodied in a 3D pipeline 2912, graphics core(s) 3015A, shared function logic 3016, graphics core(s) 3015B, shared function logic 3020, or other logic in FIG. 30. Moreover, in at least one embodiment, inferencing and/or training operations described herein may be done using logic other than logic illustrated in FIG. 11A or 11B. In at least one embodiment, weight parameters may be stored in on-chip or off-chip memory and/or registers (shown or not shown) that configure ALUs of a graphics processor 3010 to perform one or more machine learning algorithms, neural network architectures, use cases, or training techniques described herein.

In at least one embodiment, a GPU-based scrambling/descrambling unit might be used to perform scrambling and/or descrambling as part of a communications process or system used with a system of FIG. 30.

Figure 31:
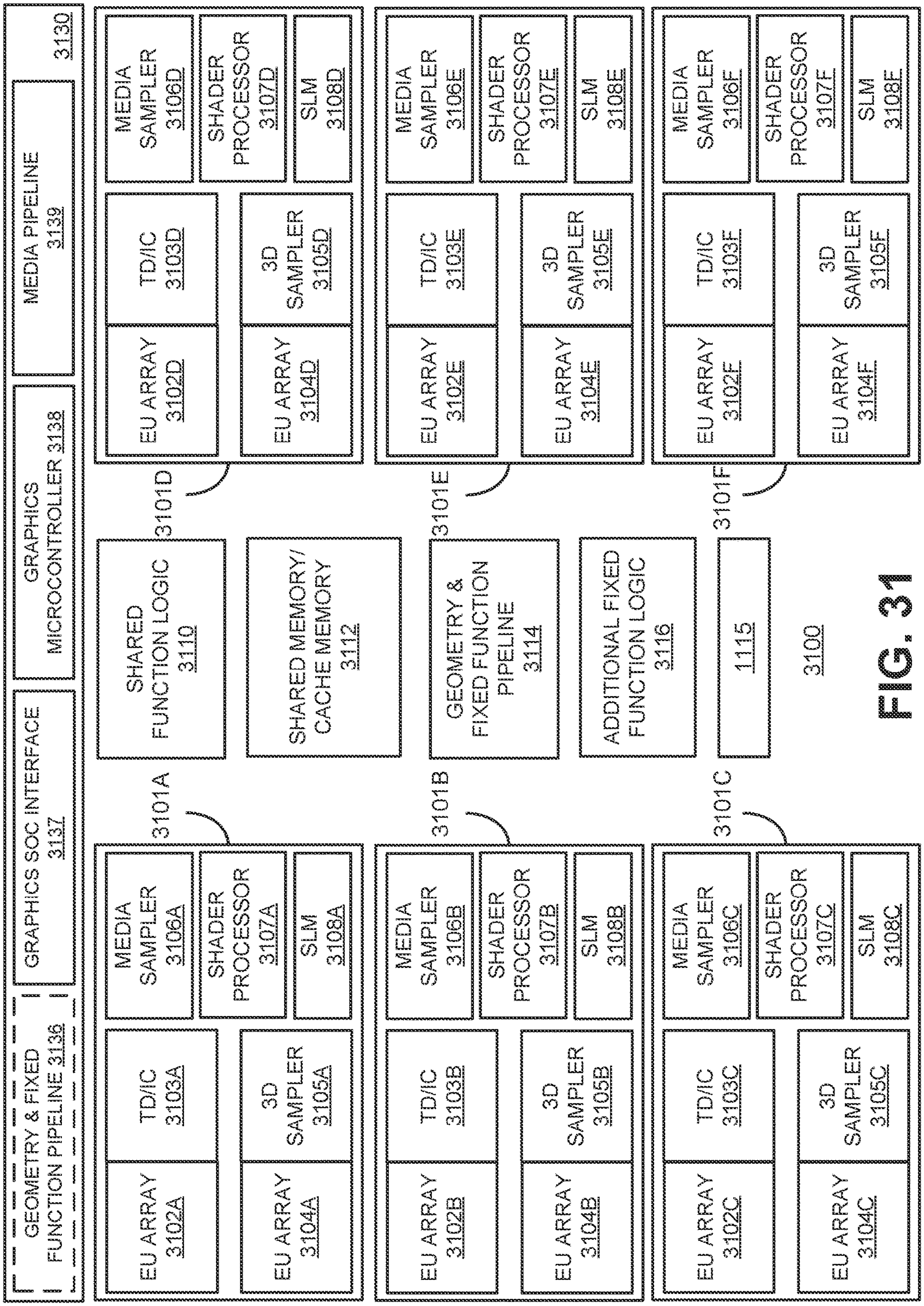
FIG. 31 is a block diagram of at least portions of a graphics processor core, according to at least one embodiment.

FIG. 31 is a block diagram of hardware logic of a graphics processor core 3100, according to at least one embodiment described herein. In at least one embodiment, a graphics processor core 3100 is included within a graphics core array. In at least one embodiment, a graphics processor core 3100, sometimes referred to as a core slice, can be one or multiple graphics cores within a modular graphics processor. In at least one embodiment, a graphics processor core 3100 is exemplary of one graphics core slice, and a graphics processor as described herein may include multiple graphics core slices based on target power and performance envelopes. In at least one embodiment, each graphics core 3100 can include a fixed function block 3130 coupled with multiple sub-cores 3101A-3101F, also referred to as sub-slices, that include modular blocks of general-purpose and fixed function logic.

In at least one embodiment, a fixed function block 3130 includes a geometry/fixed function pipeline 3136 that can be shared by all sub-cores in a graphics processor 3100, for example, in lower performance and/or lower power graphics processor implementations. In at least one embodiment, geometry/fixed function pipeline 3136 includes a 3D fixed function pipeline, a video front-end unit, a thread spawner and thread dispatcher, and a unified return buffer manager, which manages unified return buffers.

In at least one embodiment a fixed function block 3130 also includes a graphics SoC interface 3137, a graphics microcontroller 3138, and a media pipeline 3139. In at least one embodiment, a graphics SoC interface 3137 provides an interface between a graphics core 3100 and other processor cores within a system on a chip integrated circuit. In at least one embodiment, a graphics microcontroller 3138 is a programmable sub-processor that is configurable to manage various functions of graphics processor 3100, including thread dispatch, scheduling, and pre-emption. In at least one embodiment, media pipeline 3139 includes logic to facilitate decoding, encoding, pre-processing, and/or post-processing of multimedia data, including image and video data. In at least one embodiment, a media pipeline 3139 implements media operations via requests to compute or sampling logic within sub-cores 3101-3101F.

In at least one embodiment, SoC interface 3137 enables a graphics core 3100 to communicate with general-purpose application processor cores (e.g., CPUs) and/or other components within an SoC, including memory hierarchy elements such as a shared last level cache memory, a system RAM, and/or an embedded on-chip or on-package DRAM. In at least one embodiment, an SoC interface 3137 can also enable communication with fixed function devices within an SoC, such as camera imaging pipelines, and enables use of and/or implements global memory atomics that may be shared between a graphics core 3100 and CPUs within an SoC. In at least one embodiment, an SoC interface 3137 can also implement power management controls for a graphics core 3100 and enable an interface between a clock domain of a graphic core 3100 and other clock domains within an SoC. In at least one embodiment, SoC interface 3137 enables receipt of command buffers from a command streamer and global thread dispatcher that are configured to provide commands and instructions to each of one or more graphics cores within a graphics processor. In at least one embodiment, commands and instructions can be dispatched to a media pipeline 3139, when media operations are to be performed, or a geometry and fixed function pipeline (e.g., geometry and fixed function pipeline 3136, a geometry and fixed function pipeline 3114) when graphics processing operations are to be performed.

In at least one embodiment, a graphics microcontroller 3138 can be configured to perform various scheduling and management tasks for a graphics core 3100. In at least one embodiment, a graphics microcontroller 3138 can perform graphics and/or compute workload scheduling on various graphics parallel engines within execution unit (EU) arrays 3102A-3102F, 3104A-3104F within sub-cores 3101A-3101F. In at least one embodiment, host software executing on a CPU core of an SoC including a graphics core 3100 can submit workloads one of multiple graphics processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, a graphics microcontroller 3138 can also facilitate low-power or idle states for a graphics core 3100, providing a graphics core 3100 with an ability to save and restore registers within a graphics core 3100 across low-power state transitions independently from an operating system and/or graphics driver software on a system.

In at least one embodiment, a graphics core 3100 may have greater than or fewer than illustrated sub-cores 3101A-3101F, up to N modular sub-cores. For each set of N sub-cores, in at least one embodiment, a graphics core 3100 can also include shared function logic 3110, a shared and/or cache memory 3112, a geometry/fixed function pipeline 3114, as well as additional fixed function logic 3116 to accelerate various graphics and compute processing operations. In at least one embodiment, shared function logic 3110 can include logic units (e.g., sampler, math, and/or inter-thread communication logic) that can be shared by each N sub-cores within a graphics core 3100. In at least one embodiment, shared and/or cache memory 3112 can be a last-level cache for N sub-cores 3101A-3101F within a graphics core 3100 and can also serve as a shared memory that is accessible by multiple sub-cores. In at least one embodiment, a geometry/fixed function pipeline 3114 can be included instead of a geometry/fixed function pipeline 3136 within a fixed function block 3130 and can include same or similar logic units.

In at least one embodiment, a graphics core 3100 includes additional fixed function logic 3116 that can include various fixed function acceleration logic for use by a graphics core 3100. In at least one embodiment, additional fixed function logic 3116 includes an additional geometry pipeline for use in position only shading. In position-only shading, at least two geometry pipelines exist, whereas in a full geometry pipeline within a geometry/fixed function pipeline 3116, 3136, and a cull pipeline, which is an additional geometry pipeline which may be included within additional fixed function logic 3116. In at least one embodiment, a cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3116 can execute position shaders in parallel with a main application and generally generates critical results faster than a full pipeline, as a cull pipeline fetches and shades a position attribute of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 3116 can also include machine-learning acceleration logic, such as fixed function matrix multiplication logic, for implementations including optimizations for machine learning training or inferencing.

In at least one embodiment, each graphics sub-core 3101A-3101F includes a set of execution resources that may be used to perform graphics, media, and compute operations in response to requests by graphics pipeline, media pipeline, or shader programs. In at least one embodiment, graphics sub-cores 3101A-3101F include multiple EU arrays 3102A-3102F, 3104A-3104F, thread dispatch and inter-thread communication (TD/IC) logic 3103A-3103F, a 3D (e.g., texture) sampler 3105A-3105F, a media sampler 3106A-3106F, a shader processor 3107A-3107F, and shared local memory (SLM) 3108A-3108F. In at least one embodiment, EU arrays 3102A-3102F, 3104A-3104F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 3103A-3103F performs local thread dispatch and thread control operations for execution units within a sub-core and facilitate communication between threads executing on execution units of a sub-core. In at least one embodiment, 3D sampler 3105A-3105F can read texture or other 3D graphics related data into memory. In at least one embodiment, a 3D sampler can read texture data differently based on a configured sample state and texture format associated with a given texture. In at least one embodiment, a media sampler 3106A-3106F can perform similar read operations based on a type and format associated with media data. In at least one embodiment, each graphics sub-core 3101A-3101F can alternately include a unified 3D and media sampler. In at least one embodiment, threads executing on execution units within each of sub-cores 3101A-3101F can make use of shared local memory 3108A-3108F within each sub-core, to enable threads executing within a thread group to execute using a common pool of on-chip memory.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, portions or all of inference and/or training logic 1115 may be incorporated into graphics processor 3110. For example, in at least one embodiment, training and/or inferencing techniques described herein may use one or more of ALUs embodied in a 3D pipeline 3110, a graphics microcontroller 3138, a geometry & fixed function pipeline 3114 and 3136, or other logic in FIG. 30. Moreover, in at least one embodiment, inferencing and/or training operations described herein may be done using logic other than logic illustrated in FIG. 11A or 11B. In at least one embodiment, weight parameters may be stored in on-chip or off-chip memory and/or registers (shown or not shown) that configure ALUs of a graphics processor 3100 to perform one or more machine learning algorithms, neural network architectures, use cases, or training techniques described herein.

In at least one embodiment, a GPU-based scrambling/descrambling unit might be used to perform scrambling and/or descrambling as part of a communications process or system used with a system of FIG. 31.

Figure 32A:
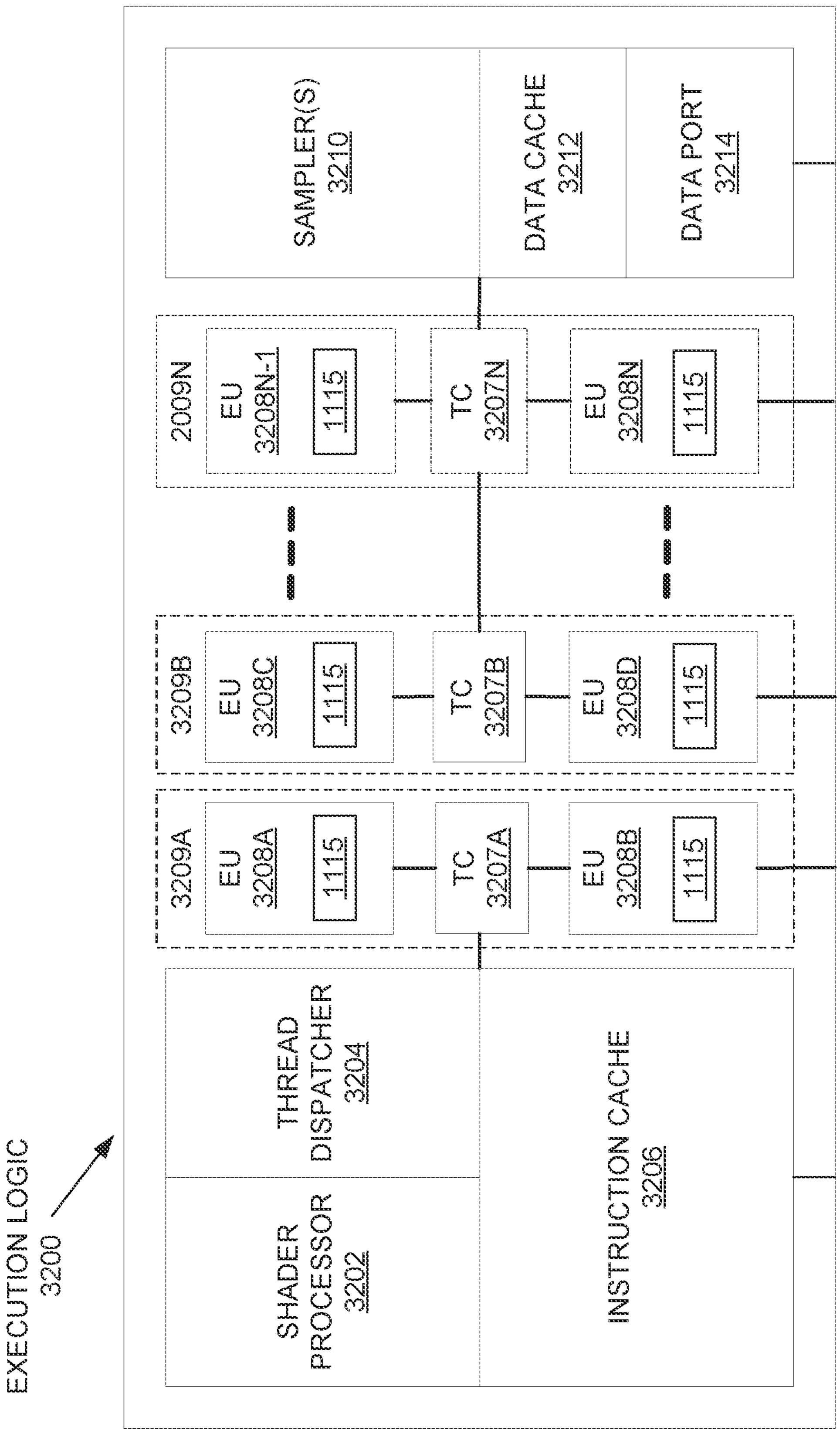
FIGS. 32A and 32B illustrate thread execution logic, according to at least one embodiment.
Figure 32B:
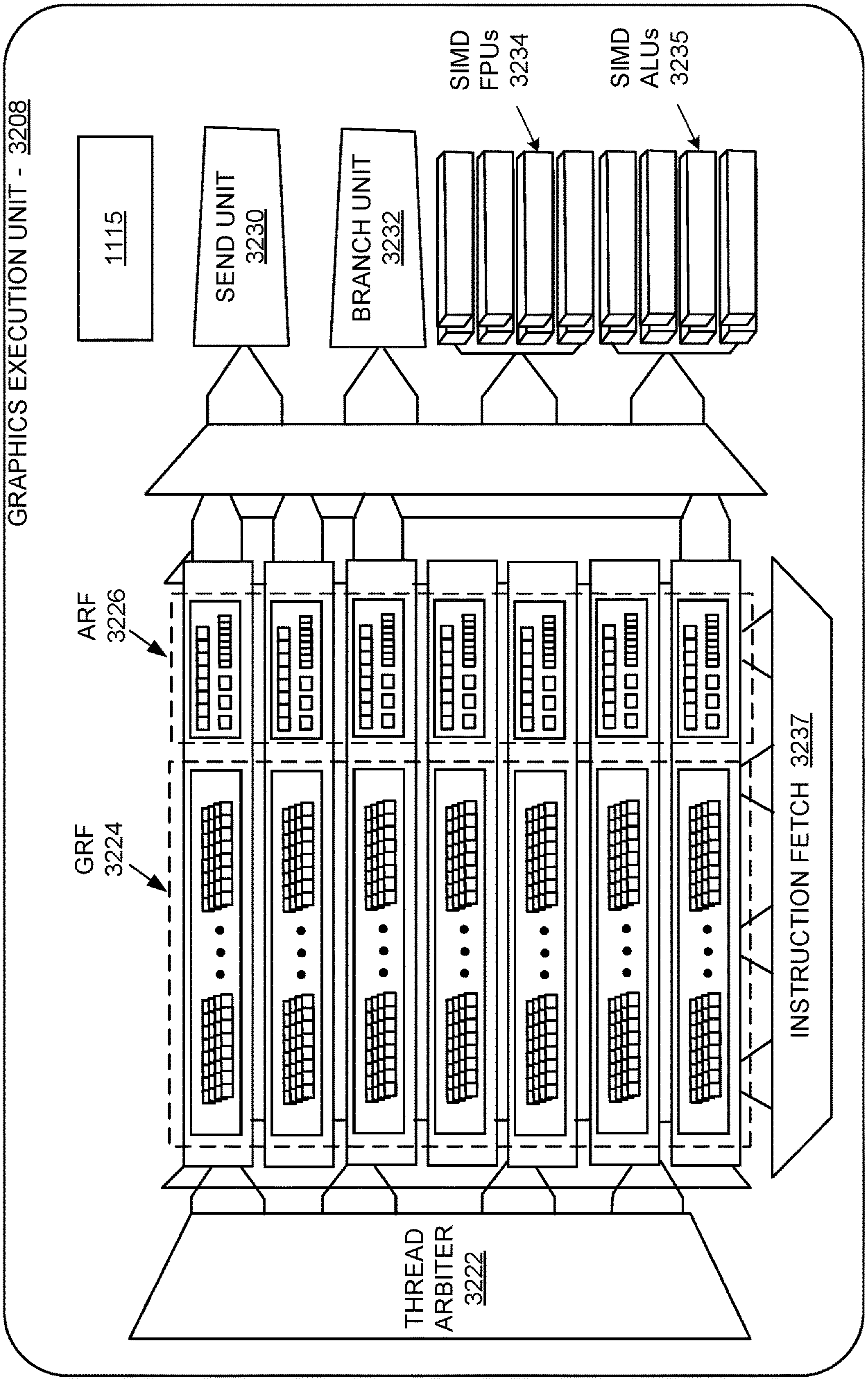

FIGS. 32A and 32B illustrate thread execution logic 3200 including an array of processing elements of a graphics processor core according to at least one embodiment. FIG. 32A illustrates at least one embodiment, in which thread execution logic 3200 is used. FIG. 32B illustrates exemplary internal details of an execution unit, according to at least one embodiment.

As illustrated in FIG. 32A, in at least one embodiment, thread execution logic 3200 includes a shader processor 3202, a thread dispatcher 3204, instruction cache 3206, a scalable execution unit array including a plurality of execution units 3208A-3208N, a sampler 3210, a data cache 3212, and a data port 3214. In at least one embodiment a scalable execution unit array can dynamically scale by enabling or disabling one or more execution units (e.g., any of execution unit 3208A, 3208B, 3208C, 3208D, through 3208N-1 and 3208N) based on computational requirements of a workload, for example. In at least one embodiment, scalable execution units are interconnected via an interconnect fabric that links to each of said execution units. In at least one embodiment, thread execution logic 3200 includes one or more connections to memory, such as system memory or cache memory, through one or more of instruction a cache 3206, a data port 3214, a sampler 3210, and execution units 3208A-3208N. In at least one embodiment, each execution unit (e.g., 3208A) is a stand-alone programmable general-purpose computational unit that is capable of executing multiple simultaneous hardware threads while processing multiple data elements in parallel for each thread. In at least one embodiment, an array of execution units 3208A-3208N is scalable to include any number individual execution units.

In at least one embodiment, execution units 3208A-3208N are primarily used to execute shader programs. In at least one embodiment, a shader processor 3202 can process various shader programs and dispatch execution threads associated with shader programs via a thread dispatcher 3204. In at least one embodiment, a thread dispatcher 3204 includes logic to arbitrate thread initiation requests from graphics and media pipelines and instantiate requested threads on one or more execution units in execution units 3208A-3208N. For example, in at least one embodiment, a geometry pipeline can dispatch vertex, tessellation, or geometry shaders to thread execution logic for processing. In at least one embodiment, a thread dispatcher 3204 can also process runtime thread spawning requests from executing shader programs.

In at least one embodiment, execution units 3208A-3208N support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, vertex shaders), pixel processing (e.g., pixel shaders, fragment shaders) and general-purpose processing (e.g., compute and media shaders). In at least one embodiment, each of execution units 3208A-3208N, which include one or more arithmetic logic units (ALUs), is capable of multi-issue single instruction multiple data (SIIvD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIvMD branch capability, logical operations, transcendental operations, and other miscellaneous operations. In at least one embodiment, while waiting for data from memory or one of shared functions, dependency logic within execution units 3208A-3208N causes a waiting thread to sleep until requested data has been returned. In at least one embodiment, while a waiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 3208A-3208N operates on arrays of data elements. In at least one embodiment, number of data elements refers to "execution size," or number of channels for an instruction. In at least one embodiment, an execution channel is a logical unit of execution for data element access, masking, and flow control within instructions. In at least one embodiment, a number of channels may be independent of a number of physical Arithmetic Logic Units (ALUs) or Floating Point Units (FPUs) for a particular graphics processor. In at least one embodiment, execution units 3208A-3208N support integer and floating-point data types.

In at least one embodiment, an execution unit instruction set includes SIMD instructions. In at least one embodiment, various data elements can be stored as a packed data type in a register and an execution unit will process various elements based on data size of elements. For example, in at least one embodiment, when operating on a 256-bit wide vector, 256 bits of a vector are stored in a register, and an execution unit operates on vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 3209A-3209N having thread control logic (3207A-3207N) that is common to fused EUs. In at least one embodiment, multiple EUs can be fused into an EU group. In at least one embodiment, each EU in fused EU group can be configured to execute a separate SIMD hardware thread. In at least one embodiment, a number of EUs in a fused EU group can vary. In at least one embodiment, various SIMD widths can be performed per-EU, including but not limited to SIMD8, SIMD16, and SIMD32. In at least one embodiment, each fused graphics execution unit 3209A-3209N includes at least two execution units. For example, in at least one embodiment, a fused execution unit 3209A includes a first EU 3208A, a second EU 3208B, and thread control logic 3207A that is common to first EU 3208A and second EU 3208B. In at least one embodiment, thread control logic 3207A controls threads executed on a fused graphics execution unit 3209A, allowing each EU within fused execution units 3209A-3209N to execute using a common instruction pointer register.

In at least one embodiment, one or more internal instruction caches (e.g., 3206) are included in thread execution logic 3200 to cache thread instructions for execution units. In at least one embodiment, one or more data caches (e.g., 3212) are included to cache thread data during thread execution. In at least one embodiment, a sampler 3210 is included to provide texture sampling for 3D operations and media sampling for media operations. In at least one embodiment, sampler 3210 includes specialized texture or media sampling functionality to process texture or media data during sampling process before providing sampled data to an execution unit.

During execution, in at least one embodiment, graphics and media pipelines send thread initiation requests to thread execution logic 3200 via thread spawning and dispatch logic. In at least one embodiment, once a group of geometric objects has been processed and rasterized into pixel data, pixel processor logic (e.g., pixel shader logic, fragment shader logic, etc.) within shader processor 3202 is invoked to further compute output information and cause results to be written to output surfaces (e.g., color buffers, depth buffers, stencil buffers, etc.). In at least one embodiment, a pixel shader or fragment shader calculates values of various vertex attributes that are to be interpolated across a rasterized object. In at least one embodiment, pixel processor logic within a shader processor 3202 then executes an application programming interface (API)-supplied pixel or fragment shader program. In at least one embodiment, to execute a shader program, a shader processor 3202 dispatches threads to an execution unit (e.g., 3208A) via a thread dispatcher 3204. In at least one embodiment, a shader processor 3202 uses texture sampling logic in a sampler 3210 to access texture data in texture maps stored in memory. In at least one embodiment, arithmetic operations on texture data and input geometry data compute pixel color data for each geometric fragment, or discards one or more pixels from further processing.

In at least one embodiment, a data port 3214 provides a memory access mechanism for thread execution logic 3200 to output processed data to memory for further processing on a graphics processor output pipeline. In at least one embodiment, a data port 3214 includes or couples to one or more cache memories (e.g., data cache 3212) to cache data for memory access via a data port.

As illustrated in FIG. 32B, in at least one embodiment, a graphics execution unit 3208 can include an instruction fetch unit 3237, a general register file array (GRF) 3224, an architectural register file array (ARF) 3226, a thread arbiter 3222, a send unit 3230, a branch unit 3232, a set of SIMD floating point units (FPUs) 3234, and in at least one embodiment a set of dedicated integer SIMD ALUs 3235. In at least one embodiment, GRF 3224 and ARF 3226 includes a set of general register files and architecture register files associated with each simultaneous hardware thread that may be active in a graphics execution unit 3208. In at least one embodiment, a per thread architectural state is maintained in ARF 3226, while data used during a thread execution is stored in GRF 3224. In at least one embodiment, an execution state of each thread, including instruction pointers for each thread, can be held in thread-specific registers in ARF 3226.

In at least one embodiment, a graphics execution unit 3208 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, a graphics execution unit 3208 can co-issue multiple instructions, which may each be different instructions. In at least one embodiment, a thread arbiter 3222 of a graphics execution unit thread 3208 can dispatch instructions to one of send unit 3230, branch unit 3242, or SIMD FPU(s) 3234 for execution. In at least one embodiment, each execution thread can access 128 general-purpose registers within GRF 3224, where each register can store 32 bytes, accessible as a SIMD 8-element vector of 32-bit data elements. In at least one embodiment, each execution unit thread has access to 4 Kbytes within a GRF 3224, although embodiments are not so limited, and greater or fewer register resources may be provided in at least one embodiment. In at least one embodiment, up to seven threads can execute simultaneously, although number of threads per execution unit can also vary according to embodiments. In at least one embodiment, in which seven threads may access 4 Kbytes, a GRF 3224 can store a total of 28 Kbytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by a message passing send unit 3230. In at least one embodiment, branch instructions are dispatched to a dedicated branch unit 3232 to facilitate SIMD divergence and eventual convergence.

In at least one embodiment a graphics execution unit 3208 includes one or more SIMD floating point units (FPU(s)) 3234 to perform floating-point operations. In at least one embodiment, FPU(s) 3234 also support integer computation. In at least one embodiment FPU(s) 3234 can SIMD execute up to M number of 32-bit floating-point (or integer) operations, or SIMD execute up to 2M 16-bit integer or 16-bit floating-point operations. In at least one embodiment, at least one of FPU(s) provides extended math capability to support high-throughput transcendental math functions and a double precision 64-bit floating-point. In at least one embodiment, a set of 8-bit integer SIMD ALUs 3235 is also present, and may be specifically optimized to perform operations associated with machine learning computations.

In at least one embodiment, arrays of multiple instances of a graphics execution unit 3208 can be instantiated in a graphics sub-core grouping (e.g., a sub-slice). In at least one embodiment an execution unit 3208 can execute instructions across a plurality of execution channels. In at least one embodiment, each thread executed on a graphics execution unit 3208 is executed on a different channel.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, portions or all of inference and/or training logic 1115 may be incorporated into execution logic 3200. Moreover, in at least one embodiment, inferencing and/or training operations described herein may be done using logic other than logic illustrated in FIG. 11A or 11B. In at least one embodiment, weight parameters may be stored in on-chip or off-chip memory and/or registers (shown or not shown) that configure ALUs of execution logic 3200 to perform one or more machine learning algorithms, neural network architectures, use cases, or training techniques described herein.

In at least one embodiment, a GPU-based scrambling/descrambling unit might be used to perform scrambling and/or descrambling as part of a communications process or system used in a system of FIG. 32A or 32B.

Figure 33:
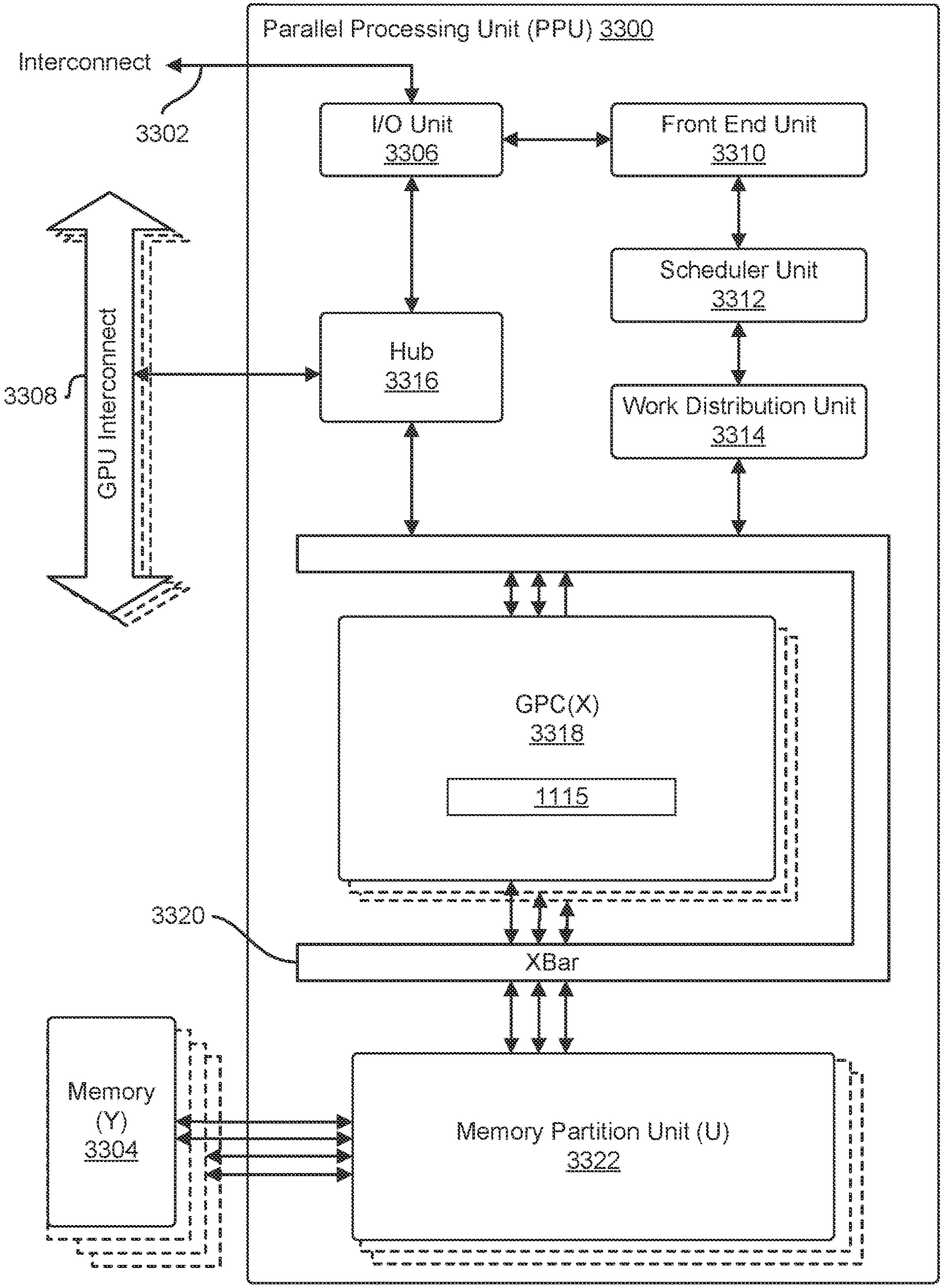
FIG. 33 illustrates a parallel processing unit ("PPU"), according to at least one embodiment.

FIG. 33 illustrates a parallel processing unit ("PPU") 3300, according to at least one embodiment. In at least one embodiment, PPU 3300 is configured with machine-readable code that, if executed by PPU 3300, causes PPU 3300 to perform some or all of processes and techniques described throughout this disclosure. In at least one embodiment, PPU 3300 is a multi-threaded processor that is implemented on one or more integrated circuit devices and that utilizes multithreading as a latency-hiding technique designed to process computer-readable instructions (also referred to as machine-readable instructions or simply instructions) on multiple threads in a parallel manner. In at least one embodiment, a thread refers to a thread of execution and is an instantiation of a set of instructions configured to be executed by PPU 3300. In at least one embodiment, PPU 3300 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 3300 is utilized to perform computations such as linear algebra operations and machine-learning operations. FIG. 33 illustrates an example of a parallel processor for illustrative purposes only and should be construed as a non-limiting example of processor architectures contemplated within scope of this disclosure and that any suitable processor may be employed to supplement and/or substitute for same.

In at least one embodiment, one or more PPUs 3300 are configured to accelerate any High Performance Computing ("HPC"), data center, and machine learning applications. In at least one embodiment, PPU 3300 is configured to accelerate all deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, personalized user recommendations and more.

In at least one embodiment, PPU 3300 includes, without limitation, an Input/Output ("I/O") unit 3306, a front-end unit 3310, a scheduler unit 3312, a work distribution unit 3314, a hub 3316, a crossbar ("Xbar") 3320, one or more general processing clusters ("GPCs") 3318, and one or more partition units ("memory partition units") 3322. In at least one embodiment, PPU 3300 is connected to a host processor or other PPUs 3300 via one or more high-speed GPU interconnects ("GPU interconnects") 3308. In at least one embodiment, PPU 3300 is connected to a host processor or other peripheral devices via an interconnect 3302. In at least one embodiment, PPU 3300 is connected to a local memory comprising one or more memory devices ("memory") 3304. In at least one embodiment, memory devices 3304 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 3308 may refer to a wire-based multi-lane communications link that is used by systems to scale and include one or more PPUs 3300 combined with one or more central processing units ("CPUs"), supports cache coherence between PPUs 3300 and CPUs, and CPU mastering. In at least one embodiment, data and/or commands are transmitted by a high-speed GPU interconnect 3308 through hub 3316 to/from other units of PPU 3300, such as one or more copy engines, video encoders, video decoders, power management units, and other components which may not be explicitly illustrated in FIG. 33.

In at least one embodiment, I/O unit 3306 is configured to transmit and receive communications (e.g., commands, data) from a host processor (not illustrated in FIG. 33) over system bus 3302. In at least one embodiment, I/O unit 3306 communicates with host processor directly via system bus 3302 or through one or more intermediate devices such as a memory bridge. In at least one embodiment, I/O unit 3306 may communicate with one or more other processors, such as one or more of PPUs 3300 via system bus 3302. In at least one embodiment, I/O unit 3306 implements a Peripheral Component Interconnect Express ("PCIe") interface for communications over a PCIe bus. In at least one embodiment, I/O unit 3306 implements interfaces for communicating with external devices.

In at least one embodiment, I/O unit 3306 decodes packets received via system bus 3302. In at least one embodiment, at least some packets represent commands configured to cause PPU 3300 to perform various operations. In at least one embodiment, I/O unit 3306 transmits decoded commands to various other units of PPU 3300 as specified by commands. In at least one embodiment, commands are transmitted to front-end unit 3310 and/or transmitted to hub 3316 or other units of PPU 3300 such as one or more copy engines, a video encoder, a video decoder, a power management unit, etc. (not explicitly illustrated in FIG. 33). In at least one embodiment, I/O unit 3306 is configured to route communications between and among various logical units of PPU 3300.

In at least one embodiment, a program executed by a host processor encodes a command stream in a buffer that provides workloads to PPU 3300 for processing. In at least one embodiment, a workload comprises instructions and data to be processed by those instructions. In at least one embodiment, buffer is a region in a memory that is accessible (e.g., read/write) by both host processor and PPU 3300 a host interface unit may be configured to access buffer in a system memory connected to system bus 3302 via memory requests transmitted over system bus 3302 by I/O unit 3306. In at least one embodiment, host processor writes command stream to buffer and then transmits a pointer to start of command stream to PPU 3300 such that front-end unit 3310 receives pointers to one or more command streams and manages one or more command streams, reading commands from command streams and forwarding commands to various units of PPU 3300.

In at least one embodiment, front-end unit 3310 is coupled to scheduler unit 3312 that configures various GPCs 3318 to process tasks defined by one or more command streams. In at least one embodiment, scheduler unit 3312 is configured to track state information related to various tasks managed by scheduler unit 3312 where state information may indicate which of GPCs 3318 a task is assigned to, whether task is active or inactive, a priority level associated with a task, and so forth. In at least one embodiment, scheduler unit 3312 manages execution of a plurality of tasks on one or more of GPCs 3318.

In at least one embodiment, scheduler unit 3312 is coupled to work distribution unit 3314 that is configured to dispatch tasks for execution on GPCs 3318. In at least one embodiment, work distribution unit 3314 tracks a number of scheduled tasks received from scheduler unit 3312 and work distribution unit 3314 manages a pending task pool and an active task pool for each of GPCs 3318. In at least one embodiment, pending task pool comprises a number of slots (e.g., 32 slots) that contain tasks assigned to be processed by a particular GPC 3318; an active task pool may comprise a number of slots (e.g., 4 slots) for tasks that are actively being processed by GPCs 3318, such that as one of GPCs 3318 completes execution of a task, that task is evicted from active task pool for GPC 3318 and one of other tasks from pending task pool is selected and scheduled for execution on GPC 3318. In at least one embodiment, if an active task is idle on GPC 3318, such as while waiting for a data dependency to be resolved, then active task is evicted from GPC 3318 and returned to pending task pool while another task in pending task pool is selected and scheduled for execution on GPC 3318.

In at least one embodiment, work distribution unit 3314 communicates with one or more GPCs 3318 via XBar 3320. In at least one embodiment, XBar 3320 is an interconnect network that couples many of units of PPU 3300 to other units of PPU 3300, and can be configured to couple work distribution unit 3314 to a particular GPC 3318. In at least one embodiment, one or more other units of PPU 3300 may also be connected to XBar 3320 via hub 3316.

In at least one embodiment, tasks are managed by scheduler unit 3312 and dispatched to one of GPCs 3318 by work distribution unit 3314. In at least one embodiment, GPC 3318 is configured to process task and generate results. In at least one embodiment, results may be consumed by other tasks within GPC 3318, routed to a different GPC 3318 via XBar 3320, or stored in memory 3304. In at least one embodiment, results can be written to memory 3304 via partition units 3322, which implement a memory interface for reading and writing data to/from memory 3304. In at least one embodiment, results can be transmitted to another PPU 3304 or CPU via high-speed GPU interconnect 3308. In at least one embodiment, PPU 3300 includes, without limitation, a number U of partition units 3322 that is equal to a number of separate and distinct memory devices 3304 coupled to PPU 3300. In at least one embodiment, partition unit 3322 will be described in more detail herein in conjunction with FIG. 35.

In at least one embodiment, a host processor executes a driver kernel that implements an application programming interface ("API") that enables one or more applications executing on host processor to schedule operations for execution on PPU 3300. In at least one embodiment, multiple compute applications are simultaneously executed by PPU 3300 and PPU 3300 provides isolation, quality of service ("QoS"), and independent address spaces for multiple compute applications. In at least one embodiment, an application generates instructions (e.g., in form of API calls) that cause driver kernel to generate one or more tasks for execution by PPU 3300 and driver kernel outputs tasks to one or more streams being processed by PPU 3300. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform a task and that exchange data through shared memory. In at least one embodiment, threads and cooperating threads are described in more detail, in accordance with at least one embodiment, in conjunction with FIG. 35.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, a deep learning application processor is used to train a machine learning model, such as a neural network, to predict or infer information provided to PPU 3300. In at least one embodiment, a deep learning application processor 3300 is used to infer or predict information based on a trained machine learning model (e.g., neural network) that has been trained by another processor or system or by PPU 3300. In at least one embodiment, PPU 3300 may be used to perform one or more neural network use cases described herein.

In at least one embodiment, a GPU-based scrambling/descrambling unit might be used to perform scrambling and/or descrambling as part of a communications process or system used with a system of FIG. 33.

Figure 34:
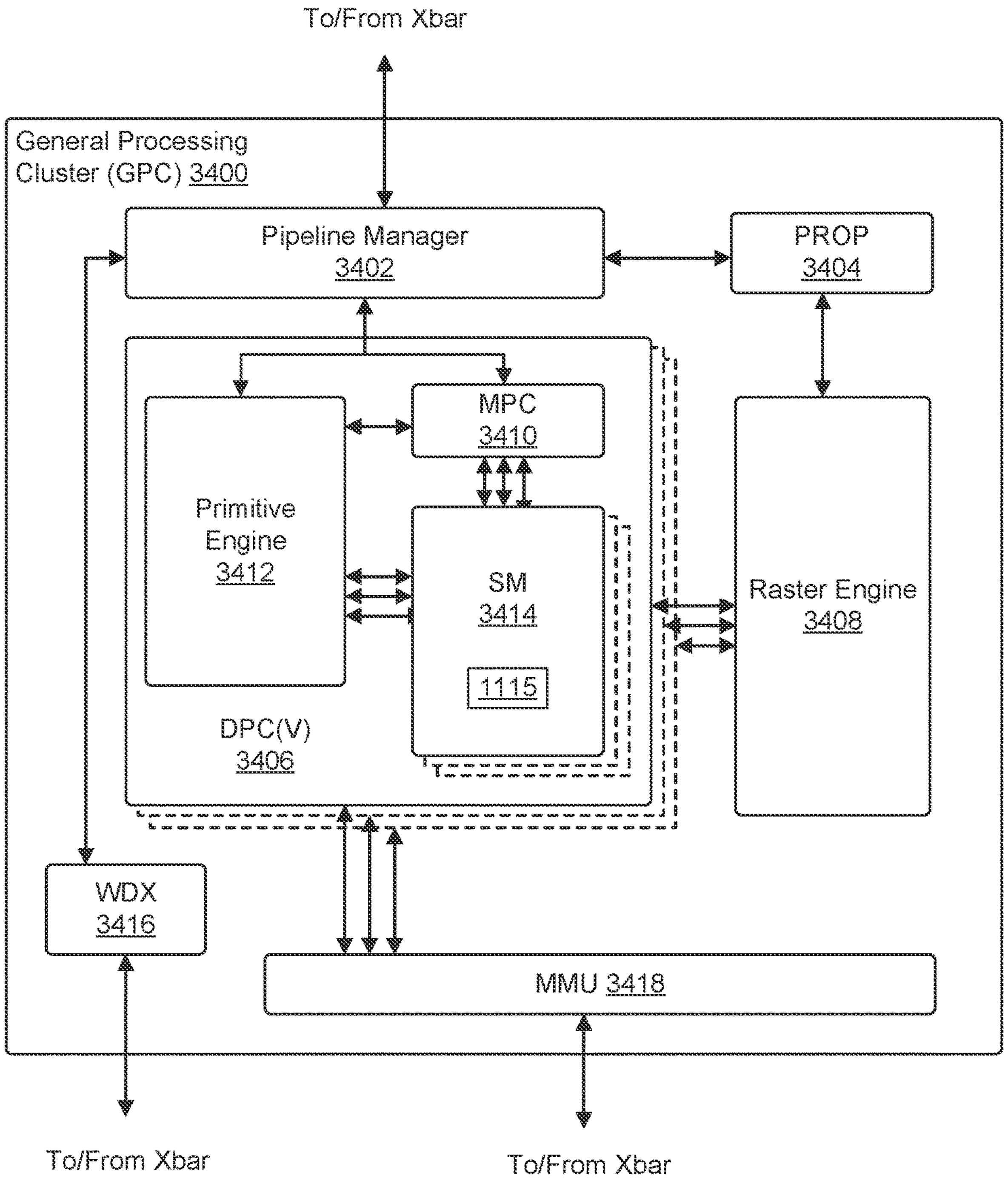
FIG. 34 illustrates a general processing cluster ("GPC"), according to at least one embodiment.

FIG. 34 illustrates a general processing cluster ("GPC") 3400, according to at least one embodiment. In at least one embodiment, GPC 3400 is GPC 3318 of FIG. 33. In at least one embodiment, each GPC 3400 includes, without limitation, a number of hardware units for processing tasks and each GPC 3400 includes, without limitation, a pipeline manager 3402, a pre-raster operations unit ("PROP") 3404, a raster engine 3408, a work distribution crossbar ("WDX") 3416, a memory management unit ("MMU") 3418, one or more Data Processing Clusters ("DPCs") 3406, and any suitable combination of parts.

In at least one embodiment, operation of GPC 3400 is controlled by a pipeline manager 3402. In at least one embodiment, pipeline manager 3402 manages configuration of one or more DPCs 3406 for processing tasks allocated to GPC 3400. In at least one embodiment, pipeline manager 3402 configures at least one of one or more DPCs 3406 to implement at least a portion of a graphics rendering pipeline. In at least one embodiment, DPC 3406 is configured to execute a vertex shader program on a programmable streaming multi-processor ("SM") 3414. In at least one embodiment, pipeline manager 3402 is configured to route packets received from a work distribution unit to appropriate logical units within GPC 3400. In at least one embodiment, and some packets may be routed to fixed function hardware units in PROP 3404 and/or raster engine 3408 while other packets may be routed to DPCs 3406 for processing by a primitive engine 3412 or SM 3414. In at least one embodiment, pipeline manager 3402 configures at least one of DPCs 3406 to implement a neural network model and/or a computing pipeline.

In at least one embodiment, PROP unit 3404 is configured to route data generated by raster engine 3408 and DPCs 3406 to a Raster Operations ("ROP") unit in a partition unit 3322, described in more detail above in conjunction with FIG. 33. In at least one embodiment, PROP unit 3404 is configured to perform optimizations for color blending, organize pixel data, perform address translations, and more. In at least one embodiment, raster engine 3408 includes, without limitation, a number of fixed function hardware units configured to perform various raster operations, in at least one embodiment, and raster engine 3408 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to coarse raster engine to generate coverage information (e.g., an x, y coverage mask for a tile) for primitive; output of coarse raster engine is transmitted to culling engine where all fragments associated with primitive that fail a z-test are culled, and transmitted to a clipping engine where all fragments lying outside a viewing frustum are clipped. In at least one embodiment, any fragments that survive clipping and culling are passed to a fine raster engine to generate attributes for pixel fragments, based on plane equations generated by setup engine. In at least one embodiment, output of raster engine 3408 comprises fragments to be processed by any suitable entity, such as by a fragment shader implemented within DPC 3406.

In at least one embodiment, each DPC 3406 included in GPC 3400 comprise, without limitation, an M-Pipe Controller ("MPC") 3410; a primitive engine 3412; one or more SMs 3414; and any suitable combination thereof. In at least one embodiment, MPC 3410 controls operation of DPC 3406, routing packets received from pipeline manager 3402 to appropriate units in DPC 3406. In at least one embodiment, packets associated with a vertex are routed to primitive engine 3412, which is configured to fetch vertex attributes associated with vertex from memory; in contrast, packets associated with a shader program may be transmitted to SM 3414.

In at least one embodiment, SM 3414 comprises, without limitation, a programmable streaming processor that is configured to process tasks represented by a number of threads. In at least one embodiment, SM 3414 is multi-threaded and configured to execute a plurality of threads (e.g., 32 threads) from a particular group of threads concurrently, and implements a Single-Instruction, Multiple-Data ("SIMD") architecture, where each thread in a group of threads (e.g., a warp) is configured to process a different set of data based on same set of instructions. In at least one embodiment, all threads in a group of threads execute same instructions. In at least one embodiment, SM 3414 implements a Single-Instruction, Multiple Thread ("SIMT") architecture wherein each thread in a group of threads is configured to process a different set of data based on same set of instructions, but where individual threads in group of threads are allowed to diverge during execution. In at least one embodiment, a program counter, call stack, and execution state is maintained for each warp, enabling concurrency between warps and serial execution within warps when threads within warp diverge. In at least one embodiment, a program counter, call stack, and execution state is maintained for each individual thread, enabling equal concurrency between all threads, within and between warps. In at least one embodiment, execution state is maintained for each individual thread and threads executing same instructions may be converged and executed in parallel for better efficiency. At least one embodiment of SM 3414 is described in more detail herein.

In at least one embodiment, MMU 3418 provides an interface between GPC 3400 and memory partition unit (e.g., partition unit 3322 of FIG. 33) and MMU 3418 provides translation of virtual addresses into physical addresses, memory protection, and arbitration of memory requests. In at least one embodiment, MMU 3418 provides one or more translation lookaside buffers ("TLBs") for performing translation of virtual addresses into physical addresses in memory.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, a deep learning application processor is used to train a machine learning model, such as a neural network, to predict or infer information provided to GPC 3400. In at least one embodiment, GPC 3400 is used to infer or predict information based on a trained machine learning model (e.g., neural network) that has been trained by another processor or system or by GPC 3400. In at least one embodiment, GPC 3400 may be used to perform one or more neural network use cases described herein.

In at least one embodiment, a GPU-based scrambling/descrambling unit might be used to perform scrambling and/or descrambling as part of a communications process or system used with a system of FIG. 34.

Figure 35:
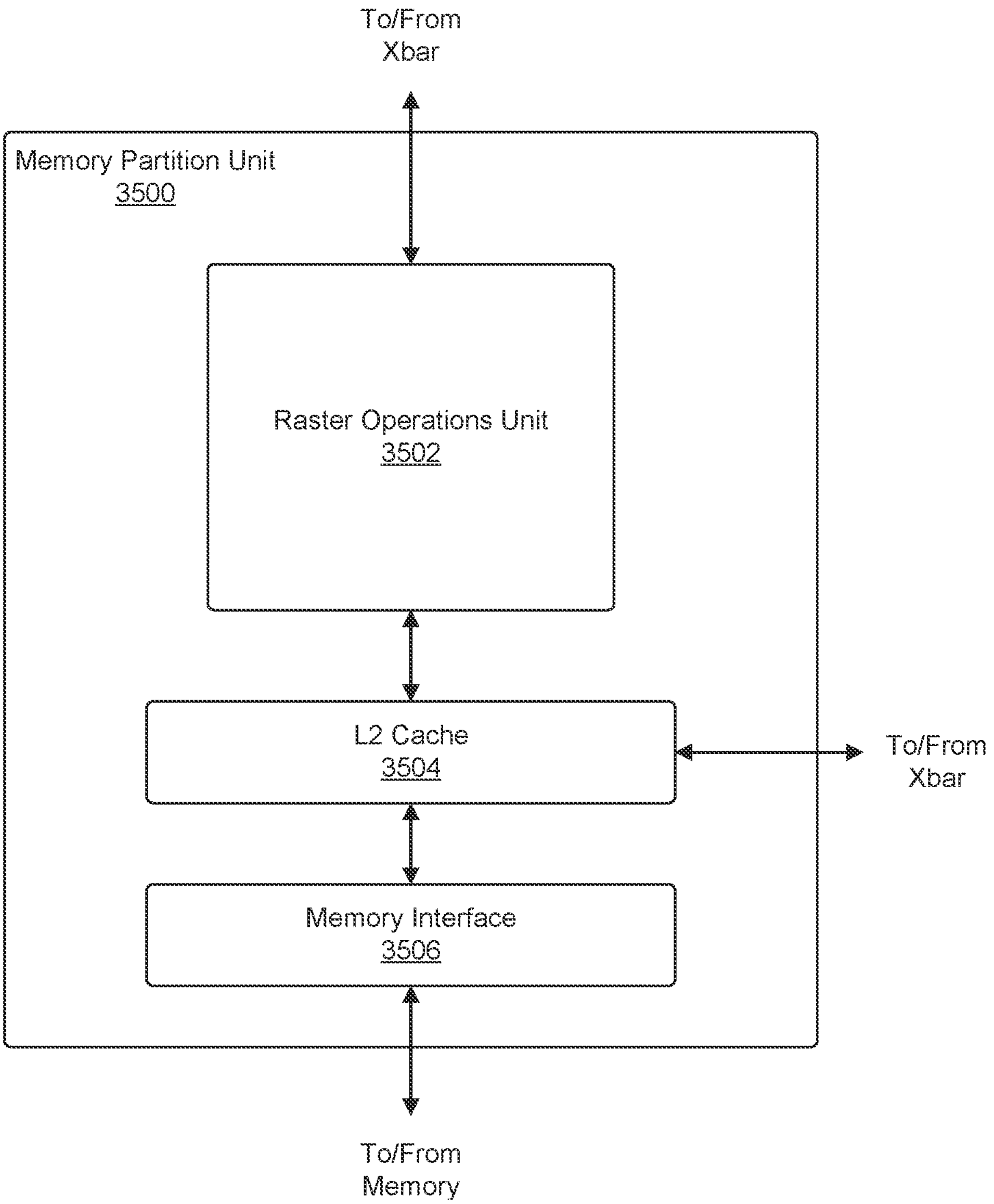
FIG. 35 illustrates a memory partition unit of a parallel processing unit ("PPU"), according to at least one embodiment.

FIG. 35 illustrates a memory partition unit 3500 of a parallel processing unit ("PPU"), in accordance with at least one embodiment. In at least one embodiment, a memory partition unit 3500 includes, without limitation, a Raster Operations ("ROP") unit 3502; a level two ("L2") cache 3504; a memory interface 3506; and any suitable combination thereof. In at least one embodiment, memory interface 3506 is coupled to memory. In at least one embodiment, memory interface 3506 may implement 32, 64, 128, 1024-bit data buses, or alike, for high-speed data transfer. In at least one embodiment, PPU incorporates U memory interfaces 3506, one memory interface 3506 per pair of partition units 3500, where each pair of partition units 3500 is connected to a corresponding memory device. For example, in at least one embodiment, a PPU may be connected to up to Y memory devices, such as high bandwidth memory stacks or graphics double-data-rate, version 5, synchronous dynamic random access memory ("GDDR5 SDRAM").

In at least one embodiment, memory interface 3506 implements a high bandwidth memory second generation ("HBM2") memory interface and Y equals half U. In at least one embodiment, HBM2 memory stacks are located on same physical package as PPU, providing substantial power and area savings compared with GDDR5 SDRAM systems. In at least one embodiment, each HBM2 stack includes, without limitation, four memory dies and Y equals 4, with each HBM2 stack including two 128-bit channels per die for a total of 8 channels and a data bus width of 1024 bits. In at least one embodiment, memory supports Single-Error Correcting Double-Error Detecting ("SECDED") Error Correction Code ("ECC") to protect data. ECC provides higher reliability for compute applications that are sensitive to data corruption.

In at least one embodiment, a PPU implements a multi-level memory hierarchy. In at least one embodiment, memory partition unit 3500 supports a unified memory to provide a single unified virtual address space for central processing unit ("CPU") and PPU memory, enabling data sharing between virtual memory systems. In at least one embodiment frequency of accesses by a PPU to memory located on other processors is traced to ensure that memory pages are moved to physical memory of PPU that is accessing pages more frequently. In at least one embodiment, high-speed GPU interconnect 3308 supports address translation services allowing PPU to directly access a CPU's page tables and providing full access to CPU memory by PPU.

In at least one embodiment, copy engines transfer data between multiple PPUs or between PPUs and CPUs. In at least one embodiment, copy engines can generate page faults for addresses that are not mapped into page tables and memory partition unit 3500 then services page faults, mapping addresses into page table, after which copy engine performs transfer. In at least one embodiment, memory is pinned (e.g., non-pageable) for multiple copy engine operations between multiple processors, substantially reducing available memory. In at least one embodiment, with hardware page faulting, addresses can be passed to copy engines without regard as to whether memory pages are resident, and copy process is transparent.

Data from memory 3304 of FIG. 33 or other system memory is fetched by memory partition unit 3500 and stored in L2 cache 3504, which is located on-chip and is shared between various GPCs, in accordance with at least one embodiment. Each memory partition unit 3500, in at least one embodiment, includes, without limitation, at least a portion of L2 cache associated with a corresponding memory device. In at least one embodiment, lower level caches are implemented in various units within GPCs. In at least one embodiment, each of SMs 3414 may implement a level one ("L1") cache wherein L1 cache is private memory that is dedicated to a particular SM 3414 and data from L2 cache 3504 is fetched and stored in each of L1 caches for processing in functional units of SMs 3414. In at least one embodiment, L2 cache 3504 is coupled to memory interface 3506 and XBar 3320.

ROP unit 3502 performs graphics raster operations related to pixel color, such as color compression, pixel blending, and more, in at least one embodiment. ROP unit 3502, in at least one embodiment, implements depth testing in conjunction with raster engine 3408, receiving a depth for a sample location associated with a pixel fragment from culling engine of raster engine 3408. In at least one embodiment, depth is tested against a corresponding depth in a depth buffer for a sample location associated with fragment. In at least one embodiment, if fragment passes depth test for sample location, then ROP unit 3502 updates depth buffer and transmits a result of depth test to raster engine 3408. It will be appreciated that number of partition units 3500 may be different than number of GPCs and, therefore, each ROP unit 3502 can, in at least one embodiment, be coupled to each of GPCs. In at least one embodiment, ROP unit 3502 tracks packets received from different GPCs and determines which that a result generated by ROP unit 3502 is routed to through XBar 3320.

Figure 36:
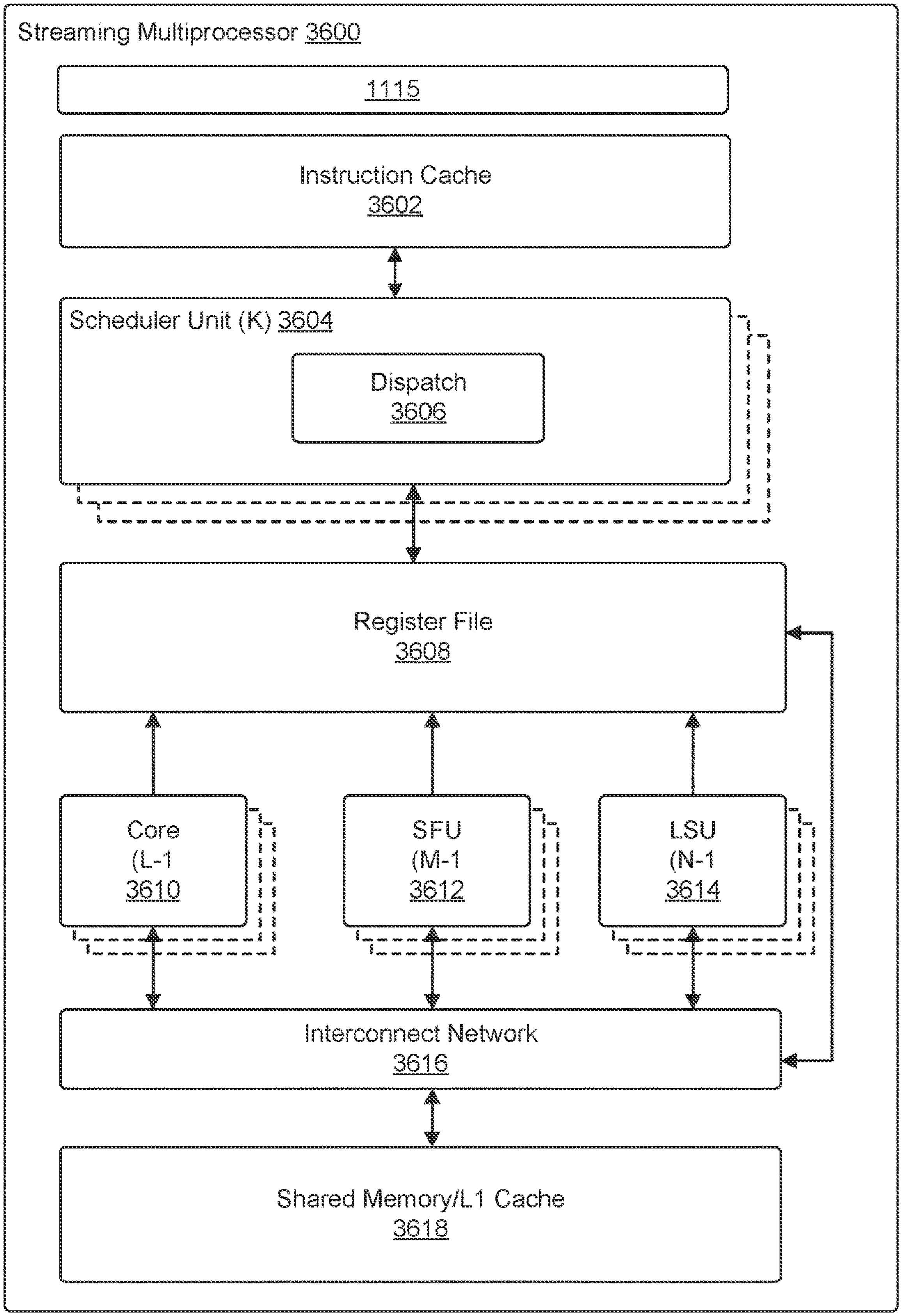
FIG. 36 illustrates a streaming multi-processor, according to at least one embodiment.

FIG. 36 illustrates a streaming multi-processor ("SM") 3600, according to at least one embodiment. In at least one embodiment, SM 3600 is SM of FIG. 34. In at least one embodiment, SM 3600 includes, without limitation, an instruction cache 3602; one or more scheduler units 3604; a register file 3608; one or more processing cores ("cores") 3610; one or more special function units ("SFUs") 3612; one or more load/store units ("LSUs") 3614; an interconnect network 3616; a shared memory/level one ("L1") cache 3618; and any suitable combination thereof. In at least one embodiment, a work distribution unit dispatches tasks for execution on general processing clusters ("GPCs") of parallel processing units ("PPUs") and each task is allocated to a particular Data Processing Cluster ("DPC") within a GPC and, if task is associated with a shader program, task is allocated to one of SMs 3600. In at least one embodiment, scheduler unit 3604 receives tasks from work distribution unit and manages instruction scheduling for one or more thread blocks assigned to SM 3600. In at least one embodiment, scheduler unit 3604 schedules thread blocks for execution as warps of parallel threads, wherein each thread block is allocated at least one warp. In at least one embodiment, each warp executes threads. In at least one embodiment, scheduler unit 3604 manages a plurality of different thread blocks, allocating warps to different thread blocks and then dispatching instructions from plurality of different cooperative groups to various functional units (e.g., processing cores 3610, SFUs 3612, and LSUs 3614) during each clock cycle.

In at least one embodiment, the Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, the Cooperative Groups enables programmers to define groups of threads explicitly at sub-block (e.g., as small as a single thread) and multi-block granularities, and to perform collective operations such as synchronization on threads in a cooperative group. In at least one embodiment, programming models support clean composition across software boundaries, so that libraries and utility functions can synchronize safely within their local context without having to make assumptions about convergence. In at least one embodiment, the Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 3606 is configured to transmit instructions to one or more of functional units and scheduler units 3604 includes, without limitation, two dispatch units 3606 that enable two different instructions from same warp to be dispatched during each clock cycle. In at least one embodiment, each scheduler unit 3604 includes a single dispatch unit 3606 or additional dispatch units 3606.

In at least one embodiment, each SM 3600, includes, without limitation, a register file 3608 that provides a set of registers for functional units of SM 3600. In at least one embodiment, register file 3608 is divided between each of functional units such that each functional unit is allocated a dedicated portion of register file 3608. In at least one embodiment, register file 3608 is divided between different warps being executed by SM 3600 and register file 3608 provides a temporary storage for operands connected to data paths of functional units. In at least one embodiment, each SM 3600 comprises, without limitation, a plurality of L processing cores 3610. In at least one embodiment, SM 3600 includes, without limitation, a large number (e.g., 128 or more) of distinct processing cores 3610. In at least one embodiment, each processing core 3610, in at least one embodiment, includes, without limitation, a fully pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 3610 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 3610. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation $D=A\times B+C$, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on a 16-bit floating point input data with a 32-bit floating point accumulation. In at least one embodiment, 16-bit floating point multiply uses 64 operations and results in a full precision product that is then accumulated using a 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as CUDA 9 C++ API, exposes specialized matrix load, matrix multiply and accumulate, and matrix store operations to efficiently use tensor cores from a CUDA-C++ program. In at least one embodiment, at CUDA level, warp-level interface assumes 16×16 size matrices spanning all 32 threads of warp.

In at least one embodiment, each SM 3600 comprises, without limitation, M SFUs 3612 that perform special functions (e.g., attribute evaluation, reciprocal square root, and like). In at least one embodiment, SFUs 3612 include, without limitation, a tree traversal unit configured to traverse a hierarchical tree data structure. In at least one embodiment, SFUs 3612 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 3600. In at least one embodiment, texture maps are stored in shared memory/L1 cache 3618. In at least one embodiment, texture units implement texture operations such as filtering operations using mip-maps (e.g., texture maps of varying levels of detail), in accordance with at least one embodiment. In at least one embodiment, each SM 3600 includes, without limitation, two texture units.

Each SM 3600 comprises, without limitation, N LSUs 3614 that implement load and store operations between shared memory/L1 cache 3618 and register file 3608, in at least one embodiment. In at least one embodiment, each SM 3600 includes, without limitation, an interconnect network 3616 that connects each of functional units to register file 3608 and LSU 3614 to register file 3608 and shared memory/L1 cache 3618 in at least one embodiment. In at least one embodiment, interconnect network 3616 is a crossbar that can be configured to connect any of functional units to any of registers in register file 3608 and connect LSUs 3614 to register file 3608 and memory locations in shared memory/L1 cache 3618.

In at least one embodiment, shared memory/L1 cache 3618 is an array of on-chip memory that allows for data storage and communication between SM 3600 and primitive engine and between threads in SM 3600, in at least one embodiment. In at least one embodiment, shared memory/L1 cache 3618 comprises, without limitation, 128 KB of storage capacity and is in path from SM 3600 to partition unit. In at least one embodiment, shared memory/L1 cache 3618, in at least one embodiment, is used to cache reads and writes. In at least one embodiment, one or more of shared memory/L1 cache 3618, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of capacity, texture and load/store operations can use remaining capacity. Integration within shared memory/L1 cache 3618 enables shared memory/L1 cache 3618 to function as a high-throughput conduit for streaming data while simultaneously providing high-bandwidth and low-latency access to frequently reused data, in accordance with at least one embodiment. In at least one embodiment, when configured for general-purpose parallel computation, a simpler configuration can be used compared with graphics processing. In at least one embodiment, fixed function graphics processing units are bypassed, creating a much simpler programming model. In a general-purpose parallel computation configuration, work distribution unit assigns and distributes blocks of threads directly to DPCs, in at least one embodiment. In at least one embodiment, threads in a block execute a same program, using a unique thread ID in calculation to ensure each thread generates unique results, using SM 3600 to execute said program and perform calculations, shared memory/L1 cache 3618 to communicate between threads, and LSU 3614 to read and write global memory through shared memory/L1 cache 3618 and memory partition unit. In at least one embodiment, when configured for general-purpose parallel computation, SM 3600 writes commands that scheduler unit 3604 can use to launch new work on DPCs.

In at least one embodiment, PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, PPU is embodied on a single semiconductor substrate. In at least one embodiment, PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and alike.

In at least one embodiment, PPU may be included on a graphics card that includes one or more memory devices. In at least one embodiment, a graphics card may be configured to interface with a PCIe slot on a motherboard of a desktop computer. In at least one embodiment, PPU may be an integrated graphics processing unit ("iGPU") included in a chipset of a motherboard.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, a deep learning application processor is used to train a machine learning model, such as a neural network, to predict or infer information provided to SM 3600. In at least one embodiment, SM 3600 is used to infer or predict information based on a trained machine learning model (e.g., neural network) that has been trained by another processor or system or by SM 3600. In at least one embodiment, SM 3600 may be used to perform one or more neural network use cases described herein.

In at least one embodiment, a GPU-based scrambling/descrambling unit might be used to perform scrambling and/or descrambling as part of a communications process or system used with a system of FIG. 36.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory 1604 and/or a secondary storage. Computer programs, if executed by one or more processors, enable system 1600 to perform various functions in accordance with at least one embodiment. In at least one embodiment, memory 1604, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, a digital versatile disk ("DVD") drive, a recording device, a universal serial bus ("USB") flash memory, etc. In at least one embodiment, architecture and/or functionality of various previous figures are implemented in context of CPU 1602; parallel processing system 1612; an integrated circuit capable of at least a portion of capabilities of both CPU 1602; parallel processing system 1612; a chipset (e.g., a group of integrated circuits designed to work and sold as a unit for performing related functions, etc.); and any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 1600 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, a workstation, game consoles, an embedded system, and/or any other type of logic.

In at least one embodiment, parallel processing system 1612 includes, without limitation, a plurality of parallel processing units ("PPUs") 1614 and associated memories 1616. In at least one embodiment, PPUs 1614 are connected to a host processor or other peripheral devices via an interconnect 1618 and a switch 1620 or a multiplexer. In at least one embodiment, parallel processing system 1612 distributes computational tasks across PPUs 1614 which can be parallelizable for example, as part of distribution of computational tasks across multiple graphics processing unit ("GPU") thread blocks. In at least one embodiment, memory is shared and accessible (e.g., for read and/or write access) across some or all of PPUs 1614, although such shared memory may incur performance penalties relative to use of local memory and registers resident to a PPU 1614. In at least one embodiment, operation of PPUs 1614 is synchronized through use of a command such as _syncthreads( ), wherein all threads in a block (e.g., executed across multiple PPUs 1614) to reach a certain point of execution of code before proceeding.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to a specific form or forms disclosed, but on contrary, intention is to cover all modifications, alternative constructions, and equivalents falling within spirit and scope of disclosure, as defined in appended claims.

Use of the terms "a" and "an" and "the" and similar referents in context of describing disclosed embodiments (especially in context of following claims) are to be construed to cover both singular and plural, unless otherwise indicated herein or clearly contradicted by context. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but a subset and a corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). Number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of said code while multiple non-transitory computer-readable storage media collectively store all of said code. In at least one embodiment, executable instructions are executed such that different instructions are executed by different processors for example, a non-transitory computer-readable storage medium store instructions and a main central processing unit ("CPU") executes some of said instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or alike, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to an acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing claims.

What is claimed is:

1. A method, comprising:

generating a descrambling sequence derived from one or more many-to-one Linear Feedback Shift Registers (LFSRs) based, at least in part, on two or more threads of one or more parallel processing units (PPUs) operating on two or more one-to-many LFSRs that are advanced through a number of cycles that differ across the two or more threads with outputs of the two or more one-to-many LFSRs provided as inputs to the one or more many-to-one LFSRs.

2. The method of claim 1, wherein the descrambling sequence is a pseudorandom bit sequence that is a function of a user identifier of a user device having transmitted an input data sequence and of a base station identifier of a base station having received the input data sequence.

3. The method of claim 2, further comprising:

storing the descrambling sequence as a stored descrambling sequence in a shared memory of a graphics processing unit (GPU) in association with a sequence user identifier and a sequence base station identifier;

determining the user identifier and the base station identifier for a subsequent input data sequence;

determining if the user identifier is equal to the sequence user identifier;

determining if the base station identifier is equal to the sequence base station identifier; and if the user identifier is equal to the sequence user identifier and the base station identifier is equal to the sequence base station identifier, using the stored descrambling sequence for descrambling the subsequent input data sequence.

4. The method of claim 1, further comprising:

storing the descrambling sequence in a shared memory of a graphics processing unit (GPU);

determining a size in bits of the descrambling sequence;

determining a data width of threads; and determining a number of allocated threads allocated to generate the descrambling sequence based on the size in bits of the descrambling sequence and the data width of the threads, and the number of allocated threads being sufficient to descramble in parallel at least as many input data values as the size in bits of the descrambling sequence.

5. The method of claim 1, further comprising:

storing the descrambling sequence in a shared memory of a graphics processing unit (GPU);

determining a size in bits of the descrambling sequence;

determining a data width of threads;

determining a number of allocated threads of a plurality of blocks of threads allocated to generate the descrambling sequence based on the size in bits of the descrambling sequence and the data width of the threads, and the number of allocated threads being sufficient to descramble in parallel at least as many input data values as the size in bits of the descrambling sequence;

reading into thread local memory an array of input data values;

reading a descrambling segment from the shared memory; and descrambling the array of input data values using the descrambling segment.

6. The method of claim 1, wherein a graphics processing unit (GPU) comprising the one or more PPUs is an element of a cellular network base station.

7. The method of claim 1, further comprising:

obtaining an initialization value for a first cycling process from a first generator polynomial for generating the descrambling sequence, wherein cycles of the first cycling process generate the descrambling sequence and the first generator polynomial corresponds to a many-to-one linear feedback shift register (LFSR) of the one or more many-to-one LFSRs with a first feedback pattern in which a plurality of register values are feedback to a single input of the many-to-one LFSR;

determining a second cycling process represented by a one-to-many LFSR of the two or more one-to-many LF SRs, converting from the first feedback pattern to a second feedback pattern, represented by a second generator polynomial, in which a single input of the one-to-many LFSR is fed back to a plurality of stages of the one-to-many LFSR according to the second generator polynomial;

initializing a plurality of threads of a graphics processing unit (GPU) to process at least a portion of the second cycling process, wherein the plurality of threads include the two or more threads;

initializing a first thread of the plurality of threads to operate a first thread LFSR, wherein the first thread LFSR is initialized to a first position in the descrambling sequence with polynomial multiplication modulo the second generator polynomial and a first monomial with a first degree corresponding to the first position;

initializing a second thread of the plurality of threads to operate a second thread LFSR, wherein the second thread LFSR is initialized to a second position in the descrambling sequence with polynomial multiplication modulo the second generator polynomial and a second monomial with a second degree corresponding to the second position, wherein the first position and the second position are distinct; and storing a first output of the first thread and a second output of the second thread as at least a portion of the descrambling sequence in a shared memory of the GPU.

8. A processor, comprising:

one or more circuits to generate a descrambling sequence derived from one or more many-to-one Linear Feedback Shift Registers (LFSRs) based, at least in part, on two or more threads of one or more parallel processing units (PPUs) operating on two or more one-to-many LFSRs that are advanced through a number of cycles that differ across the two or more threads with outputs of the two or more one-to-many LFSRs provided as inputs to the one or more many-to-one LFSRs.

9. The processor of claim 8, wherein the one or more circuits are to generate the descrambling sequence using linear feedback shift registers (LFSRs).

10. The processor of claim 8, wherein descrambling sequence is defined by a generator polynomial and a Fibonacci linear feedback shift register (LFSR), wherein the one or more circuits are to generate the descrambling sequence using a plurality of threads of a graphics processing unit (GPU) by operating each thread of the plurality of threads to generate a descrambling segment of the descrambling sequence.

11. The processor of claim 8, wherein the one or more circuits are to use the descrambling sequence by XOR-ing an output of a first linear feedback shift register (LFSR) and an output of a second linear feedback shift register (LFSR).

12. The processor of claim 8, wherein the one or more circuits are to perform the descrambling sequence using the two or more threads using a bitwise XOR on a first Fibonacci linear feedback shift register (LFSR) output and a second Fibonacci linear feedback shift register (LFSR) output.

13. The processor of claim 8, wherein the one or more circuits are to perform cycle advancement for linear feedback shift registers (LFSRs) on a plurality of threads of a graphics processing unit (GPU) in parallel, wherein each descrambling segment of the descrambling sequence is output by at least one thread of the plurality of threads.

14. A computer readable medium having stored thereon a set of instructions, which if performed by one or more processors, cause the one or more processors to generate a descrambling sequence derived from one or more many-to-one Linear Feedback Shift Registers (LFSRs) based, at least in part, on two or more threads of one or more parallel processing units (PPUs) operating on two or more one-to-many LFSRs that are advanced through a number of cycles that differ across the two or more threads with outputs of the two or more one-to-many LFSRs provided as inputs to the one or more many-to-one LFSRs.

15. The computer readable medium of claim 14, wherein the descrambling sequence is 1024 bits, a plurality of thread hardware units comprises 32 thread hardware units, and one or more descrambling segments are 32 bits wide, and wherein a first array location and a second array location are word-length memory locations in a shared memory.

16. The computer readable medium of claim 14, wherein the descrambling sequence is a pseudorandom bit sequence that is a function of a user identifier of a user device having transmitted an input data sequence and of a base station identifier of a base station having received the input data sequence.

17. The computer readable medium of claim 14, wherein the set of instructions which if performed by the one or more processors, cause the one or more processors to:

cause a global memory of a graphics processing unit (GPU) to be accessible to a first thread hardware unit and a second thread hardware unit; and a sequence identifier storage of the global memory to store a sequence user identifier and a sequence base station identifier associated with an array of descrambling segments, usable to match a user identifier of a subsequent input data sequence with the sequence user identifier and a base station identifier of the subsequent input data sequence with the sequence base station identifier, wherein if the user identifier is equal to the sequence user identifier and the base station identifier is equal to the sequence base station identifier, the array of descrambling segments is provided for descrambling the subsequent input data sequence.

18. The computer readable medium of claim 14, wherein the set of instructions which if performed by the one or more processors, cause the one or more processors to allocate the two or more threads to generate the descrambling sequence.

19. The computer readable medium of claim 14, wherein the set of instructions which if performed by the one or more processors, cause the one or more processors to allocate the two or more threads to generate the descrambling sequence based on a size in bits of the descrambling sequence, a data width of the allocated two or more threads, and/or a number of allocated threads being sufficient to generate in parallel the bits of the descrambling sequence.

20. A system, comprising:

one or more processors to generate a descrambling sequence derived from one or more many-to-one Linear Feedback Shift Registers (LFSRs) based, at least in part, on two or more threads of one or more parallel processing units (PPUs) operating on two or more one-to-many LFSRs that are advanced through a number of cycles that differ across the two or more threads with outputs of the two or more one-to-many LFSRs provided as inputs to the one or more many-to-one LFSRs.

21. The system of claim 20, wherein the generated descrambling sequence comprises a sequence of bits to be used in XOR to descramble input data.

22. The system of claim 20, wherein the one or more processors are to cause each thread of a graphics processing unit (GPU) to calculate a different set of bits of the descrambling sequence.

23. The system of claim 20, wherein the one or more processors are to derive the descrambling sequence from one or more Fibonacci linear feedback shift registers (LFSRs) that are generated using Galois LFSRs using a plurality of threads of a graphics processing unit (GPU).

24. The system of claim 20, wherein the two or more threads are a part of a graphics processing unit (GPU) of a software-defined radio access network (RAN) interface.

25. The system of claim 20, wherein the descrambling sequence is a pseudorandom bit sequence that is a function of a user identifier of a user device having transmitted an input data sequence and of a base station identifier of a base station having received the input data sequence.

* * * * *